(12) United States Patent
Hu et al.

(10) Patent No.: US 11,181,669 B2
(45) Date of Patent: Nov. 23, 2021

(54) OPTICAL SYSTEM

(71) Applicant: TDK TAIWAN CORP., Taoyuan (TW)

(72) Inventors: Chao-Chang Hu, Taoyuan (TW); Che-Wei Chang, Taoyuan (TW); Chih-Wen Chiang, Taoyuan (TW); Chen-Er Hsu, Taoyuan (TW); Fu-Yuan Wu, Taoyuan (TW); Shou-Jen Liu, Taoyuan (TW); Chih-Wei Weng, Taoyuan (TW); Mao-Kuo Hsu, Taoyuan (TW); Hsueh-Ju Lu, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 30 days.

(21) Appl. No.: 16/728,496

(22) Filed: Dec. 27, 2019

(65) Prior Publication Data

US 2020/0209439 A1    Jul. 2, 2020

Related U.S. Application Data

(60) Provisional application No. 62/894,295, filed on Aug. 30, 2019, provisional application No. 62/890,731, filed on Aug. 23, 2019, provisional application No. 62/825,538, filed on Mar. 28, 2019, provisional application No. 62/785,593, filed on Dec. 27, 2018.

(30) Foreign Application Priority Data

Dec. 20, 2019    (TW) ................................ 19218902.5

(51) Int. Cl.
    *G02B 3/14*    (2006.01)

(52) U.S. Cl.
    CPC ...................................... *G02B 3/14* (2013.01)

(58) Field of Classification Search
    CPC combination set(s) only.
    See application file for complete search history.

(56) References Cited

U.S. PATENT DOCUMENTS

2010/0232161 A1* 9/2010 Aschwanden ..... G02B 26/0825
                                                   362/278
2011/0122495 A1* 5/2011 Togashi ................... G03B 5/00
                                                   359/557

(Continued)

FOREIGN PATENT DOCUMENTS

EP          3642665 A1    4/2020
KR       20180123376 A   11/2018
WO    WO-2017/149092 A2   9/2017

OTHER PUBLICATIONS

Search Report of EP Application No. 19218902.5, dated Aug. 3, 2020, 12 pages.

*Primary Examiner* — Omar S Ismail
(74) *Attorney, Agent, or Firm* — Muncy, Geissler, Olds & Lowe, P.C.

(57) ABSTRACT

An optical system is provided and includes a fixed assembly, a movable element and a driving module. The fixed assembly has a main axis. The movable element is movable relative to the fixed assembly and has a surface facing a first optical element. The driving module is configured to drive the movable element to move relative to the fixed assembly.

20 Claims, 135 Drawing Sheets

(56) References Cited

U.S. PATENT DOCUMENTS

| | | | |
|---|---|---|---|
| 2015/0309282 A1* | 10/2015 | Lee | G03B 3/10 359/814 |
| 2016/0109681 A1* | 4/2016 | Lam | G02B 7/28 359/824 |
| 2016/0216476 A1* | 7/2016 | Lee | G02B 7/08 |

* cited by examiner

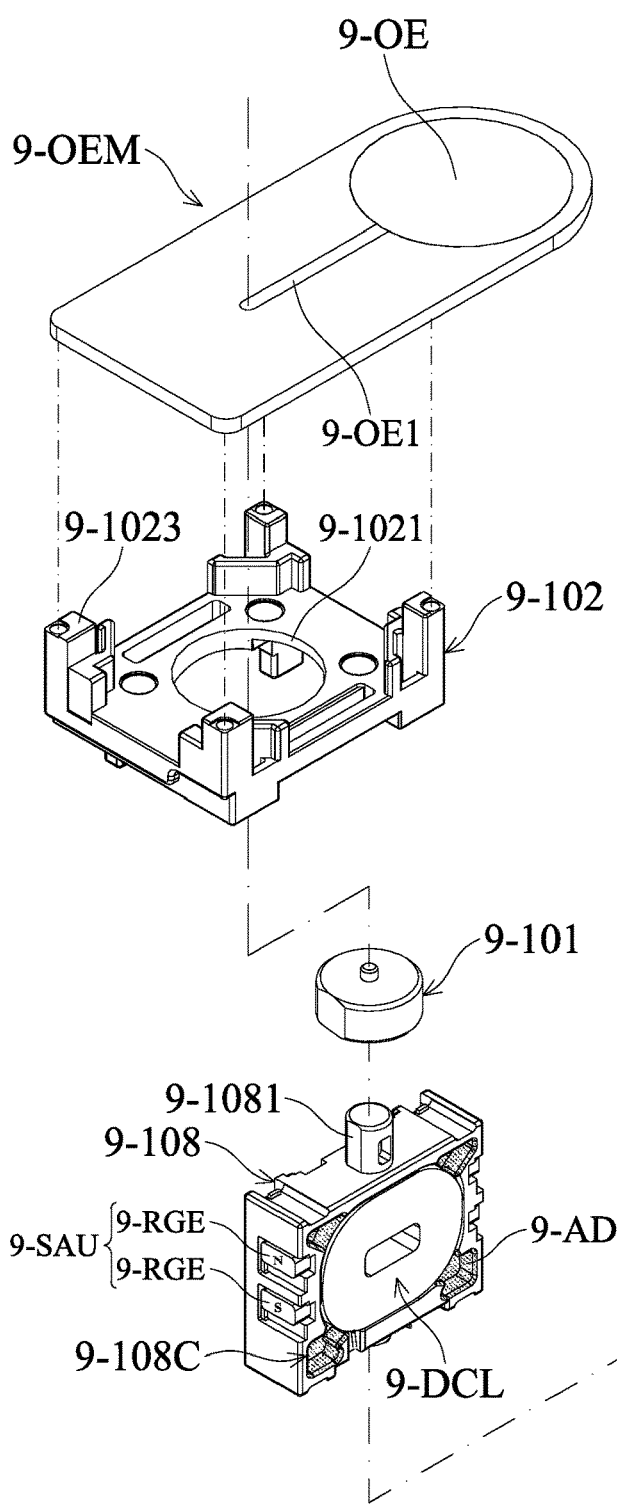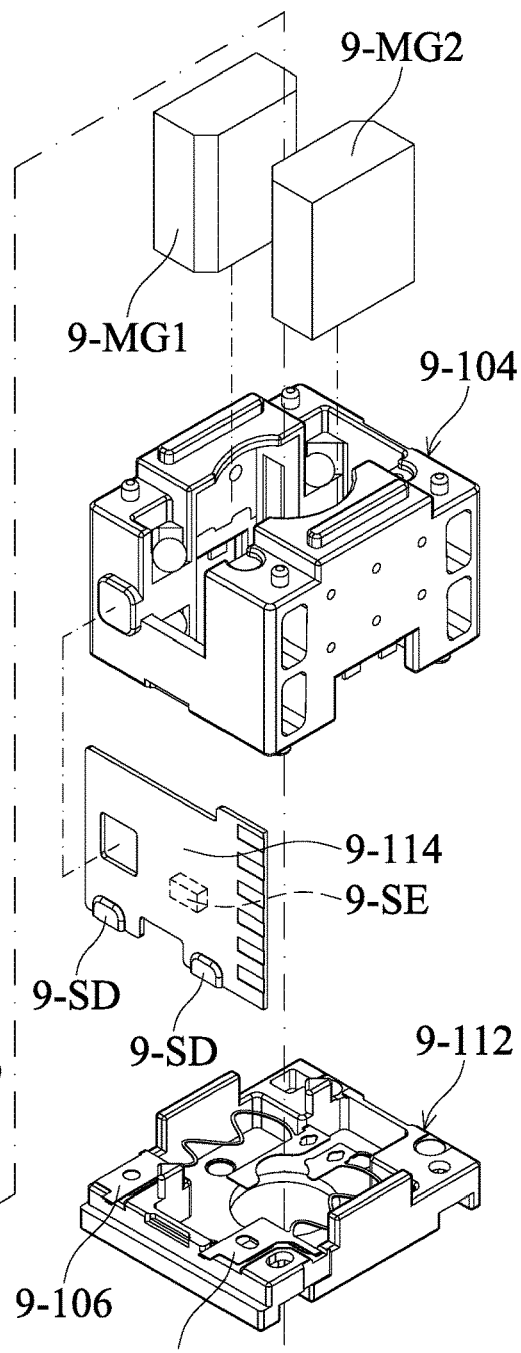
FIG. 92

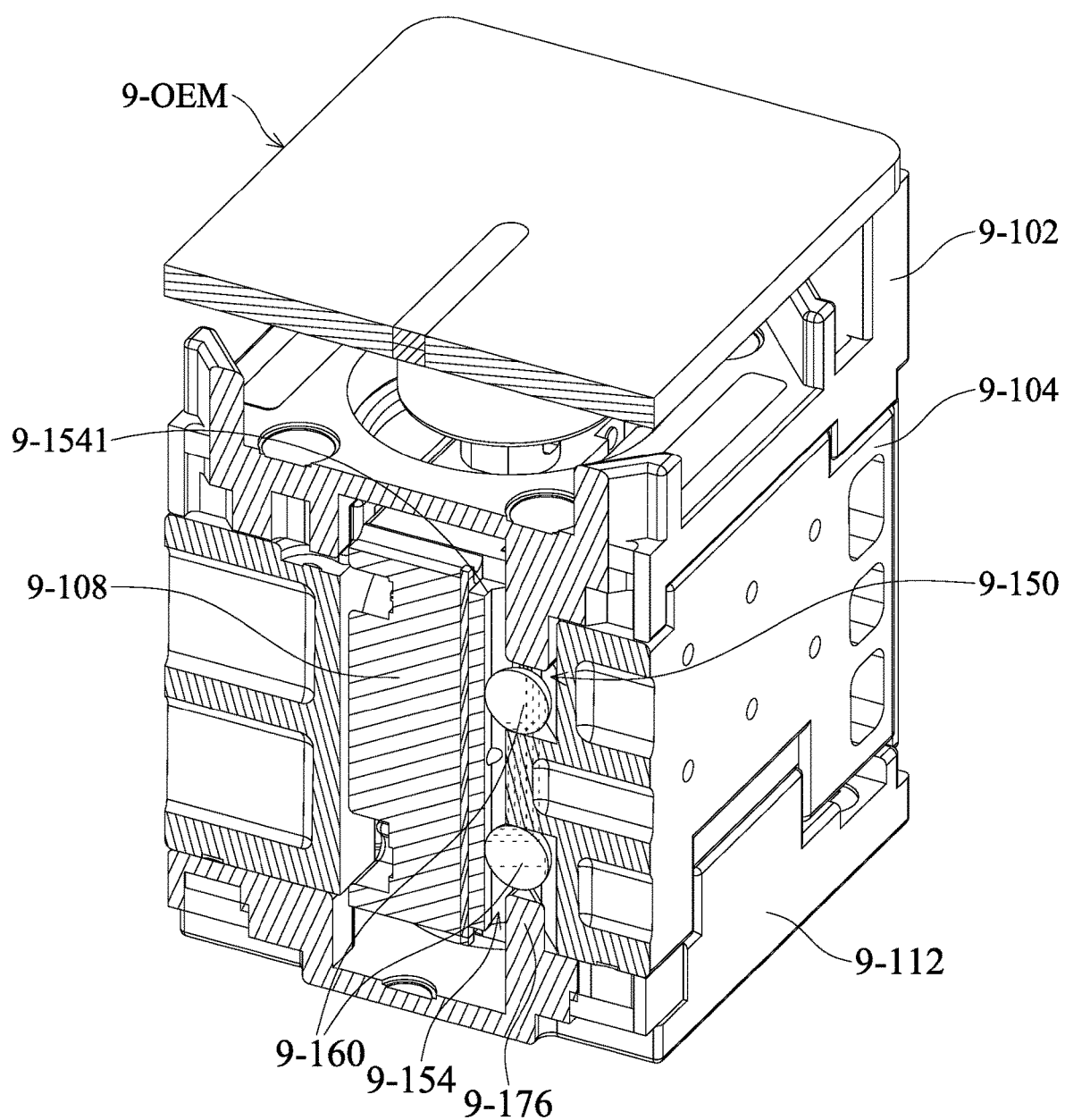
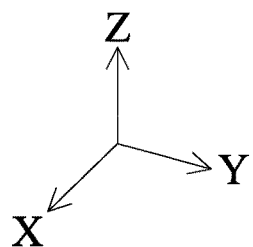
FIG. 96

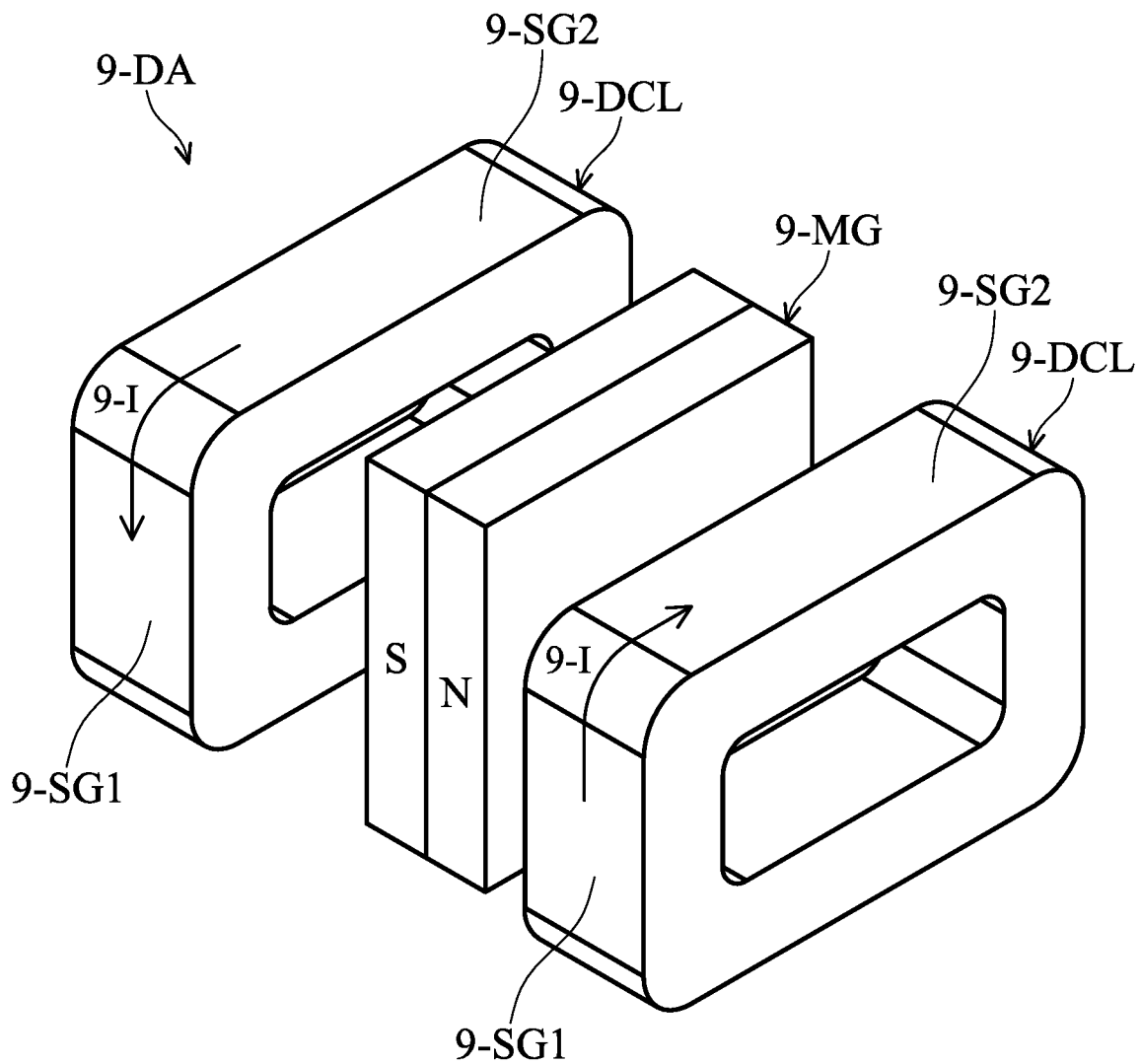
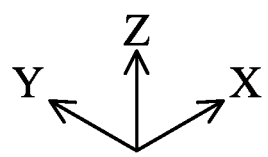
FIG. 102

OPTICAL SYSTEM

CROSS REFERENCE TO RELATED APPLICATIONS

This application claims the benefit of U.S. Provisional Application No. 62/785,593, filed Dec. 27, 2018, U.S. Provisional Application No. 62/825,538, filed Mar. 28, 2019, U.S. Provisional Application No. 62/890,731, filed Aug. 23, 2019, U.S. Provisional Application No. 62/894,295, filed Aug. 30, 2019, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate an electronic device to capture various images with a camera module that is included in the electronic device.

The design trend of today's electronic devices is toward miniaturization, meaning that the various components of a camera module or its structure must also be continuously reduced, so as to achieve the purpose of miniaturization. In general, a driving mechanism in a camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF THE DISCLOSURE

Accordingly, one objective of the present disclosure is to provide an optical system (camera module) to solve the above problems.

According to some embodiments of the disclosure, an optical system includes a fixed assembly, a movable element and a driving module. The fixed assembly has a main axis. The movable element is movable relative to the fixed assembly and has a movable element surface facing a first optical element. The driving module is configured to drive the movable element to move relative to the fixed assembly.

According to some embodiments, the driving module includes a first driving assembly and a second driving assembly. The first driving assembly has a first driving coil; and a first magnetic element, having a first magnetic surface which faces the first driving coil. The second driving assembly has a second driving coil; and a second magnetic element, having a second magnetic surface which faces the second driving coil. The first magnetic surface and the second magnetic surface face different directions.

According to some embodiments, the optical system further includes a movable assembly and a connecting assembly, the movable assembly is movably connected to the movable element via the connecting assembly, and the driving module drives the movable assembly to move relative to the fixed assembly, thereby driving the movable element.

According to some embodiments, the driving module further includes a third driving assembly, the movable assembly includes a first movable member surface and a third movable member surface, the first movable member surface faces the first driving assembly, and the third movable member surface faces the third driving assembly, wherein an imaginary plane is defined by the optical system, the imaginary plane is perpendicular to the main axis, and when the driving module drives the movable assembly and when viewed in a direction perpendicular to the main axis, an angle between the movable element surface and the imaginary plane is less than or equal to an angle formed between a line connecting a center of the first movable member surface with a center of the third movable member surface and the imaginary plane.

According to some embodiments, the movable assembly includes a first movable member and a second movable member, the first driving assembly is configured to drive the first movable member to move relative to the fixed assembly, and the second driving assembly is configured to drive the second movable member to move relative to the fixed assembly and the first movable member.

According to some embodiments, the connecting assembly includes a connecting member, and the movable assembly is connected to the movable element via an elastic portion of the connecting member.

According to some embodiments, the elastic portion has a plate-shaped structure which is substantially parallel to the main axis.

According to some embodiments, the connecting member has a platform surface facing the movable element.

According to some embodiments, the optical system further includes an adhesive member disposed between the platform surface and the movable element.

According to some embodiments, the movable assembly includes a first accommodating slot, and the first accommodating slot is configured to accommodate the connecting member.

According to some embodiments, the movable assembly further includes a second accommodating slot, and an adhesive element is disposed in the second accommodating slot and is configured to adhere to the connecting member.

According to some embodiments, the elastic portion has a plate-shaped structure which is not parallel to the main axis.

According to some embodiments, the connecting member further includes a rigid portion connected between the elastic portion and the movable assembly, and in the main axis, an elastic coefficient of the rigid portion is greater than an elastic coefficient of the elastic portion.

According to some embodiments, a portion of the rigid portion is embedded in the movable assembly, the rigid portion includes a first section and a second section connected to the first section, and the second section is not parallel to the first section.

According to some embodiments, the elastic portion includes a first cantilever, and when viewed in the direction of the main axis, the movable element does not overlap at least one portion of the first cantilever.

According to some embodiments, the optical system further includes a lens barrel configured to accommodate at least one second optical element, and the lens barrel has at least one projection, which extends toward the movable element.

According to some embodiments, the connecting assembly further includes a plurality of connecting members, and the elastic portions of the connecting members are disposed around the main axis.

According to some embodiments, when viewed in the direction of the main axis, the projection is located between two adjacent elastic portions.

According to some embodiments, an opening and a perforation are formed on the movable element, the main axis passes through the opening, and the perforation is adjacent to the opening.

According to some embodiments, the movable element has a plurality of perforations configured to surround the opening in a symmetrical manner.

According to some embodiments, the optical system further includes a movable assembly, and when viewed in a direction of the main axis, the movable assembly overlaps the first optical element.

The present disclosure provides an optical system having a first optical element, a deforming member, a movable element, a fixed assembly, a connecting assembly, a movable assembly, and a driving module. The movable element is configured to be connected to the first optical element through the deforming member, and the movable assembly is connected to the movable element through the connecting assembly. When driving module is configured to drive movable assembly to move relative to fixed assembly, the movable element can be moved to drive the deforming member to push the bottom of first optical element, thereby changing the optical properties of the liquid lens element.

In addition, each movable member of the movable assembly can be moved independently or cooperatively, so that the optical properties of the liquid lens element can be changed according to different needs. Thereby, functions such as optical zoom, optical focus or optical shake compensation can be achieved, and the performance of the driving mechanism can be improved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, the dimensions of the various features may be arbitrarily increased or reduced for clarity of discussion.

FIG. 92 is an exploded diagram of the optical element driving mechanism 9-100 according to an embodiment of the present disclosure.

FIG. 96 is a perspective sectional view of the optical element driving mechanism 9-100 according to an embodiment of the present disclosure.

FIG. 102 is a schematic perspective view of a partial structure of the optical element driving mechanism 9-100 according to another embodiment of the present disclosure.

FIG. 122 is a schematic diagram illustrating that the first optical element 11-OE is not pushed by the deforming member 11-101 according to an embodiment of the present disclosure.

FIG. 123 and FIG. 124 are schematic diagrams of the first optical element 11-OE after being pushed by the deforming member 11-101 according to an embodiment of the present disclosure.

FIG. 125 is an exploded diagram of an optical system 11-100A according to another embodiment of the present disclosure.

FIG. 126 is a cross-sectional view of the optical system 11-100A according to another embodiment of the present disclosure.

FIG. 127 is a partial structural diagram of the optical system 11-100A according to another embodiment of the present disclosure.

FIG. 128 is a top view of a partial structure of the optical system 11-100A according to another embodiment of the present disclosure.

FIG. 129 is a cross-sectional view of the optical system 11-100A according to another embodiment of the present disclosure.

FIG. 130 is a schematic diagram of a partial structure of the optical system 11-100A according to another embodiment of the present disclosure.

FIG. 131 is a cross-sectional view of the optical system 11-100A along the XZ plane according to an embodiment of the present disclosure.

FIG. 132 to FIG. 134 are schematic diagrams of the movement of the first movable member 11-1081 relative to the protruding pillar 11-1127 according to an embodiment of the present disclosure.

FIG. 135 is a top view of a part of the structure of the optical system 11-100A according to another embodiment of the present disclosure.

FIG. 136 is a partial structural diagram of the optical system 11-100A according to another embodiment of the present disclosure.

Figure 137:
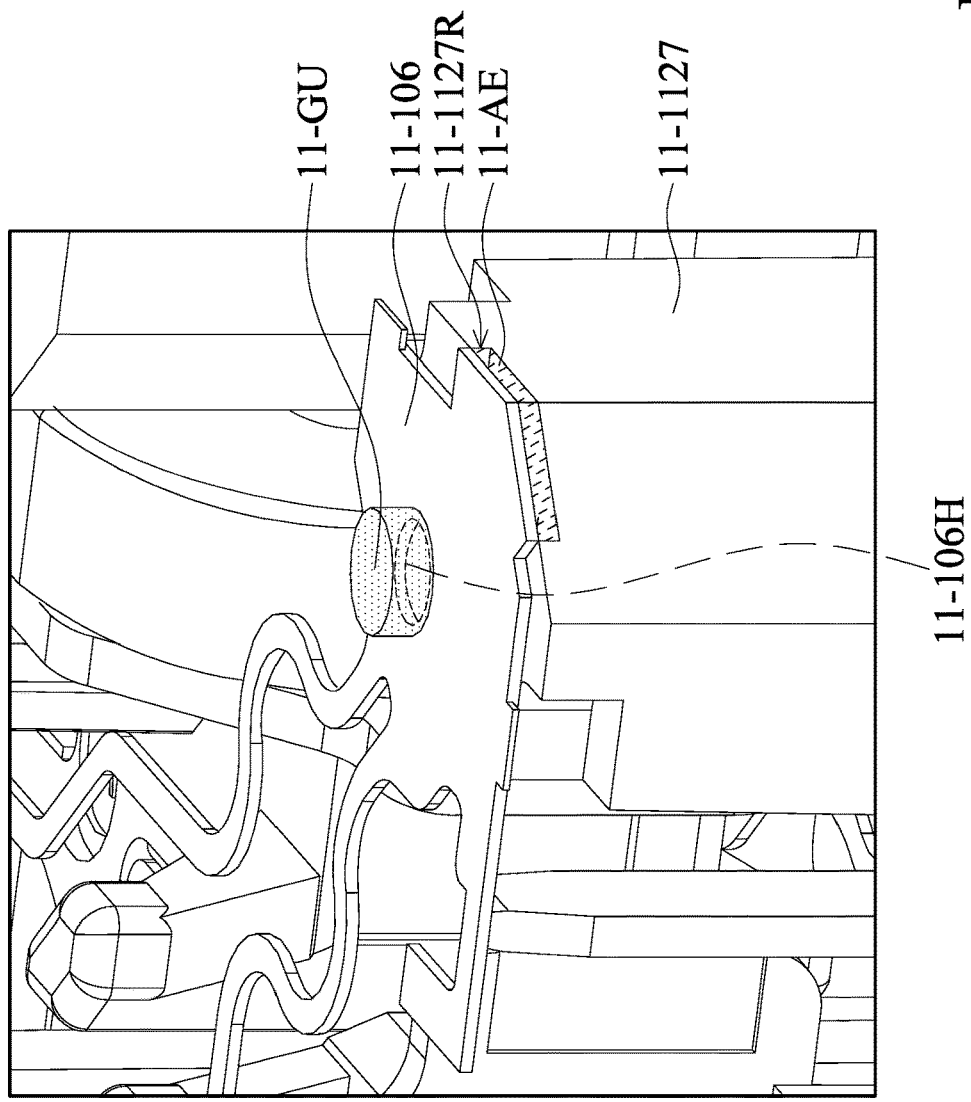

FIG. 137 is a schematic structural diagram of a part of the optical system 11-100A according to another embodiment of the present disclosure.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

The first embodiment group.

Figure 1:
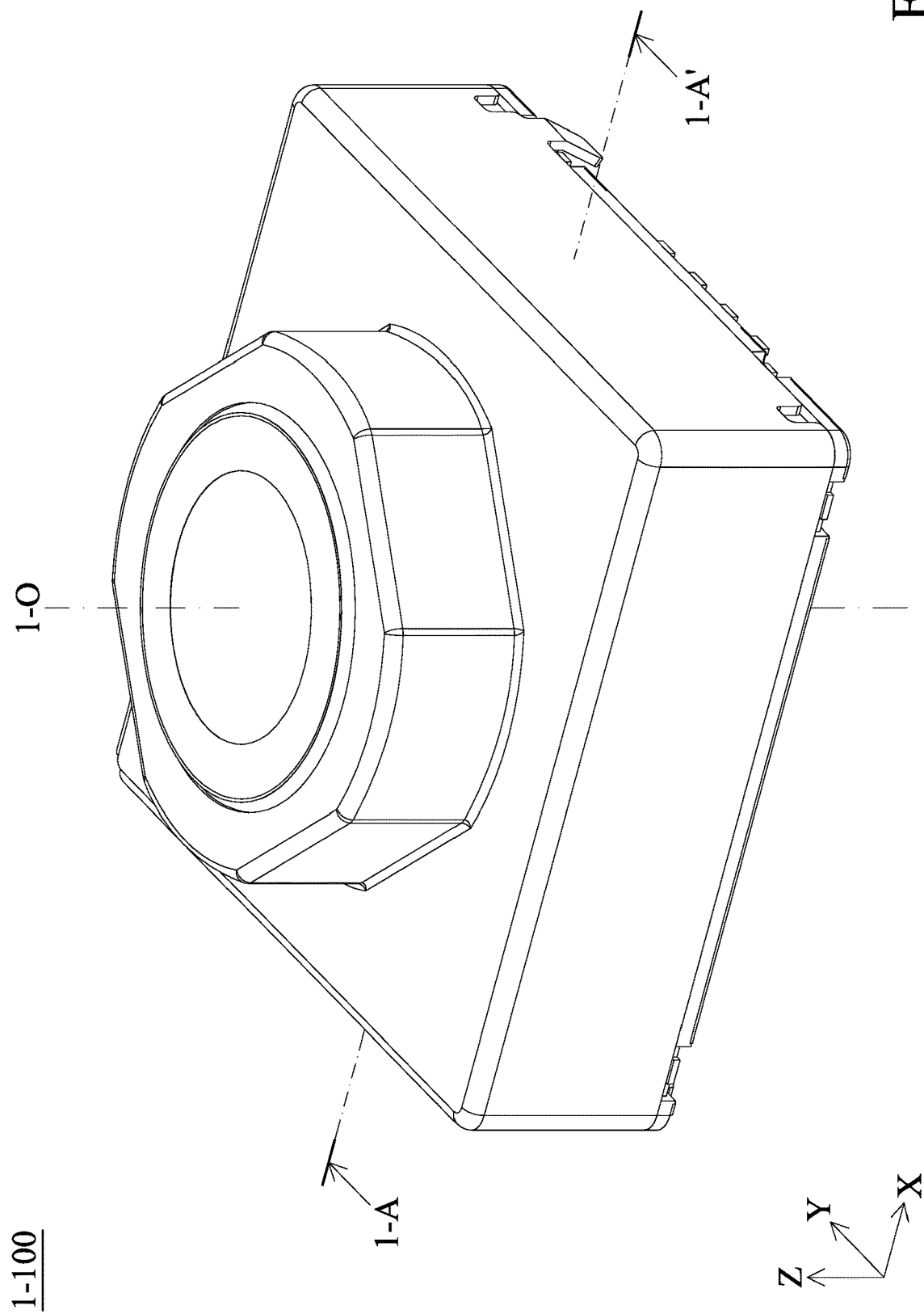
FIG. 1 is a schematic diagram of an optical system 1-100 according to an embodiment of the present disclosure.
Figure 2:
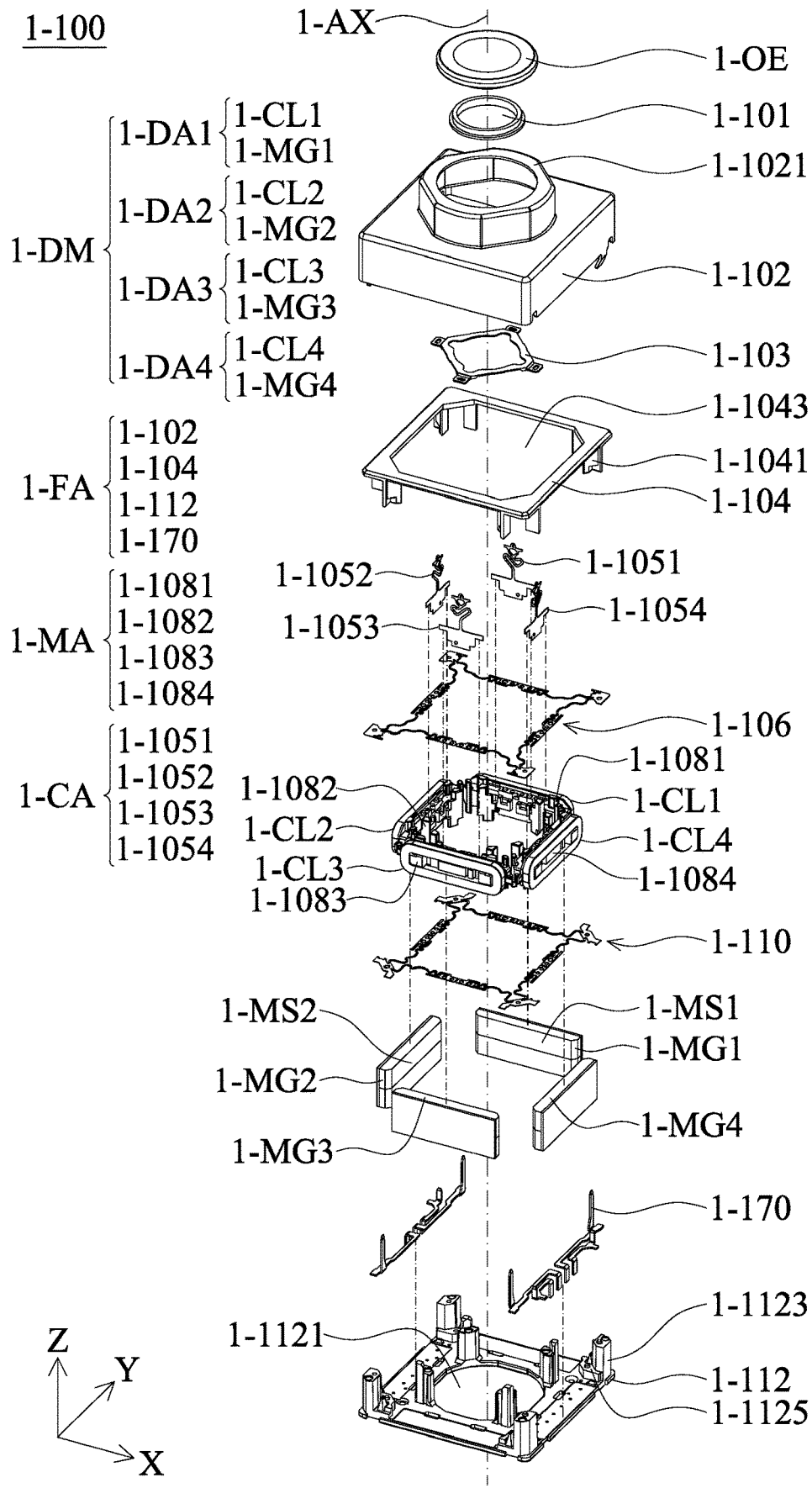
FIG. 2 is an exploded diagram of an optical system 1-100 according to an embodiment of the present disclosure.
Figure 3:
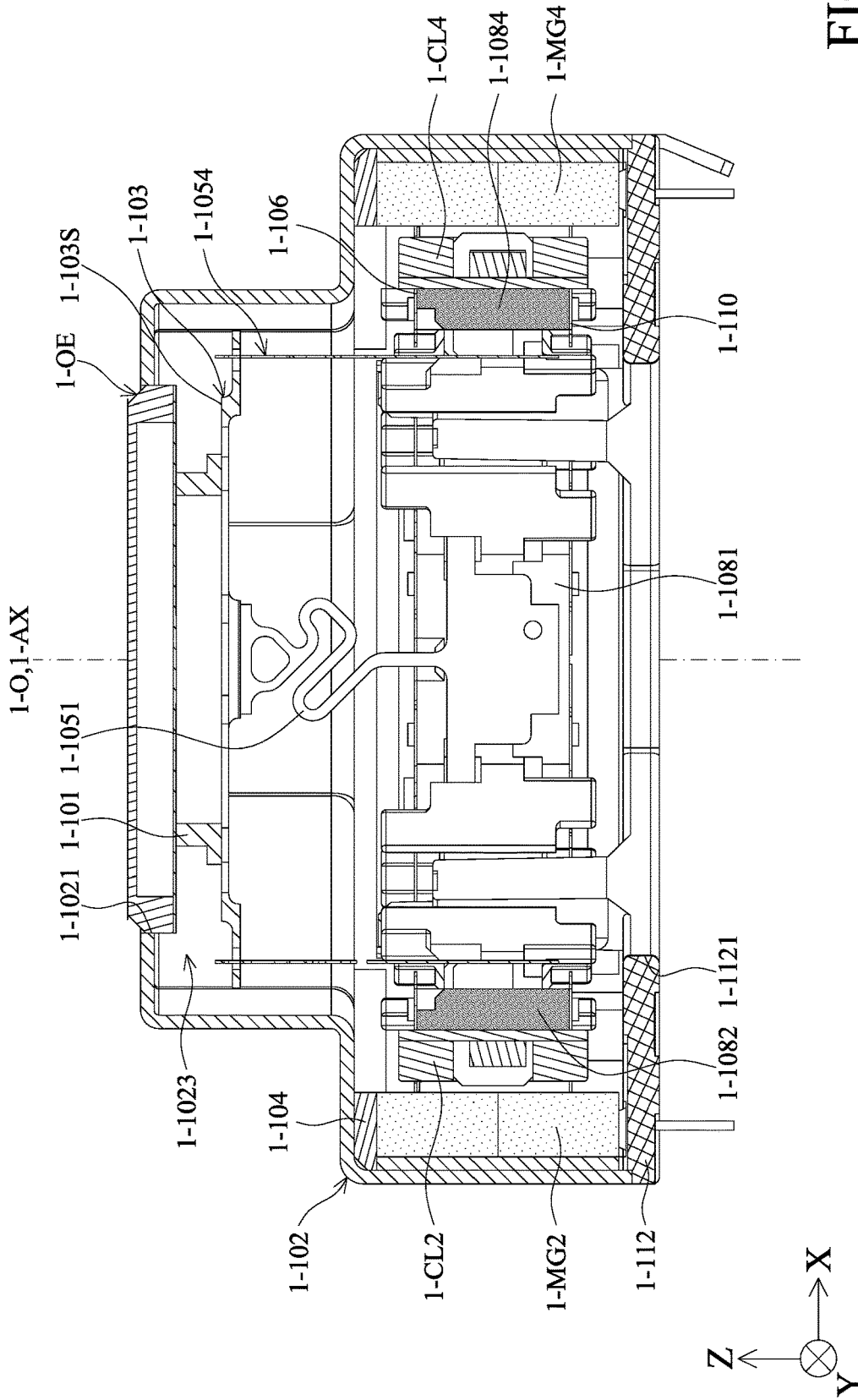
FIG. 3 is a cross-sectional view of the optical system 1-100 along line 1-A-1-A' in FIG. 1 according to an embodiment of the present disclosure.

Please refer to FIG. 1 to FIG. 3. FIG. 1 is a schematic diagram of an optical system 1-100 according to an embodiment of the present disclosure, FIG. 2 is an exploded diagram of an optical system 1-100 according to an embodiment of the present disclosure, and FIG. 3 is a cross-sectional view of the optical system 1-100 along line 1-A-1-A' in FIG. 1 according to an embodiment of the present disclosure. The optical system 1-100 can be an optical camera system and can be configured to hold and drive a first optical element 1-OE, and the first optical element 1-OE may define an optical axis 1-O. The optical system 1-100 can be installed in different electronic devices or portable electronic devices, such as a smartphone, for allowing a user to perform the image capturing function. In this embodiment, the optical system 1-100 can be a voice coil motor (VCM) with an auto-focusing (AF) function, but it is not limited thereto. In other embodiments, the optical system 1-100 can also perform the functions of auto-focusing and optical image stabilization (OIS).

As shown in FIG. 2, in this embodiment, the optical system 1-100 may include a fixed assembly 1-FA, a deforming member 1-101, a movable element 1-103, and a connecting assembly 1-CA, a movable assembly 1-MA and a driving module 1-DM. The deforming member 1-101 is connected between the movable element 1-103 and the first optical element 1-OE, the movable element 1-103 is movable relative to the fixed assembly 1-FA, and the driving module 1-DM is configured to drive the movable element 1-103 to move relative to the fixed assembly 1-FA. Specifically, the movable assembly 1-MA is movably connected to the movable element 1-103 via the connecting assembly 1-CA, and the driving module 1-DM drives the movable assembly 1-MA to move relative to the fixed assembly 1-FA, thereby driving the movable element 1-103.

In this embodiment, as shown in FIG. 2 and FIG. 3, the fixed assembly 1-FA includes a casing 1-102, a frame 1-104, and a base 1-112. The casing 1-102 is fixedly connected to the base 1-112, and the frame 1-104 can also be fixedly connected to the inner wall surface of the casing 1-102. A main axis 1-AX can be defined by the fixed assembly 1-FA. When the optical system 1-100 is not activated, the main axis 1-AX is parallel to or overlaps an optical axis 1-O of the first optical element 1-OE. In addition, the movable element 1-103 has a movable element surface 1-103S which faces the first optical element 1-OE.

As shown in FIG. 2 and FIG. 3, the aforementioned casing 1-102 has a hollow structure, and a casing opening 1-1021 is formed thereon. A base opening 1-1121 is formed on the base 1-112, The center of the casing opening 1-1021 corresponds to the optical axis 1-O of the first optical element 1-OE, and the base opening 1-1121 corresponds to a photosensitive element (not shown in the figure) disposed below the base 1-112. In this embodiment, the first optical element 1-OE is fixedly disposed in the casing opening 1-1021. The external light can enter the casing 1-102 through the first optical element 1-OE and then is received by the aforementioned photosensitive element after passing through the base opening 1-1121 so as to generate a digital image signal.

Furthermore, the casing 1-102 is disposed on the base 1-112 and may have an accommodating space 1-1023 configured to accommodate the movable element 1-103, the frame 1-104, and the movable assembly 1-MA, the connecting assembly 1-CA, and the driving module 1-DM.

As shown in FIG. 2 and FIG. 3, in this embodiment, the movable assembly 1-MA may include four movable members (a first movable member 1-1081, a second movable member 1-1082, and a third movable member 1-1083 and a fourth movable member 1-1084), and the connecting assembly 1-CA may include four connecting members (a first connecting member 1-1051, a second connecting member 1-1052, a third connecting member 1-1053, and a fourth connecting member 1-1054). The first movable member 1-1081 to the fourth movable member 1-1084 are connected to the movable element 1-103 by the first connecting member 1-1051 to the fourth connecting member 1-1054, respectively.

In addition, the optical system 1-100 may further include a first elastic element 1-106 and a second elastic element 1-110, and the base 1-112 may include four protruding columns 1-1123. The outer portion (the outer ring portion) of the first elastic element 1-106 is fixedly disposed on the top surfaces of the protruding columns 1-1123, the outer portion (the outer ring portion) of the second elastic element 1-110 is fixedly disposed on a plane 1-1125 of each of the protruding columns 1-1123, and the inner portions (the inner ring portions) of the first elastic element 1-106 and the second elastic element 1-110 are respectively connected to the upper and lower sides of the movable assembly 1-MA so that the first movable member 1-1081 to the fourth movable member 1-1084 are suspended in the accommodating space 1-1023.

In this embodiment, the driving module 1-DM may include four driving assemblies (a first driving assembly 1-DA1, a second driving assembly 1-DA2, a third driving assembly 1-DA3, and a fourth driving assembly 1-DA4). The first driving assembly 1-DA1 includes a first driving coil 1-CL1 and a first magnetic element 1-MG1, and the second driving assembly 1-DA2 includes a second driving coil 1-CL2 and a second magnetic element 1-MG2, the third driving assembly 1-DA3 includes a third driving coil 1-CL3 and a third magnetic element 1-MG3, and the fourth driving assembly 1-DA4 includes a fourth driving coil 1-CL4 and a fourth magnetic element 1-MG4.

In this embodiment, each magnetic element has a magnetic surface. For example, as shown in FIG. 2, the first magnetic element 1-MG1 and the second magnetic element 1-MG2 respectively have a first magnetic surface 1-MS1 and a second magnetic surface 1-MS2, the first magnetic surface 1-MS1 faces the first driving coil 1-CL1, the second magnetic surface 1-MS2 faces the second driving coil 1-CL2, and the first magnetic surface 1-MS1 and the second magnetic surface 1-MS2 face different directions.

In this embodiment, as shown in FIG. 2, the frame 1-104 has a plurality of grooves 1-1041 and a central opening 1-1043. In this embodiment, the frame 1-104 has four grooves 1-1041 configured to receive the four magnetic elements, but the number of the grooves 1-1041 and the magnetic elements is not limited to this embodiment. The central opening 1-1043 is configured to accommodate the first driving coil 1-CL1 to the fourth driving coil 1-CL4 and the first movable member 1-1081 to the fourth movable member 1-1084.

In this embodiment, the first driving coil 1-CL1 to the fourth driving coil 1-CL4 may be winding coils, which are respectively disposed on the first movable member 1-1081 to the fourth movable member 1-1084, and when the first driving coil 1-CL1 to the fourth driving coil 1-CL4 are provided with electricity, they can respectively act with the first magnetic element 1-MG1 to the fourth magnetic element 1-MG4 to generate an electromagnetic driving force to drive at least one of the first movable member 1-1081 to the fourth movable member 1-1084 to move relative to the base 1-112 and the frame 1-104 along the optical axis 1-O (the Z-axis) so as to perform functions of auto focusing or optical image stabilization.

The driving assembly of the driving module 1-DM can actuate individually or cooperatively. For example, the first driving assembly 1-DA1 is configured to drive the first movable member 1-1081 to move relative to the fixed assembly 1-FA, and the second driving assembly 1-DA2 is configured to drive the second movable member 1-1082 to move relative to the fixed assembly 1-FA and the first movable member 1-1081, and so on.

Furthermore, as shown in FIG. 2, in this embodiment, the fixed assembly 1-FA may further include at least one circuit member 1-170 configured to be electrically connected to the driving module 1-DM through the first elastic element 1-106 or the second elastic element 1-110. The circuit member 1-170 may be implemented by insert molding technology, but it is not limited thereto.

Figure 4:
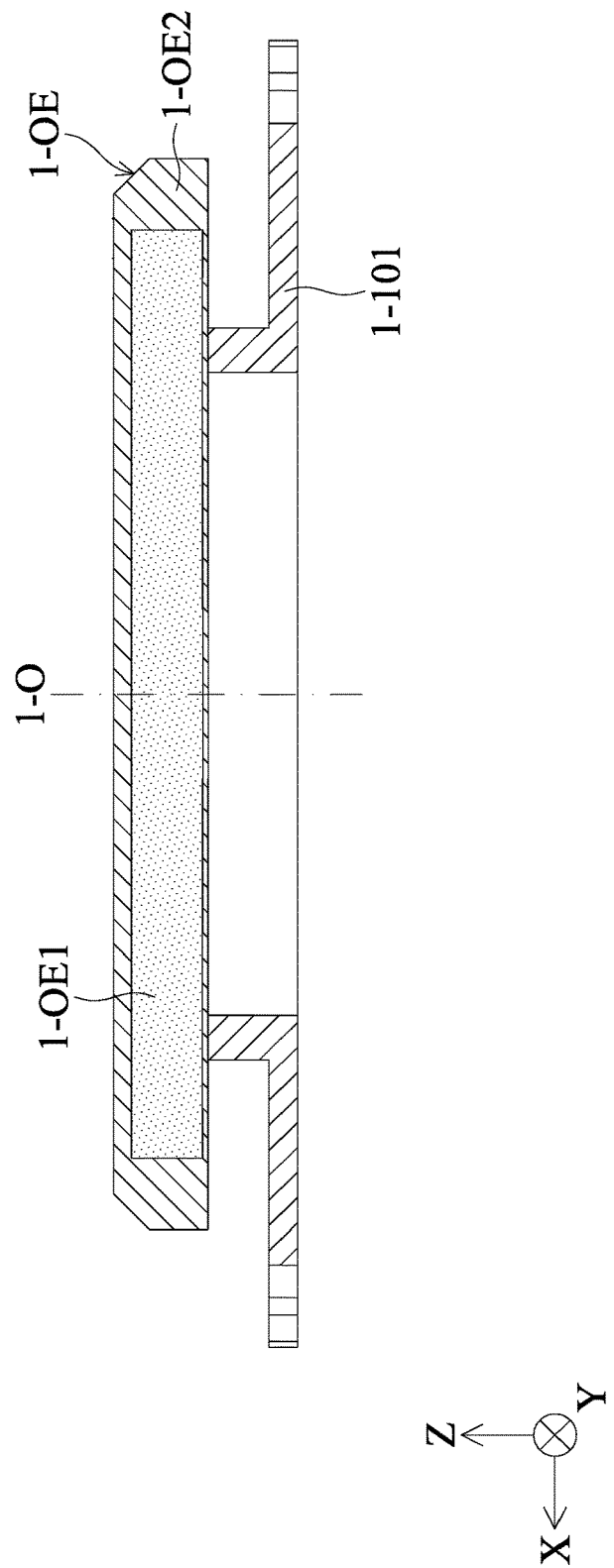
FIG. 4 is a schematic diagram illustrating that the first optical element 1-OE is not pushed by the deforming member 1-101 according to an embodiment of the present disclosure.
Figure 5:
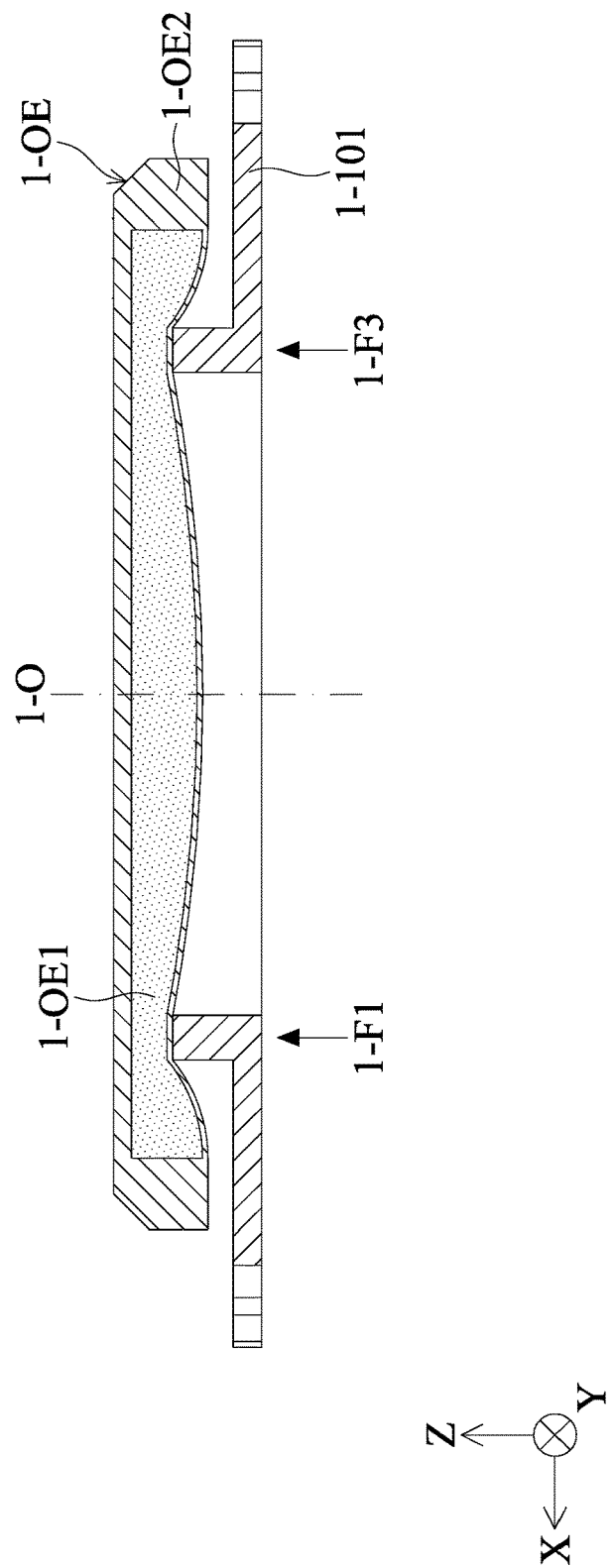
FIG. 5 and FIG. 6 are schematic diagrams of the first optical element 1-OE after being pushed by the deforming member 1-101 according to an embodiment of the present disclosure.
Figure 6:
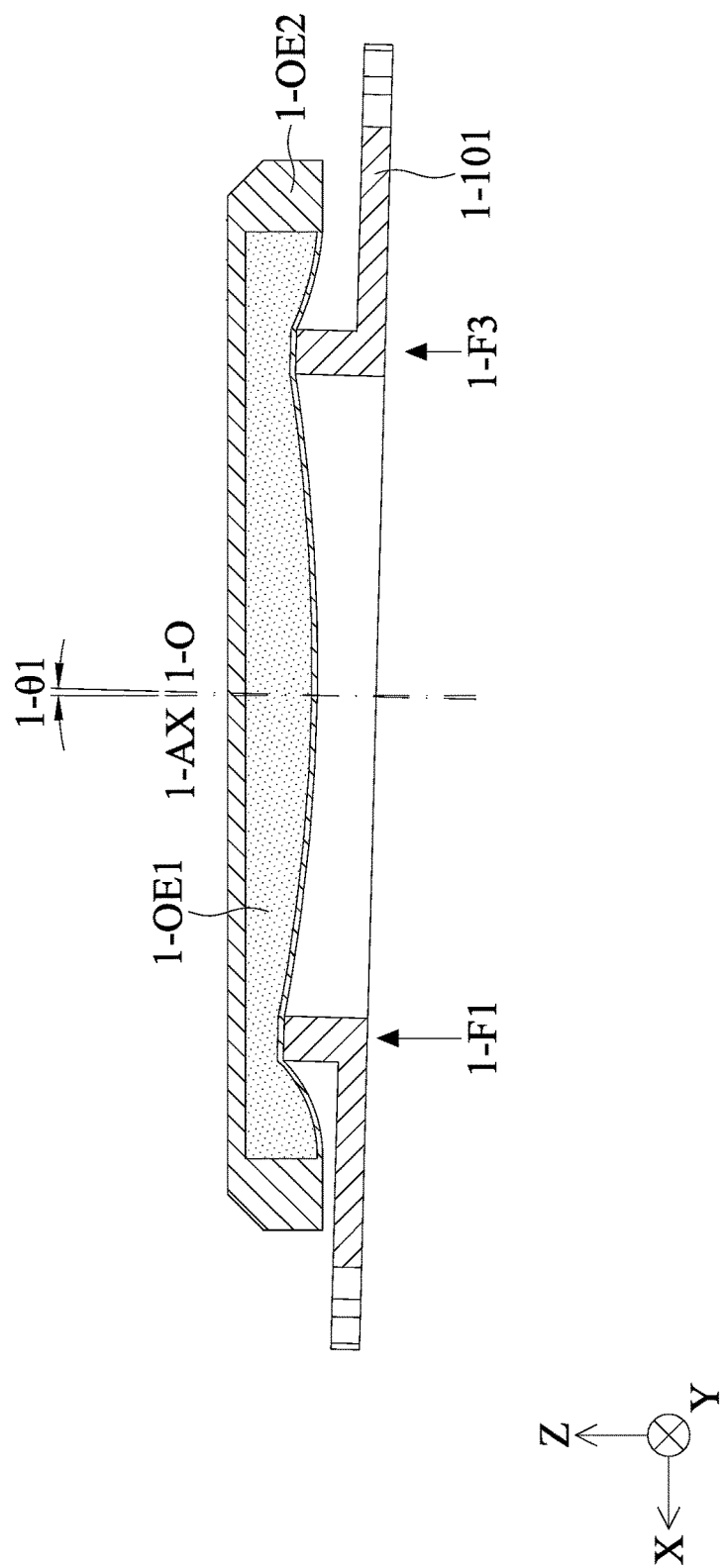

Next, please refer to FIG. 4 to FIG. 6. FIG. 4 is a schematic diagram illustrating that the first optical element 1-OE is not pushed by the deforming member 1-101 according to an embodiment of the present disclosure, and FIG. 5 and FIG. 6 are schematic diagrams of the first optical element 1-OE after being pushed by the deforming member 1-101 according to an embodiment of the present disclosure. As shown in FIG. 4, the first optical element 1-OE may be a liquid lens, including a liquid lens element 1-OE1 and a fixed member 1-OE2. The liquid lens element 1-OE1 is disposed within of the fixed member 1-OE2 having a hollow structure that protects and supports the liquid lens element 1-OE1. The deforming member 1-101 is disposed under the liquid lens element 1-OE1 and the fixed member 1-OE2. The bottom of the fixed member 1-OE2 may be a thin film, so that the deforming member 1-101 may be used for changing the shape of the liquid lens element 1-OE1.

FIG. 4 shows that the liquid lens element 1-OE1 is not deformed and the deforming member 1-101 is in an initial position, and the liquid lens element 1-OE1 has an optical axis 1-O. When the driving module 1-DM drives the movable assembly 1-MA to move, for example, applying a driving current to the driving coils of the driving module 1-DM, a magnetic force is generated between the driving coils and the corresponding magnetic elements, so that the movable assembly 1-MA is driven to move through the magnetic force and to force the deforming member 1-101 though the connecting assembly 1-CA to press the lower side of the liquid lens element 1-OE1. Therefore the liquid lens element 1-OE1 is deformed.

As shown in FIG. 2 and FIG. 5, when the first driving assembly 1-DA1 and the third driving assembly 1-DA3 of the driving module 1-DM provide pushing forces 1-F1, 1-F3 of the same magnitude, the deforming member 1-101 translates along the optical axis 1-O. At this time, the lens curvature of the liquid lens element 1-OE1 is changed from the curvature of the liquid lens element 1-OE1 in FIG. 4. That is, the shape of the liquid lens element 1-OE1 is changed. Therefore, the optical properties of the liquid lens element 1-OE1 can be changed, thereby achieving an optical zoom, focus or shock-proofing effect.

Similarly, referring to FIG. 6, when the driving module 1-DM drives the deforming member 1-101 with a tilted movement, as illustrated in FIG. 6, the deforming member 1-101 obliquely moves and provides an unequal amount of pushing forces 1-F1 and 1-F3 to two different sides of the liquid lens element 1-OE1, so that the optical axis 1-O of the liquid lens element 1-OE1 is rotated and is deviated from the main axis 1-AX. That is, there is an angle 1-θ1 formed between them. Therefore, the optical properties of the liquid lens element 1-OE1 are changed, and the optical zoom, focusing or shock-proofing effect can be accomplished.

Figure 7:
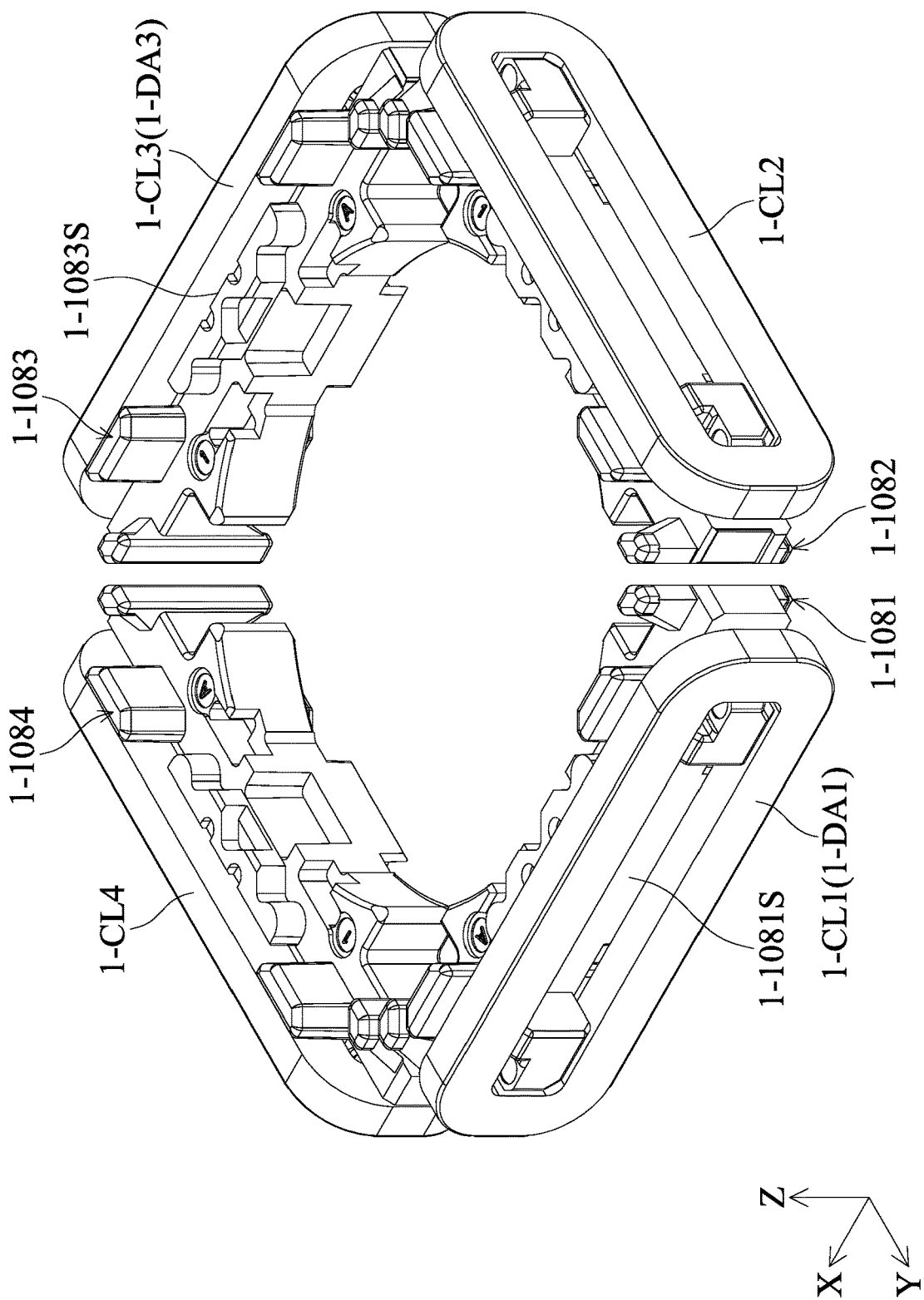
FIG. 7 is a schematic diagram of a partial structure of the optical system 1-100 according to an embodiment of the present disclosure.

Next, please refer to FIG. 2 and FIG. 7. FIG. 7 is a schematic diagram of a partial structure of the optical system 1-100 according to an embodiment of the present disclosure. In this embodiment, the first movable member 1-1081 of the movable assembly 1-MA has a first movable member surface 1-1081S, the third movable member 1-1083 has a third movable member surface 1-1083S, the first movable member surface 1-1081S faces the first driving assembly 1-DA1, and the third movable member surface 1-1083S faces the third driving assembly 1-DA3.

Figure 8:
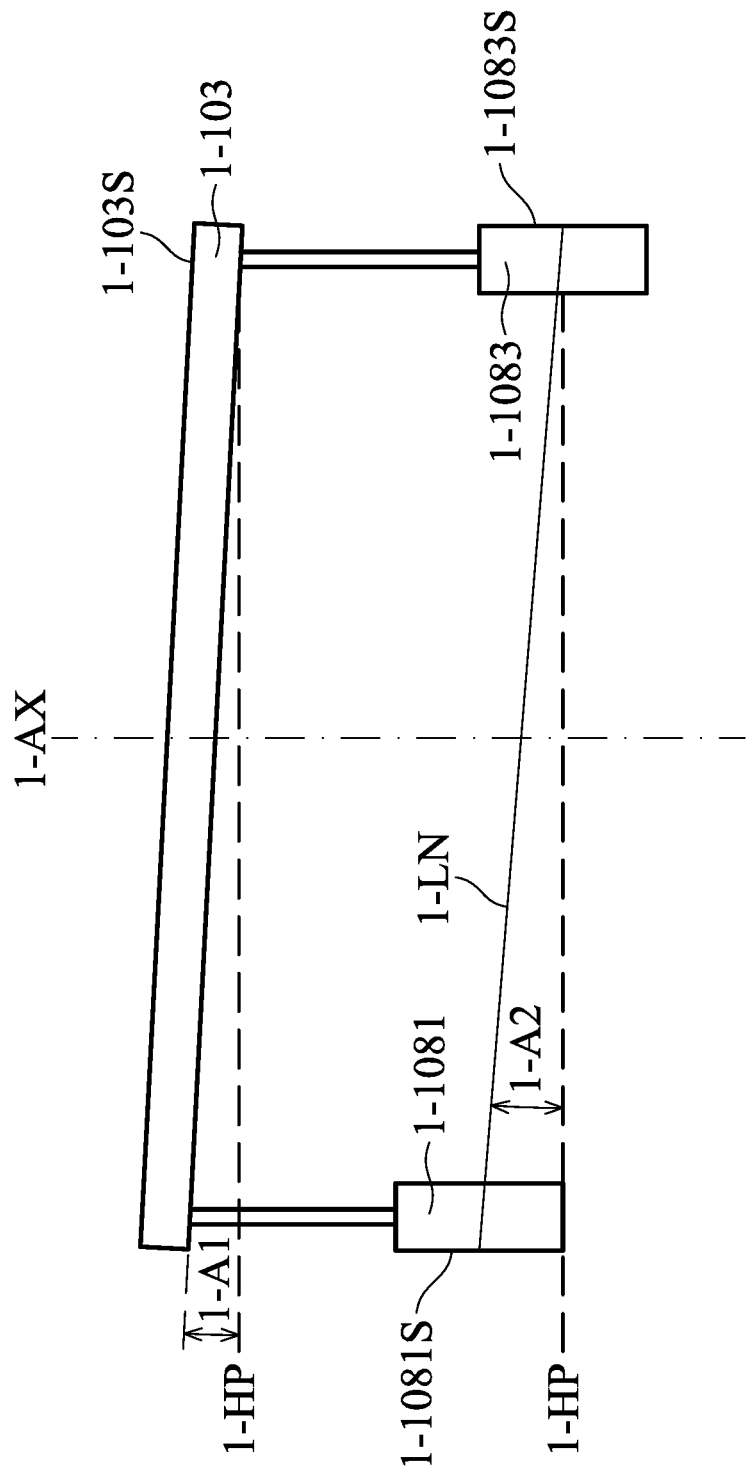
FIG. 8 is a schematic diagram of a partial structure of the optical system 1-100 according to an embodiment of the present disclosure.

Please continue to refer to FIG. 8, which is a schematic diagram of a partial structure of the optical system 1-100 according to an embodiment of the present disclosure. An imaginary plane 1-HP can be defined by the optical system 1-100, and the imaginary plane 1-HP is perpendicular to the main axis 1-AX. When the driving module 1-DM drives the movable assembly 1-MA and when viewed in a direction perpendicular to the main axis 1-AX, an angle 1-A1 between the movable element surface 1-103S and the imaginary plane 1-HP is less than or equal to an angle 1-A2 formed between a line 1-LN connecting the center of the first movable member surface 1-1081S with the center of the third movable member surface 1-1083S and the imaginary plane 1-HP.

Figure 9:
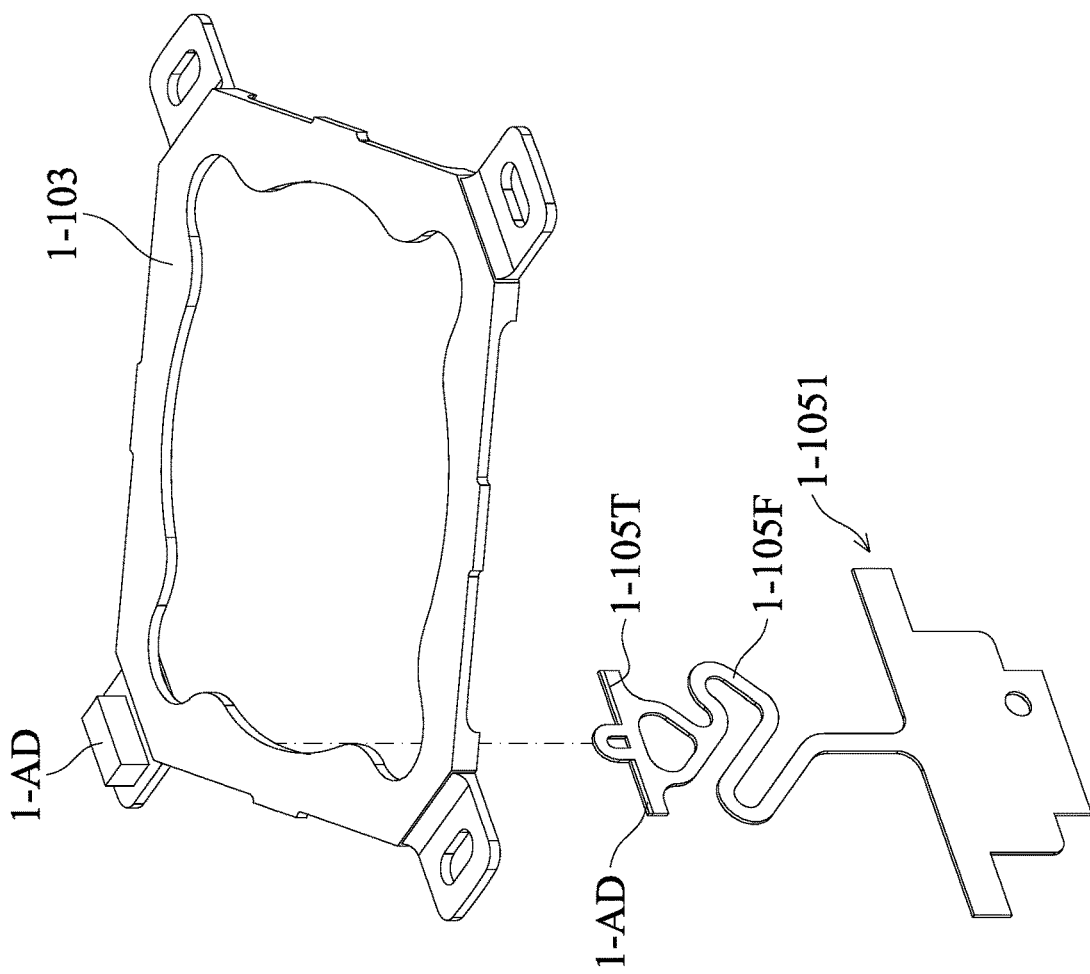
FIG. 9 is a schematic diagram of the first connecting member 1-1051 and the movable element 1-103 according to an embodiment of the present disclosure.

Please refer to FIG. 2 and FIG. 9. FIG. 9 is a schematic diagram of the first connecting member 1-1051 and the movable element 1-103 according to an embodiment of the present disclosure. The movable assembly 1-MA is connected to the movable element 1-103 through four connecting members. For example, the first movable member 1-1081 is connected to the movable element 1-103 via an elastic portion 1-105F of the first connecting member 1-1051.

As shown in FIG. 2 and FIG. 9, the elastic portion 1-105F may have a plate-shaped structure which is substantially parallel to the main axis 1-AX. Furthermore, the first connecting member 1-1051 has a platform surface 1-105T facing the movable element 1-103. In addition, the optical system 1-100 may further include an adhesive member 1-AD disposed between the platform surface 1-105T and the movable element 1-103. The adhesive member 1-AD can be glue or solder.

Figure 10:
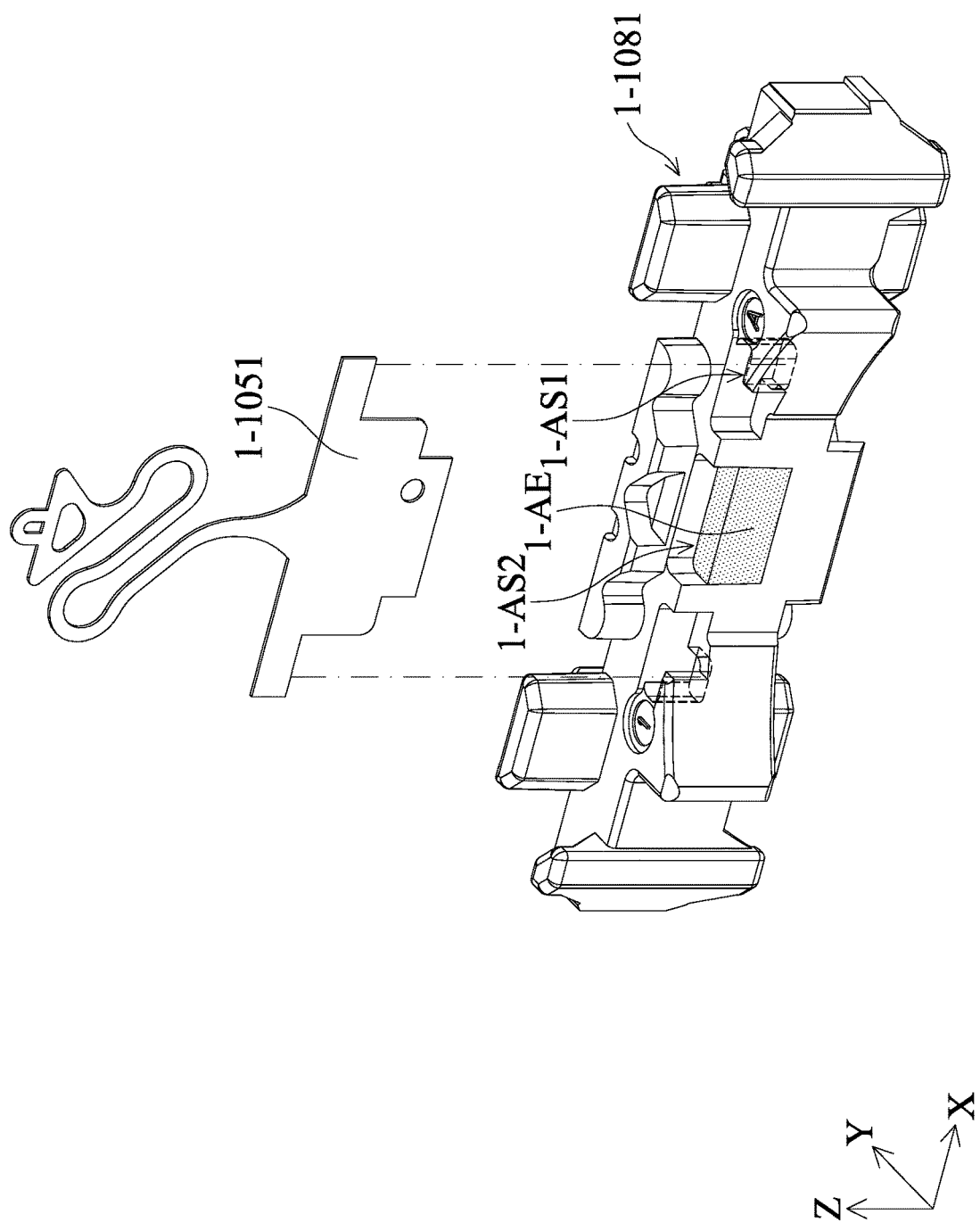
FIG. 10 is a schematic diagram of the first connecting member 1-1051 and the first movable member 1-1081 according to an embodiment of the present disclosure.

Please refer to FIG. 10, which is a schematic diagram of the first connecting member 1-1051 and the first movable member 1-1081 according to an embodiment of the present disclosure. As shown in FIG. 10, the first movable member 1-1081 of the movable assembly 1-MA may have a first accommodating slot 1-AS1, and the first accommodating slot 1-AS1 is configured to accommodate the first connecting member 1-1051.

In addition, the first movable member 1-1081 may further include a second accommodating slot 1-AS2, and an adhesive element AE may be disposed in the second accommodating slot 1-AS2 and is configured to adhere to the first connecting member 1-1051, so that the first connecting member 1-1051 is fixedly disposed on the first movable member 1-1081.

Figure 11:
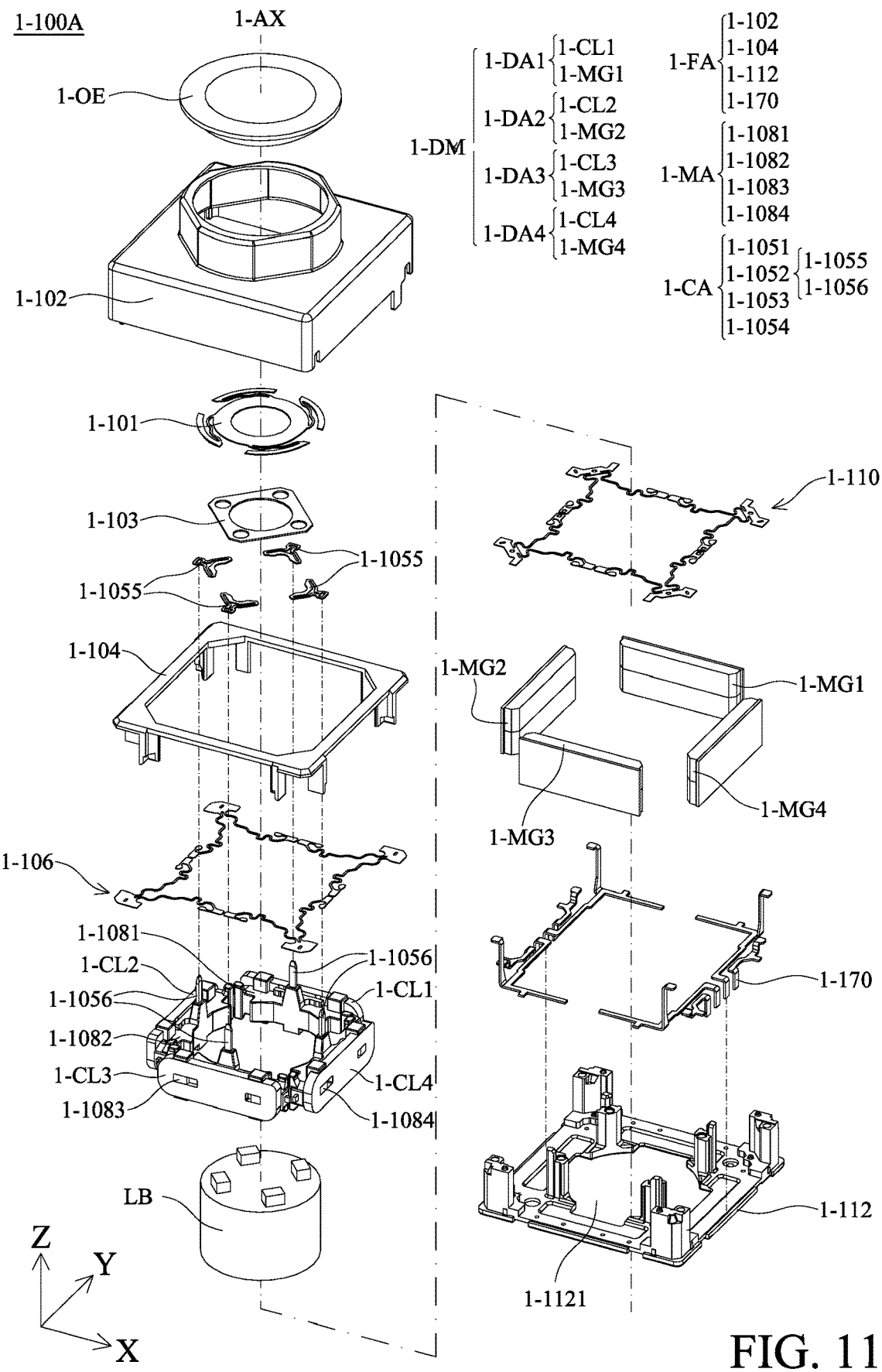
FIG. 11 is an exploded diagram of an optical system 1-100A according to another embodiment of the present disclosure.
Figure 11A:
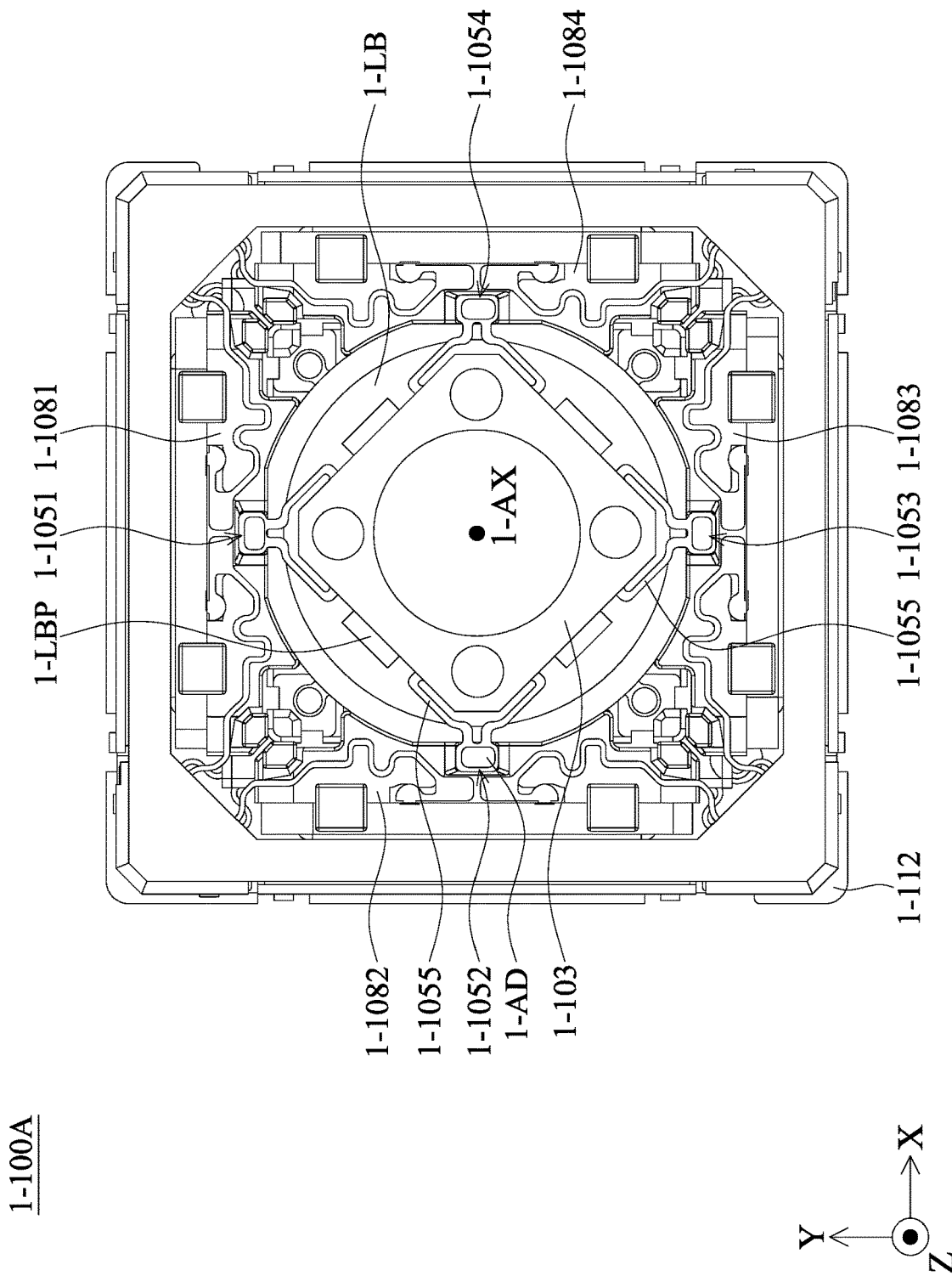
FIG. 11A is a top view of a partial structure of the optical system 1-100A according to another embodiment of the present disclosure.
Figure 12:
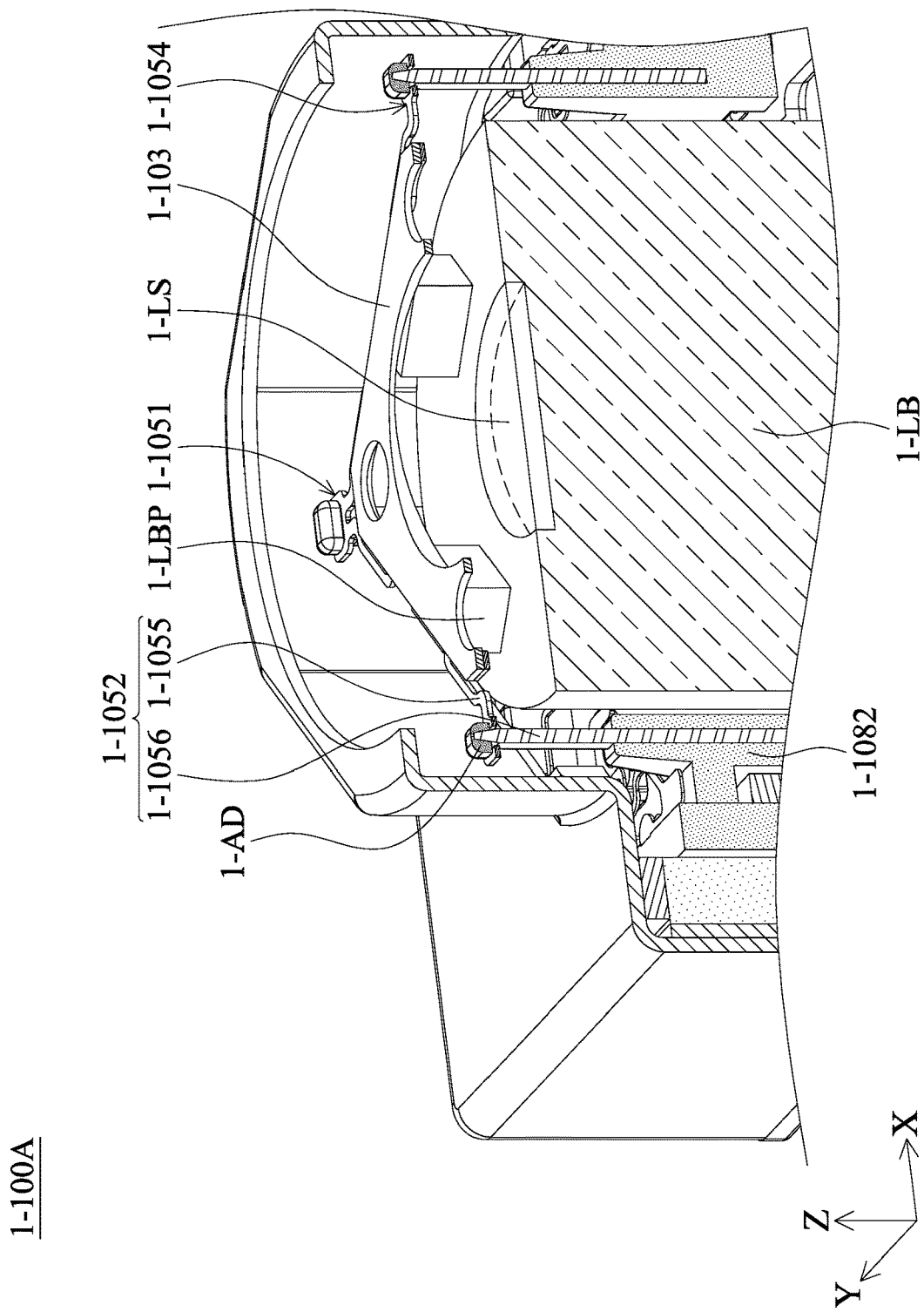
FIG. 12 is a perspective sectional view of the optical system 1-100A according to another embodiment of the present disclosure.
Figure 13:
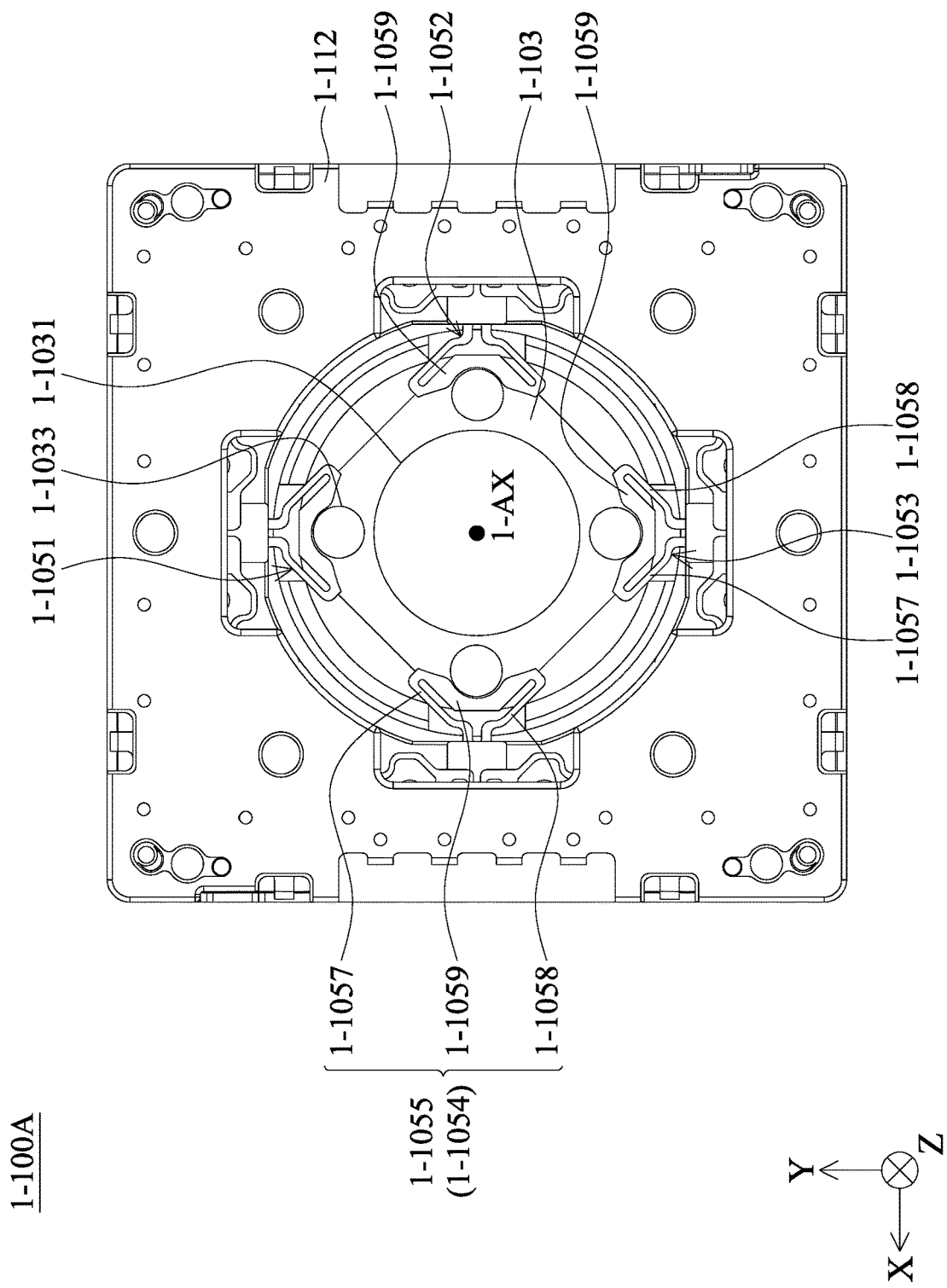
FIG. 13 is a bottom view of a partial structure of the optical system 1-100A according to another embodiment of the present disclosure.

Please refer to FIG. 11 to FIG. 13. FIG. 11 is an exploded diagram of an optical system 1-100A according to another embodiment of the present disclosure, FIG. 11A is a top view of a partial structure of the optical system 1-100A according to another embodiment of the present disclosure, FIG. 12 is a perspective sectional view of the optical system 1-100A according to another embodiment of the present disclosure, and FIG. 13 is a bottom view of a partial structure of the optical system 1-100A according to another embodiment of the present disclosure. The optical system 1-100A is similar to the optical system 1-100. In this embodiment, the connecting assembly 1-CA of the optical system 1-100A also includes four connecting members.

Each connecting member may have an elastic portion and a rigid portion. As shown in FIG. 11, FIG. 11A, and FIG. 12, the second connecting member 1-1052 has an elastic portion 1-1055 and a rigid portion 1-1056. The elastic portion 1-1055 may have a plate-shaped structure, which is not parallel to the main axis 1-AX, for example, perpendicular to the main axis 1-AX, and the rigid portion 1-1056 is connected to the elastic portion 1-1055 by the adhesive member 1-AD. The rigid portion 1-1056 is connected between the elastic portion 1-1055 and the second movable member 1-1082 of the movable assembly 1-MA, and in the direction of the main axis 1-AX (the Z-axis), the elastic coefficient of the rigid portion 1-1056 is greater than the elastic coefficient of the elastic portion 1-1055. That is, in the Z-axis, the second connection member 1-1052 is harder, and it is softer (more elastic) in the X-axis or in the Y-axis.

Furthermore, as shown in FIG. 12, the optical system 1-100A further includes a lens barrel 1-LB configured to accommodate at least one second optical element 1-LS, and the second optical element 1-LS is a solid lens. The lens barrel 1-LB has four projections 1-LBP, which extend toward the movable element 1-103.

In this embodiment, the elastic portions of the connecting members of the connecting assembly 1-CA are arranged around the main axis 1-AX. Specifically, as shown in FIG. 11A, the elastic portions 1-1055 of the first connecting member 1-1051 to the fourth connecting member 1-1054 are disposed around the main axis 1-AX. In addition, as shown in FIG. 11A and FIG. 12, when viewed in the direction of the main axis 1-AX, the projections 1-LBP are located between two adjacent elastic portions 1-1055.

Next, please continue to refer to FIG. 11A and FIG. 13 (the lens barrel 1-LB and the second optical element 1-LS are not shown in FIG. 13). The elastic portion 1-1055 may include a first cantilever 1-1057, a second cantilever 1-1058, and a contact portion 1-1059. The first cantilever 1-1057 and the second cantilever 1-1058 are symmetrically arranged. For example, the first cantilever 1-1057 and the second cantilever 1-1058 of the fourth connecting member 1-1054 are symmetrical with respect to the X-axis, and the contact portion 1-1059 is fixed on the bottom of the movable element 1-103.

In this embodiment, when viewed in the direction of the main axis 1-AX, the movable element 1-103 does not overlap at least one portion of the first cantilever 1-1057. As shown in FIG. 13, only a part of the first cantilever 1-1057 and the second cantilever 1-1058 overlap the movable element 1-103. It should be noted that in other embodiments, the first cantilever 1-1057 and the second cantilever 1-1058 may not overlap the movable element 1-103 completely.

In addition, as shown in FIG. 13, an opening 1-1031 and four perforations 1-1033 may be formed on the movable element 1-103. The main axis 1-AX passes through the opening 1-1031, and these perforations 1-1033 are adjacent to the opening 1-1031. Specifically, these perforations 1-1033 are configured to surround the opening 1-1031 in a symmetrical manner. Based on the design of perforations 1-1033, the operator can take movable element 1-103 by the perforations 1-1033 without touching the central opening 1-1031 when performing assembly operation so as to avoid damaging the opening 1-1031.

Figure 14:
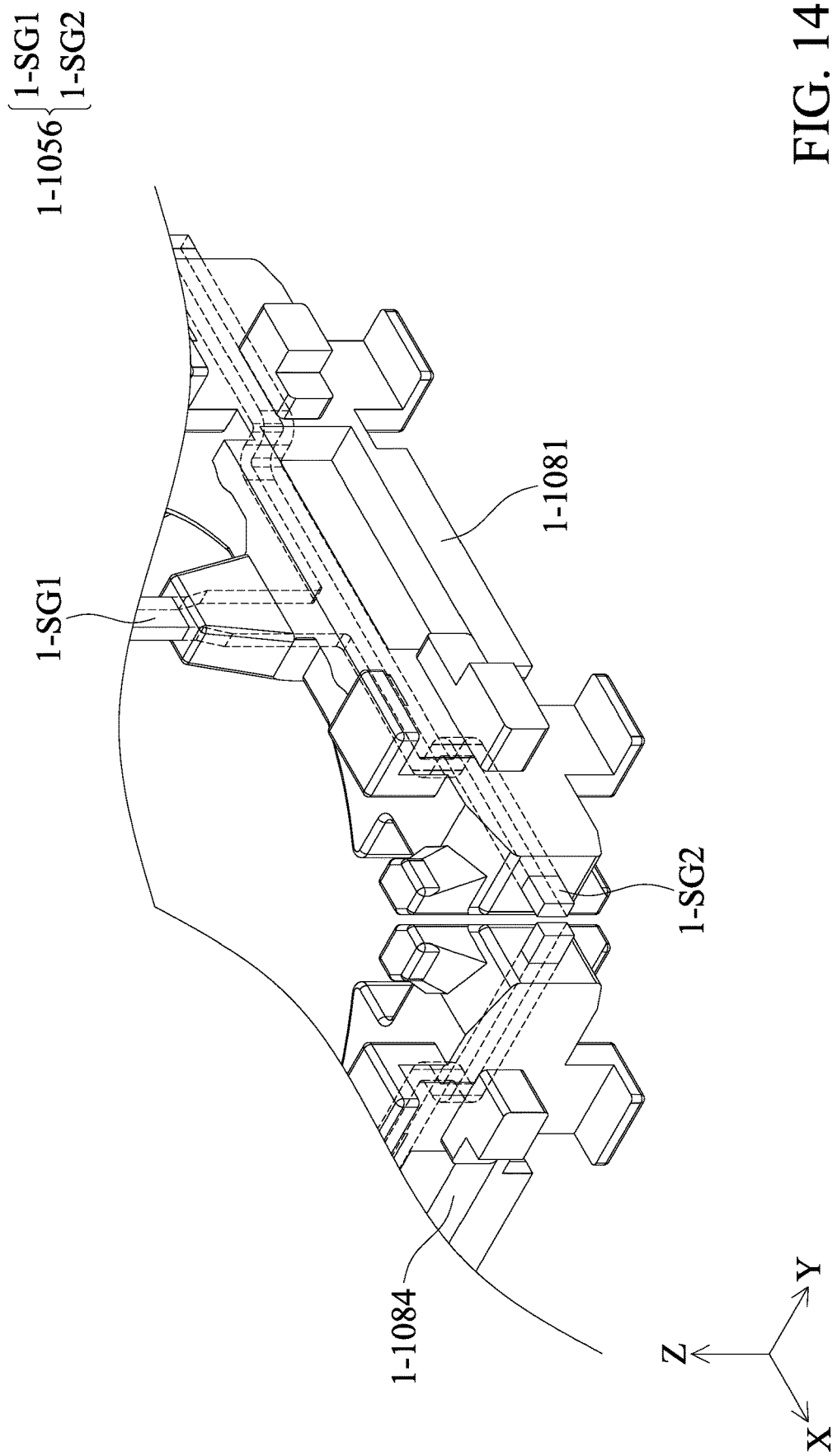
FIG. 14 is a partial structural diagram of the movable assembly 1-MA according to another embodiment of the present disclosure.

Please refer to FIG. 12 and FIG. 14. FIG. 14 is a partial structural diagram of the movable assembly 1-MA according to another embodiment of the present disclosure. In this embodiment, a portion of the rigid portion 1-1056 is embedded in the first movable member 1-1081. The rigid portion 1-1056 may include a first section 1-SG1 and a second section 1-SG2 connected to the first section 1-SG1, and the second section 1-SG2 is not parallel to the first section 1-SG1. For example, the first section 1-SG1 is perpendicular to the second section 1-SG2.

Figure 15:
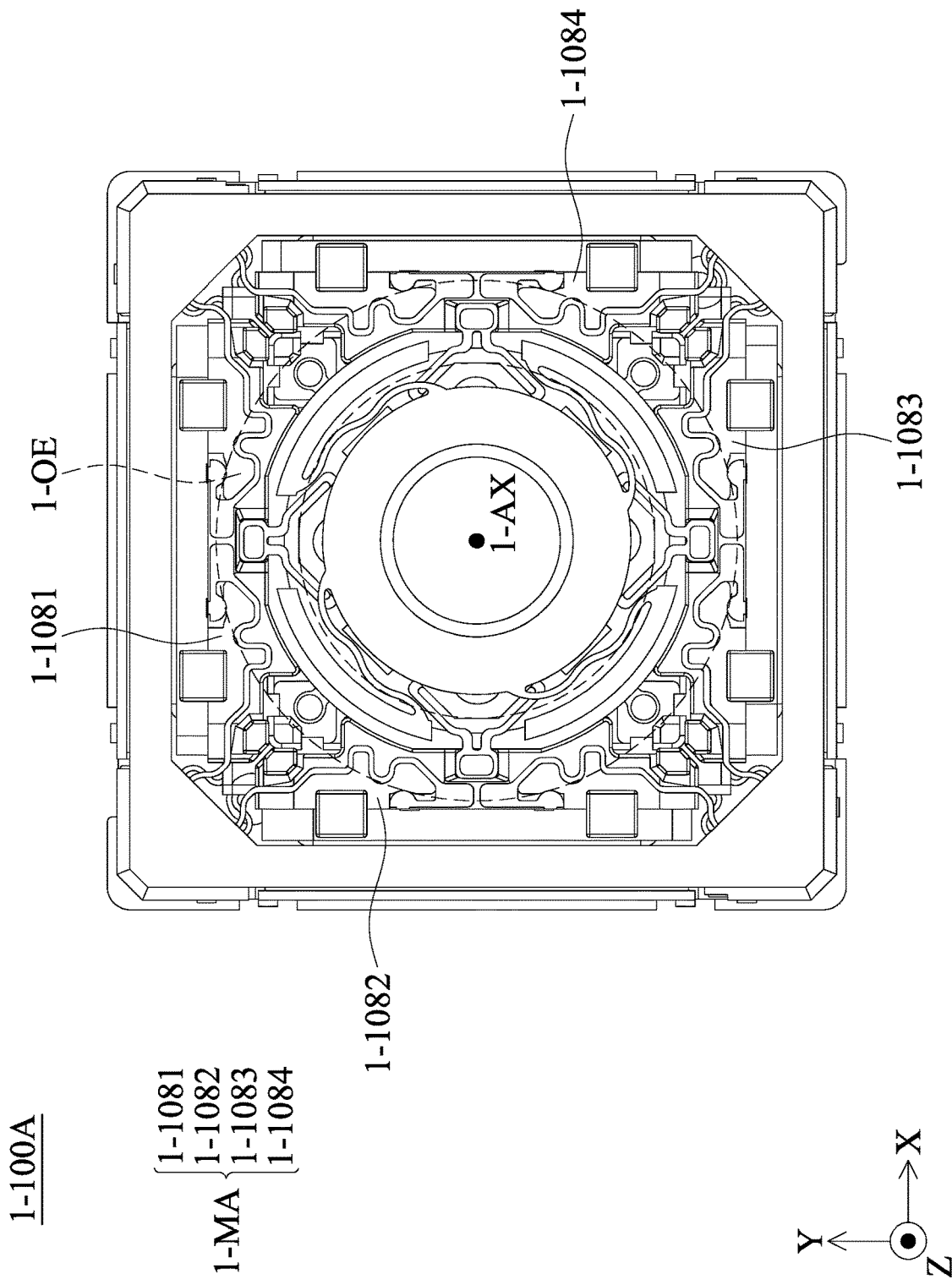
FIG. 15 is a top view of a partial structure of the optical system 1-100A according to another embodiment of the present disclosure.

Please refer to FIG. 15, which is a top view of a partial structure of the optical system 1-100A according to another embodiment of the present disclosure. In this embodiment, when viewed in the direction of the main axis 1-AX, the movable assembly 1-MA overlaps the first optical element 1-OE, which means that the first optical element 1-OE is larger and has better optical characteristics, such as a greater amount of light. In other embodiments, the movable assembly 1-MA may not overlap the first optical element 1-OE. Because the first optical element 1-OE is small, it can achieve the effect of weight reduction.

The present disclosure provides an optical system having a first optical element 1-OE, a deforming member 1-101, a movable element 1-103, a fixed assembly 1-FA, a connecting assembly 1-CA, a movable assembly 1-MA, and a driving module 1-DM. The movable element 1-103 is configured to be connected to the first optical element 1-OE through the deforming member 1-101, and the movable assembly 1-MA is connected to the movable element 1-103 through the connecting assembly 1-CA. When driving module 1-DM is configured to drive movable assembly 1-MA to move relative to fixed assembly 1-FA, the movable element 1-103 can be moved to drive the deforming member 1-101 to push the bottom of first optical element 1-OE, thereby changing the optical properties of the liquid lens element 1-OE1.

In addition, each movable member of the movable assembly 1-MA can be moved independently or cooperatively, so that the optical properties of the liquid lens element 1-OE1 can be changed according to different needs. Thereby, functions such as optical zoom, optical focus or optical shake compensation can be achieved, and the performance of the driving mechanism can be improved.

The second embodiment group.

Figure 16:
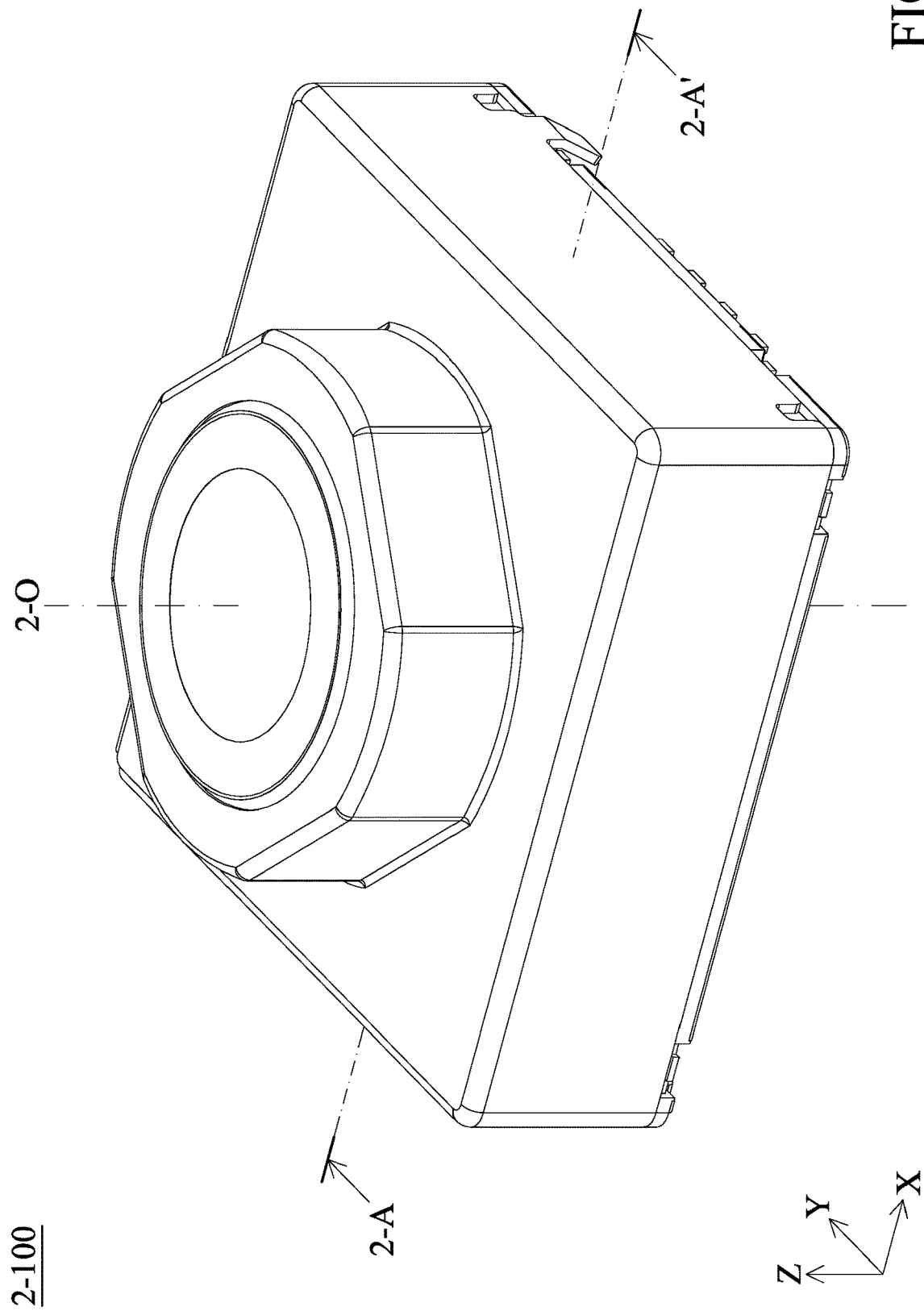
FIG. 16 is a schematic diagram of an optical system 2-100 according to an embodiment of the present disclosure.
Figure 17:
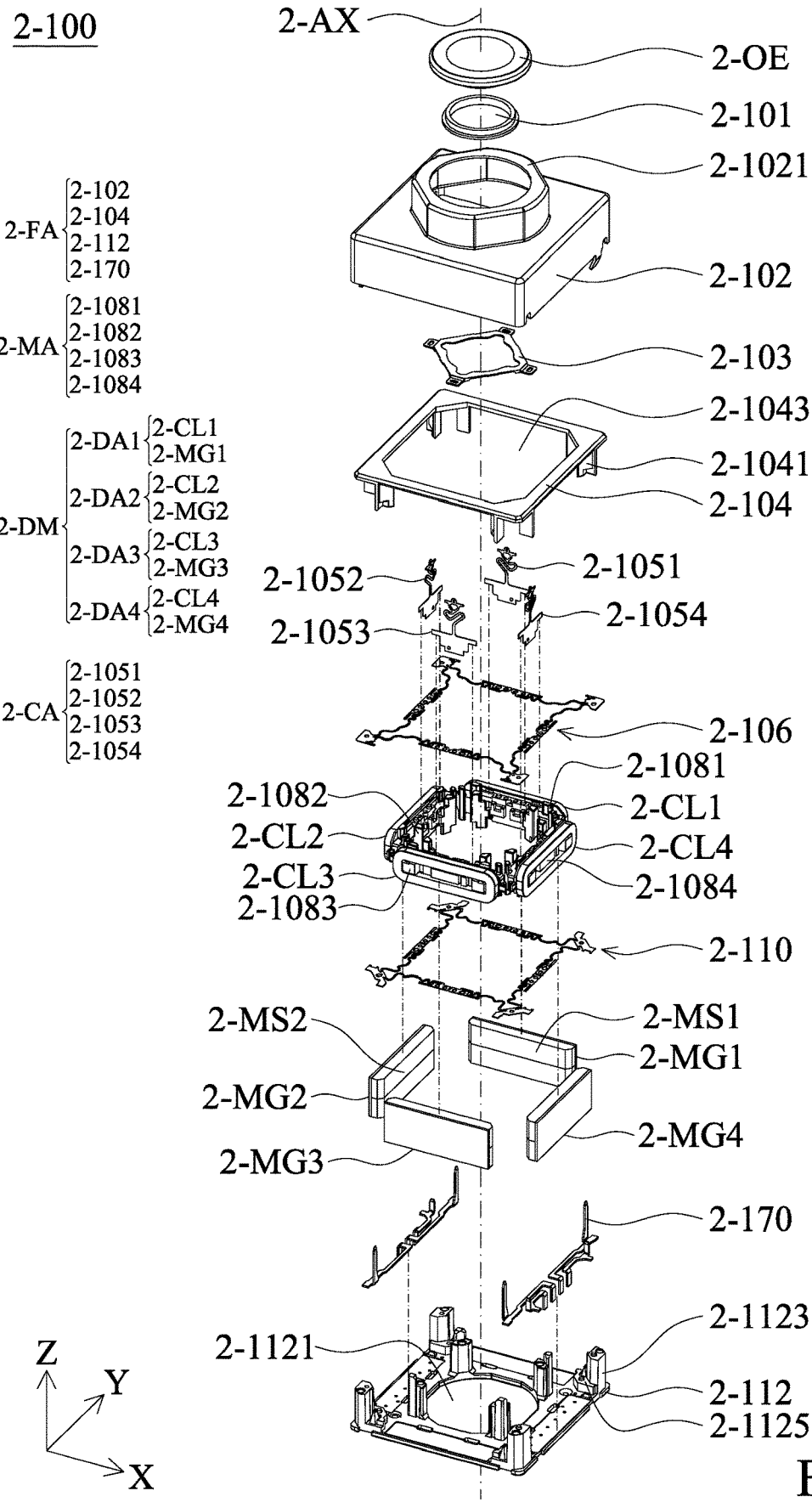
FIG. 17 is an exploded diagram of an optical system 2-100 according to an embodiment of the present disclosure.
Figure 18:
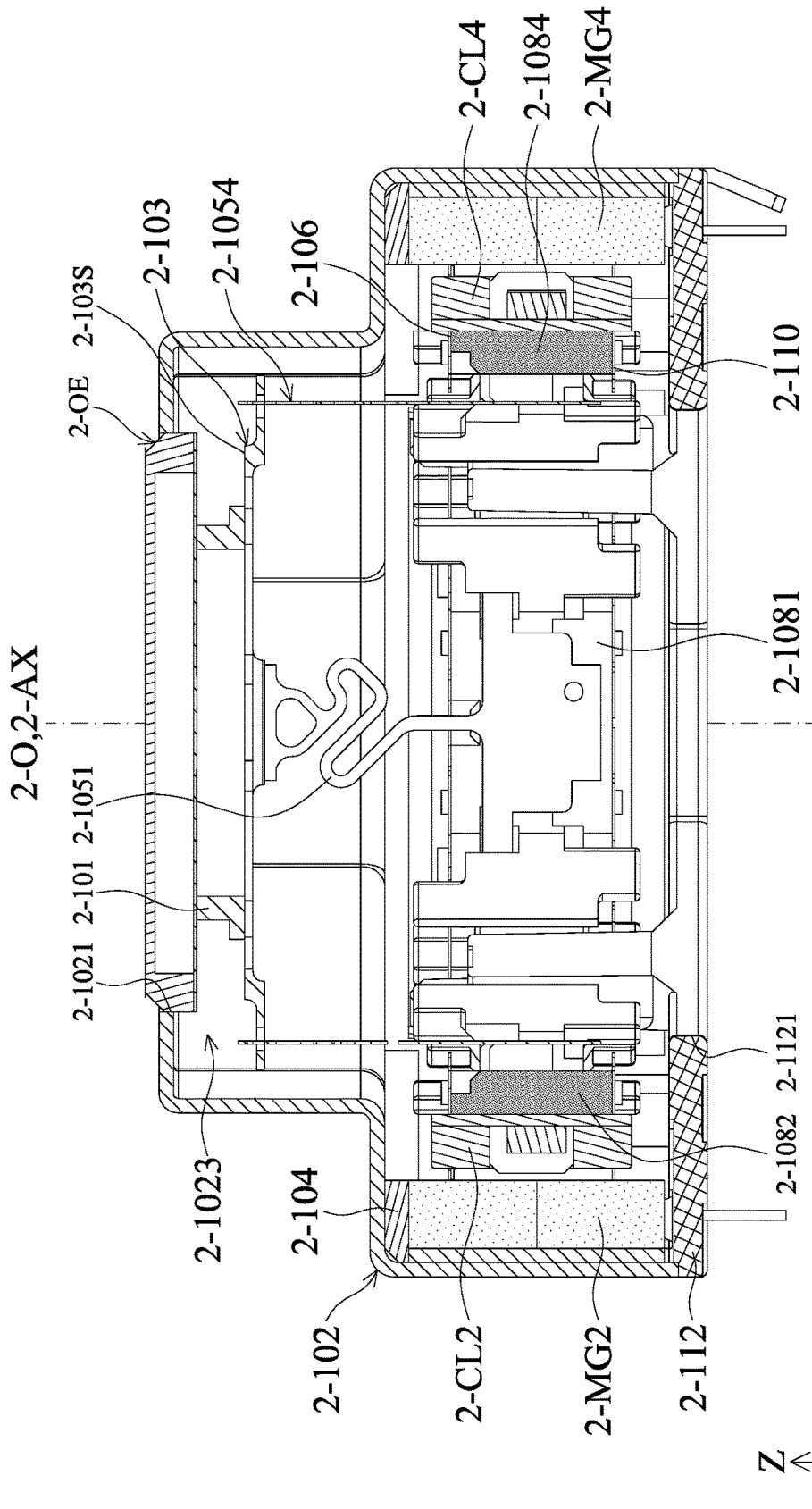
FIG. 18 is a cross-sectional view of the optical system 2-100 along line (2-A)-(2-A') in FIG. 16 according to an embodiment of the present disclosure.

Please refer to FIG. 16 to FIG. 18. FIG. 16 is a schematic diagram of an optical system 2-100 according to an embodiment of the present disclosure, FIG. 17 is an exploded diagram of an optical system 2-100 according to an embodiment of the present disclosure, and FIG. 18 is a cross-sectional view of the optical system 2-100 along line (2-A)-(2-A') in FIG. 16 according to an embodiment of the present disclosure. The optical system 2-100 can be an optical camera system and can be configured to hold and drive a first optical element 2-OE, and the first optical element 2-OE may define an optical axis 2-O. The optical system 2-100 can be installed in different electronic devices or portable electronic devices, such as a smartphone, for allowing a user to perform the image capturing function. In this embodiment, the optical system 2-100 can be a voice coil motor (VCM) with an auto-focusing (AF) function, but it is not limited thereto. In other embodiments, the optical system 2-100 can also perform the functions of auto-focusing and optical image stabilization (OIS).

As shown in FIG. 2, in this embodiment, the optical system 2-100 may include a fixed assembly 2-FA, a deforming member 2-101, a movable element 2-103, and a connecting assembly 2-CA, a movable assembly 2-MA and a driving module 2-DM. The deforming member 2-101 is connected between the movable element 2-103 and the first optical element 2-OE, the movable element 2-103 is movable relative to the fixed assembly 2-FA, and the driving module 2-DM is configured to drive the movable element 2-103 to move relative to the fixed assembly 2-FA. Specifically, the movable assembly 2-MA is movably connected to the movable element 2-103 via the connecting assembly 2-CA, and the driving module 2-DM drives the movable assembly 2-MA to move relative to the fixed assembly 2-FA, thereby driving the movable element 2-103.

In this embodiment, as shown in FIG. 17 and FIG. 18, the fixed assembly 2-FA includes a casing 2-102, a frame 2-104, and a base 2-112. The casing 2-102 is fixedly connected to the base 2-112, and the frame 2-104 can also be fixedly connected to the inner wall surface of the casing 2-102. A main axis 2-AX can be defined by the fixed assembly 2-FA. When the optical system 2-100 is not activated, the main axis 2-AX is parallel to or overlaps an optical axis 2-O of the first optical element 2-OE. In addition, the movable element 2-103 has a movable element surface 2-103S which faces the first optical element 2-OE.

As shown in FIG. 17 and FIG. 18, the aforementioned casing 2-102 has a hollow structure, and a casing opening 2-1021 is formed thereon. A base opening 2-1121 is formed on the base 2-112, The center of the casing opening 2-1021 corresponds to the optical axis 2-O of the first optical element 2-OE, and the base opening 2-1121 corresponds to a photosensitive element (not shown in the figure) disposed below the base 2-112. In this embodiment, the first optical element 2-OE is fixedly disposed in the casing opening 2-1021. The external light can enter the casing 2-102 through the first optical element 2-OE and then is received by the aforementioned photosensitive element after passing through the base opening 2-1121 so as to generate a digital image signal.

Furthermore, the casing 2-102 is disposed on the base 2-112 and may have an accommodating space 2-1023 configured to accommodate the movable element 2-103, the frame 2-104, and the movable assembly 2-MA, the connecting assembly 2-CA, and the driving module 2-DM.

As shown in FIG. 17 and FIG. 18, in this embodiment, the movable assembly 2-MA may include four movable members (a first movable member 2-1081, a second movable member 2-1082, and a third movable member 2-1083 and a fourth movable member 2-1084), and the connecting assembly 2-CA may include four connecting members (a first connecting member 2-1051, a second connecting member 2-1052, a third connecting member 2-1053, and a fourth connecting member 2-1054). The first movable member 2-1081 to the fourth movable member 2-1084 are connected to the movable element 2-103 by the first connecting member 2-1051 to the fourth connecting member 2-1054, respectively.

In addition, the optical system 2-100 may further include a first elastic element 2-106 and a second elastic element 2-110, and the base 2-112 may include four protruding columns 2-1123. The outer portion (the outer ring portion) of the first elastic element 2-106 is fixedly disposed on the top surfaces of the protruding columns 2-1123, the outer portion (the outer ring portion) of the second elastic element 2-110 is fixedly disposed on a plane 2-1125 of each of the protruding columns 2-1123, and the inner portions (the inner ring portions) of the first elastic element 2-106 and the second elastic element 2-110 are respectively connected to the upper and lower sides of the movable assembly 2-MA so that the first movable member 2-1081 to the fourth movable member 2-1084 are suspended in the accommodating space 2-1023.

In this embodiment, the driving module 2-DM may include four driving assemblies (a first driving assembly 2-DA1, a second driving assembly 2-DA2, a third driving assembly 2-DA3, and a fourth driving assembly 2-DA4). The first driving assembly 2-DA1 includes a first driving coil 2-CL1 and a first magnetic element 2-MG1, and the second driving assembly 2-DA2 includes a second driving coil 2-CL2 and a second magnetic element 2-MG2, the third driving assembly 2-DA3 includes a third driving coil 2-CL3 and a third magnetic element 2-MG3, and the fourth driving assembly 2-DA4 includes a fourth driving coil 2-CL4 and a fourth magnetic element 2-MG4.

In this embodiment, each magnetic element has a magnetic surface. For example, as shown in FIG. 2, the first magnetic element 2-MG1 and the second magnetic element 2-MG2 respectively have a first magnetic surface 2-MS1 and a second magnetic surface 2-MS2, the first magnetic surface 2-MS1 faces the first driving coil 2-CL1, the second magnetic surface 2-MS2 faces the second driving coil 2-CL2, and the first magnetic surface 2-MS1 and the second magnetic surface 2-MS2 face different directions.

In this embodiment, as shown in FIG. 2, the frame 2-104 has a plurality of grooves 2-1041 and a central opening 2-1043. In this embodiment, the frame 2-104 has four grooves 2-1041 configured to receive the four magnetic elements, but the number of the grooves 2-1041 and the magnetic elements is not limited to this embodiment. The central opening 2-1043 is configured to accommodate the first driving coil 2-CL1 to the fourth driving coil 2-CL4 and the first movable member 2-1081 to the fourth movable member 2-1084.

In this embodiment, the first driving coil 2-CL1 to the fourth driving coil 2-CL4 may be winding coils, which are respectively disposed on the first movable member 2-1081 to the fourth movable member 2-1084, and when the first driving coil 2-CL1 to the fourth driving coil 2-CL4 are provided with electricity, they can respectively act with the first magnetic element 2-MG1 to the fourth magnetic element 2-MG4 to generate an electromagnetic driving force to drive at least one of the first movable member 2-1081 to the fourth movable member 2-1084 to move relative to the base 2-112 and the frame 2-104 along the optical axis 2-O (the Z-axis) so as to perform functions of auto focusing or optical image stabilization.

The driving assembly of the driving module 2-DM can actuate individually or cooperatively. For example, the first driving assembly 2-DA1 is configured to drive the first movable member 2-1081 to move relative to the fixed assembly 2-FA, and the second driving assembly 2-DA2 is configured to drive the second movable member 2-1082 to move relative to the fixed assembly 2-FA and the first movable member 2-1081, and so on.

Furthermore, as shown in FIG. 2, in this embodiment, the fixed assembly 2-FA may further include at least one circuit member 2-170 configured to be electrically connected to the driving module 2-DM through the first elastic element 2-106 or the second elastic element 2-110. The circuit member 2-170 may be implemented by insert molding technology, but it is not limited thereto. In addition, the circuit member 2-170, the first elastic element 2-106 and the second elastic element 2-110 may constitute a circuit assembly.

Figure 19:
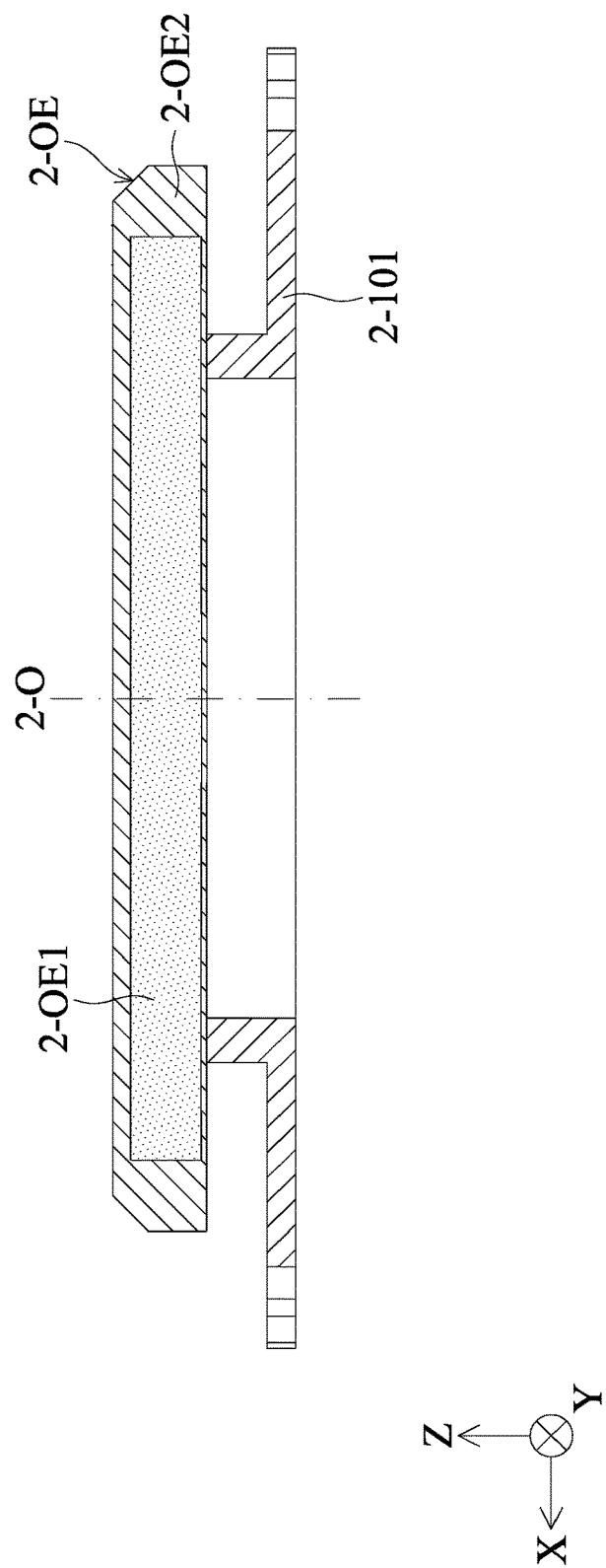
FIG. 19 is a schematic diagram illustrating that the first optical element 2-OE is not pushed by the deforming member 2-101 according to an embodiment of the present disclosure.
Figure 20:
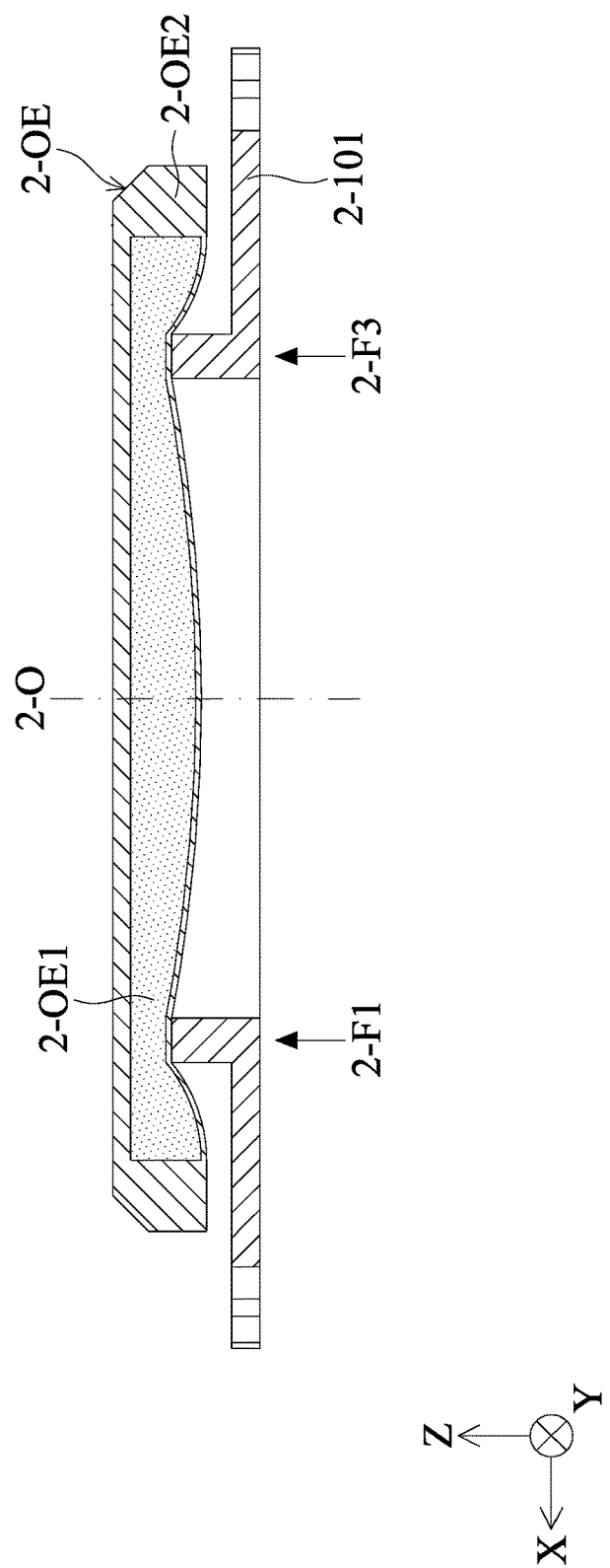
FIG. 20 and FIG. 21 are schematic diagrams of the first optical element 2-OE after being pushed by the deforming member 2-101 according to an embodiment of the present disclosure.
Figure 21:
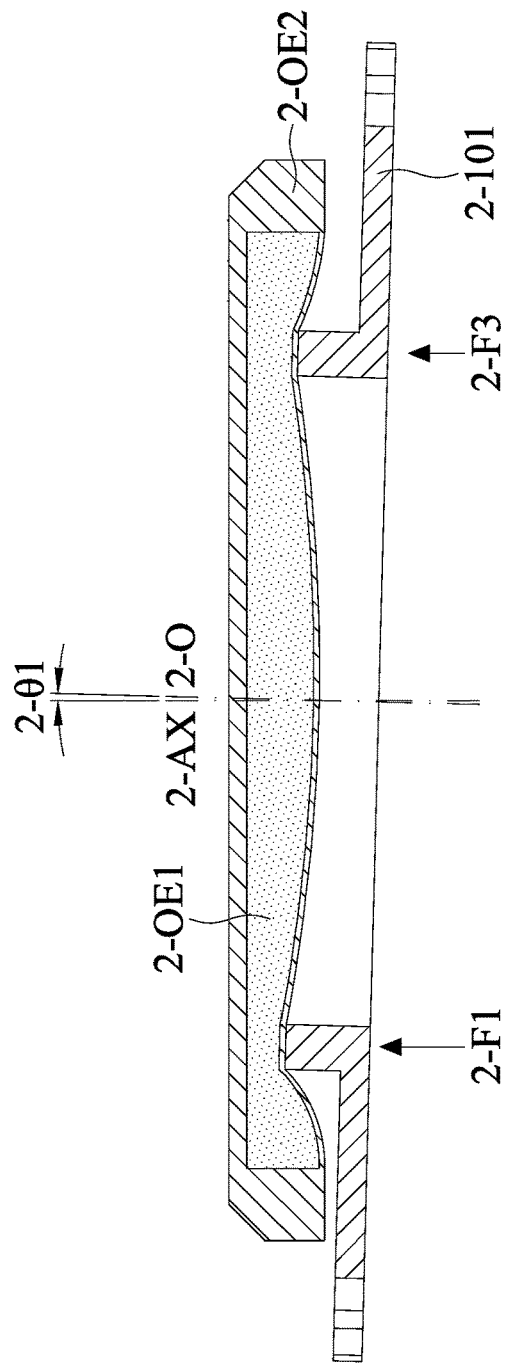

Next, please refer to FIG. 19 to FIG. 21. FIG. 19 is a schematic diagram illustrating that the first optical element 2-OE is not pushed by the deforming member 2-101 according to an embodiment of the present disclosure, and FIG. 20 and FIG. 21 are schematic diagrams of the first optical element 2-OE after being pushed by the deforming member 2-101 according to an embodiment of the present disclosure. As shown in FIG. 19, the first optical element 2-OE may be a liquid lens, including a liquid lens element 2-OE1 and a fixed member 2-OE2. The liquid lens element 2-OE1 is disposed within of the fixed member 2-OE2 having a hollow structure that protects and supports the liquid lens element 2-OE1. The deforming member 2-101 is disposed under the liquid lens element 2-OE1 and the fixed member 2-OE2. The bottom of the fixed member 2-OE2 may be a thin film, so that the deforming member 2-101 may be used for changing the shape of the liquid lens element 2-OE1.

FIG. 19 shows that the liquid lens element 2-OE1 is not deformed and the deforming member 2-101 is in an initial position, and the liquid lens element 2-OE1 has an optical axis 2-O. When the driving module 2-DM drives the movable assembly 2-MA to move, for example, applying a driving current to the driving coils of the driving module 2-DM, a magnetic force is generated between the driving coils and the corresponding magnetic elements, so that the movable assembly 2-MA is driven to move through the magnetic force and to force the deforming member 2-101 though the connecting assembly 2-CA to press the lower side of the liquid lens element 2-OE1. Therefore the liquid lens element 2-OE1 is deformed.

As shown in FIG. 17 and FIG. 20, when the first driving assembly 2-DA1 and the third driving assembly 2-DA3 of the driving module 2-DM provide pushing forces 2-F1, 2-F3 of the same magnitude, the deforming member 2-101 translates along the optical axis 2-O. At this time, the lens curvature of the liquid lens element 2-OE1 is changed from the curvature of the liquid lens element 2-OE1 in FIG. 19. That is, the shape of the liquid lens element 2-OE1 is changed. Therefore, the optical properties of the liquid lens element 2-OE1 can be changed, thereby achieving an optical zoom, focus or shock-proofing effect.

Similarly, referring to FIG. 21, when the driving module 2-DM drives the deforming member 2-101 with a tilted movement, as illustrated in FIG. 21, the deforming member 2-101 obliquely moves and provides an unequal amount of pushing forces 2-F1 and 2-F3 to two different sides of the liquid lens element 2-OE1, so that the optical axis 2-O of the liquid lens element 2-OE1 is rotated and is deviated from the main axis 2-AX. That is, there is an angle 2-θ1 formed between them. Therefore, the optical properties of the liquid lens element 2-OE1 are changed, and the optical zoom, focusing or shock-proofing effect can be accomplished. Next, please refer to FIG. 22, which is a schematic perspective view of a part of the structure of an optical system 2-100A according to another embodiment of the present disclosure. In this embodiment, the first elastic element 2-106 may include four conductive elements 2-1061 to 2-1064, and the second elastic element 2-110 may include four conductive elements 2-1101 to 2-1104.

Figure 22:
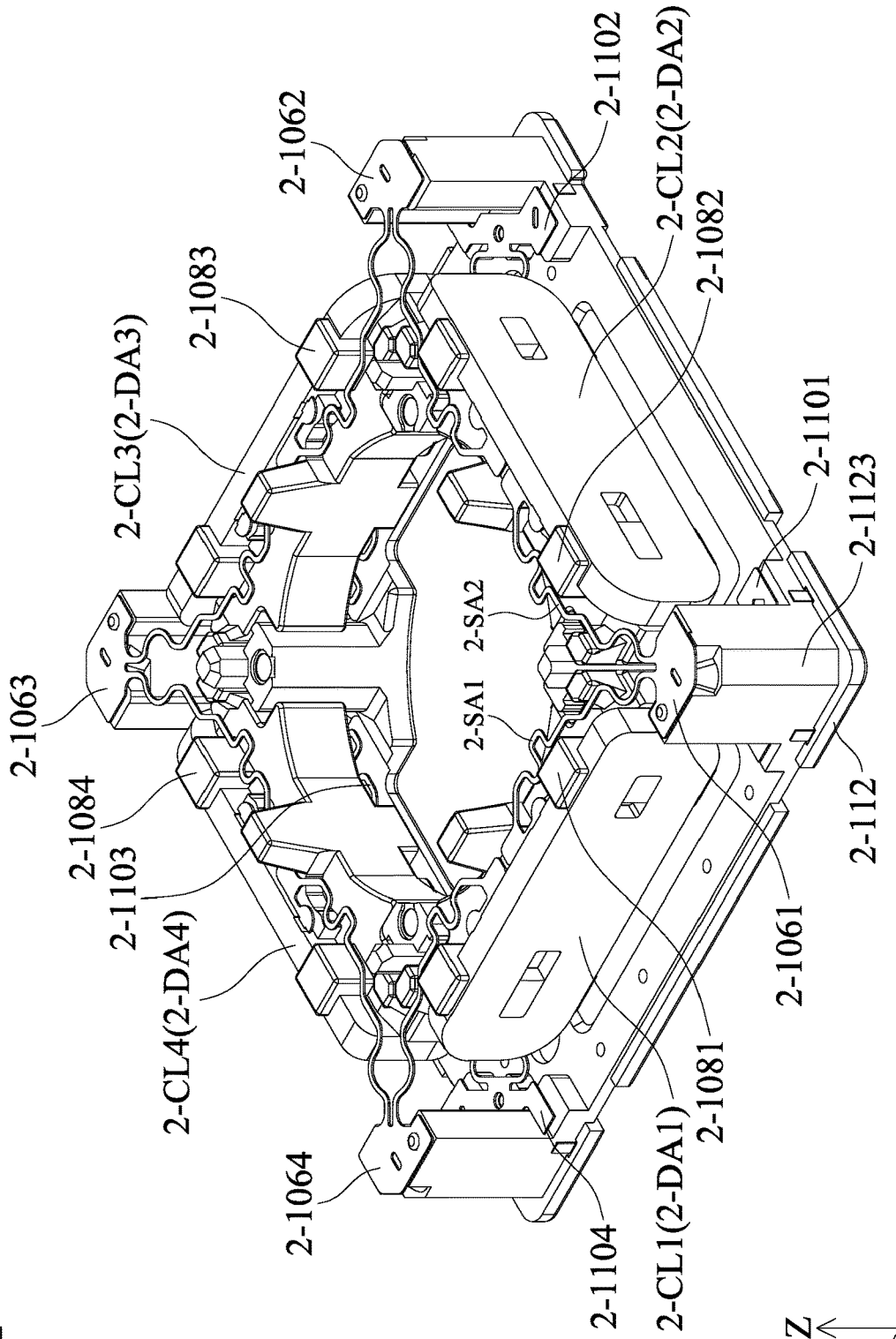
FIG. 22 is a schematic perspective view of a part of the structure of an optical system 2-100A according to another embodiment of the present disclosure.

As shown in FIG. 22, the first driving coil 2-CL1 of the first driving assembly 2-DA1 is electrically connected to the second driving coil 2-CL2 of the second driving assembly 2-DA2 via the conductive element 2-1061 (the first conductive element) of the circuit assembly. Specifically, the conductive element 2-1061 (the first conductive element) has a first string arm 2-SA1 and a second string arm 2-SA2, which are respectively connected to the first driving coil 2-CL1 of the first driving assembly 2-DA1 and the second driving coil 2-CL2 of the second driving assembly 2-DA2.

In addition, the protruding column 2-1123 of the base 2-112 is located between the first driving coil 2-CL1 and the second driving coil 2-CL2, and the conductive element 2-1061 (the first conductive element) is connected to the protruding column 2-1123. For example, the conductive element 2-1061 is fixed to the protruding column 2-1123 by glue or solder.

As shown in FIG. 22, the first driving coil 2-CL1 of the first driving assembly 2-DA1 can also be electrically connected to the second driving coil 2-CL2 of the second driving assembly 2-DA2 via the conductive element 2-1101 (the second conductive element), and the conductive element 2-1061 (the first conductive element) and the conductive element 2-1101 (the second conductive element) are respectively disposed at two sides of the first driving assembly 2-DA1 and the second driving assembly 2-DA2, such as being disposed at the upper side and the lower side of the first driving assembly 2-DA1 and the second driving assembly 2-DA2 in the Z-axis.

Furthermore, the first movable member 2-1081 of the movable assembly 2-MA is movably connected to the protruding column 2-1123 of the fixed assembly 2-FA by the aforementioned first and second conductive elements, but it is not limited thereto. In other embodiments of the present disclosure, the movable assembly 2-MA may also be movably connected to the protruding column 2-1123 of the fixed assembly 2-FA only by the aforementioned first conductive element.

Similarly, the second driving coil 2-CL2 of the second driving assembly 2-DA2 can be electrically connected to the third driving coil 2-CL3 of the third driving assembly 2-DA3 via the conductive element 2-1062 (the third conductive element), and the second driving coil 2-CL2 of the second driving assembly 2-DA2 can also be electrically connected to the third driving coil 2-CL3 of the third driving assembly 2-DA3 via the conductive element 2-1102 (the fourth conductive element). The aforementioned third and fourth conductive elements are respectively disposed at the upper side and the lower side of the second driving assembly 2-DA2 and the third driving assembly 2-DA3 (along the Z-axis).

Figure 23:
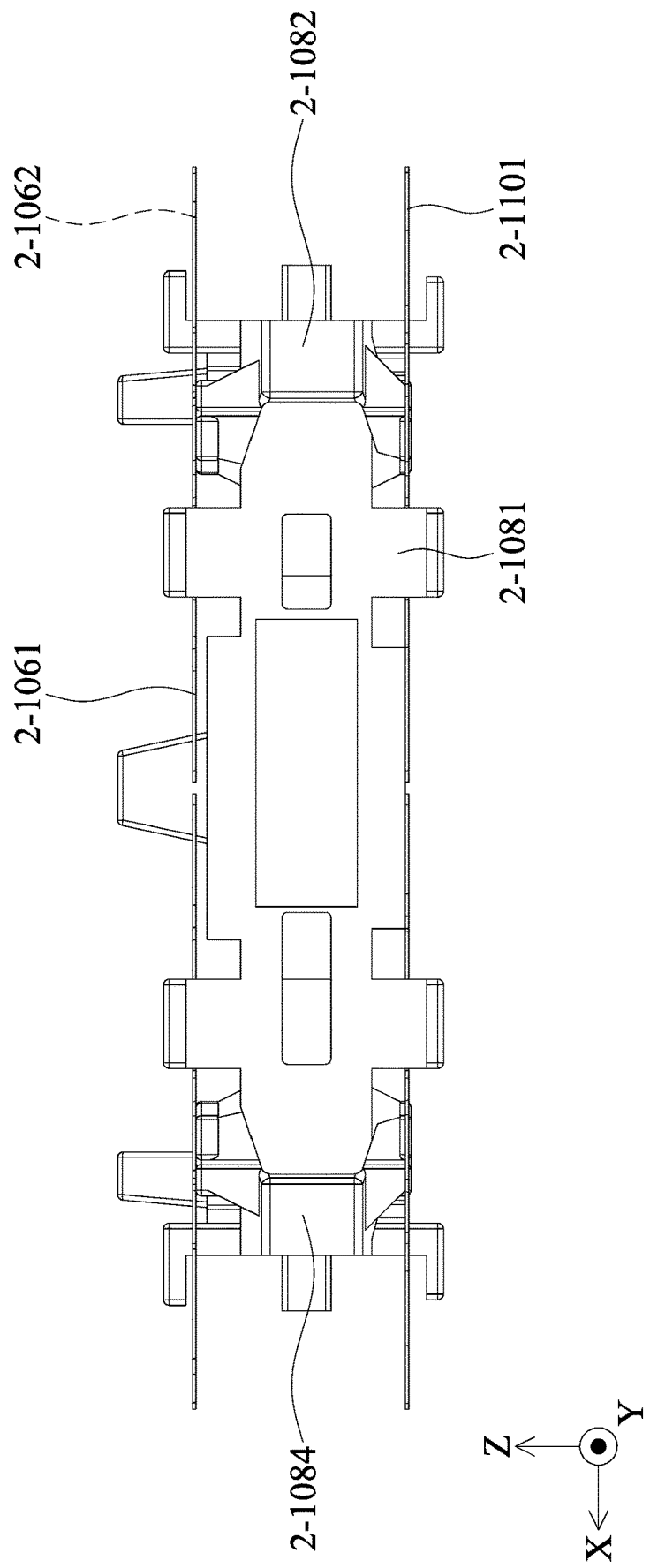
FIG. 23 is a schematic diagram of a partial structure of the optical system 2-100A according to another embodiment of the present disclosure.

Please continue to refer to FIG. 22 and FIG. 23. FIG. 23 is a schematic diagram of a partial structure of the optical system 2-100A according to another embodiment of the present disclosure. The aforementioned conductive elements (such as the first and third conductive elements) all have a plate-shaped structure, and when viewed along an extending direction of the conductive element 2-1061 (such as along the Y-axis), the conductive element 2-1061 (the first conductive element) at least partially overlaps the conductive element 2-1062 (the third conductive element). In this embodiment, the conductive element 2-1061 (the first conductive element) overlaps the conductive element 2-1062 (the third conductive element).

Figure 24:
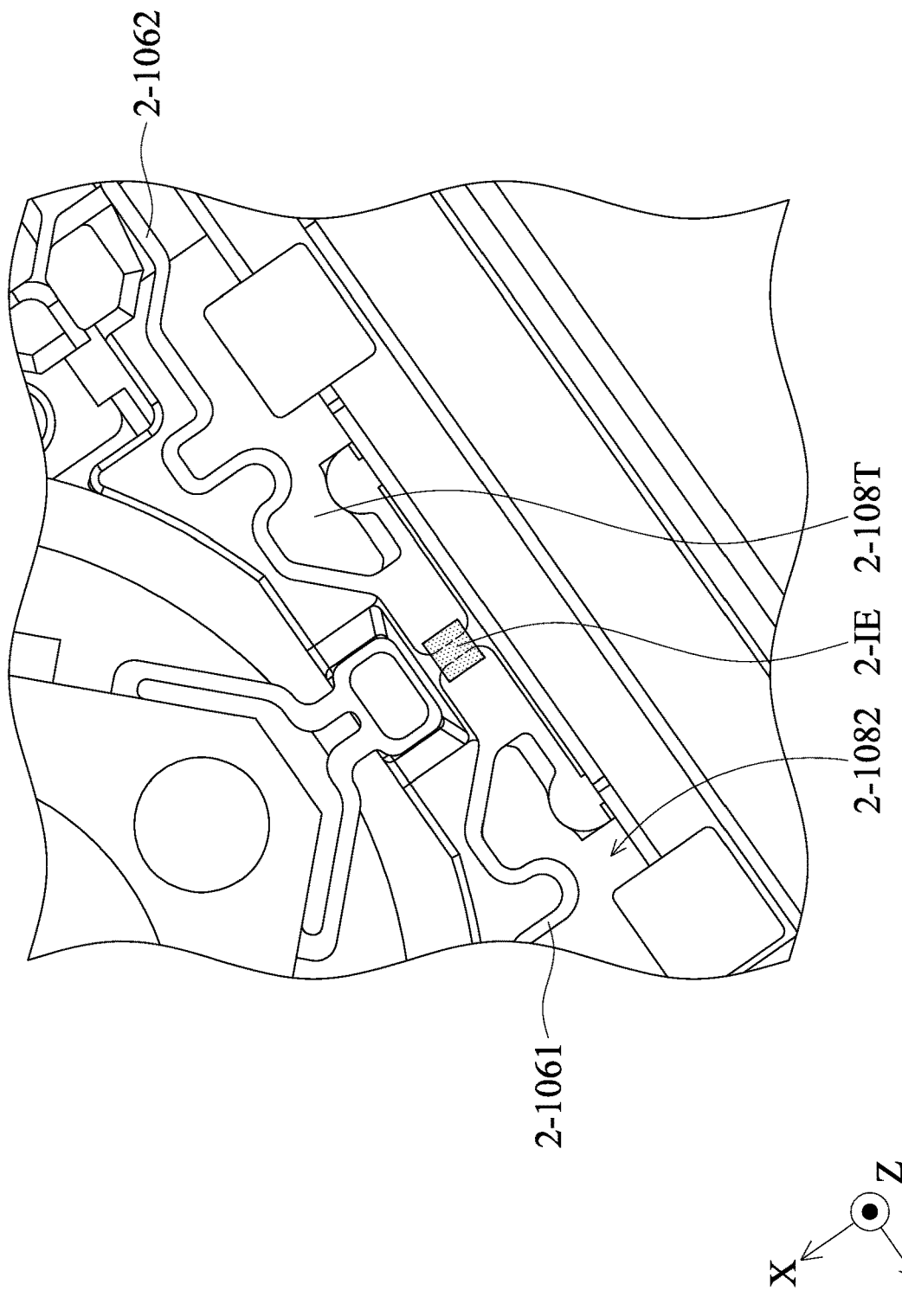
FIG. 24 is an enlarged diagram of a partial structure of the optical system 2-100A according to another embodiment of the present disclosure.

Please refer to FIG. 24, which is an enlarged diagram of a partial structure of the optical system 2-100A according to another embodiment of the present disclosure. The conductive element 2-1061 (the first conductive element) and the conductive element 2-1062 (the third conductive element) are disposed on a top surface 2-108T of the second movable member 2-1082 of the movable assembly 2-MA, and when viewed in the direction of the main axis 2-AX (the Z-axis), the conductive element 2-1061 (the first conductive element) does not overlap the conductive element 2-1062 (the third conductive element).

Furthermore, in this embodiment, the optical system 2-100A may further include an insulating element 2-IE, which is disposed between the conductive element 2-1061 (the first conductive element) and the conductive element 2-1062 (the third conductive element). In this embodiment, the insulating element 2-IE may be a glue configured to connect the conductive element 2-1061 (the first conductive element), the conductive element 2-1062 (the third conductive element), and the second movable member 2-1082 of the movable assembly 2-MA, as shown in FIG. 24. The insulating element 2-IE can be used to fix the end portions of the conductive element 2-1061 (the first conductive element) and the conductive element 2-1062 (the third conductive element) to the second movable member 2-1082, and it can cause the conductive element 6-1061 (the first conductive element) being electrically independent from the conductive element 2-1062 (the third conductive element).

Figure 25:
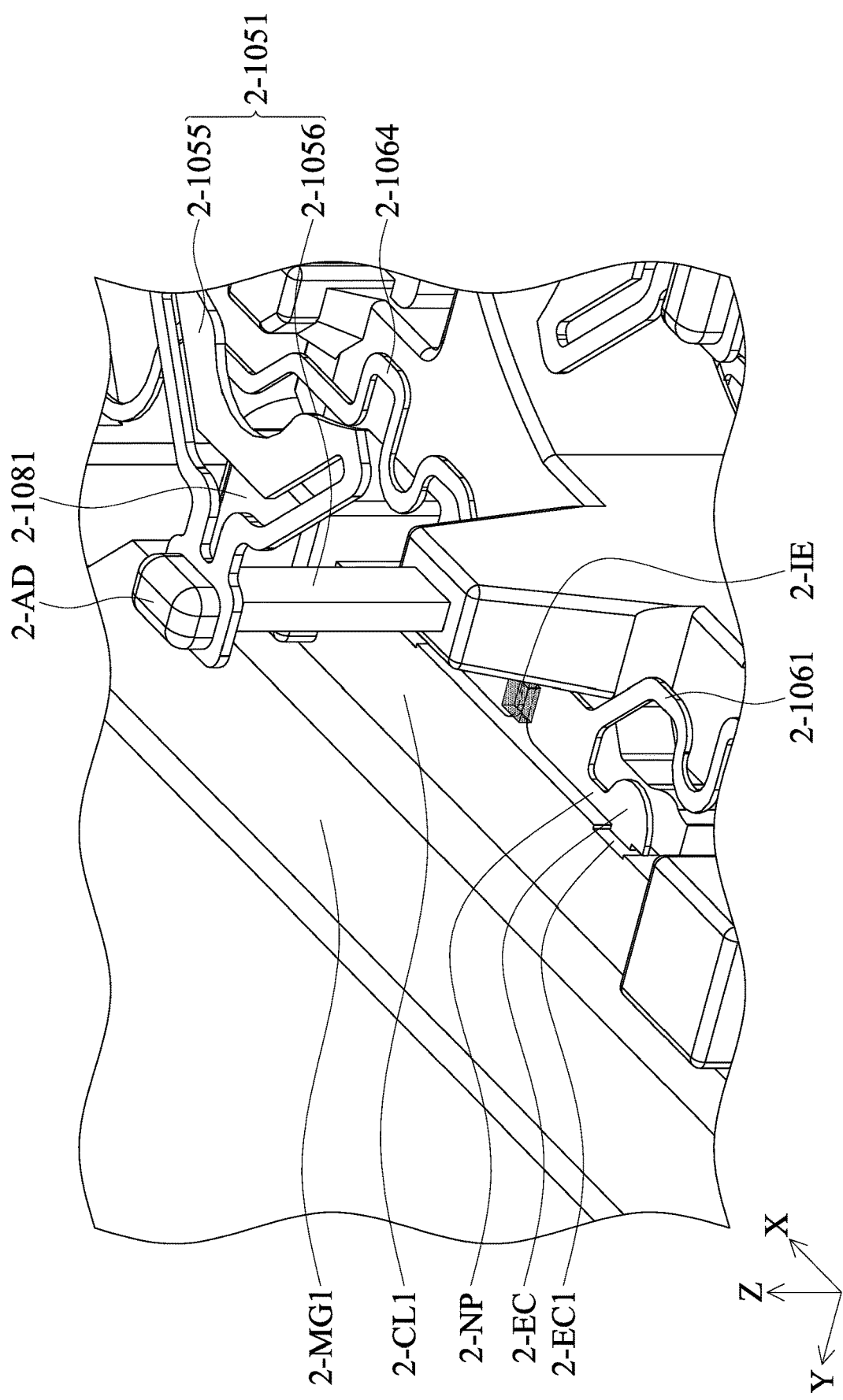
FIG. 25 is an enlarged diagram of a part of the structure of the optical system 2-100A in another view according to another embodiment of the present disclosure.

Please refer to FIG. 25, which is an enlarged diagram of a part of the structure of the optical system 2-100A in another view according to another embodiment of the present disclosure. The optical system 2-100A is similar to the optical system 2-100. The difference between them is that each connecting member of the optical system 2-100A can have an elastic portion and a rigid portion. For example, the first connecting member 2-1051 may have an elastic portion 2-1055 and a rigid portion 2-1056, and the rigid portion 2-1056 is connected to the elastic portion 2-1055 by an adhesive member 2-AD. The rigid portion 2-1056 is connected between the elastic portion 2-1055 and the first movable member 2-1081.

Furthermore, as shown in FIG. 25, the conductive element 2-1061 (the first conductive element) has an electrical contact 2-EC and a narrow portion 2-NP. The electrical contact 2-EC is configured to be electrically connected to an electrical contact 2-EC1 of the first driving coil 2-CL1 of the first driving assembly 2-DA1, for example, by welding. The narrow portion 2-NP is adjacent to the electrical contact 2-EC, and the design of the narrow portion 2-NP can reduce the heat transfer during welding to prevent the first movable member 2-1081 from being damaged and can allow the thermal energy to be concentrated on the electrical contact 2-EC so as to facilitate melt of the solder more reliably, so that the solder can be set more securely.

Figure 26:
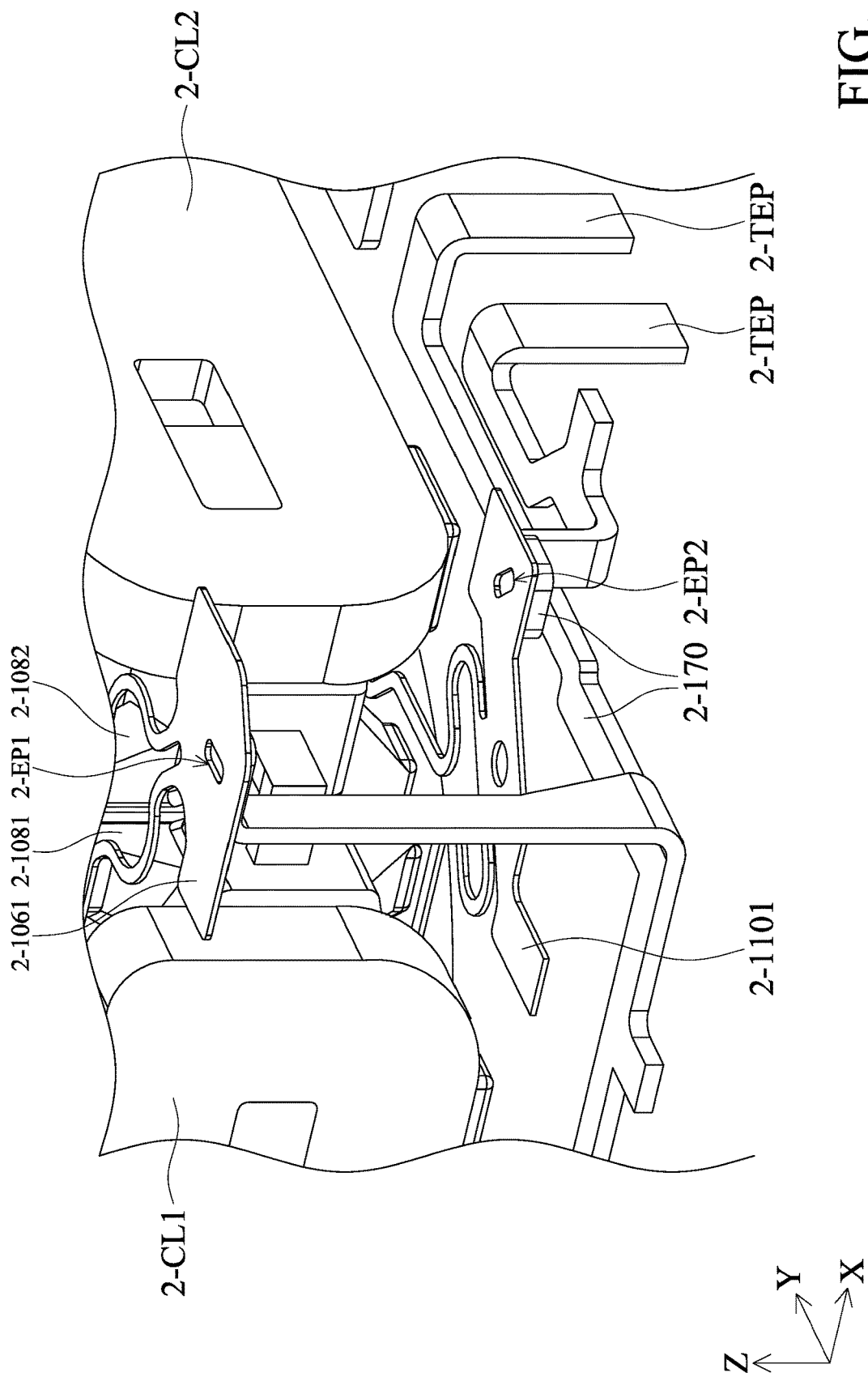
FIG. 26 is an enlarged diagram of the optical system 2-100A after removing the base 2-112 according to an embodiment of the present disclosure.

Please refer to FIG. 26, which is an enlarged diagram of the optical system 2-100A after removing the base 2-112 according to an embodiment of the present disclosure. In this embodiment, the conductive element 2-1061 (the first conductive element) and the conductive element 2-1101 (the second conductive element) can be electrically connected to an external electrical connection portion 2-TEP through the circuit member 2-170 which is embedded in the base 2-112, for example, by welding.

Specifically, as shown in FIG. 26, the conductive element 2-1061 (the first conductive element) is electrically connected to the circuit member 2-170 through a first electrical connecting point 2-EP1, and the conductive element 2-1101 (the second conductive element) is electrically connected to the circuit member 2-170 through a second electrical connecting point 2-EP2. In addition, the shortest distance between the first electrical connecting point 2-EP1 and the first optical element 2-OE is different from the shortest distance between the second electrical connecting point 2-EP2 and the first optical element 2-OE. That is, the distance between the first electrical connecting point 2-EP1 and the first optical element 2-OE along the main axis 2-AX is smaller than the distance between the second electrical connecting point 2-EP2 and the first optical element 2-OE.

Figure 27:
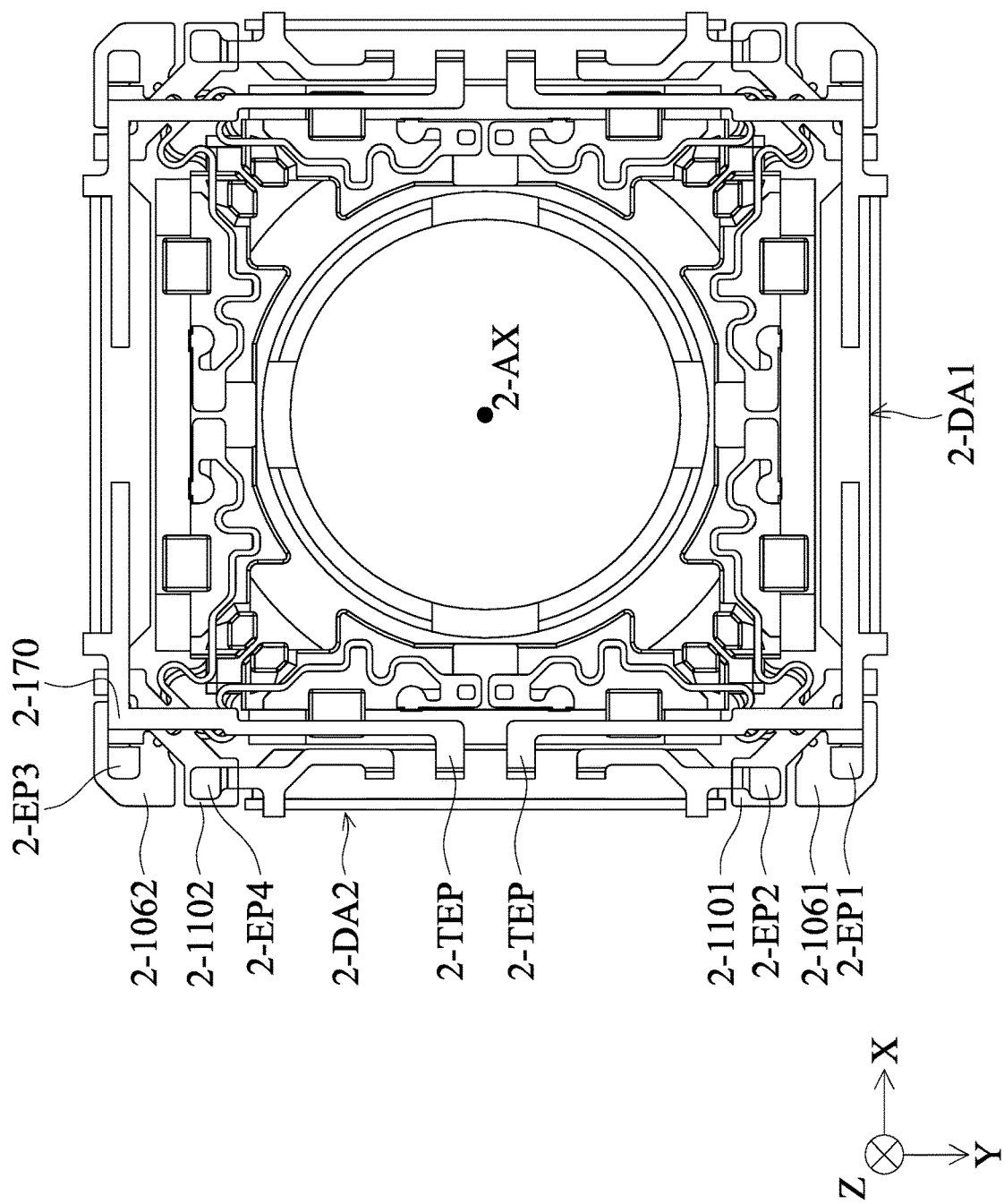
FIG. 27 is a bottom view of the of the optical system 2-100A after removing the base 2-112 according to another embodiment of the present disclosure.

Next, please refer to FIG. 27, which is a bottom view of the of the optical system 2-100A after removing the base 2-112 according to another embodiment of the present disclosure. When viewed along the main axis 2-AX, the second driving assembly 2-DA2 overlaps the external electrical connection portion 2-TEP, and the first driving assembly 2-DA1 does not overlap the external electrical connection portion 2-TEP. The external electrical connection portion 2-TEP is a pin exposed from the base 2-112.

In this embodiment, the circuit member 2-170 may constitute a polygonal structure, such as a rectangular structure in FIG. 27. Furthermore, the conductive element 2-1062 (the third conductive element) is electrically connected to the circuit member 2-170 through a third electrical connecting point 2-EP3, the conductive element 2-1102 (the fourth conductive element) is electrically connected to the circuit member 2-170 through a fourth electrical connecting point 2-EP4, and the aforementioned second electrical connecting point 2-EP2 and the fourth electrical connecting point 2-EP4 are disposed on one side of the circuit member 2-170, such as on the left.

It should be noted that when viewed along the main axis 2-AX, the aforementioned second electrical connecting point 2-EP2 and the fourth electrical connecting point 2-EP4 are located between the aforementioned first electrical connecting point 2-EP1 and the third electrical connecting point 2-EP3.

Figure 28:
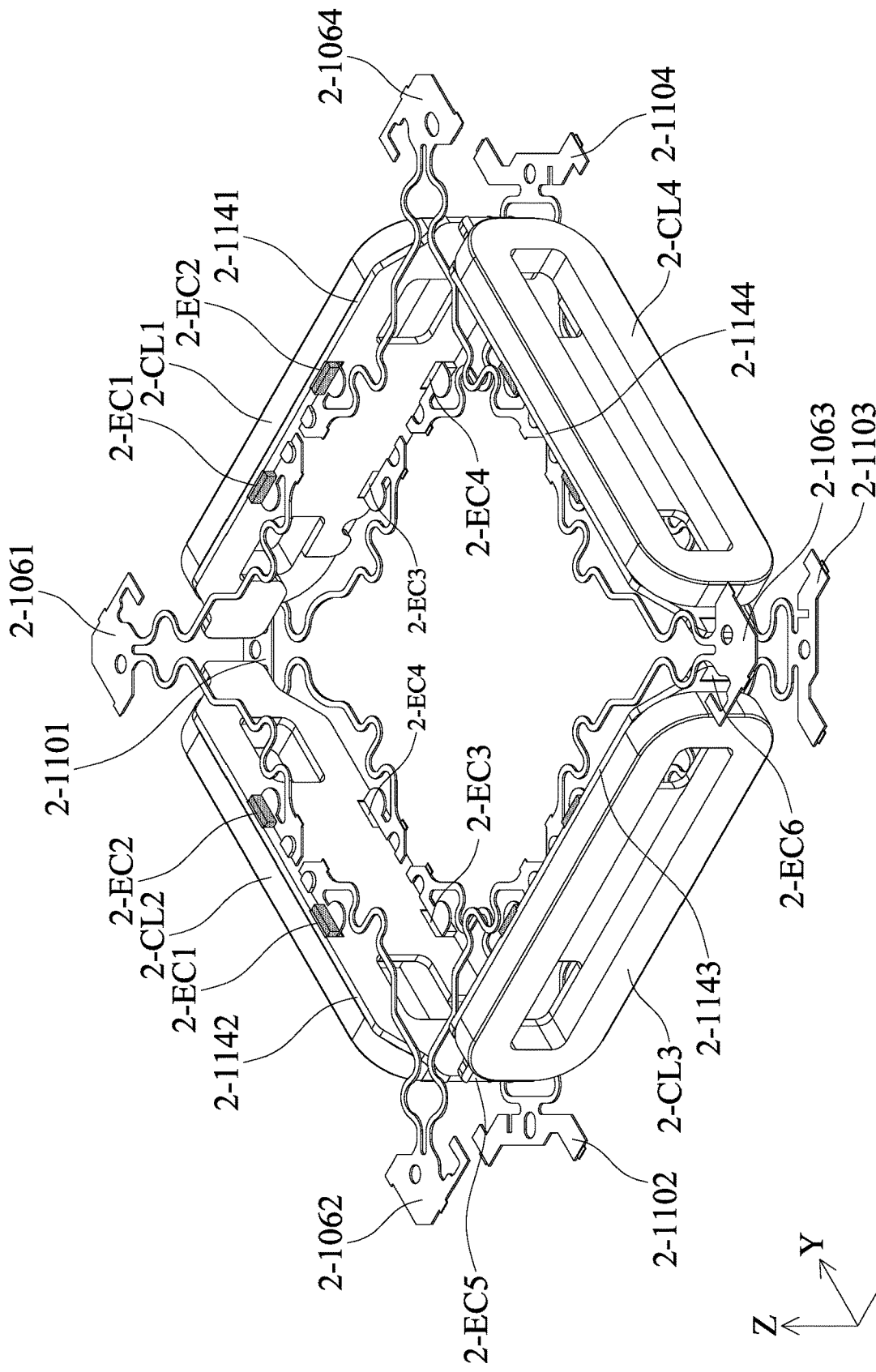
FIG. 28 is a schematic diagram of a part of a structure of an optical system according to another embodiment of the present disclosure.

Please refer to FIG. 28, which is a schematic diagram of a part of a structure of an optical system according to another embodiment of the present disclosure. In this embodiment, each driving assembly may further include a flexible circuit board. For example, the first driving assembly 2-DA1 to the fourth driving assembly 2-DA4 may have circuit boards 2-1141 to 2-1144 respectively, and each circuit board may have six electrical contacts 2-EC1 to 2-EC6.

In this embodiment, the electrical contact 2-EC1 and the electrical contact 2-EC2 of the circuit board 2-1141 are electrically connected to a positive voltage and a negative voltage, respectively. The electrical contact 2-EC3 and the electrical contact 2-EC4 of the circuit board 2-1141 are electrically connected to a data signal and a clock signal, respectively, and the electrical contact 2-EC5 and the electrical contact 2-EC6 respectively output a first output signal and a second output signal.

Because the circuit board 2-1141 and the circuit board 2-1142 share the conductive element 2-1061 and the conductive element 2-1101, the electrical contact 2-EC2 of the circuit board 2-1142 is electrically connected to the positive voltage, and the electrical contact 2-EC4 of the circuit board 2-1142 is electrically connected to the data signal. Similarly, because the circuit board 2-1142 and the circuit board 2-1143 share the conductive element 2-1062 and the conductive element 2-1102, the electrical contact 2-EC1 of the circuit board 2-1142 is electrically connected to the negative voltage. The electrical contact 2-EC3 of the circuit board 2-1142 is electrically connected to the clock signal, and the electrical contact 2-EC5 and the electrical contact 2-EC6 of the circuit board 2-1142 respectively output the second output signal and the first output signal.

That is, the circuit layout of the circuit board 2-1141 (the first circuit element) is different from the circuit layout of the circuit board 2-1142 (the second circuit element). For example, the circuit layout of the circuit board 2-1141 is symmetrical to the circuit layout of the circuit board 2-1142.

The present disclosure provides an optical system having a first optical element 2-OE, a deforming member 2-101, a movable element 2-103, a fixed assembly 2-FA, a connecting assembly 2-CA, a movable assembly 2-MA, and a driving module 2-DM. The movable element 2-103 is configured to be connected to the first optical element 2-OE through the deforming member 2-101, and the movable assembly 2-MA is connected to the movable element 2-103 through the connecting assembly 2-CA. When driving module 2-DM is configured to drive movable assembly 2-MA to move relative to fixed assembly 2-FA, the movable element 2-103 can be moved to drive the deforming member 2-101 to push the bottom of first optical element 2-OE, thereby changing the optical properties of the liquid lens element 2-OE1.

In addition, the circuit layouts of adjacent circuit boards in the driving assembly are symmetrical, and adjacent movable members in movable assembly 2-MA can share conductive elements, so that the optical system of the present disclosure can achieve simplified mechanism design and the purpose of miniaturization.

The third embodiment group.

Figure 29:
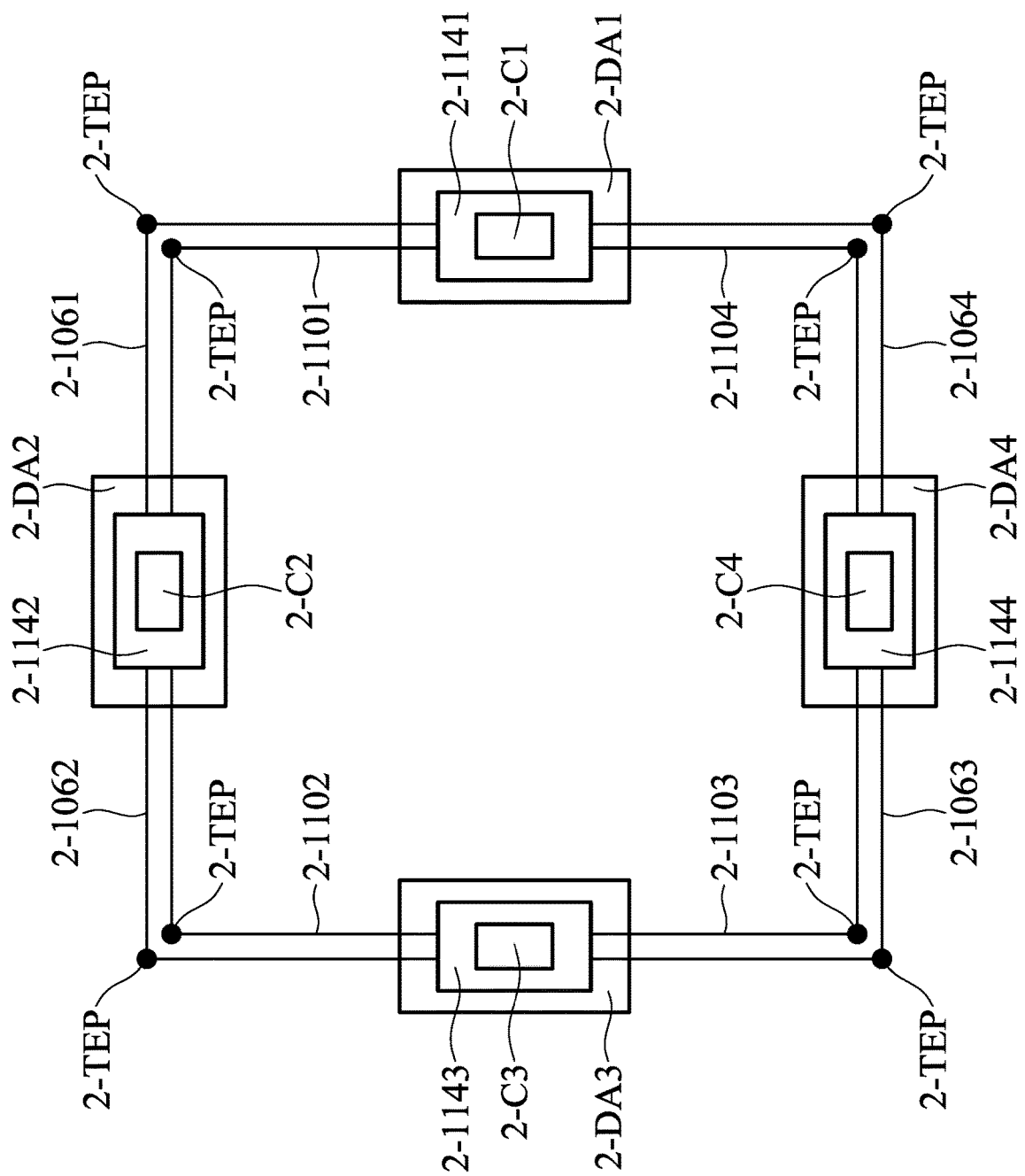
FIG. 29 is a perspective diagram showing the eight conductive elements 2-1061 to 2-1064 and 2-1101 to 2-1104 electrically connected to the circuit boards 2-1141 to 2-1144 of the four driving assemblies 2-DA1 to 2-DA4.

FIG. 29 is a perspective diagram showing the eight conductive elements 2-1061 to 2-1064 and 2-1101 to 2-1104 electrically connected to the circuit boards 2-1141 to 2-1144 of the four driving assemblies 2-DA1 to 2-DA4.

Referring to FIGS. 22, 28 and 29, the eight conductive elements 2-1061 to 2-1064 and 2-1101 to 2-1104 may be resilient metal spring sheets that electrically connect to the circuit boards 2-1141 to 2-1144 of the four driving assemblies 2-DA1 to 2-DA4. Here, the two conductive elements 2-1061, 2-1101 are electrically connected to 2-1141, 2-1142, the two conductive elements 2-1062, 2-1102 are electrically connected to the circuit boards 2-1142, 2-1143, the two conductive elements 2-1063, 2-1103 are electrically connected to the circuit boards 2-1143, 2-1144, and the two conductive elements 2-1064, 2-1104 are electrically connected to the circuit boards 2-1144, 2-1141. It should be noted that the eight conductive elements 2-1061 to 2-1064 and 2-1101 to 2-1104 further electrically connect to an external circuit via the external electrical connection portions 2-TEP that are exposed to the surface of the base 2-112.

The circuit boards 2-1141 to 2-1144 are respectively affixed to the movable members 2-1081 to 2-1084, and four control circuit elements 2-C1 to 2-C4 are disposed on the circuit boards 2-1141 to 2-1144, as shown in FIG. 29. Moreover, the movable members 2-1081 to 2-1084 are spaced apart from each other in a horizontal direction substantially parallel to the XY plane (FIG. 22), wherein the horizontal direction and the main axis 2-AX form an included angle, and each of the movable members 2-1081 to 2-1084 can be driven to move relative to the fixed assembly 2-FA and the other movable members.

In this embodiment, the control circuit element 2-C1 (first control circuit element) on the circuit board 2-1141 can transmit a first driving signal to the driving assembly 2-DA1 in a first time interval for driving the movable member 2-1081 to move relative to the fixed assembly 2-FA, and the conductive element 2-1061 is electrically connected to the control circuit element 2-C1 via the circuit board 2-1141.

Similarly, the control circuit element 2-C2 (second control circuit element) on the circuit board 2-1142 can transmit a second driving signal to the driving assembly 2-DA2 in a second time interval for driving the movable member 2-1082 to move relative to the fixed assembly 2-FA, and the conductive element 2-1062 is electrically connected to the control circuit element 2-C2 via the circuit board 2-1142.

Similarly, the control circuit element 2-C3 (third control circuit element) on the circuit board 2-1143 can transmit a third driving signal to the driving assembly 2-DA3 in a third time interval for driving the movable member 2-1083 to move relative to the fixed assembly 2-FA, and the conductive element 2-1063 is electrically connected to the control circuit element 2-C3 via the circuit board 2-1143.

Similarly, the control circuit element 2-C4 (fourth control circuit element) on the circuit board 2-1144 can transmit a fourth driving signal to the driving assembly 2-DA4 in a fourth time interval for driving the movable member 2-1084 to move relative to the fixed assembly 2-FA, and the conductive element 2-1064 is electrically connected to the control circuit element 2-C4 via the circuit board 2-1144. In some embodiments, the control circuit elements 2-C1 to 2-C4 may comprise a microcontroller unit (MCU), Hall effect sensor or other IC component.

As shown in FIGS. 22, 28 and 29, the optical system has a substantially rectangular configuration, wherein the driving assemblies 2-DA1 and 2-DA3 are arranged on two opposite sides of the optical system, and the driving assemblies 2-DA2 and 2-DA4 are arranged on the other two opposite sides of the optical system. Moreover, the two driving assemblies 2-DA1 and 2-DA2 are arranged on the adjacent sides of the optical system, the two driving assemblies 2-DA2 and 2-DA3 are arranged on the adjacent sides of the optical system, the two driving assemblies 2-DA3 and 2-DA4 are arranged on the adjacent sides of the optical system, and the two driving assemblies 2-DA4 and 2-DA1 are arranged on the adjacent sides of the optical system.

It should be noted that electrical current signals can be applied to the driving assemblies 2-DA1 to 2-DA4 via the conductive elements 2-1061 to 2-1064 and 2-1101 to 2-1104 from an external circuit, thus driving the movable members 2-1081 to 2-1084 to move relative to the fixed assembly 2-FA. However, since the adjacent driving assemblies 2-DA1 and 2-DA2 share the conductive elements 2-1061 and 2-1101 in common, the conductive elements 2-1061 and 2-1101 cannot be used at the same time to energize the driving assemblies 2-DA1 and 2-DA2 for simultaneously driving the movable members 2-1081 to 2-1082 to move.

For the same reasons as described above, the driving assemblies 2-DA2 and 2-DA3 cannot drive the movable members 2-1082 to 2-1083 to move at the same time, the driving assemblies 2-DA3 and 2-DA4 cannot drive the movable members 2-1083 to 2-1084 to move at the same time, and the driving assemblies 2-DA4 and 2-DA1 cannot drive the movable members 2-1084 to 2-1081 to move at the same time.

Figure 30:
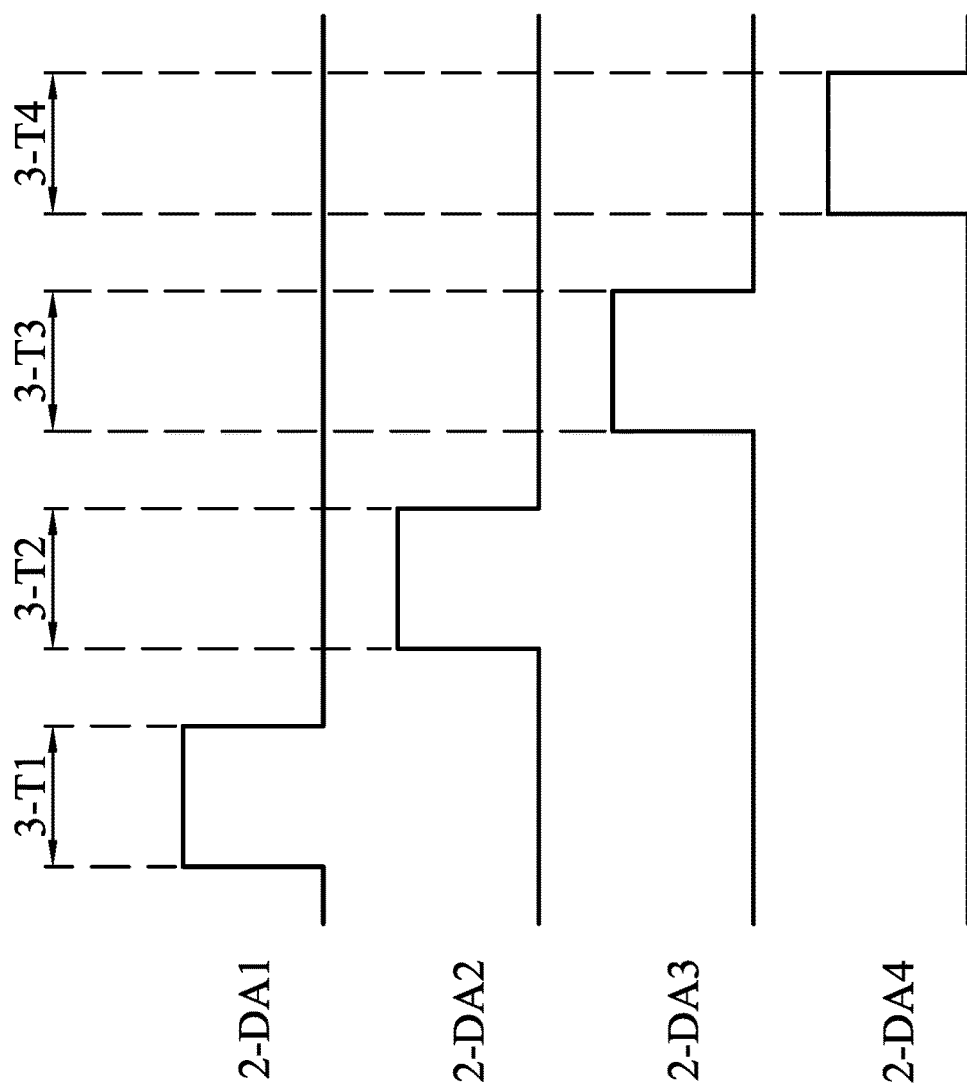
FIG. 30 is a sequence diagram showing the four driving assemblies 2-DA1 to 2-DA4 sequentially drive the movable members 2-1081 to 2-1084 to move relative to the fixed assembly 2-FA in different time intervals 3-T1 to 3-T4.

Referring to FIGS. 29 and 30, FIG. 30 is a sequence diagram showing the four driving assemblies 2-DA1 to 2-DA4 sequentially drive the movable members 2-1081 to 2-1084 to move relative to the fixed assembly 2-FA in different time intervals 3-T1 to 3-T4. To overcome the problem that the adjacent driving assemblies may commonly share the same conductive elements to communicate with the external circuit, as show in FIG. 30, the four driving assemblies 2-DA1 to 2-DA4 in this embodiment can respectively drive the movable members 2-1081 to 2-1084 to move relative to the fixed assembly 2-FA in a first time interval 3-T1, a second time interval 3-T2, a third time interval 3-T3, and a four time interval 3-T4. Hence, the external circuit can transmit electrical current signals through the same conductive elements to different driving assemblies in different time intervals. Thus, the movable assembly 2-MA, the movable element 2-103, and the deforming member 2-101 can be driven to move, and the optical axis 2-O of the liquid lens element 2-OE1 can be effectively adjusted.

Figure 31:
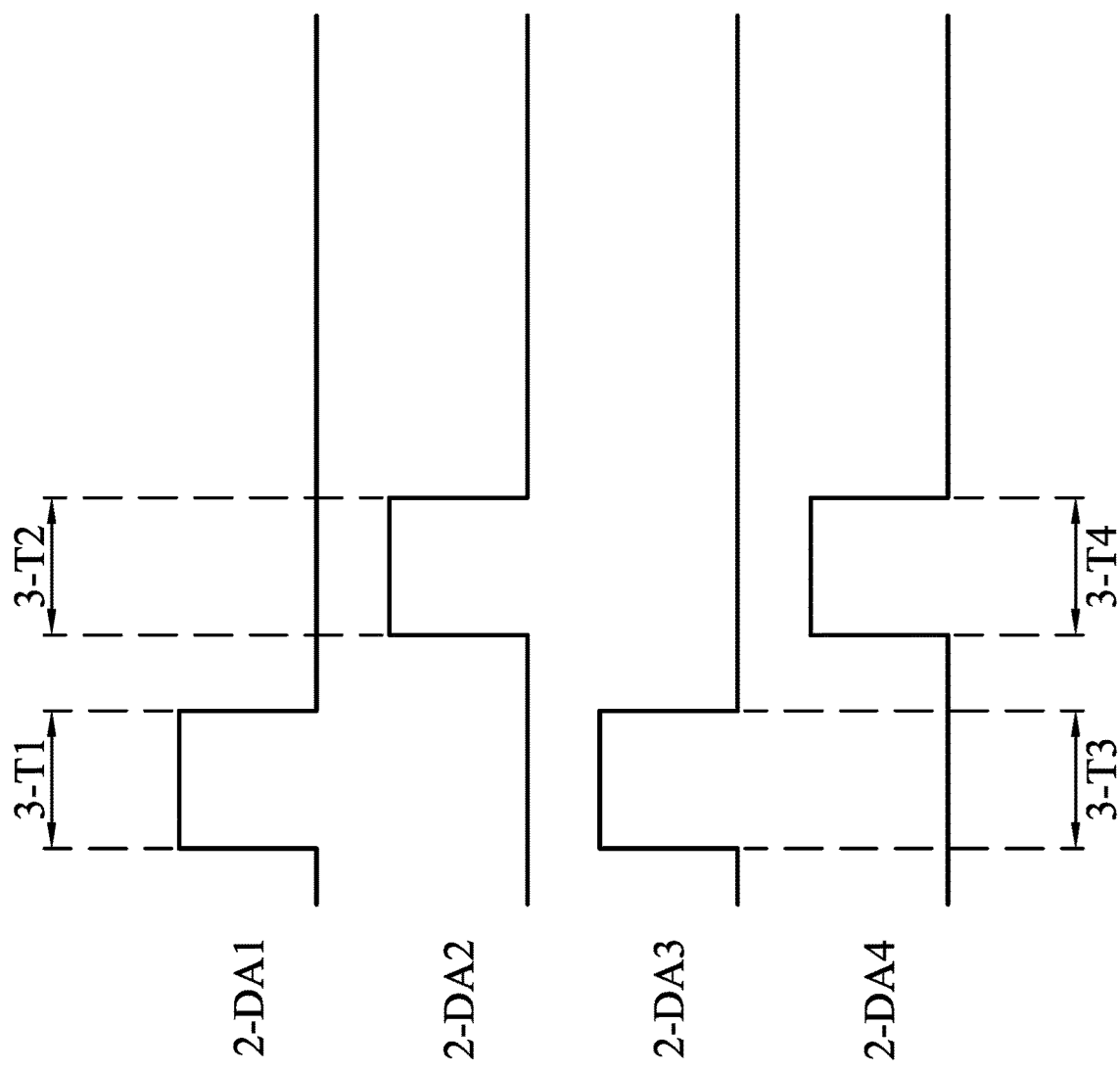
FIG. 31 is a sequence diagram showing the driving assemblies 2-DA1 and 2-DA3 respectively drive the movable member 2-1081 and 2-1083 to move relative to the fixed assembly 2-FA in the same time interval, and the driving assemblies 2-DA2 and 2-DA4 respectively drive the movable member 2-1082 and 2-1084 to move relative to the fixed assembly 2-FA in the same time interval.

FIG. 31 is a sequence diagram showing the driving assemblies 2-DA1 and 2-DA3 respectively drive the movable member 2-1081 and 2-1083 to move relative to the fixed assembly 2-FA in the same time interval, and the driving assemblies 2-DA2 and 2-DA4 respectively drive the movable member 2-1082 and 2-1084 to move relative to the fixed assembly 2-FA in the same time interval. As shown in FIG. 29, since the driving assemblies 2-DA1 and 2-DA3 do not share the same conductive elements in common, they can drive the movable members 2-1081 and 2-1083 to move relative to the fixed assembly 2-FA in the same time interval.

Similarly, since the driving assemblies 2-DA2 and 2-DA4 do not share the same conductive elements in common, they can also drive the movable member 2-1082 and 2-1084 to move relative to the fixed assembly 2-FA in the same time interval. That is, the first time interval 3-T1 could be the same as the third time interval 3-T3, and the second time interval 3-T2 could also be the same as the fourth time interval 3-T4, whereby the time for driving the movable assembly 2-MA can be reduced, and the efficiency of the optical system 2-100 and the driving module 2-DM thereof can be greatly improved. Furthermore, miniaturization of the optical system 2-100 can also be achieved.

Figure 32:
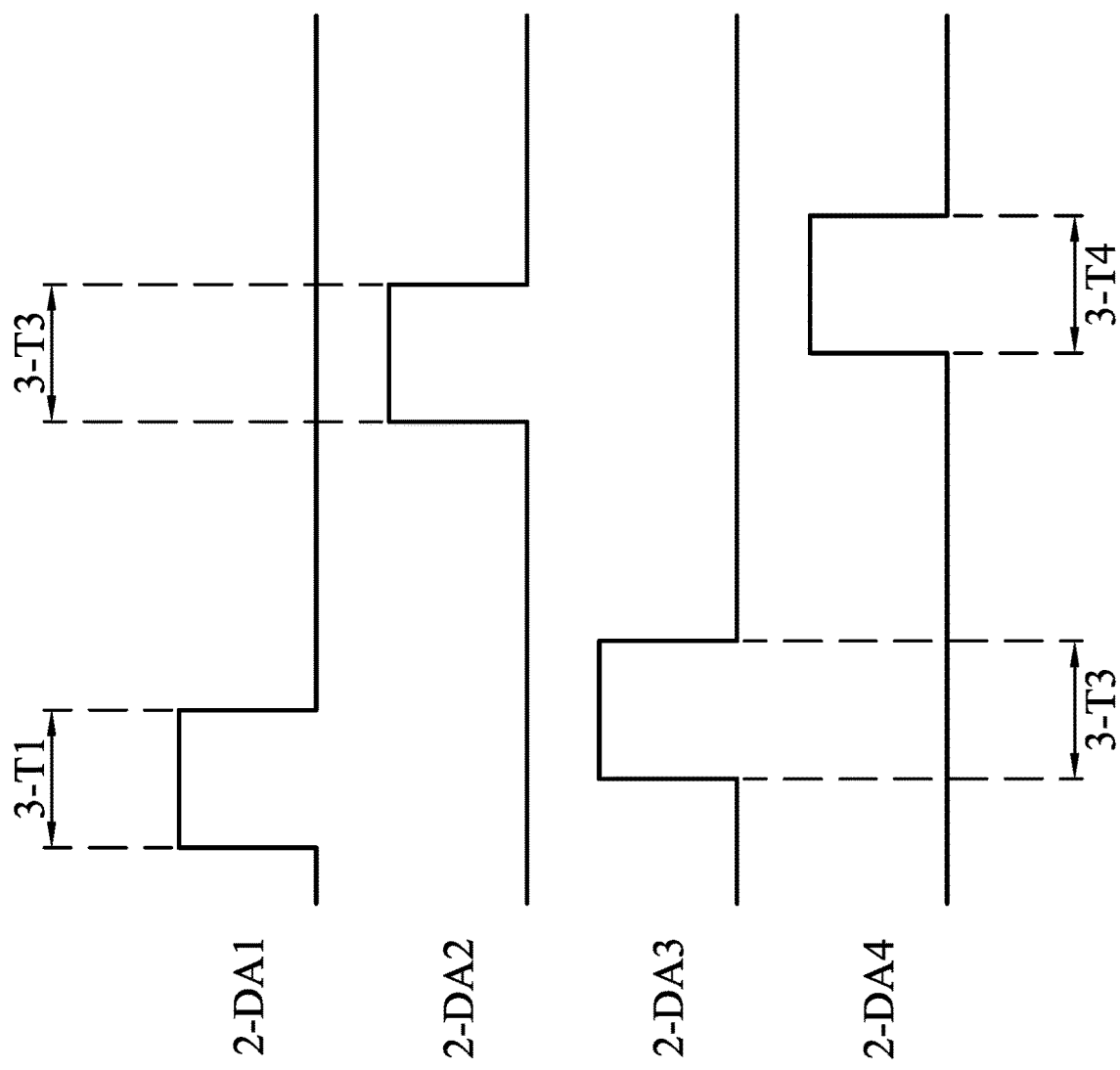
FIG. 32 is a sequence diagram showing the driving assemblies 2-DA1 to 2-DA4 respectively drive the movable member 2-1081 and 2-1084 to move relative to the fixed assembly 2-FA in different time intervals 3-T1 to 3-T4.

FIG. 32 is a sequence diagram showing the driving assemblies 2-DA1 to 2-DA4 respectively drive the movable member 2-1081 and 2-1084 to move relative to the fixed assembly 2-FA in different time intervals 3-T1 to 3-T4. In another embodiment of FIG. 32, the first time interval 3-T1 and the third time interval 3-T3 may partially overlap, and the second time interval 3-T2 and the fourth time interval 3-T4 may also partially overlap, so as to overcome the problem that the adjacent driving assemblies commonly share the same conductive elements.

In the aforementioned embodiments, since the driving assemblies on the adjacent sides of the optical system share the same conductive elements in common, when the driving assemblies 2-DA1 and 2-DA3 drive the movable member 2-1081 and 2-1083 to move relative to the fixed assembly 2-FA, the driving assemblies 2-DA2 and 2-DA4 do not drive the movable member 2-1082 and 2-1084 to move relative to the fixed assembly 2-FA. For the same reasons as described above, when the driving assemblies 2-DA2 and 2-DA4 drive the movable member 2-1082 and 2-1084 to move relative to the fixed assembly 2-FA, the driving assemblies 2-DA1 and 2-DA3 do not drive the movable member 2-1081 and 2-1083 to move relative to the fixed assembly 2-FA.

The fourth embodiment group.

Figure 33:
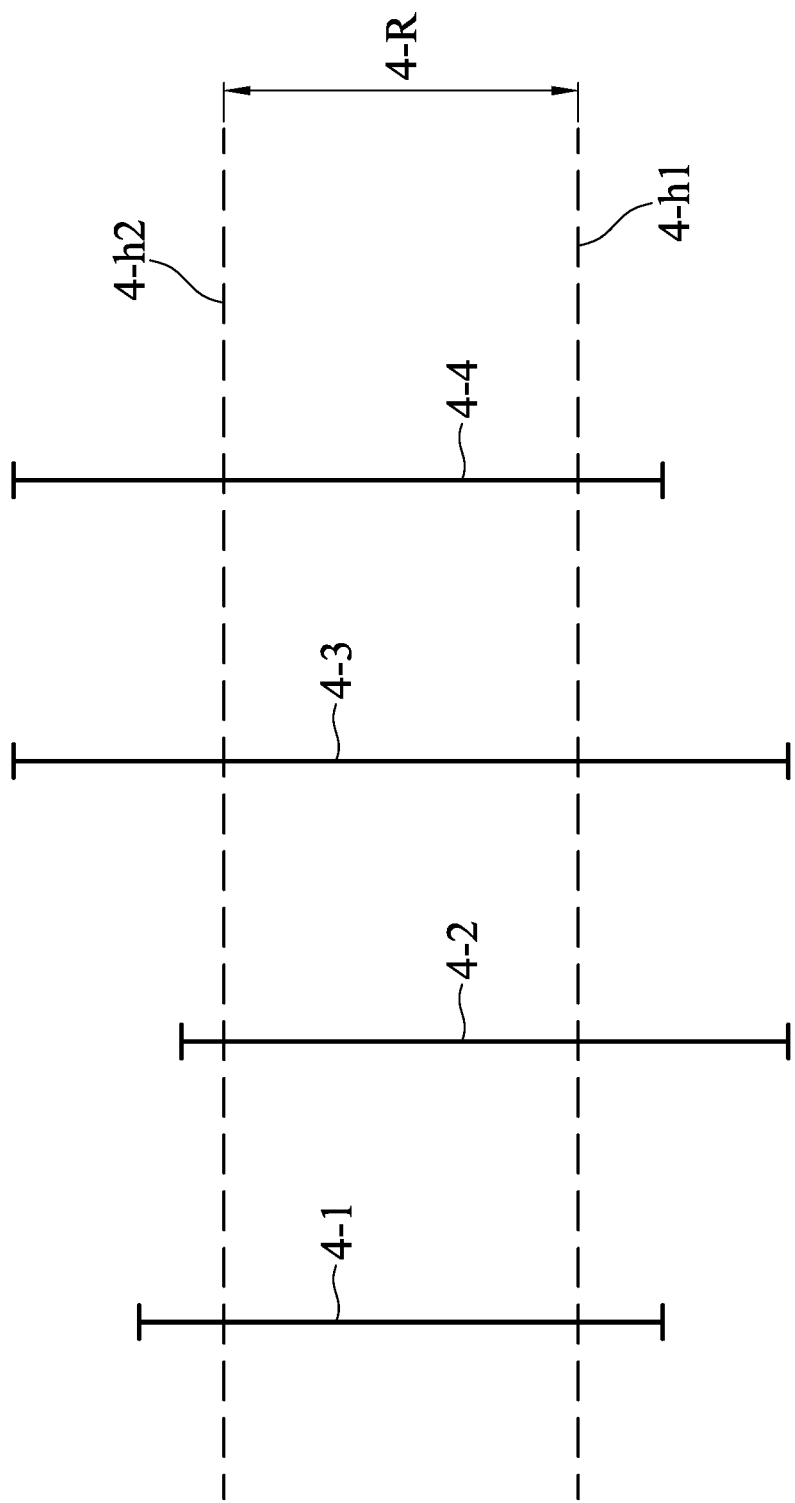
FIG. 33 is a perspective diagram showing the four movable members 2-1081 to 2-1084 in FIG. 17 are respectively movable relative to the fixed assembly 2-FA within the ranges 4-1 to 4-4 along the main axis 2-AX.

Referring to FIGS. 17 and 33, FIG. 33 is a perspective diagram showing the four movable members 2-1081 to 2-1084 in FIG. 17 are respectively movable relative to the fixed assembly 2-FA within the ranges 4-1 to 4-4 along the main axis 2-AX.

As shown in FIG. 17, the movable members 2-1081 to 2-1084 can be respectively driven to move relative to the fixed assembly 2-FA along the main axis 2-AX by the driving assemblies 2-DA1 to 2-DA4. In this embodiment, as shown in FIG. 33, the movable member 2-1081 can be driven to move within a range 4-1 along the main axis 2-AX, the movable member 2-1082 can be driven to move within a range 4-2 along the main axis 2-AX, the movable member 2-1083 can be driven to move within a range 4-3 along the main axis 2-AX, and the movable member 2-1084 can be driven to move within a range 4-4 along the main axis 2-AX.

It should be noted that the ranges 4-1 to 4-4 may not be the same (FIG. 33) due to the assembly tolerance of parts in the optical system. To overcome the deficiencies caused by the tolerance, a calibration method of the optical system in accordance with an embodiment of the invention is provided below.

Before assembling the optical element 2-OE to a main surface of the movable element 2-103, a first height 4-h1 and a second height 4-h2 can be previously determined in each of the ranges 4-1 to 4-4. It should be noted that all of the movable members 2-1081 to 2-1084 can be respectively adjusted along the main axis 2-AX so that the main surface of the movable element 2-103 is perpendicular to the main axis 2-AX when the movable element 2-103 moves to the first height 4-h1 or the second height 4-h2.

Figure 38:
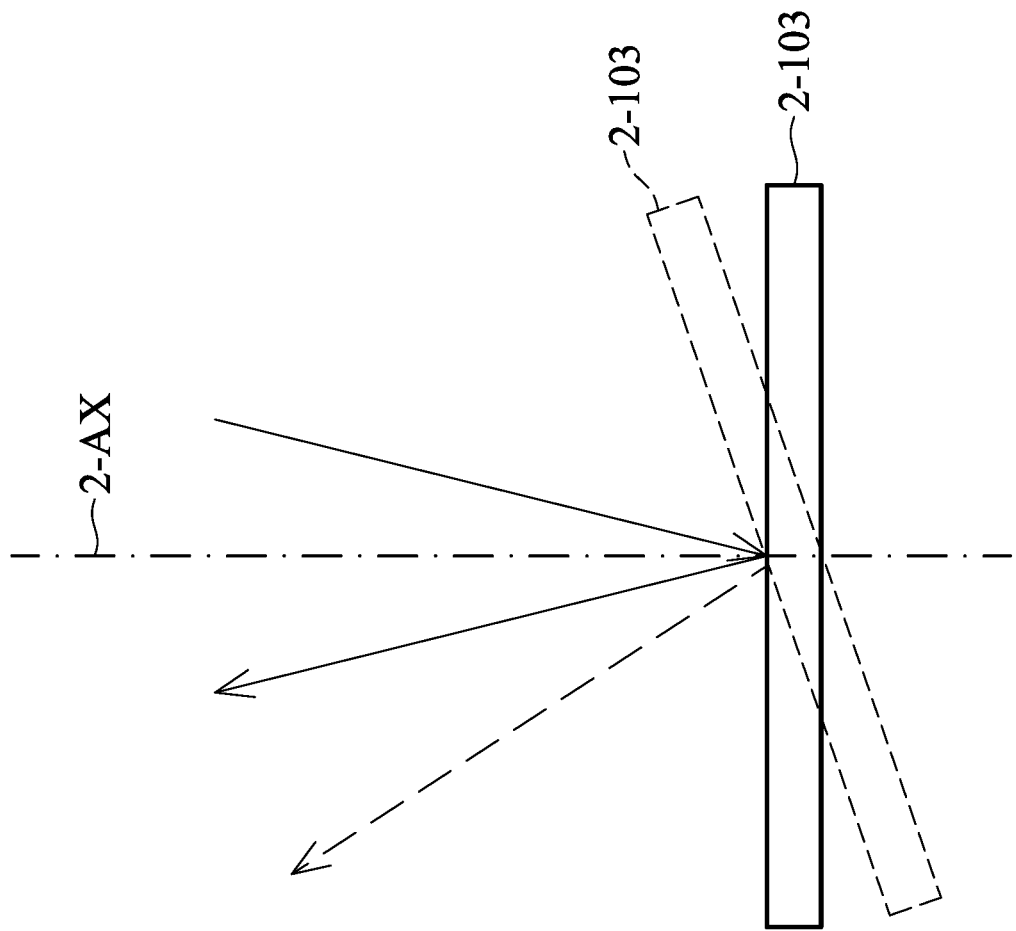
FIG. 38 is a perspective diagram showing an optical instrument projects light onto the main surface of the movable element 2-103.

In some embodiments, an optical instrument may project light to the main surface of the movable element 2-103, as the arrow indicates in FIG. 38, and light can be reflected by the main surface for detecting the attitude of the main surface relative to the main axis 2-AX. In some embodiments, an external equipment may be used to measure a plurality of reference systems that have substantially the same specification as the optical system 2-100, so as to determine the first and second heights 4-h1 and 4-h2.

Hence, as shown in FIG. 33, an operation interval 4-R can be defined between the first and second heights 4-h1 and 4-h2 where the movable element 2-103 can be driven to move. It should be noted that the movable members 2-1081 to 2-1084 can respectively move relative to the fixed assembly 2-FA within the ranges 4-1 to 4-4 (maximum range), and the operation interval 4-R is smaller than each one of the ranges 4-1 to 4-4. An object of the invention is to ensure that the main surface of the movable element 2-103 remains perpendicular to the main axis 2-AX when moving within the operation interval 4-R, thus preventing efficiency reduction of the optical system due to angular deviation of the main axis 2-AX of the optical element 2-OE.

Figure 34:
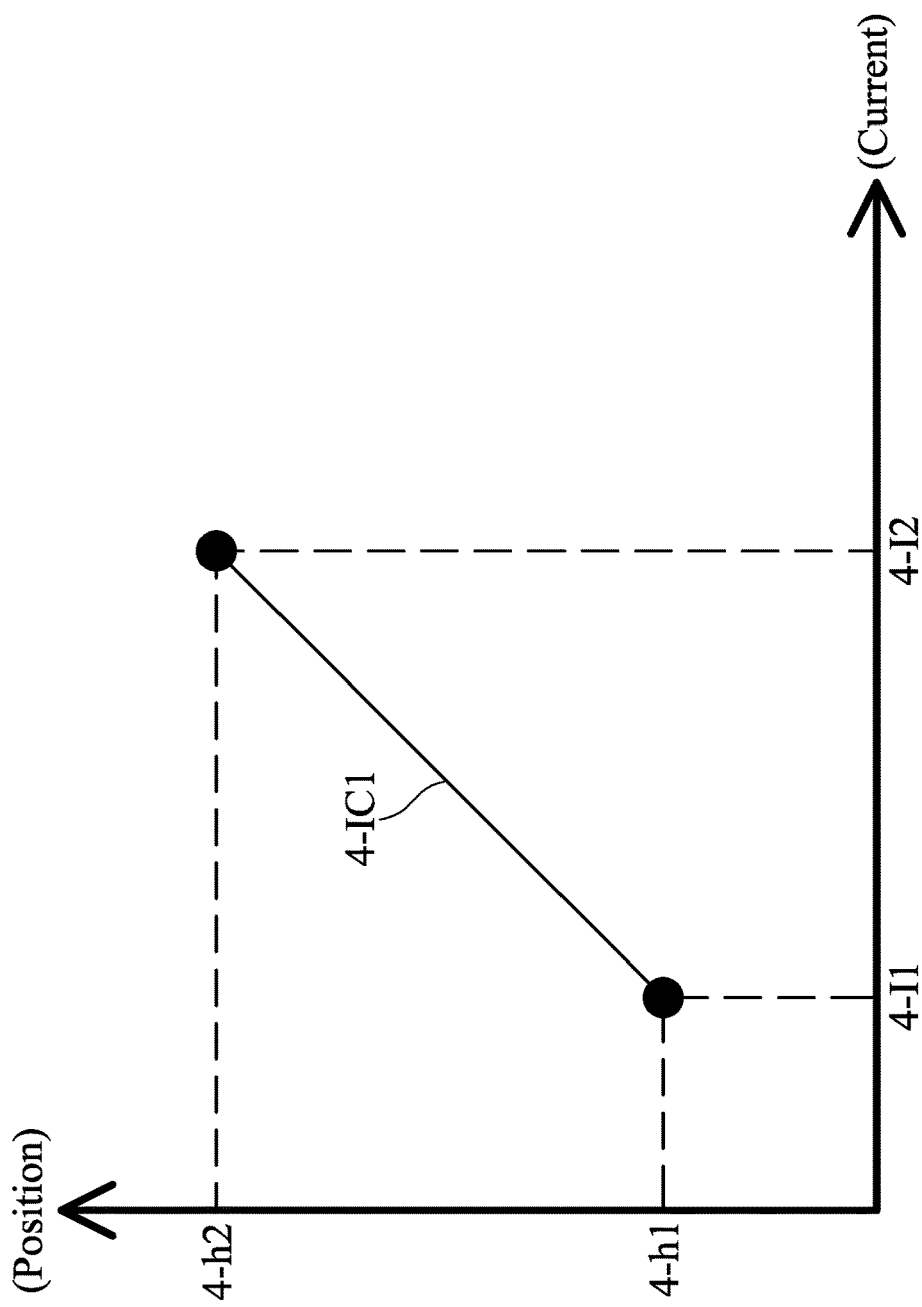
FIG. 34 shows a linear curve 4-IC1 that represents the relationship between the position of the movable element 2-103 versus the electrical current signal that is applied to the driving assembly 2-DA1.
Figure 35:
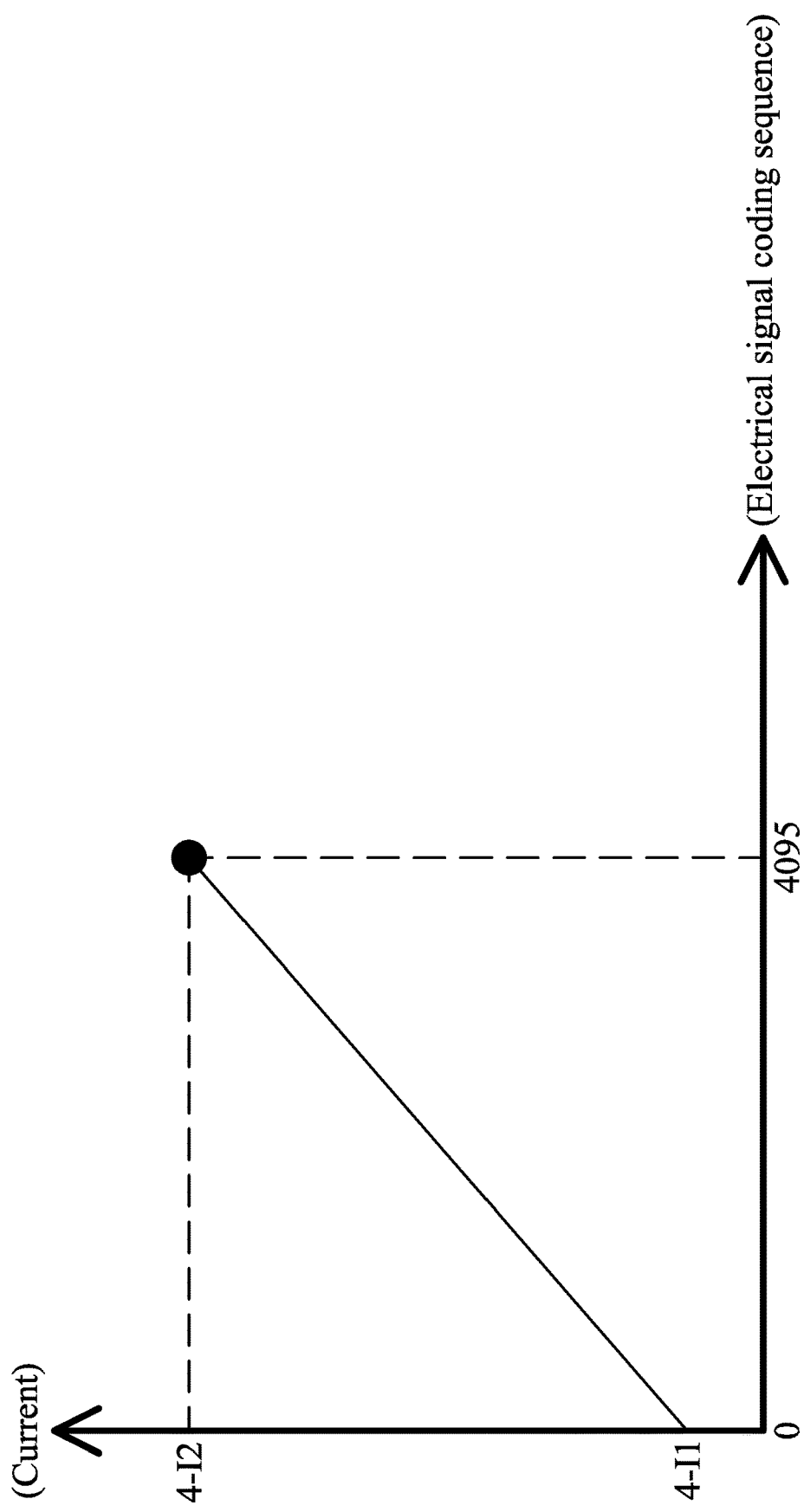
FIG. 35 shows a linear curve representing the relationship between the electrical current signal in FIG. 34 versus an electrical signal coding sequence (0 to 4095).

FIG. 34 shows a curve representing the linear relationship between the position of the movable element 2-103 versus the electrical current signal that is applied to the driving assembly 2-DA1. FIG. 35 shows a curve representing the linear relationship between the electrical current signal in FIG. 34 versus an electrical signal coding sequence (0 to 4095).

As shown in FIG. 34, it is supposed that when the movable element 2-103 is impelled to the first height 4-h1 with the main surface thereof being perpendicular to the main axis 2-AX, the electrical current signal applied to the driving assembly 2-DA1 has a first driving value 4-I1. Additionally, it is supposed that when the movable element 2-103 is impelled to the second height 4-h2 with the main surface thereof being perpendicular to the main axis 2-AX, the electrical current signal applied to the driving assembly 2-DA2 has a second driving value 4-I2. Hence, a position versus current linear curve 4-IC1 of the driving assembly 2-DA1 can be established.

Here, an electrical signal coding sequence (0 to 4095) can be used as an input parameter of a control circuit element in the optical system. As shown in FIG. 35, the coding sequence is from 0 to 4095, wherein the first and second first driving values 4-I1 and 4-I2 are respectively assigned to code 0 and code 4095. Therefore, the relationship between the operation interval 4-R and the electrical signal coding sequence in regard to the driving assembly 2-DA1 can be established. Similarly, the relationship between the operation interval 4-R and the electrical signal coding sequence in regard to the other driving assemblies 2-DA2 to 2-DA4 can also be established.

Additionally, the optical system 2-100 further comprises four position sensors (e.g. Hall effect sensors) to respectively detect the positions of the four movable members 2-1081 to 2-1084. It is supposed that a position sensor detects the movable member 2-1081 when at the first height 4-h1 with the main surface thereof being perpendicular to the main axis 2-AX, the position sensor generates a signal that a first sensing value. It is also supposed that the position sensor detects the movable member 2-1081 at the second height 4-h2 with the main surface thereof being perpendicular to the main axis 2-AX, the position sensor generates a signal that has a second sensing value.

Figure 36:
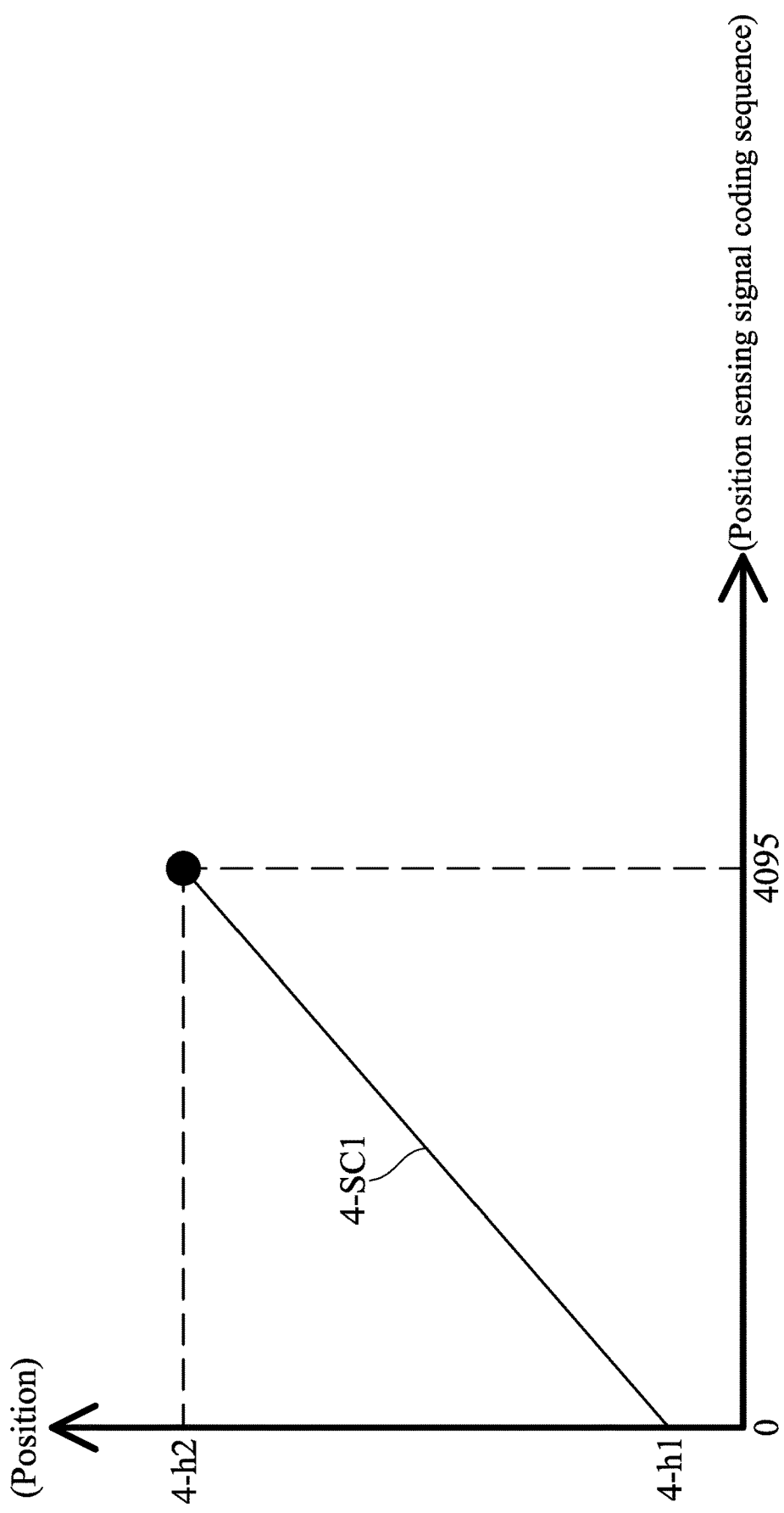
FIG. 36 shows a linear curve 4-SC1 that represents the relationship between the position of the movable element 2-103 versus a position sensing signal coding sequence.

In this embodiment, the first and second sensing values can be respectively assigned to code 0 and code 4095 of a position sensing signal coding sequence (FIG. 36). Hence, a position versus position-sensing-signal-coding-sequence curve 4-SC1 in regard to the position sensor can be established.

Figure 37:
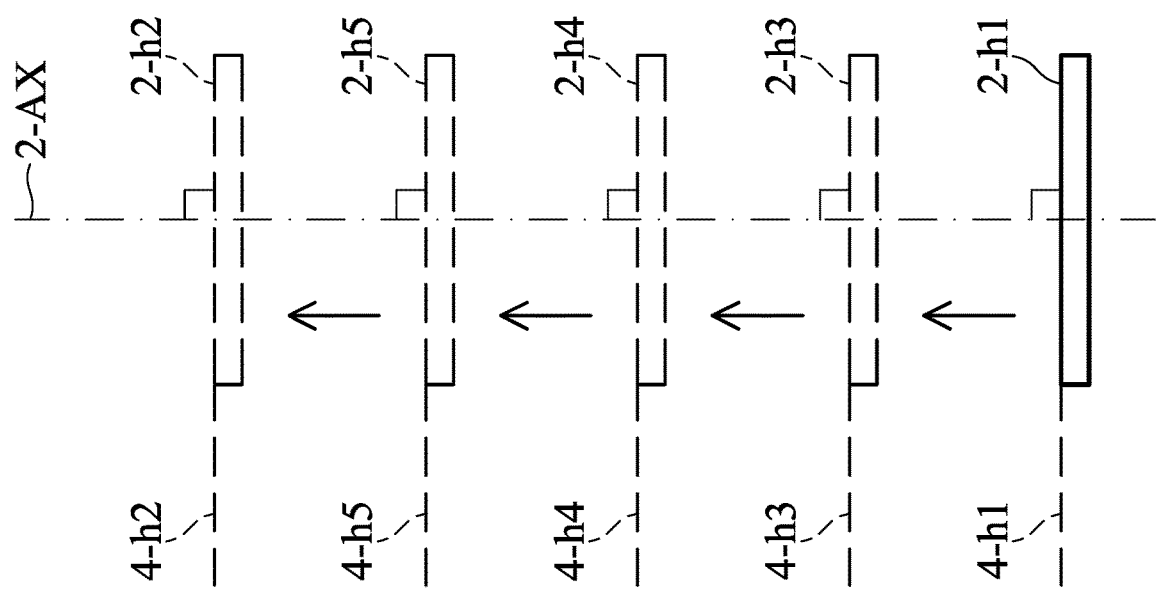
FIG. 37 is a perspective diagram showing several sampling positions 4-h3, 4-h4 and 4-h5 are set within the operation interval 4-R between the first and second heights 4-h1 and 4-h2.

It should be noted that the position versus position-sensing-signal-coding-sequence curve 4-SC1 and the position versus position-sensing-signal-coding-sequence curve 4-SC1 are ideal curves that can be created by linear interpolation, wherein the movable element 2-103 is calibrated by the optical instrument only at the first height 4-h1 and the second height 4-h2. To improve the efficiency and accuracy of position control of the movable element 2-103 within the operation interval 4-R, several sampling positions can be set within the operation interval 4-R between the first and second heights 4-h1 and 4-h2s, such as the sampling positions 4-h3, 4-h4 and 4-h5 shown in FIG. 37. In some embodiments, the sampling positions 4-h3, 4-h4 and 4-h5 may be spaced at the same or different intervals.

Subsequently, the movable members 2-1081 to 2-1084 can be respectively driven to move relative to the fixed assembly 2-FA along the main axis 2-AX by the driving assemblies 2-DA1 to 2-DA4, so that the movable element 2-103 can be sequentially impelled to the sampling positions 4-h3, 4-h4 and 4-h5. It should be emphasized that the main surface of the movable element 2-103 is adjusted to be perpendicular to the main axis 2-AX while the movable element 2-103 moves to the sampling position 4-h3, 4-h4 or 4-h5.

Figure 39:
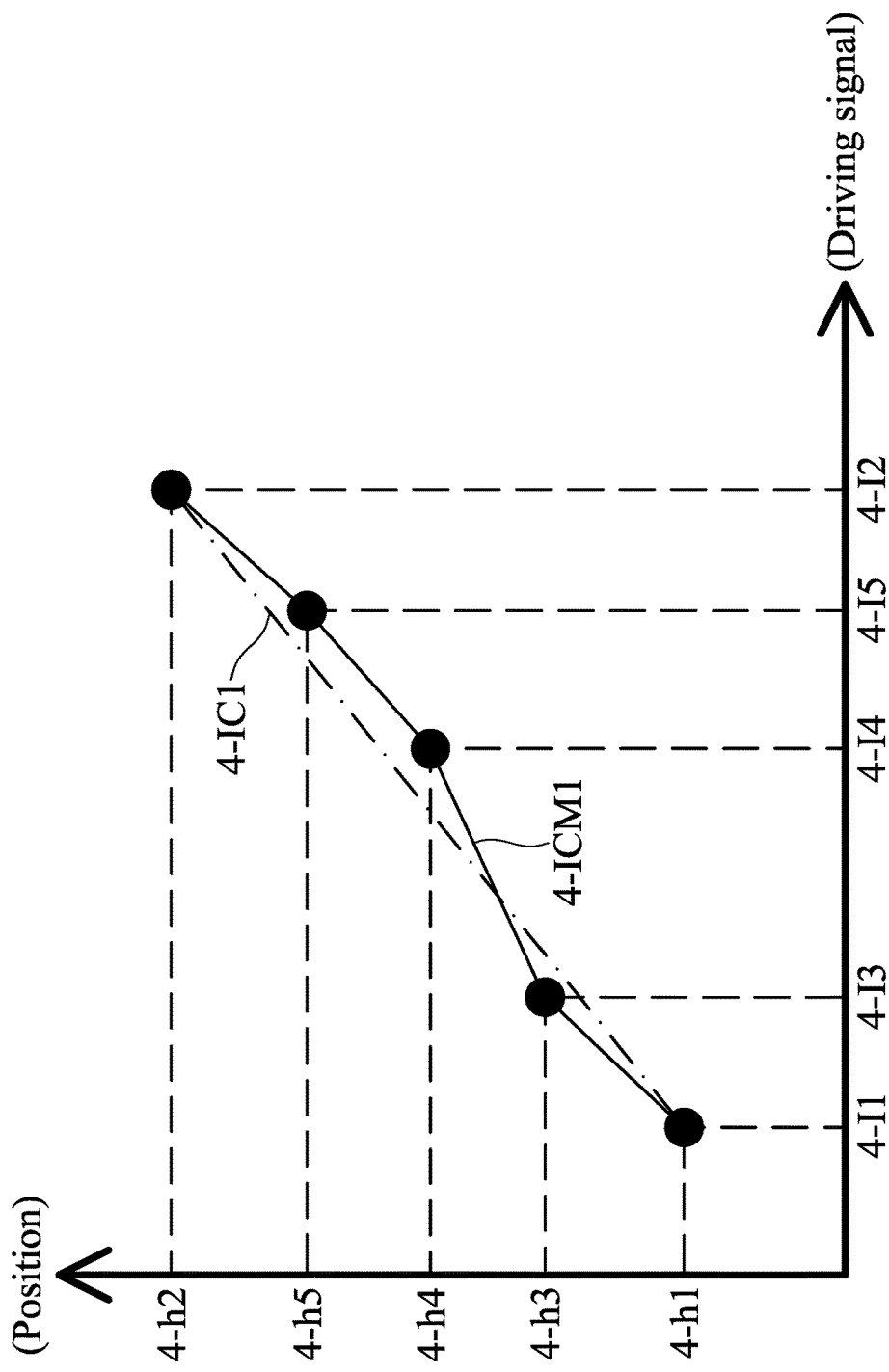
FIG. 39 is a perspective diagram showing the driving current values 4-I3, 4-I4, and 4-I5 deviate from the position versus current curve 4-IC1 of FIG. 34.

When the driving assemblies 2-DA1 to 2-DA4 impel the movable element 2-103 to sequentially move to the sampling positions 4-h3, 4-h4 and 4-h5 with the main surface of the movable element 2-103 being perpendicular to the main axis 2-AX, the driving current values (corresponding to the sampling positions 4-h3, 4-h4 and 4-h5 in FIG. 39) that are applied to each of the driving assemblies 2-DA1 to 2-DA4 can be stored in a memory unit, whereby the relationship between position and driving current value of each of the driving assemblies 2-DA1 to 2-DA4 can be established.

It is supposed that when the movable element 2-103 moves to the sampling positions 4-h3, 4-h4 and 4-h5, the driving assembly 2-DA1 has the driving current values of 4-I3, 4-I4, and 4-I5 (FIG. 39), respectively. It can be noticed that the driving current values 4-I3, 4-I4, and 4-I5 deviate from the position versus current curve 4-IC1 of FIG. 34 due to assembly tolerance and positioning errors of the components in the optical system.

Similarly, a position sensor may detect the position of the movable member 2-1081 and generate position sensing signal codes 4-S3, 4-S4, and 4-S5 when the movable element 2-103 moves to the sampling positions 4-h3, 4-h4 and 4-h5, respectively. It can be also noticed that the position sensing signal codes 4-S3, 4-S4, and 4-S5 deviate from the position versus position-sensing-signal-coding-sequence curve 4-SC1 of FIG. 36.

Figure 40:
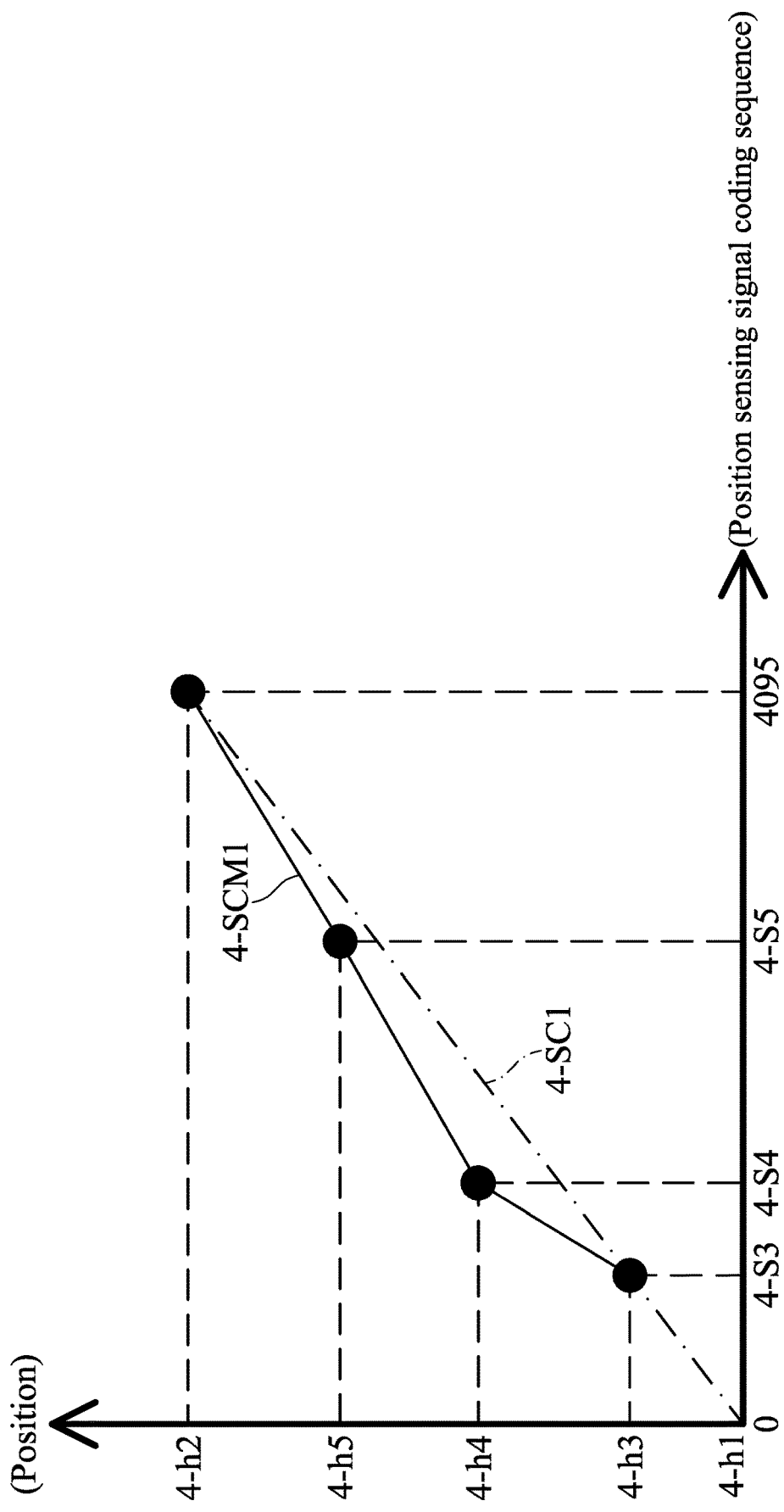
FIG. 40 is a perspective diagram showing the position sensing signal codes 4-S3, 4-S4, and 4-S5 deviate from the position versus position-sensing-signal-coding-sequence curve 4-SC1 of FIG. 36.

It should be realized that when the movable element 2-103 moves to any one of the sampling positions 4-h3, 4-h4 and 4-h5, the driving current values (or the code of electrical current signal) applied to the driving assemblies 2-DA1 to 2-DA4 may be different, and the position sensing signal codes generated by the position sensors when detecting the movable members 2-1081 to 2-1084 moves to any one of the sampling positions 4-h3, 4-h4 and 4-h5 may also be different. As shown in FIGS. 39 and 40, the sampling positions 4-h3, 4-h4 and 4-h5 have an obviously nonlinear relationship with respect to the driving current value and the position sensing signal coding sequence.

Hence, to facilitate accurate and rapid attitude control of the movable element 2-103 within the operation interval 4-R, a modified relationship curve 4-ICM1 between the position of the movable element 2-103 and the driving current value for each driving assembly can be created by curve fitting. Similarly, a modified relationship curve 4-SCM1 between the position of the movable element 2-103 and the position sensing signal coding sequence for each position sensor can also be created by curve fitting, so as to perform the following driving and control processes.

In some embodiments, the electrical signal applied to each of the driving assemblies may be re-encoding based on the modified relationship curve 4-ICM1 for linear compensation. Similarly, the position sensing signal code for each position sensor can also be redefined for linear compensation based on the modified relationship curve 4-SCM1. Once the above steps are completed, the optical element 2-OE can be assembled to the movable element 2-103, and all the above steps can be repeated again to ensure the main surface of the movable element 2-103 being perpendicular to the main axis 2-AX.

In some embodiments, an inertial sensor may be provided to detect the attitude of the optical system. According to the attitude information of the optical system, a modified electrical signal can be applied to the driving assemblies 2-DA1 to 2-DA4, so that the main surface of the movable element 2-103 can remain perpendicular to the main axis 2-AX.

In some embodiments, attitude information and data of the modified electrical signal can be stored in a memory unit to facilitate effective and rapid position control of the movable element 2-103.

In some embodiments, the electrical signal applied to the driving assemblies 2-DA1 to 2-DA4 may be a current or voltage signal, thus driving the movable members 2-1081 to 2-1084 to move relative to the fixed assembly 2-FA. When the above steps are completed, the movable element 2-103 can be efficiently impelled to a target position within the operation interval 4-R by open-loop control or closed-loop control with the main surface of the movable element 2-103 being perpendicular to the main axis 2-AX. Thus, angular deviation of the optical element 2-OE can be prevented, so as to improve the efficiency of the optical system.

The fifth embodiment group.

Figure 41:
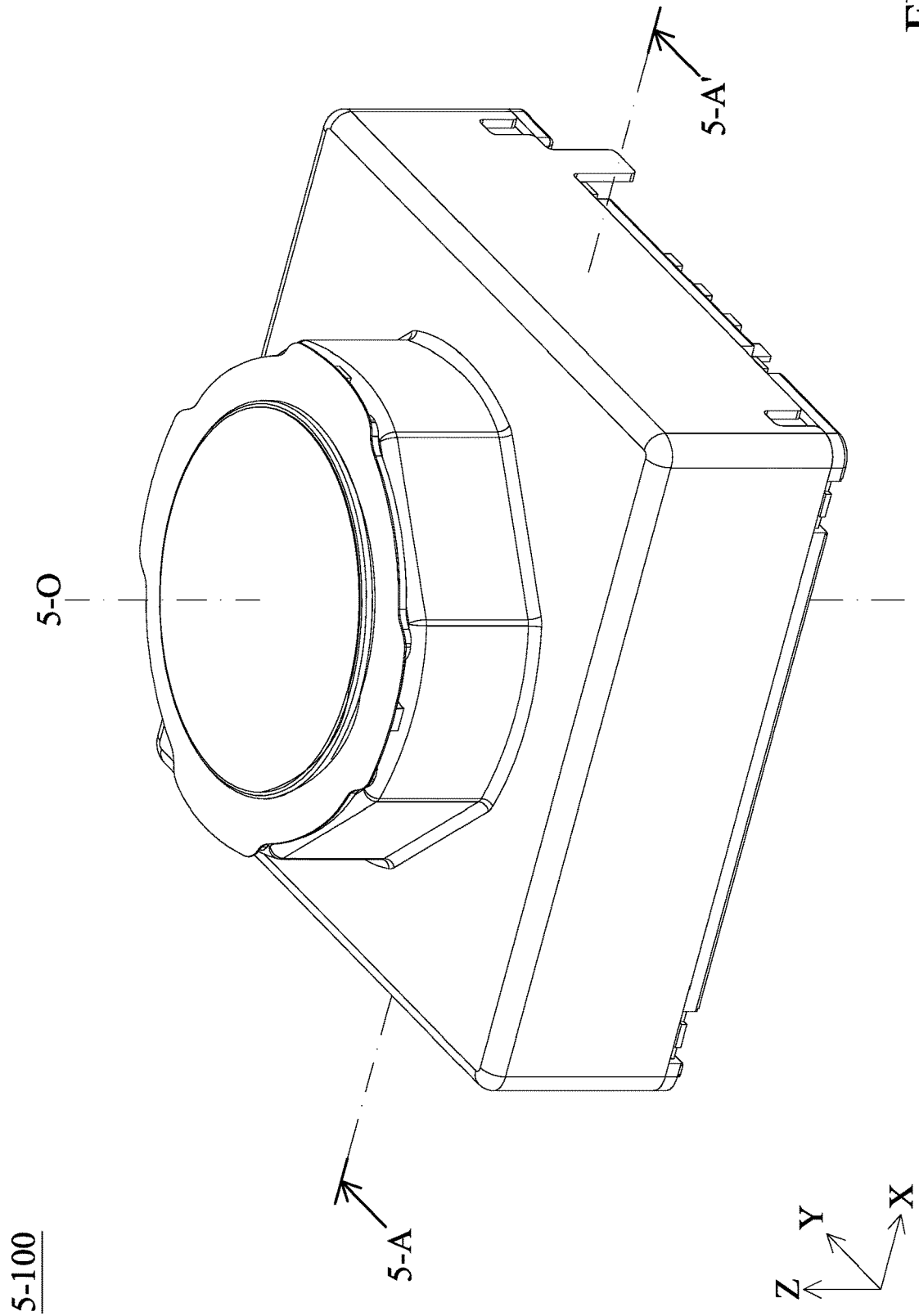
FIG. 41 is a schematic diagram of an optical system 5-100 according to an embodiment of the present disclosure.
Figure 42:
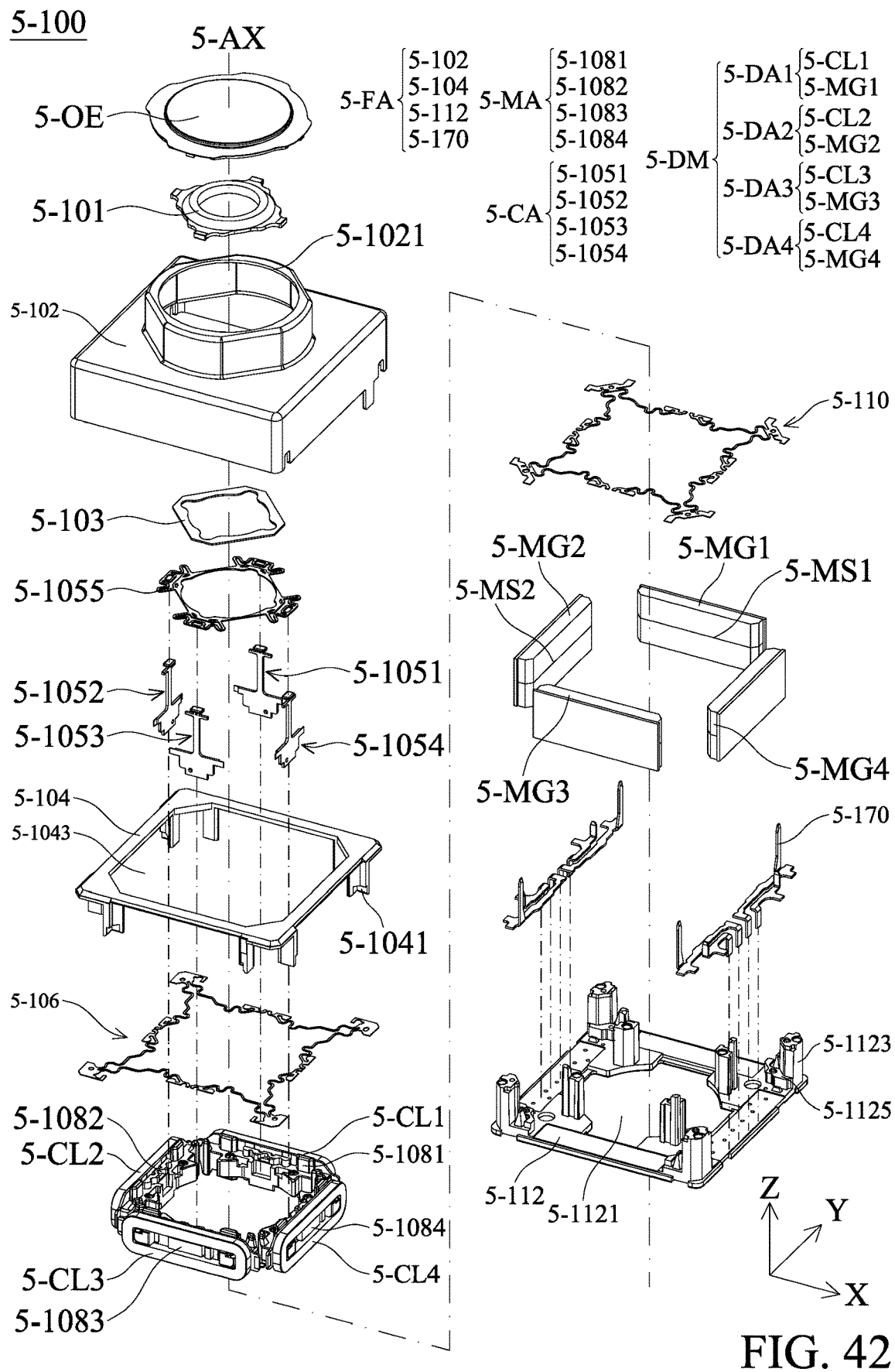
FIG. 42 is an exploded diagram of an optical system 5-100 according to an embodiment of the present disclosure.
Figure 43:
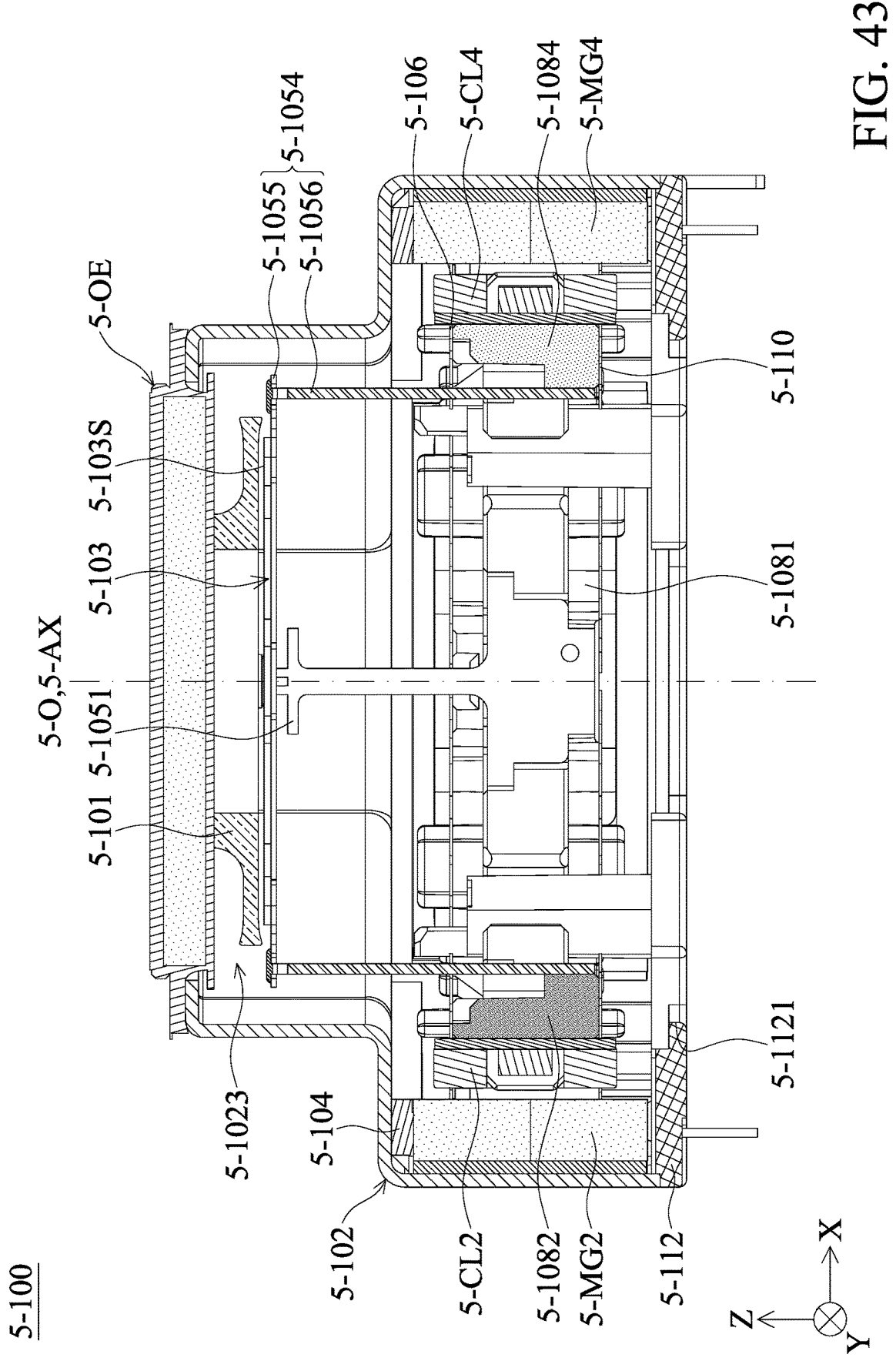
FIG. 43 is a cross-sectional view of the optical system 5-100 along line 5-A-5-A' in FIG. 41 according to an embodiment of the present disclosure.

Please refer to FIG. 41 to FIG. 43. FIG. 41 is a schematic diagram of an optical system 5-100 according to an embodiment of the present disclosure, FIG. 42 is an exploded diagram of an optical system 5-100 according to an embodiment of the present disclosure, and FIG. 43 is a cross-sectional view of the optical system 5-100 along line 5-A-5-A' in FIG. 41 according to an embodiment of the present disclosure. The optical system 5-100 can be an optical camera system and can be configured to hold and drive a first optical element 5-OE, and the first optical element 5-OE may define an optical axis 5-0. The optical system 5-100 can be installed in different electronic devices or portable electronic devices, such as a smartphone, for allowing a user to perform the image capturing function. In this embodiment, the optical system 5-100 can be a voice coil motor (VCM) with an auto-focusing (AF) function, but it is not limited thereto. In other embodiments, the optical system 5-100 can also perform the functions of auto-focusing and optical image stabilization (OIS).

As shown in FIG. 42, in this embodiment, the optical system 5-100 may include a fixed assembly 5-FA, a deforming member 5-101, a movable element 5-103, and a connecting assembly 5-CA, a movable assembly 5-MA and a driving module 5-DM. The deforming member 5-101 is connected between the movable element 5-103 and the first optical element 5-OE, the movable element 5-103 is movable relative to the fixed assembly 5-FA, and the driving module 5-DM is configured to drive the movable element 5-103 to move relative to the fixed assembly 5-FA. Specifically, the movable assembly 5-MA is movably connected to the movable element 5-103 via the connecting assembly 5-CA, and the driving module 5-DM drives the movable assembly 5-MA to move relative to the fixed assembly 5-FA, thereby driving the movable element 5-103.

In this embodiment, as shown in FIG. 42 and FIG. 43, the fixed assembly 5-FA includes a casing 5-102, a frame 5-104, and a base 5-112. The casing 5-102 is fixedly connected to the base 5-112, and the frame 5-104 can also be fixedly connected to the inner wall surface of the casing 5-102. A main axis 5-AX can be defined by the fixed assembly 5-FA. When the optical system 5-100 is not activated, the main axis 5-AX is parallel to or overlaps an optical axis 5-0 of the first optical element 5-OE. In addition, the movable element 5-103 has a movable element surface 5-103S which faces the first optical element 5-OE.

As shown in FIG. 42 and FIG. 43, the aforementioned casing 5-102 has a hollow structure, and a casing opening 5-1021 is formed thereon. A base opening 5-1121 is formed on the base 5-112, The center of the casing opening 5-1021 corresponds to the optical axis 5-O of the first optical element 5-OE, and the base opening 5-1121 corresponds to a photosensitive element (not shown in the figure) disposed below the base 5-112. In this embodiment, the first optical element 5-OE is fixedly disposed in the casing opening 5-1021. The external light can enter the casing 5-102 through the first optical element 5-OE and then is received by the aforementioned photosensitive element after passing through the base opening 5-1121 so as to generate a digital image signal.

Furthermore, the casing 5-102 is disposed on the base 5-112 and may have an accommodating space 5-1023 configured to accommodate the movable element 5-103, the frame 5-104, and the movable assembly 5-MA, the connecting assembly 5-CA, and the driving module 5-DM.

As shown in FIG. 42 and FIG. 43, in this embodiment, the movable assembly 5-MA may include four movable members (a first movable member 5-1081, a second movable member 5-1082, and a third movable member 5-1083 and a fourth movable member 5-1084), and the connecting assembly 5-CA may include four connecting members (a first connecting member 5-1051, a second connecting member 5-1052, a third connecting member 5-1053, and a fourth connecting member 5-1054). The first movable member 5-1081 to the fourth movable member 5-1084 are connected to the movable element 5-103 by the first connecting member 5-1051 to the fourth connecting member 5-1054, respectively. Specifically, the first connecting member 5-1051 to the fourth connecting member 5-1054 may each include an elastic portion 5-1055 and a rigid portion 5-1056. The elastic portion 5-1055 is connected to the movable element 5-103, and the rigid portion 5-1056 is connected to the elastic portion 5-1055 by an adhesive member 5-AD. In addition, multiple elastic portions 5-1055 form an elastic sheet and collectively surround the main axis 5-AX, as shown in FIG. 42.

In addition, the optical system 5-100 may further include a first elastic element 5-106 and a second elastic element 5-110, and the base 5-112 may include four protruding columns 5-1123. The outer portion (the outer ring portion) of the first elastic element 5-106 is fixedly disposed on the top surfaces of the protruding columns 5-1123, the outer portion (the outer ring portion) of the second elastic element 5-110 is fixedly disposed on a plane 5-1125 of each of the protruding columns 5-1123, and the inner portions (the inner ring portions) of the first elastic element 5-106 and the second elastic element 5-110 are respectively connected to the upper and lower sides of the movable assembly 5-MA so that the first movable member 5-1081 to the fourth movable member 5-1084 are suspended in the accommodating space 5-1023.

In this embodiment, the driving module 5-DM may include four driving assemblies (a first driving assembly 5-DA1, a second driving assembly 5-DA2, a third driving assembly 5-DA3, and a fourth driving assembly 5-DA4). The first driving assembly 5-DA1 includes a first driving coil 5-CL1 and a first magnetic element 5-MG1, and the second driving assembly 5-DA2 includes a second driving coil 5-CL2 and a second magnetic element 5-MG2, the third driving assembly 5-DA3 includes a third driving coil 5-CL3 and a third magnetic element 5-MG3, and the fourth driving assembly 5-DA4 includes a fourth driving coil 5-CL4 and a fourth magnetic element 5-MG4.

In this embodiment, each magnetic element has a magnetic surface. For example, as shown in FIG. 42, the first magnetic element 5-MG1 and the second magnetic element 5-MG2 respectively have a first magnetic surface 5-MS1 and a second magnetic surface 5-MS2, the first magnetic surface 5-MS1 faces the first driving coil 5-CL1, the second magnetic surface 5-MS2 faces the second driving coil 5-CL2, and the first magnetic surface 5-MS1 and the second magnetic surface 5-MS2 face different directions.

In this embodiment, as shown in FIG. 42, the frame 5-104 has a plurality of grooves 5-1041 and a central opening 5-1043. In this embodiment, the frame 5-104 has four grooves 5-1041 configured to receive the four magnetic elements, but the number of the grooves 5-1041 and the magnetic elements is not limited to this embodiment. The central opening 5-1043 is configured to accommodate the first driving coil 5-CL1 to the fourth driving coil 5-CL4 and the first movable member 5-1081 to the fourth movable member 5-1084.

In this embodiment, the first driving coil 5-CL1 to the fourth driving coil 5-CL4 may be winding coils, which are respectively disposed on the first movable member 5-1081 to the fourth movable member 5-1084, and when the first driving coil 5-CL1 to the fourth driving coil 5-CL4 are provided with electricity, they can respectively act with the first magnetic element 5-MG1 to the fourth magnetic element 5-MG4 to generate an electromagnetic driving force to drive at least one of the first movable member 5-1081 to the fourth movable member 5-1084 to move relative to the base 5-112 and the frame 5-104 along the optical axis 5-0 (the Z-axis) so as to perform functions of auto focusing or optical image stabilization.

The driving assembly of the driving module 5-DM can actuate individually or cooperatively. For example, the first driving assembly 5-DA1 is configured to drive the first movable member 5-1081 to move relative to the fixed assembly 5-FA, and the second driving assembly 5-DA2 is configured to drive the second movable member 5-1082 to move relative to the fixed assembly 5-FA and the first movable member 5-1081, and so on.

Furthermore, as shown in FIG. 42, in this embodiment, the fixed assembly 5-FA may further include at least one circuit member 5-170 configured to be electrically connected to the driving module 5-DM through the first elastic element 5-106 or the second elastic element 5-110. The circuit member 5-170 may be implemented by insert molding technology, but it is not limited thereto. In addition, the circuit member 5-170, the first elastic element 5-106, and the second elastic element 5-110 may constitute a circuit assembly.

Figure 44:
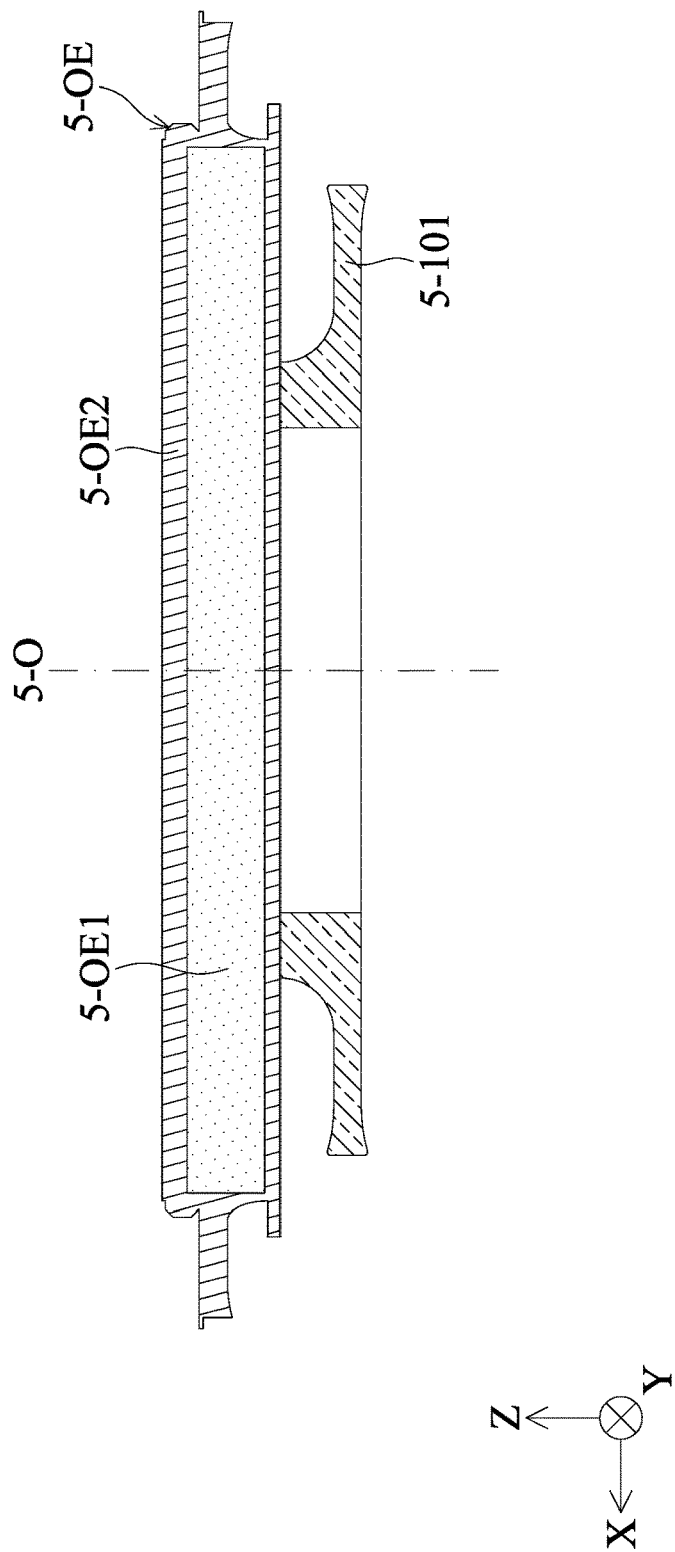
FIG. 44 is a schematic diagram illustrating that the first optical element 5-OE is not pushed by the deforming member 5-101 according to an embodiment of the present disclosure.
Figure 45:
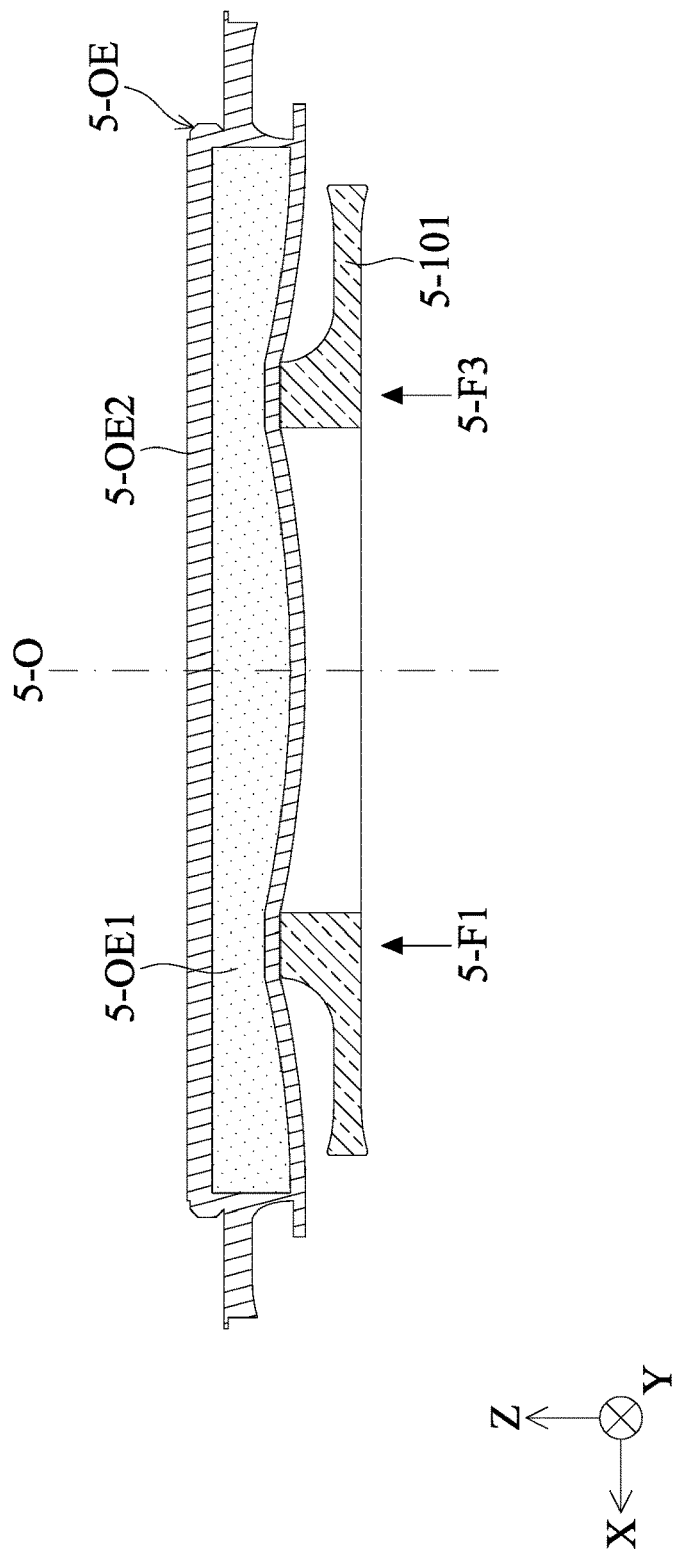
FIG. 45 and FIG. 46 are schematic diagrams of the first optical element 5-OE after being pushed by the deforming member 5-101 according to an embodiment of the present disclosure.
Figure 46:
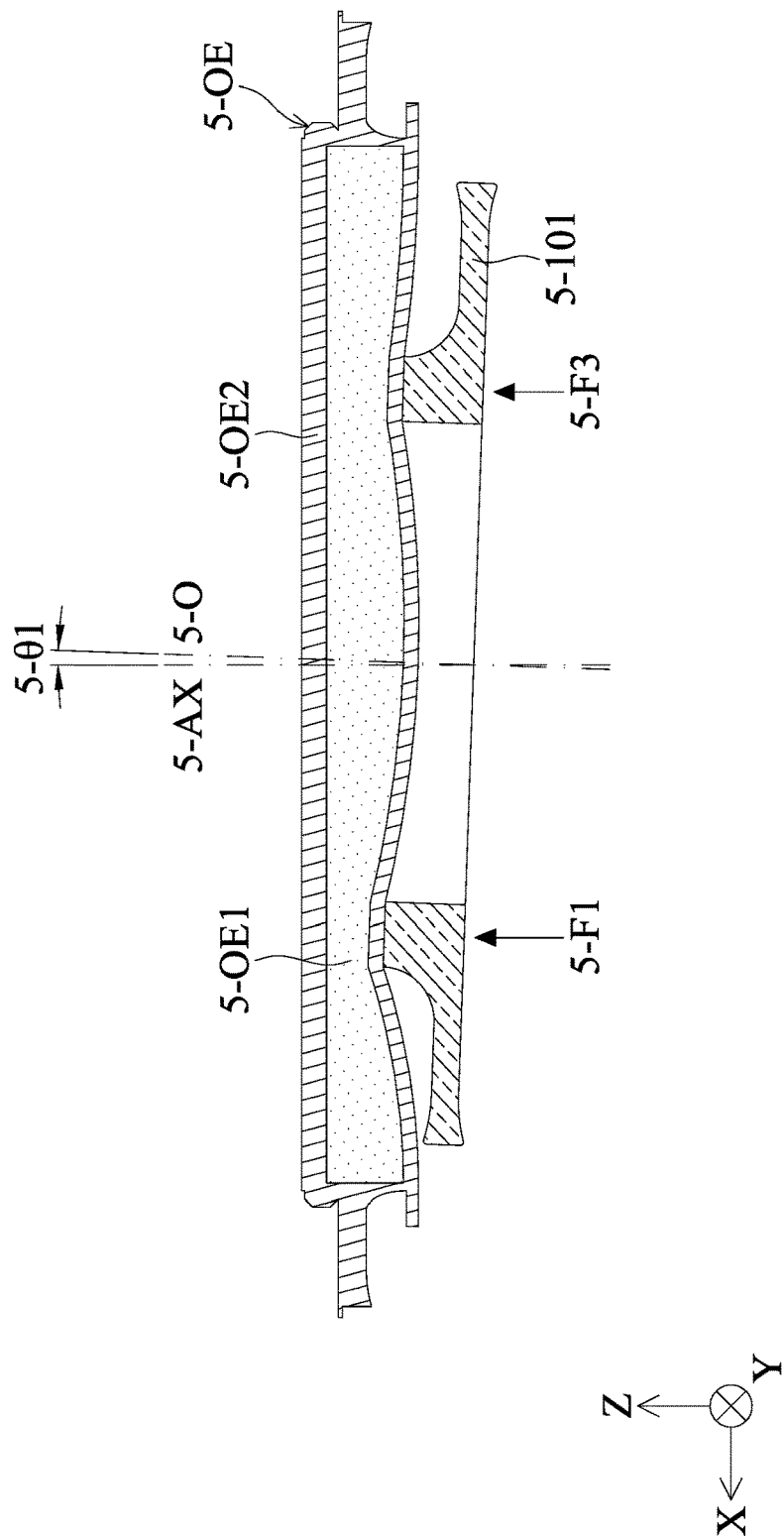

Next, please refer to FIG. 44 to FIG. 46. FIG. 44 is a schematic diagram illustrating that the first optical element 5-OE is not pushed by the deforming member 5-101 according to an embodiment of the present disclosure, and FIG. 45 and FIG. 46 are schematic diagrams of the first optical element 5-OE after being pushed by the deforming member 5-101 according to an embodiment of the present disclosure. As shown in FIG. 44, the first optical element 5-OE may be a liquid lens, including a liquid lens element 5-OE1 and a fixed member 5-OE2. The liquid lens element 5-OE1 is disposed within of the fixed member 5-OE2 having a hollow structure that protects and supports the liquid lens element 5-OE1. The deforming member 5-101 is disposed under the liquid lens element 5-OE1 and the fixed member 5-OE2. The bottom of the fixed member 5-OE2 may be a thin film, so that the deforming member 5-101 may be used for changing the shape of the liquid lens element 5-OE1.

FIG. 44 shows that the liquid lens element 5-OE1 is not deformed and the deforming member 5-101 is in an initial position, and the liquid lens element 5-OE1 has an optical axis 5-O. When the driving module 5-DM drives the movable assembly 5-MA to move, for example, applying a driving current to the driving coils of the driving module 5-DM, a magnetic force is generated between the driving coils and the corresponding magnetic elements, so that the movable assembly 5-MA is driven to move through the magnetic force and to force the deforming member 5-101 though the connecting assembly 5-CA to press the lower side of the liquid lens element 5-OE1. Therefore the liquid lens element 5-OE1 is deformed.

As shown in FIG. 42 and FIG. 45, when the first driving assembly 5-DA1 and the third driving assembly 5-DA3 of the driving module 5-DM provide pushing forces 5-F1, 5-F3 of the same magnitude, the deforming member 5-101 translates along the optical axis 5-O. At this time, the lens curvature of the liquid lens element 5-OE1 is changed from the curvature of the liquid lens element 5-OE1 in FIG. 44. That is, the shape of the liquid lens element 5-OE1 is changed. Therefore, the optical properties of the liquid lens element 5-OE1 can be changed, thereby achieving an optical zoom, focus or shock-proofing effect.

Similarly, referring to FIG. 46, when the driving module 5-DM drives the deforming member 5-101 with a tilted movement, as illustrated in FIG. 46, the deforming member 5-101 obliquely moves and provides an unequal amount of pushing forces 5-F1 and 5-F3 to two different sides of the liquid lens element 5-OE1, so that the optical axis 5-O of the liquid lens element 5-OE1 is rotated and is deviated from the main axis 5-AX. That is, there is an angle 5-θ1 formed between them. Therefore, the optical properties of the liquid lens element 5-OE1 are changed, and the optical zoom, focusing or shock-proofing effect can be accomplished.

Figure 47:
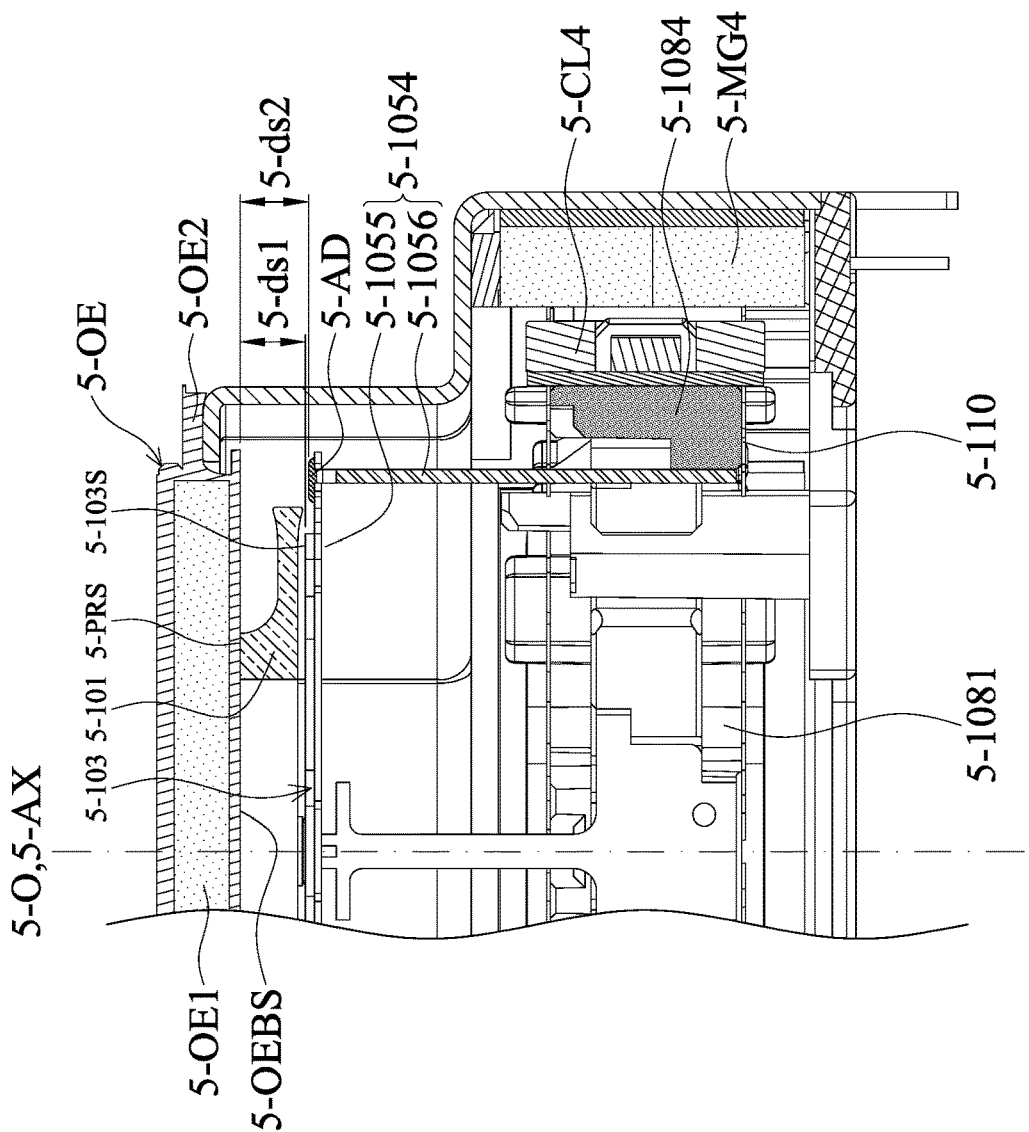
FIG. 47 is an enlarged schematic diagram of the optical system 5-100 in FIG. 43 according to an embodiment of the present disclosure.

Please refer to FIG. 47, which is an enlarged schematic diagram of the optical system 5-100 in FIG. 43 according to an embodiment of the present disclosure. As shown in FIG. 47, the fourth connecting member 5-1054 has an elastic portion 5-1055 and a rigid portion 5-1056. The elastic portion 5-1055 is not parallel to the main axis 5-AX, for example, perpendicular to the main axis 5-AX. The rigid portion 5-1056 is connected between the elastic portion 5-1055 and the fourth movable member 5-1084 of the movable assembly 5-MA. It should be notated that a distance 5-ds1 between the movable element surface 5-103S (the top surface) of the movable element 5-103 and the first optical element 5-OE along the main axis 5-AX is less than a distance 5-ds2 between the adhesive member 5-AD and the first optical element 5-OE. Based on the above design, when the movable assembly 5-MA moves, it can prevent the rigid portion 5-1056 and the adhesive member 5-AD from contacting the first optical element 5-OE to cause damage to the first optical element 5-OE.

Figure 48:
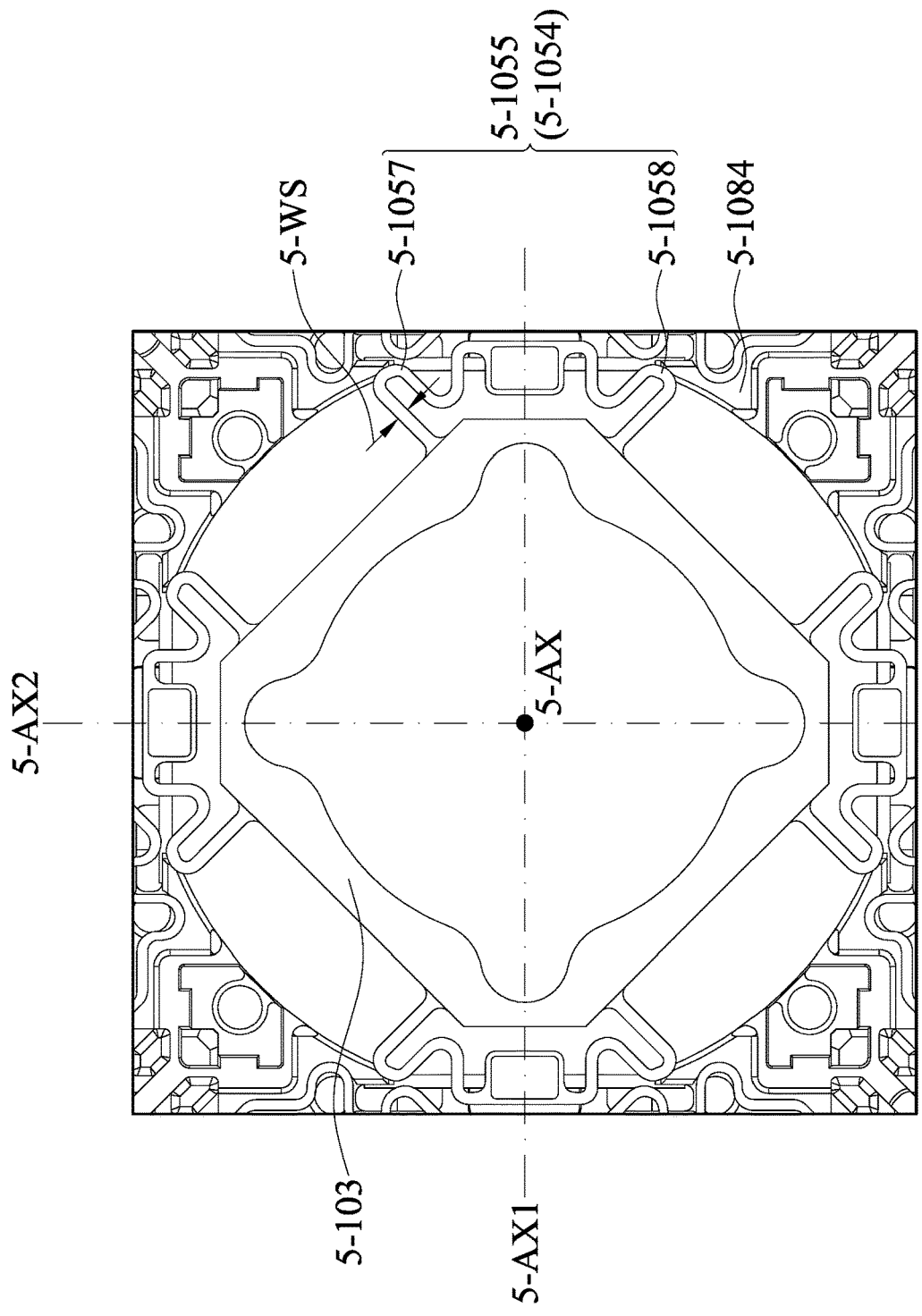
FIG. 48 is a top view of a partial structure of the optical system 5-100 according to an embodiment of the present disclosure.

Please refer to FIG. 48, which is a top view of a partial structure of the optical system 5-100 according to an embodiment of the present disclosure. As shown in FIG. 48, when viewed along the main axis 5-AX, the elastic portion of each connecting member extends outward from the movable element 5-103. For example, the elastic portion 5-1055 of the fourth connecting member 5-1054 extends outward from the movable element 5-103. In addition, in this embodiment, the connecting assembly 5-CA includes four connecting members, and when viewed along the main axis 5-AX, the elastic portions of these connecting members are mirror-symmetric with respect to a first traverse axis 5-AX1 or a second traverse axis 5-AX2.

Specifically, the elastic portion of each connecting member may be formed by a string, extending along multiple directions which are perpendicular to the main axis 5-AX, that is, extending along the XY plane. In addition, as shown in FIG. 48, when viewed along the main axis 5-AX, the string of the elastic portion 5-1055 of the fourth connecting member 5-1054 has a fixed width 5-WS, and both ends of the string are connected to the movable element 5-103.

In this embodiment, the string of the elastic portion 5-1055 may have two cantilever. For example, the string of the elastic portion 5-1055 of the fourth connecting member 5-1054 may have a first cantilever 5-1057 and a second cantilever 5-1058, and the first cantilever 5-1057 and the second cantilever 5-1058 are symmetrical with respect to the first traverse axis 5-AX1.

Based on the design of the string of the elastic portion, the stability of the movable assembly 5-MA to drive the movable element 5-103 via the connecting assembly 5-CA can be increased. For example, when the fourth movable member 5-1084 moves along the main axis 5-AX, the movable element 5-103 is driven to move only along the main axis 5-AX and not to move along the first traverse axis 5-AX1 or the second traverse axis 5-AX2.

Figure 49:
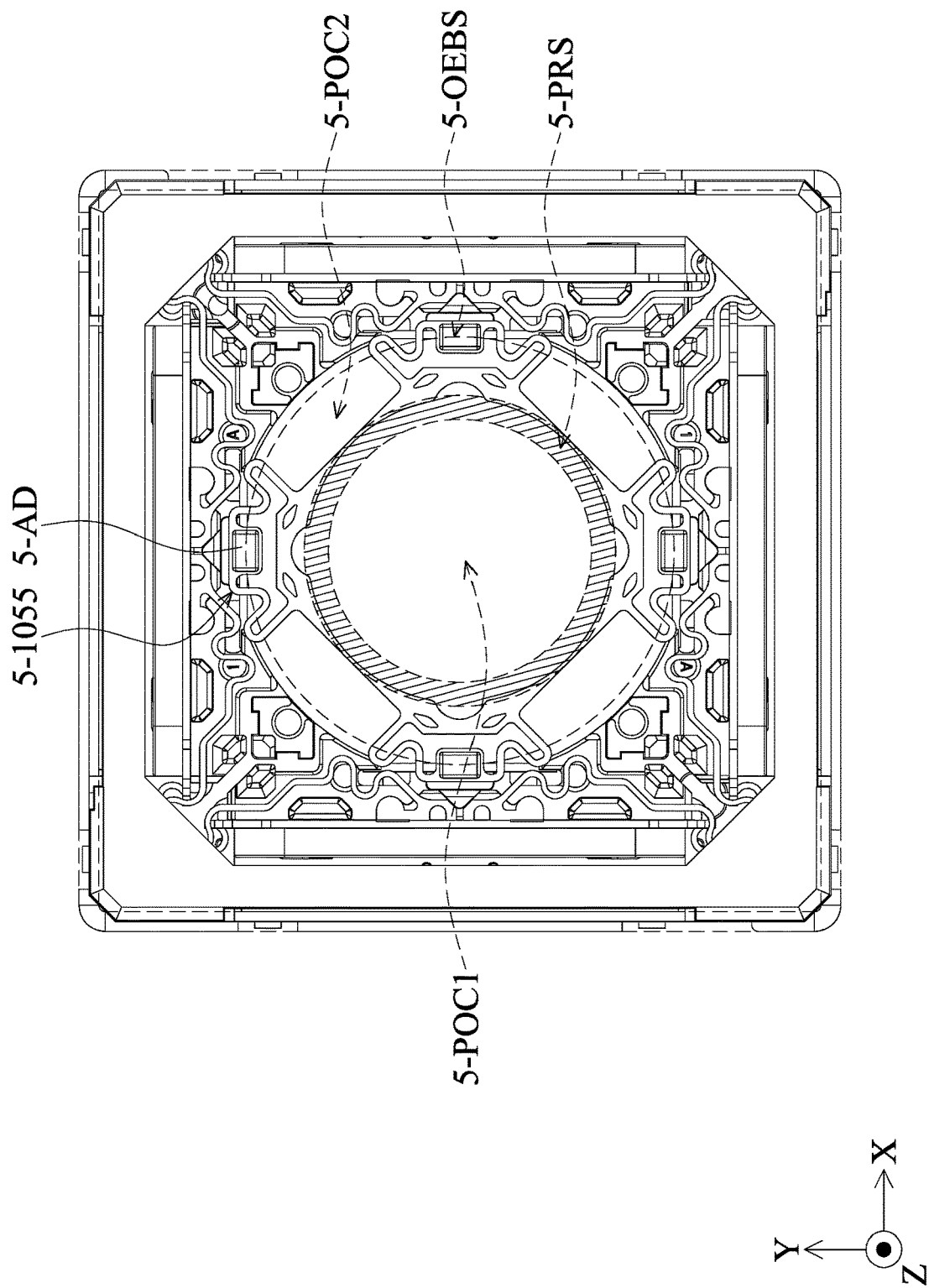
FIG. 49 is a top view of a partial structure of the optical system 5-100 according to an embodiment of the present disclosure.

Please refer to FIG. 47 and FIG. 49. FIG. 49 is a top view of a partial structure of the optical system 5-100 according to an embodiment of the present disclosure. When viewed along the main axis 5-AX, a surface 5-OEBS of the first optical element 5-OE partially overlaps at least one portion of the string. The surface 5-OEBS may be the portion of projection of the liquid lens element 5-OE1 on the bottom surface of the fixed member 5-OE2 along the optical axis 5-O in FIG. 47.

As shown in FIG. 49, the surface 5-OEBS includes a first portion 5-POC1, a second portion 5-POC2, and a pressed surface 5-PRS. The pressed surface 5-PRS may be an area where the deforming member 5-101 contacts the bottom surface of the fixed member 5-OE2 in FIG. 47, and in this embodiment, the pressed surface 5-PRS is an annular area.

In addition, the first portion 5-POC1 is located in the inner side of the pressed surface 5-PRS, the second portion 5-POC2 is located outside the pressed surface 5-PRS, and the string of the elastic portion 5-1055 of each connecting member partially overlaps at least one portion of the second portion 5-POC2. Moreover, in this embodiment, the second portion 5-POC2 also partially overlaps the adhesive member 5-AD, but it is not limited thereto. In other embodiments, the second portion 5-POC2 may not overlap the adhesive member 5-AD.

Figure 50:
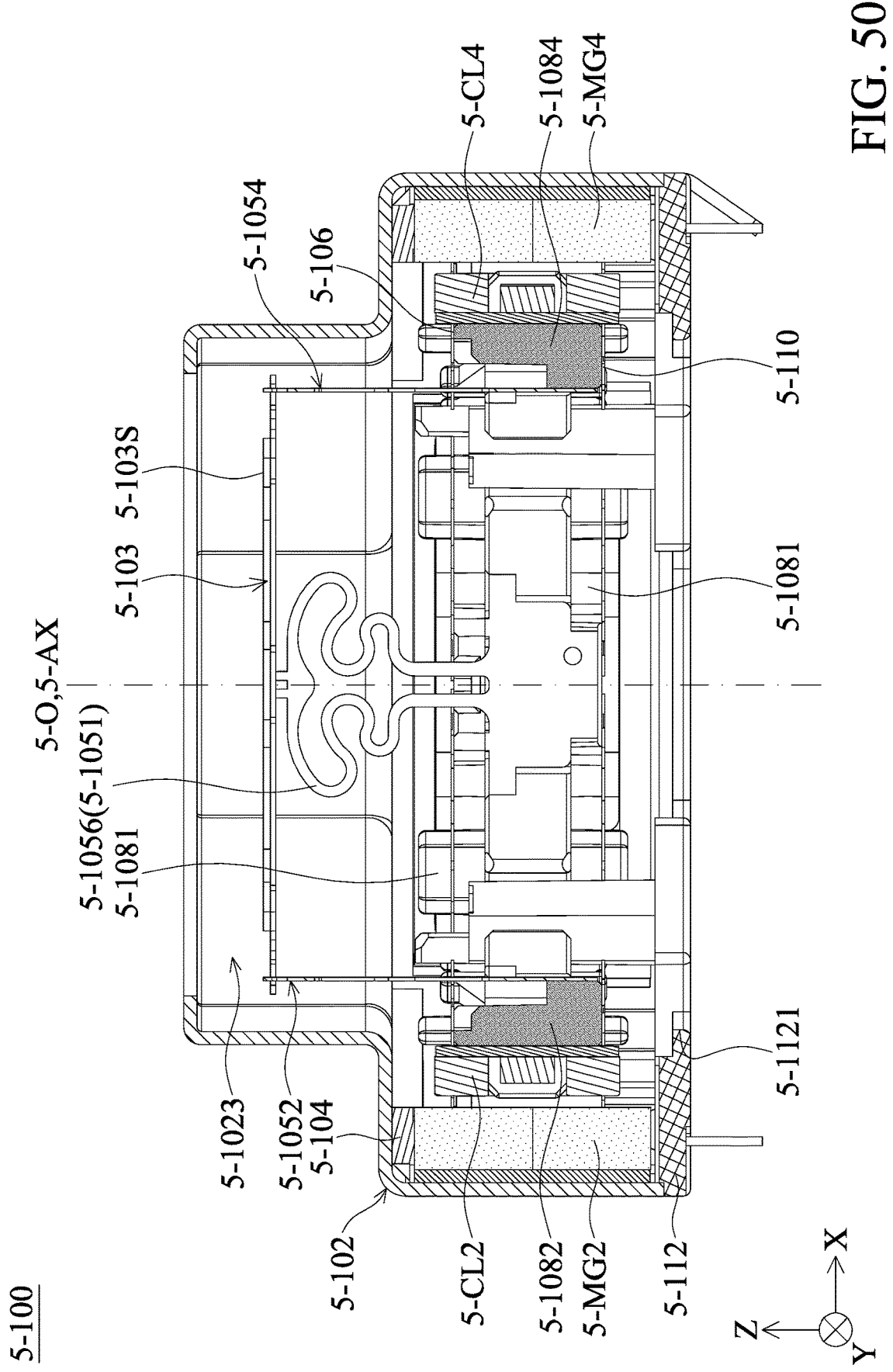
FIG. 50 is a cross-sectional view of the optical system 5-100 according to another embodiment of the present disclosure.

Please refer to FIG. 50, which is a cross-sectional view of the optical system 5-100 according to another embodiment of the present disclosure. This embodiment is similar to the previous embodiment, and their difference is that the rigid portion 5-1056 in this embodiment may be composed of two strings, and the two strings are mirror-symmetric with respect to the main axis 5-AX. Based on the design of the rigid portion 5-1056 in this embodiment, the rigid portion 5-1056 can be prevented from being bent along the XY plane when the movable member (such as the first movable member 5-1081) moves along the main axis 5-AX, and the problem that the rigid portion 5-1056 is easily broken can also be prevented.

Figure 51:
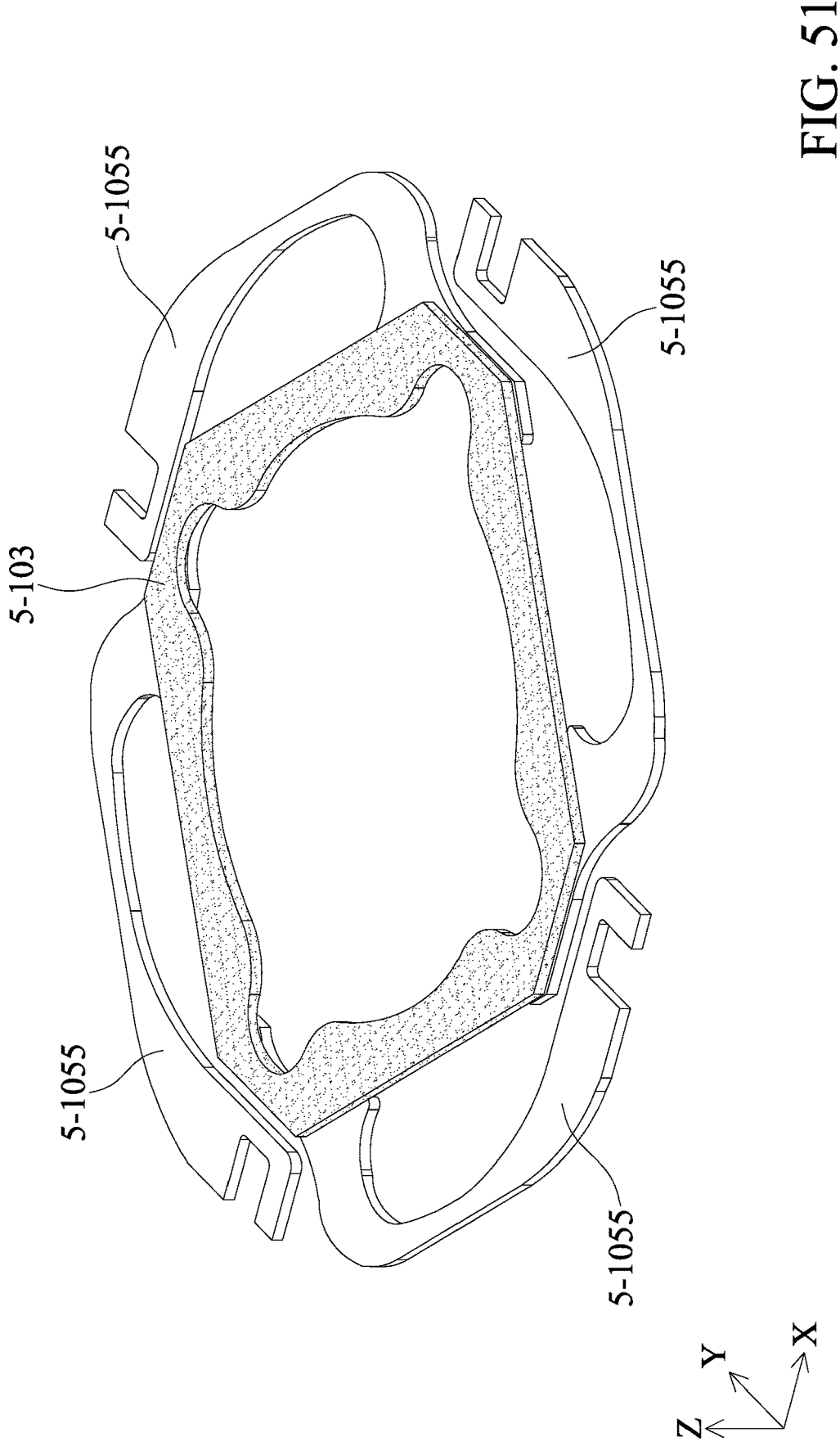
FIG. 51 is a schematic diagram of the movable element 5-103 and several elastic portions 5-1055 after assembly according to another embodiment of the present disclosure.
Figure 52:
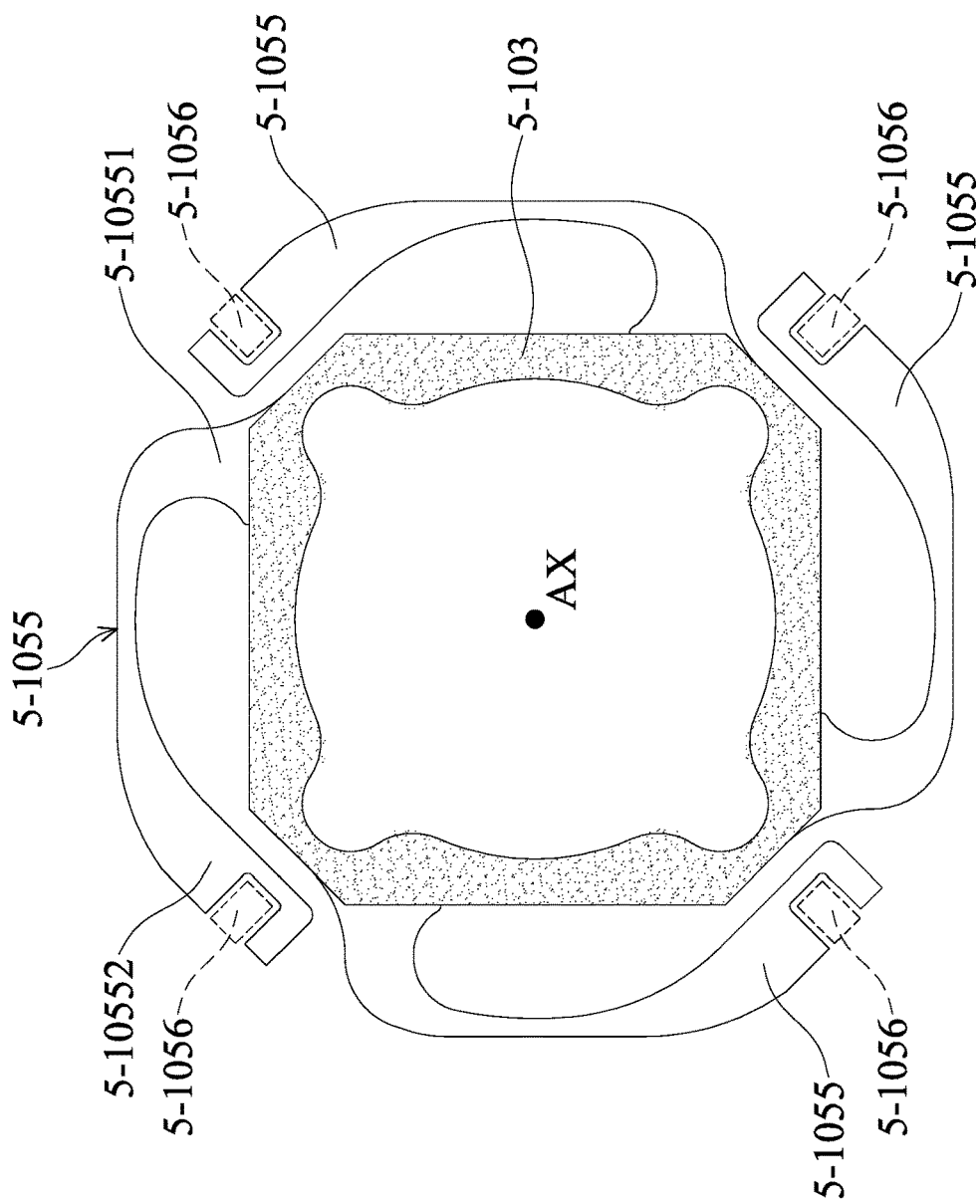
FIG. 52 is a top view of the movable element 5-103 and several elastic portions 5-1055 after assembly according to another embodiment of the present disclosure.

Please refer to FIG. 51 and FIG. 52. FIG. 51 is a schematic diagram of the movable element 5-103 and several elastic portions 5-1055 after assembly according to another embodiment of the present disclosure, and FIG. 52 is a top view of the movable element 5-103 and several elastic portions 5-1055 after assembly according to another embodiment of the present disclosure. In this embodiment, each elastic portion 5-1055 is composed of a single string, and the string has a non-uniform width. Based on the design of the elastic portion 5-1055, the problem of damage to the elastic portion 5-1055 caused by stress concentration can be prevented.

As shown in FIG. 52, when viewed along the main axis 5-AX, each string has a first end 5-10551 and a second end 5-10552. The first end 5-10551 is connected to the movable element 5-103, and the second end 5-10552 is connected to the corresponding rigid portion 5-1056, for example, via the adhesive member 5-AD. In addition, these connecting members (including the elastic portion 5-1055 and the rigid portion 5-1056) are rotationally symmetric with respect to the main axis 5-AX.

Figure 53:
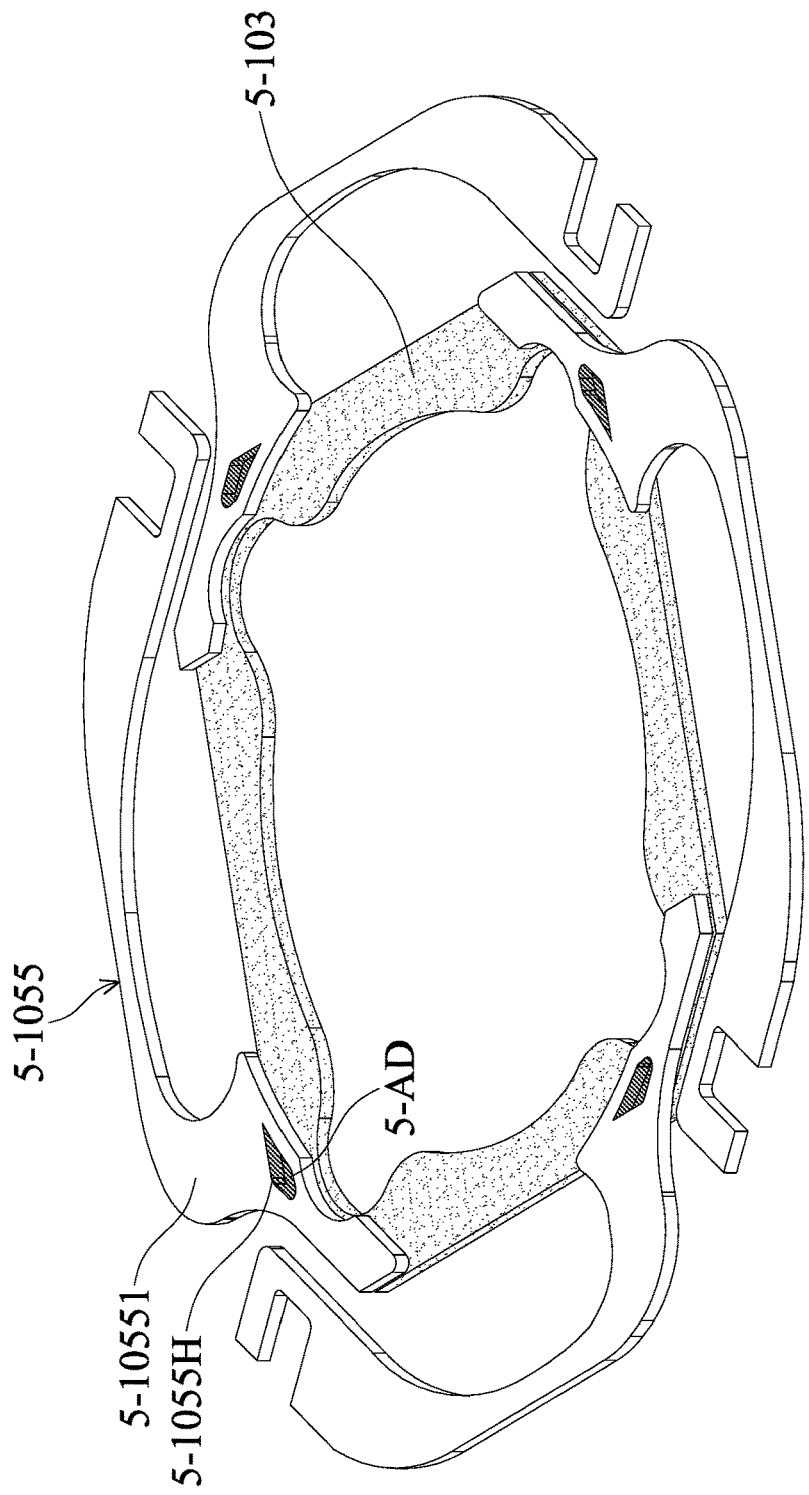
FIG. 53 is a schematic diagram of the movable element 5-103 and several elastic portions 5-1055 after assembly in another view according to another embodiment of the present disclosure.

Please refer to FIG. 53, which is a schematic diagram of the movable element 5-103 and several elastic portions 5-1055 after assembly in another view according to another embodiment of the present disclosure. In this embodiment, the string can be connected to the movable element 5-103 by an adhesive member 5-AD. Specifically, as shown in FIG. 53, an opening 5-1055H may be formed on the first end 5-10551, and the adhesive member 5-AD may be disposed within the opening 5-1055H, so that the elastic portion 5-1055 is fixed to the movable element 5-103.

In this embodiment, the elastic portion 5-1055 and the movable element 5-103 can be made of a metal material. In addition, in other embodiments, the movable element 5-103 and these elastic portions 5-1055 (string) may be integrally formed in one piece, for example, using a stamping technique. Based on the design of one-piece, the convenience of assembly without positioning and the increase of strength can be achieved.

Figure 54:
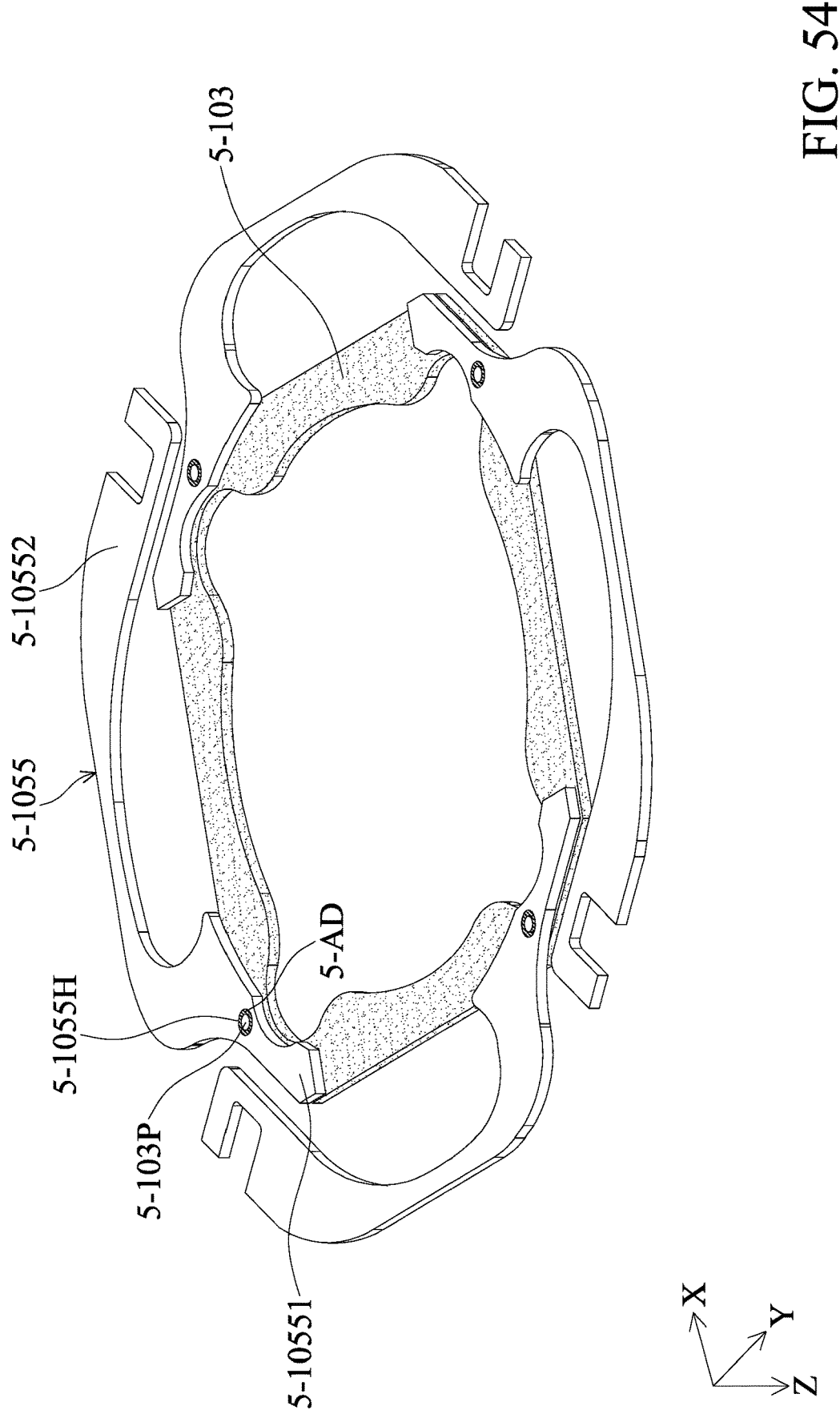
FIG. 54 is a schematic diagram of the movable element 5-103 and several elastic portions 5-1055 after assembly in another view according to another embodiment of the present disclosure.

Please refer to FIG. 54, which is a schematic diagram of the movable element 5-103 and several elastic portions 5-1055 after assembly in another view according to another embodiment of the present disclosure. In this embodiment, the movable element 5-103 is made of plastic material, and at least one positioning portion 5-103P may be formed on the movable element 5-103. The positioning portion 5-103P corresponds to the opening 5-1055H and is configured to position the first end 5-10551 of the string. In addition, the adhesive member 5-AD may be further disposed in the opening 5-1055H so that the first end 5-10551 is fixed to the movable element 5-103. Based on the design of the positioning portion 5-103P, the convenience of assembly and the accuracy of positioning can be increased.

Figure 55:
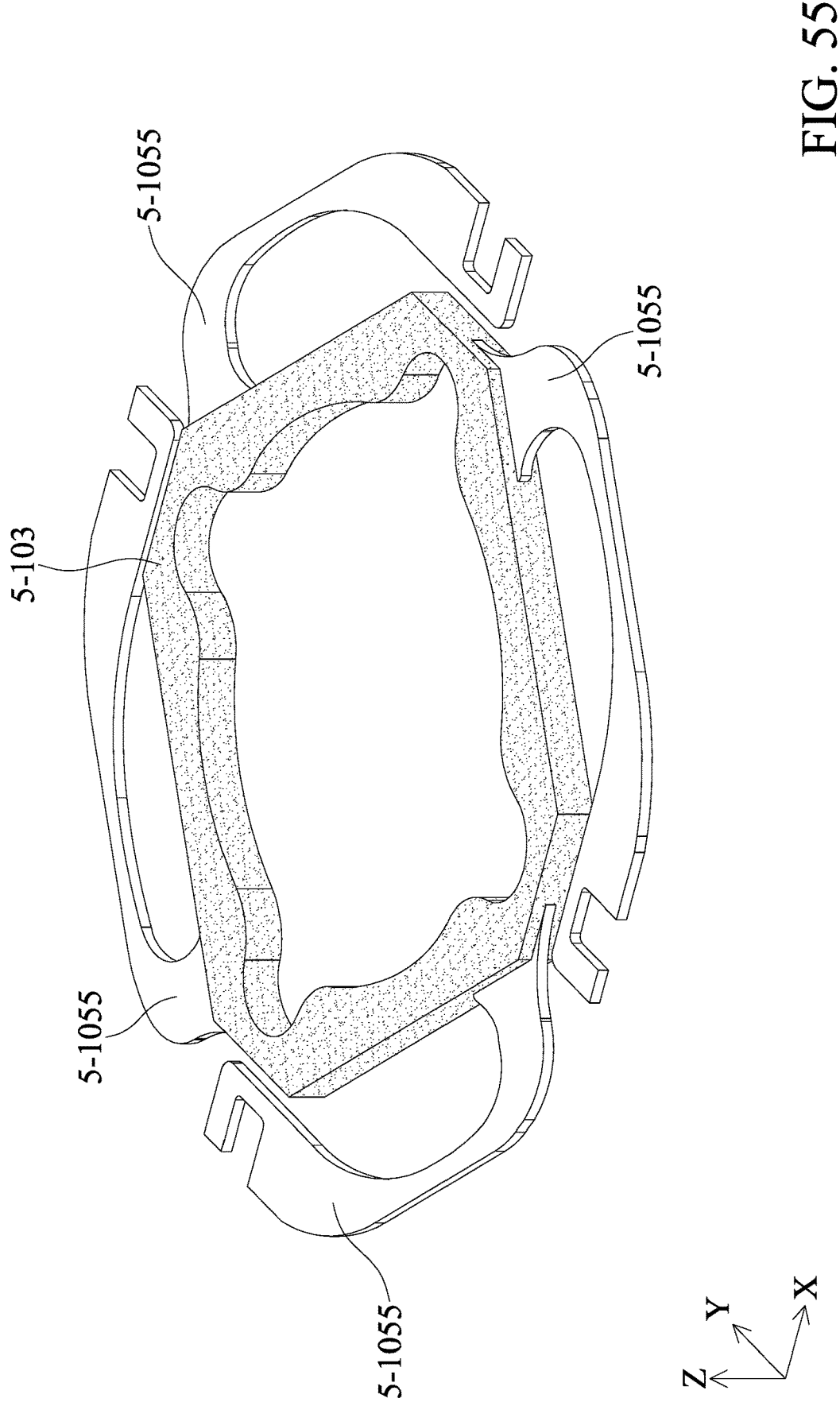
FIG. 55 is a schematic diagram of the movable element 5-103 and several elastic portions 5-1055 according to another embodiment of the present disclosure.

Please refer to FIG. 55, which is a schematic diagram of the movable element 5-103 and several elastic portions 5-1055 according to another embodiment of the present disclosure. In this embodiment, the movable element 5-103 is made of plastic material, and these elastic portions 5-1055 (the strings) are made of metal material and are embedded in the movable element 5-103 by insert molding technology. Based on this design, the assembly convenience of the optical system 5-100 can be improved.

The present disclosure provides an optical system having a first optical element 5-OE, a deforming member 5-101, a movable element 5-103, a fixed assembly 5-FA, a connecting assembly 5-CA, a movable assembly 5-MA, and a driving module 5-DM. The movable element 5-103 is configured to be connected to the first optical element 5-OE through the deforming member 5-101, and the movable assembly 5-MA is connected to the movable element 5-103 through the connecting assembly 5-CA. When driving module 5-DM is configured to drive movable assembly 5-MA to move relative to fixed assembly 5-FA, the movable element 5-103 can be moved to drive the deforming member 5-101 to push the bottom of first optical element 5-OE, thereby changing the optical properties of the liquid lens element 5-OE1.

In addition, in some embodiments, the string of the elastic portion 5-1055 can be designed to include two cantilever, and based on the design of this string, the stability of the movable assembly 5-MA to drive the movable element 5-103 via the connecting assembly 5-CA can be increased.

The sixth embodiment group.

Figure 56:
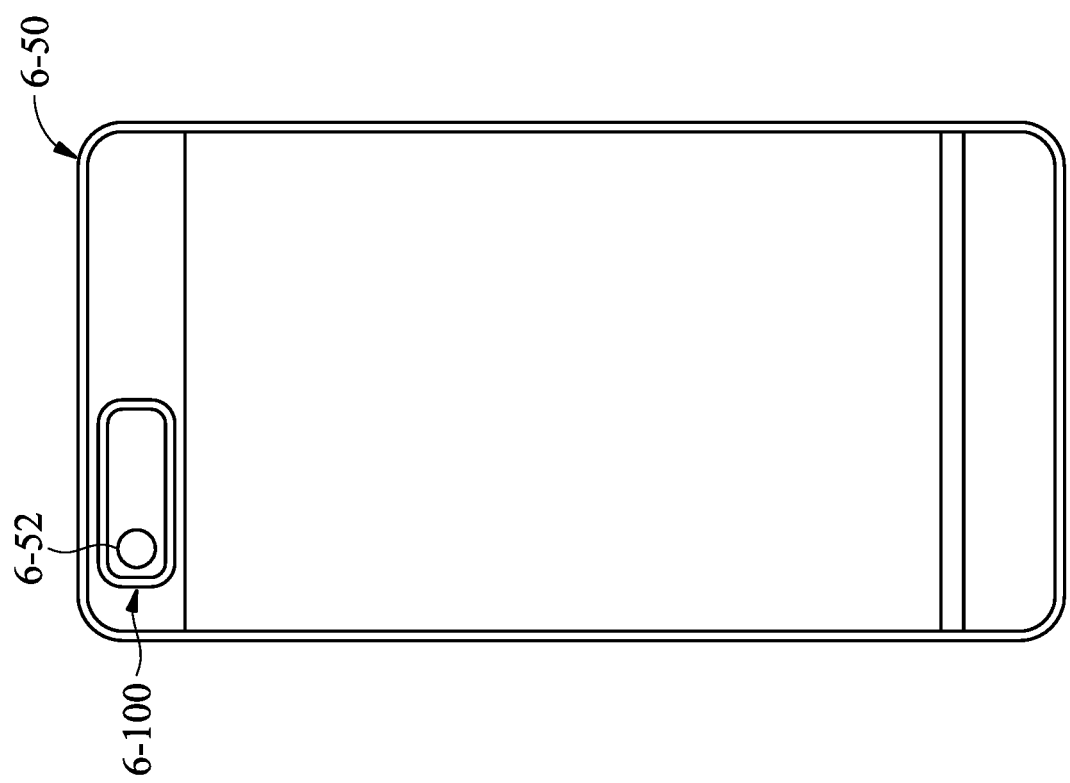
FIG. 56 shows a schematic diagram of an optical system 6-100 installed on a portable electronic device 6-50 according to an embodiment of the present disclosure.

Please refer to FIG. 56, which shows a schematic diagram of an optical system 6-100 installed on a portable electronic device 6-50 according to an embodiment of the present disclosure. The portable electronic device 6-50 can be any kind of portable electronic devices or handheld device, such as a personal digital assistant (PDA), a smartphone, a tablet, a mobile phone, a mobile Internet device (MID), a notebook computer, a car computer, a digital camera, a digital media player, a gaming device or any other type of mobile computing device. However, it will be understood by a person skilled in the art that the present disclosure is not limited to those devices. In this embodiment, the optical system 6-100 can be a camera system with a long focal length and can provide a better image effect of a photo for a user. Light is emitted into the optical system 6-100 through an opening 6-52, so as to generate one or several digital images.

Figure 57:
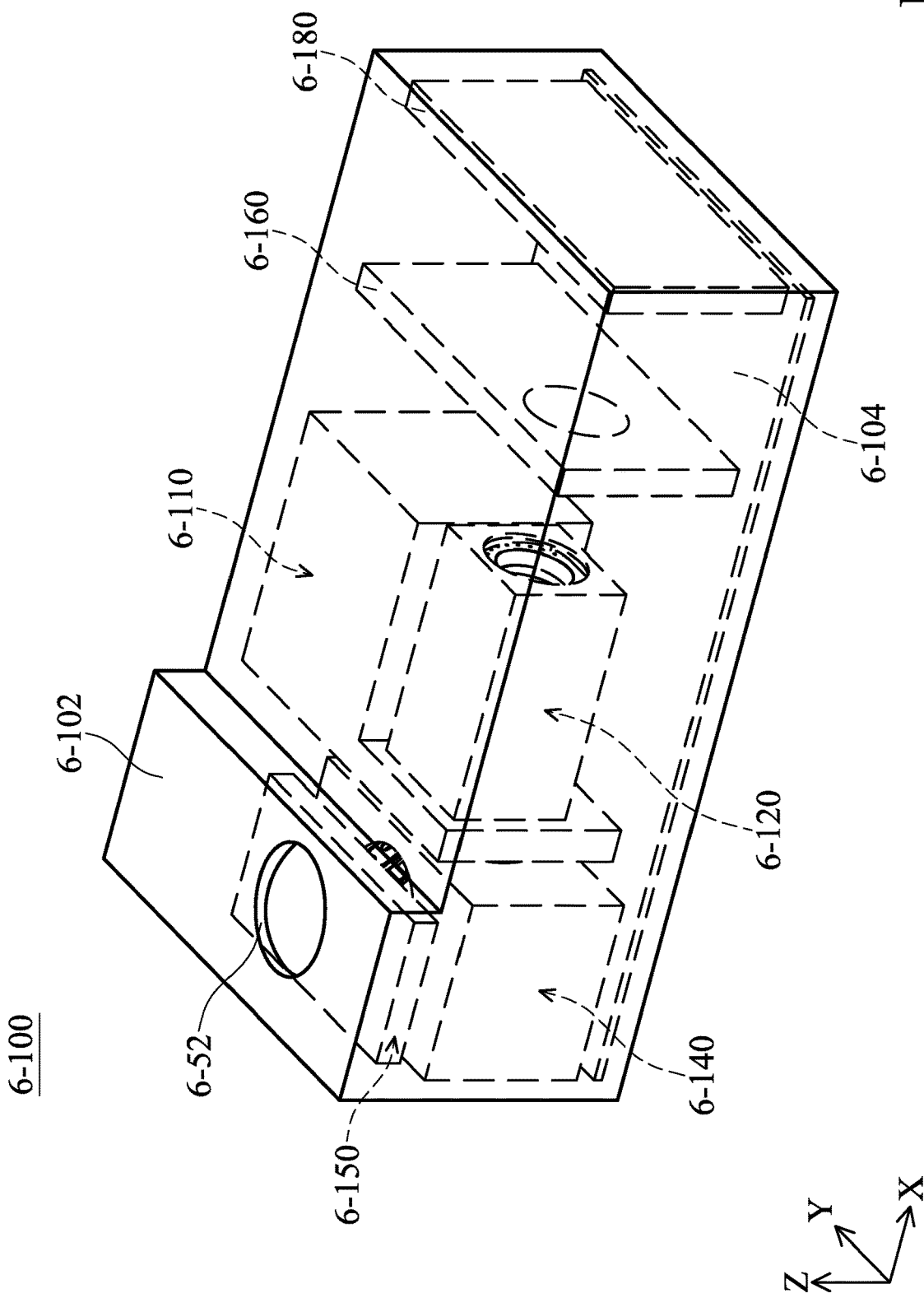
FIG. 57 is a schematic diagram of the optical system 6-100 according to an embodiment of the present disclosure.
Figure 58:
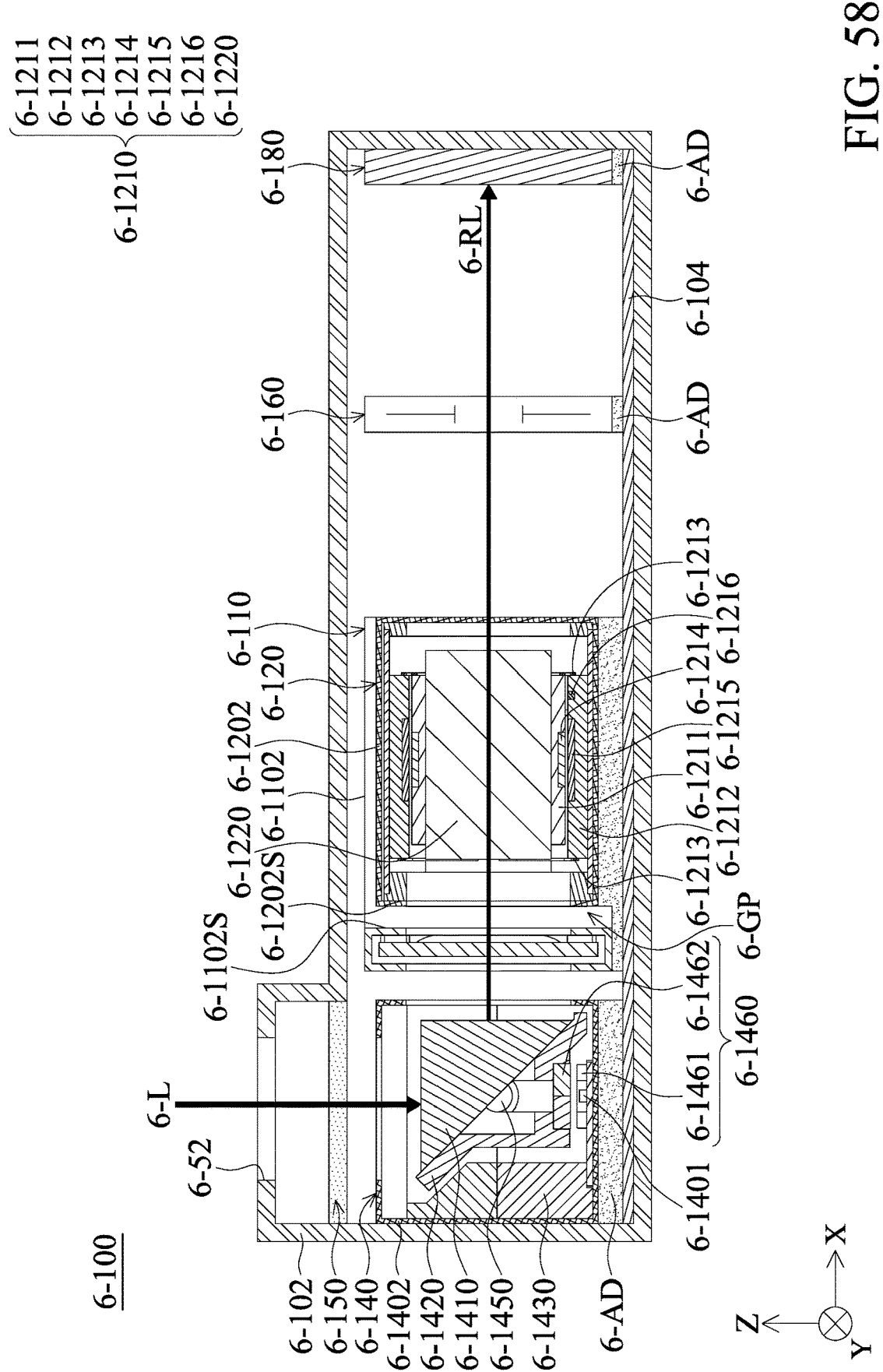
FIG. 58 is a schematic cross-sectional diagram of the optical system 6-100 according to an embodiment of the present disclosure.

Please refer to FIG. 57 and FIG. 58. FIG. 57 is a schematic diagram of the optical system 6-100 according to an embodiment of the present disclosure, and FIG. 58 is a schematic cross-sectional diagram of the optical system 6-100 according to an embodiment of the present disclosure. In this embodiment, the optical system 6-100 includes a housing 6-102, which is buried in the portable electronic device 6-50, and the optical system 6-100 further includes a fixed member 6-104, a first optical module 6-110, a second optical module 6-120, a reflective optical module 6-140 (the fourth optical module), and a photosensitive module 6-180 which are disposed in a housing 6-102 Inside.

the fixed member 6-104 may have a plate-shaped structure, which is fixed to the bottom surface of the housing 6-102, and the first optical module 6-110, the second optical module 6-120, the reflective optical module 6-140 and the photosensitive module 6-180 are fixedly disposed on the fixed member 6-104 and are arranged in a first direction (the X-axis). In the first direction, the first optical module 6-110 is disposed between the reflective optical module 6-140 (the fourth optical module) and the second optical module 6-120.

It should be noted that there may be a gap between each of the optical modules (may including the photosensitive module 6-180) and the fixed member 6-104. For example, as shown in FIG. 58, a gap is formed between the fixed member 6-104 and the first optical module 6-110, and another gap is formed between the fixed member 6-104 and the second optical module 6-120. The optical system 6-100 may include a plurality of adhesive members 6-AD, filling these gaps, so that the optical modules can be fixed to the fixing member 104.

Furthermore, the first optical module 6-110 has a first housing 6-1102, the second optical module 6-120 has a second housing 6-1202, and the first housing 6-1102 has a first wall surface 6-1102S, the second housing 1202 has a second wall surface 6-1202S, and the first wall surface 6-1102S faces the second wall surface 6-1202S. In this embodiment, the first wall surface 6-1102S does not contact the second wall surface 6-1202S, which means that there is a gap 6-GP formed between the first wall surface 6-1102S and the second wall surface 6-1202S.

Similarly, there is also a gap between a housing 6-1402 of the reflective optical module 6-140 and the first housing 6-1102, and so on. That is, each module in the optical system 6-100 of the present disclosure has its own housing, and the adjacent housings are not in contact with each other.

Figure 59:
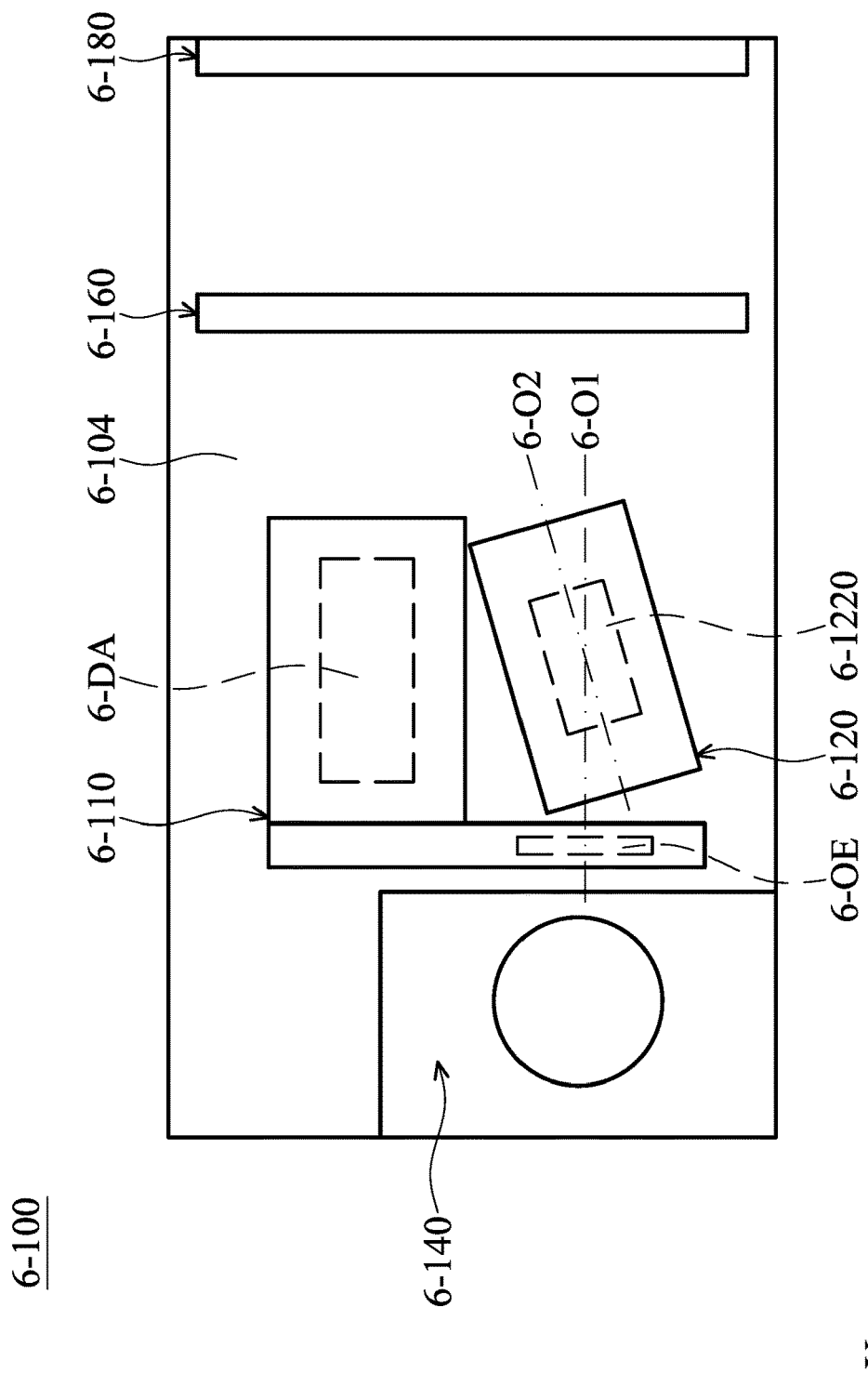
FIG. 59 is a top view of the optical system 6-100 according to an embodiment of the present disclosure.

Please refer to FIG. 58 and FIG. 59. FIG. 59 is a top view of the optical system 6-100 according to an embodiment of the present disclosure. A first optical element (an optical element 6-OE) of the first optical module 6-110 has a first optical axis 6-O1, and a second optical element (a lens 6-1220) of the second optical module 6-120 has a second optical axis 6-O2, and the first optical module 6-110 and the second optical module 6-120 are configured to be adjusted so that the first optical axis 6-O1 is aligned to the second optical axis 6-O2 before the adhesive member 6-AD is solidified.

For example, as shown in FIG. 59, when the first optical module 6-110 and the second optical module 6-120 are mounted on the fixed member 6-104 by using the adhesive members 6-AD, the second optical axis 6-O2 may be not aligned with the first optical axis 6-O1 due to the assembly tolerance. At this time, the operator can rotate the second optical module 6-120 so that the second optical axis 6-O2 is aligned with the first optical axis 6-O1, and then solidify the adhesive members 6-AD for securely fixing the first optical module 6-110 and the second optical module 6-120 on the fixed member 6-104.

In an embodiment of the present disclosure, the adhesive member 6-AD may be an Ultraviolet Rays (UV) glue, but it is not limited thereto, and it may be solidified by ultraviolet irradiation.

It should be noted that, as shown in FIG. 58 and FIG. 59, when viewed in a second direction (the Y-axis) which is perpendicular to the first direction (the X-axis), a driving assembly 6-DA of the first optical module 6-110 partially overlaps at least one portion of a lens 6-1220 (the second optical element) of the second optical module 6-120.

Furthermore, as shown in FIG. 57 to FIG. 59, the optical system 6-100 further includes a fifth optical module 6-150 and a sixth optical module 6-160. The fifth optical module 6-150 may include an aperture, and the sixth optical module 6-160 may include a shutter. The fifth optical module 6-150 is disposed above the reflective optical module 6-140 (FIG. 58), and the sixth optical module 6-160 is disposed between the photosensitive module 6-180 and the second optical module 6-120.

The fifth optical module 6-150 is configured to receive an incident light 6-L in a third direction (the Z-axis), and the incident light 6-L is received by the reflective optical module 6-140 after passing through the fifth optical module 6-150. Then, the reflective optical module 6-140 reflects a reflected light 6-RL. The reflected light 6-RL moves in the first direction, and passes through the first optical module 6-110, the second optical module 6-120, and the sixth optical module 6-160 in order to be received by the photosensitive module 6-180 so as to generate digital images.

Next, a specific structures of the second optical module 6-120 are described below. As shown in FIG. 3, the second optical module 6-120 primarily includes a lens driving mechanism 6-1210 and a lens 6-1220, wherein the lens driving mechanism 6-1210 is used to drive the lens 6-1220 to move. For example, the lens driving mechanism 6-1210 can include a lens holder 6-1211, an outer frame 6-1212, two spring sheets 6-1213, at least one coil 6-1214, and at least one magnetic member 6-1215. The coil 6-1214 and the magnetic member 6-1215 may constitute a second driving component.

The lens 6-1220 (the second optical element) is affixed to the lens holder 6-1211 (the second connecting member). Two spring sheets 6-1213 are connected to the lens holder 6-1211 and the outer frame 6-1212, and respectively disposed on opposite sides of the lens holder 6-1211. Thus, the lens holder 6-1211 can be movably hung in the outer frame 6-1212. The coil 6-1214 and the magnetic member 6-1215 are respectively disposed on the lens holder 6-1211 and the outer frame 6-1212, and correspond to each other. When current flows through the coil 6-1214, an electromagnetic effect is generated between the coil 6-1214 and the magnetic member 6-1215, and the lens holder 6-1211 and the lens 6-1220 disposed thereon can be driven to move relative to the outer frame 6-1212 (the second fixed portion), such as moving along the X-axis. In addition, the second optical module 6-120 can further include a sensing component 6-1216 configured to sense the motion of the lens holder 6-1211 relative to the outer frame 6-1212.

Next, a specific structure of the reflective optical module 6-140 are described below. As shown in FIG. 58, the reflective optical module 6-140 primarily includes an optical member 6-1410, an optical member holder 6-1420, a frame 6-1430, at least one first hinge 6-1450, a first driving module 6-1460, and a position detector 6-1401.

The optical member holder 6-1420 can be pivotally connected to the frame 6-1430 via the first hinge 6-1450. When the optical member holder 6-1420 rotates relative to the frame 6-1430, the optical member 6-1410 disposed thereon also rotates relative to the frame 6-1430. The optical member 6-1410 can be a prism or a reflecting mirror.

The first driving module 6-1460 can include a first electromagnetic driving assembly 6-1461 and a second electromagnetic driving assembly 6-1462, respectively disposed on the frame 6-1430 and the optical member holder 6-1420 and corresponding to each other.

For example, the first electromagnetic driving assembly 6-1461 can include a driving coil, and the second electromagnetic driving assembly 6-1462 can include a magnet. When a current flows through the driving coil (the first electromagnetic driving assembly 6-1461), an electromagnetic effect is generated between the driving coil and the magnet. Thus, the optical member holder 6-1420 and the optical member 6-1410 can be driven to rotate relative to the frame 6-1430 around the first hinge 6-1450, so as to adjust the position of the reflected light 6-RL on the photosensitive module 6-180.

The position detector 6-1401 can be disposed on the frame 6-1430 and correspond to the second electromagnetic driving assembly 6-1462, so as to detect the position of the second electromagnetic driving assembly 6-1462 to obtain the rotation angle of the optical member 6-1410. For example, the position detector 6-1401 can be Hall sensors, magnetoresistance effect sensors (MR sensor), giant magnetoresistance effect sensors (GMR sensor), tunneling magnetoresistance effect sensors (TMR sensor), or fluxgate sensors.

Figure 60:
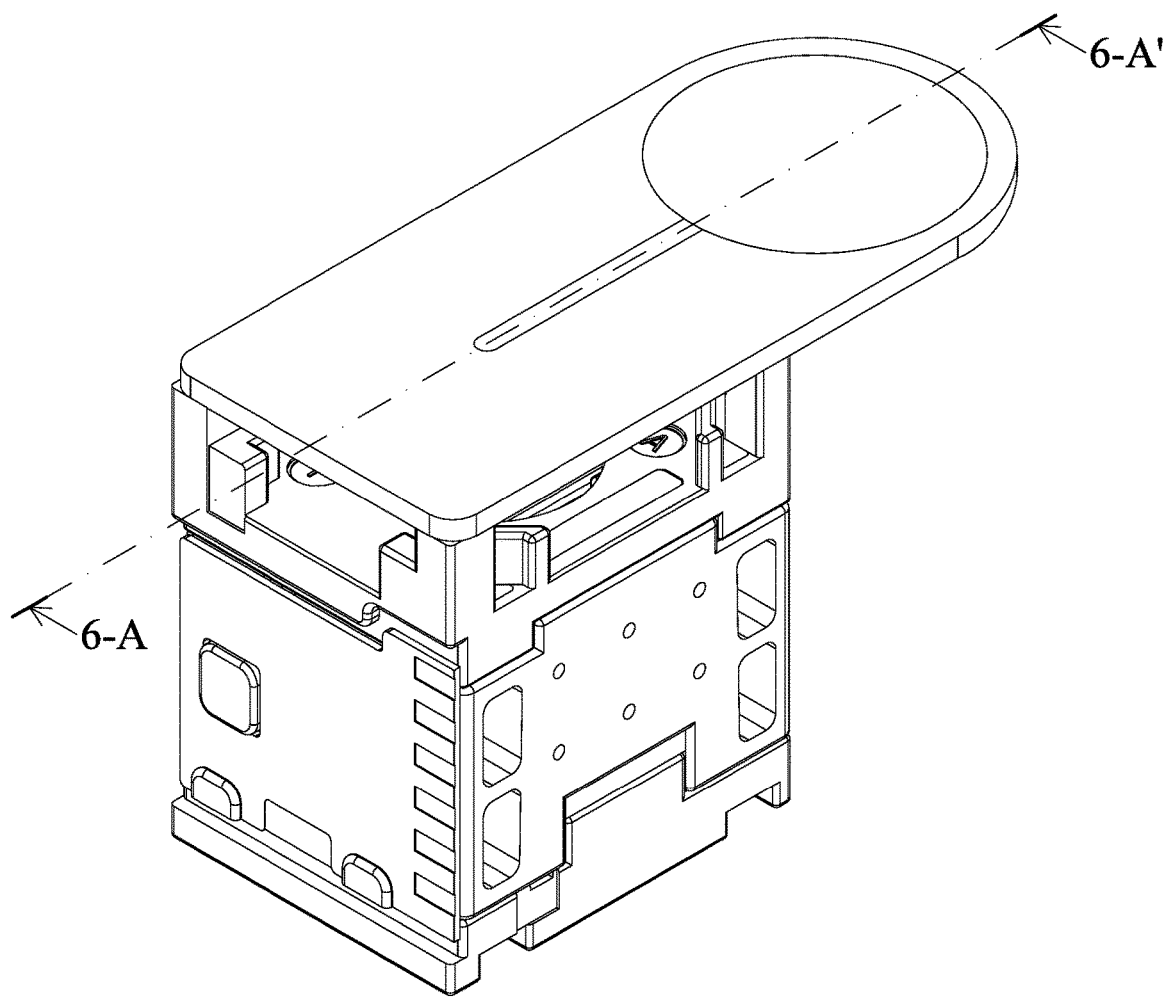
FIG. 60 is a schematic diagram of the first optical module 6-110 according to an embodiment of the present disclosure.
Figure 61:
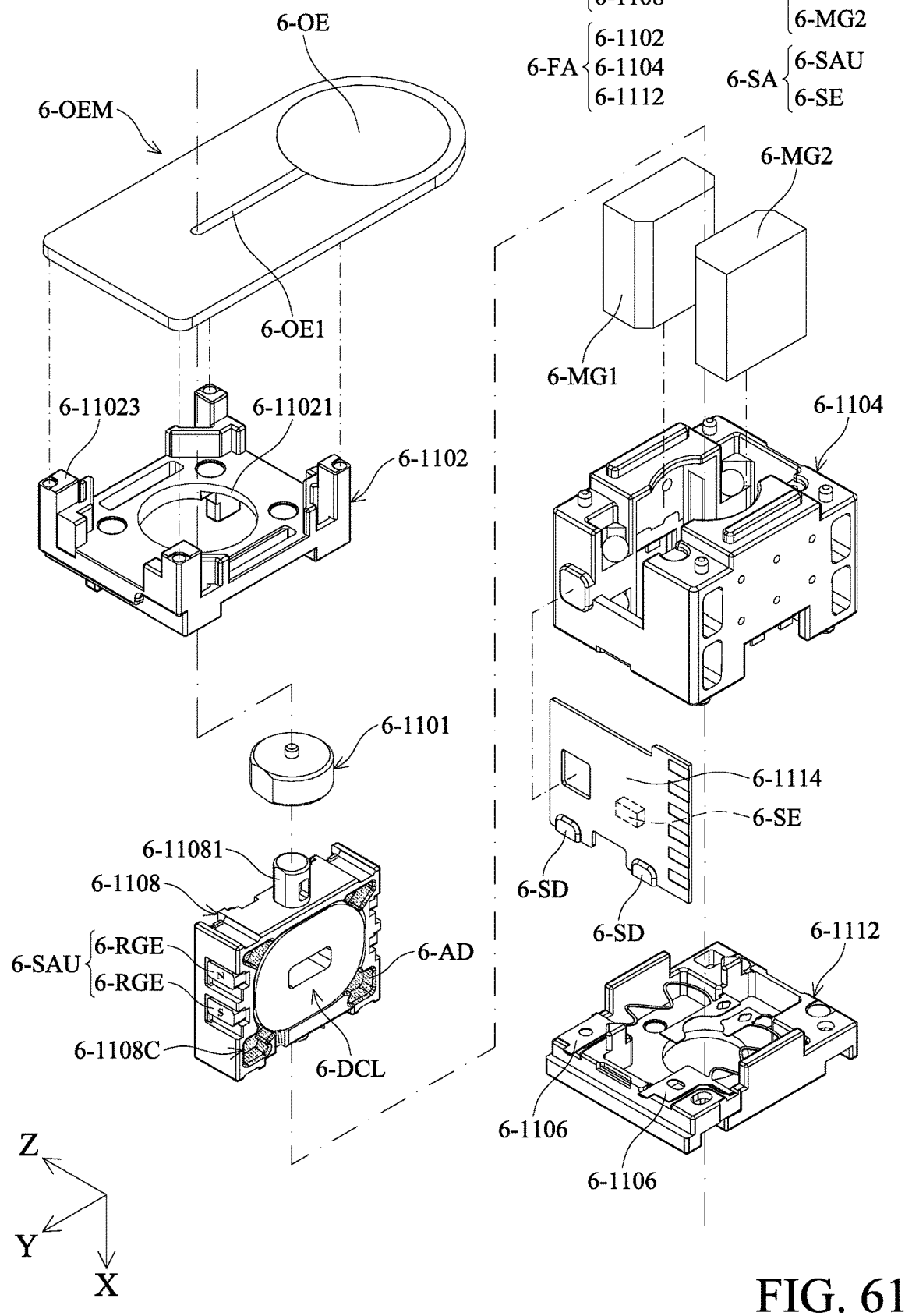
FIG. 61 is an exploded diagram of the first optical module 6-110 according to an embodiment of the present disclosure.
Figure 62:
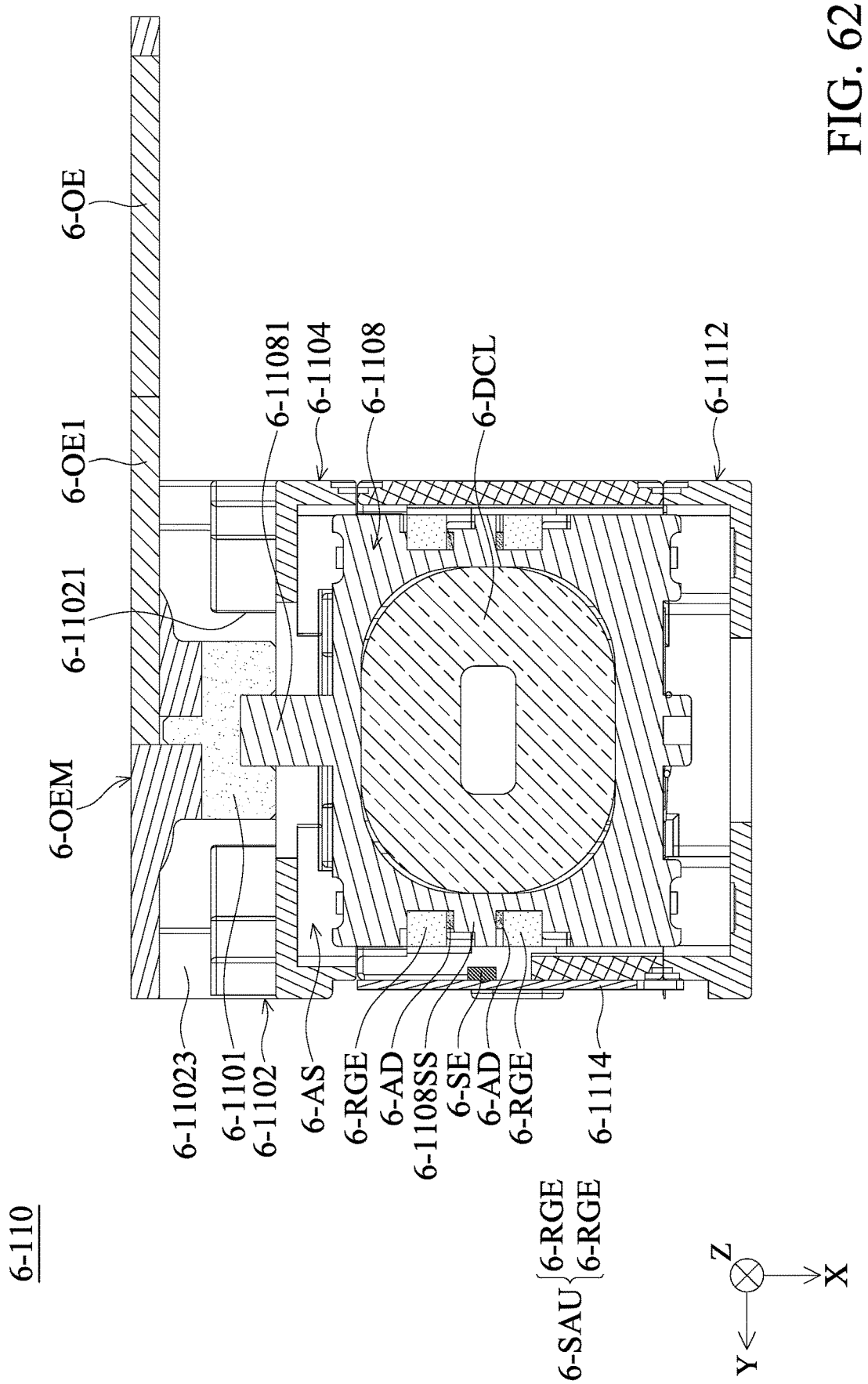
FIG. 62 is a cross-sectional diagram of the first optical module 6-110 along line 6-A-6-A' in FIG. 60 according to an embodiment of the present disclosure.

Next, the structure of the first optical module 6-110 are described. Please refer to FIG. 60 to FIG. 62. FIG. 60 is a schematic diagram of the first optical module 6-110 according to an embodiment of the present disclosure, FIG. 61 is an exploded diagram of the first optical module 6-110 according to an embodiment of the present disclosure, and FIG. 62 is a cross-sectional diagram of the first optical module 6-110 along line 6-A-6-A' in FIG. 60 according to an embodiment of the present disclosure. In this embodiment, the first optical module 6-110 includes an optical element module 6-OEM, a fixed assembly 6-FA (the first fixed portion), a movable assembly 6-MA (the first movable assembly), a driving assembly 6-DA (the first driving assembly), and a position sensing assembly 6-SA. The movable assembly 6-MA corresponds to an optical element 6-OE (the first optical element) of the optical element module 6-OEM, and the movable assembly 6-MA are movable relative to the fixed assembly 6-FA. The driving assembly 6-DA is configured to drive the movable assembly 6-MA to move relative to fixed assembly 6-FA, and the position sensing assembly 6-SA is configured to sense the position and movement of the movable assembly 6-MA relative to fixed assembly 6-FA.

As shown in FIG. 61, the fixed assembly 6-FA may include a top frame 6-1102, a side frame 6-1104, and a base 6-1112. The top frame 6-1102 is fixedly connected to the side frame 6-1104, and the side frame 6-1104 is fixedly connected to the base 6-1112. The top frame 6-1102 has an opening 6-11021 and four protruding columns 6-11023, and the optical element module 6-OEM is fixedly disposed on these protruding columns 6-11023. The side frame 6-1104 and the base 6-1112 may form an accommodating space 6-AS (FIG. 62), configured to accommodate the movable assembly 6-MA and the driving assembly 6-DA. In addition, the fixed assembly 6-FA may further include a circuit board 6-1114, which is fixedly disposed on one side of the side frame 6-1104.

The movable assembly 6-MA includes a movable member 6-1108 and two elastic members 6-1106. The movable member 6-1108 is movably disposed in the accommodating space 6-AS, and the elastic member 6-1106 is disposed the side frame 6-1104 and the base 6-1112. In addition, the driving assembly 6-DA may include a driving coil 6-DCL, a first driving magnetic element 6-MG1, and a second driving magnetic element 6-MG2.

As shown in FIG. 61, the driving coil 6-DCL is disposed in the movable member 6-1108. The movable member 6-1108 may have a plurality of grooves 6-1108C located around the driving coil 6-DCL, and an adhesive member 6-AD can be accommodated in each groove 6-1108C, so that the driving coil 6-DCL is fixed in the movable member 6-1108. The first driving magnetic element 6-MG1 and the second driving magnetic element 6-MG2 correspond to the driving coil 6-DCL and are fixedly provided in the fixed assembly 6-FA. Specifically, the first driving magnetic element 6-MG1 and the second driving magnetic element 6-MG2 are disposed on the side frame 6-1104 and are located in the accommodating space 6-AS. In addition, the driving coil 6-DCL is electrically connected to the circuit board 6-1114 via two the elastic members 6-1106. For example, the driving coil 6-DCL is electrically connected to the circuit board 6-1114 by solders 6-SD in FIG. 61.

In this embodiment, the position sensing assembly 6-SA includes a sensed unit 6-SAU and a sensing element 6-SE. The sensing element 6-SE is disposed on the circuit board 6-1114 and corresponds to the sensed unit 6-SAU. The sensed unit 6-SAU may have a plurality of reference magnetic elements 6-RGE. These reference magnetic elements 6-RGE are arranged in a first direction (such as the X-axis), the sensed unit 6-SAU and the sensing element 6-SE are arranged in an arrangement direction (the Y-axis), and the first direction is not parallel to the arrangement direction.

As shown in FIG. 61 and FIG. 62, the optical element 6-OE is a liquid lens, and the optical element 6-OE can has a flow channel 6-OE1. A translucent liquid is disposed in the flow channel 6-OE1 and the optical element 6-OE. Furthermore, the first optical module 6-110 may further include a deforming member 6-1101 (the first connecting member), a protruding pillar 6-11081 of the movable member 6-1108 is inserted into the deforming member 6-1101, and the deforming member 6-1101 is in contact with one end of the flow channel 6-OE1 (such as the left end in FIG. 62).

In this embodiment, one or both sides of the optical element 6-OE and the flow channel 6-OE1 along the X-axis may be a thin film structure. When the driving coil 6-DCL is provided with electricity, the driving coil 6-DCL acts with the first driving magnetic element 6-MG1 and the second driving magnetic element 6-MG2 to generate an electromagnetic driving force. This electromagnetic driving force drives the movable member 6-1108 to move along the X-axis. Therefore, the movable member 6-1108 and the deforming member 6-1101 push the flow channel 6-OE1 so that a portion of the liquid in the flow channel 6-OE1 flows to the optical element 6-OE, thereby causing the optical element 6-OE to deform. Thus, the optical properties of the optical element 6-OE are changed so as to achieve the effect of optical zoom.

As shown in FIG. 62, a separating structure 6-1108SS (a spacer element) can be formed on the movable member 6-1108, and the separating structure 6-1108SS is disposed between these reference magnetic elements 6-RGE. When viewed in the first direction (the X-axis), the reference magnetic elements 6-RGE partially overlap the separating structure 6-1108SS, and the separating structure 6-1108SS has a non-magnetic permeability material, such as a plastic material. Furthermore, the first optical module 6-110 may include a plurality of adhesive members 6-AD disposed between the separating structure 6-108SS and the corresponding reference magnetic element 6-RGE, so that the reference magnetic elements 6-RGE are fixed to the movable member 6-108.

Figure 63:
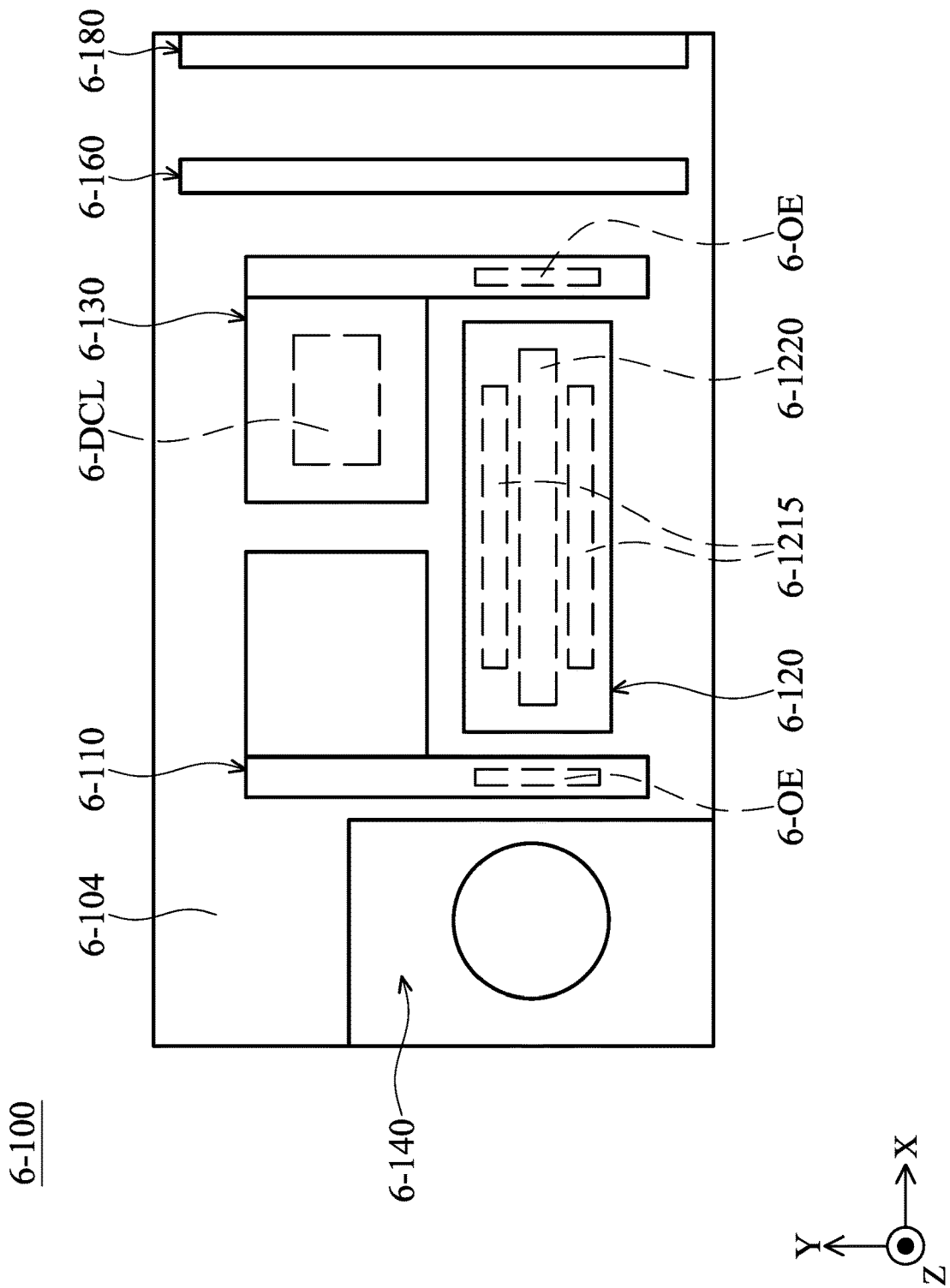
FIG. 63 is a top view of the optical system 6-100 according to another embodiment of the present disclosure.

Please refer to FIG. 63, which is a top view of the optical system 6-100 according to another embodiment of the present disclosure. In this embodiment, the optical system 6-100 may further include a third optical module 6-130, and the third optical module 6-130 may have the same structure as the first optical module 6-110. For example, the third optical module 6-130 includes a third driving assembly (such as the driving assembly 6-DA), a third fixed portion (such as the fixed assembly 6-FA), and a third connecting member (such as the deforming member 6-1101).

When viewed in the first direction (the X-axis), the magnetic member 6-1215 of the second driving assembly partially overlaps at least one portion of a third optical element (such as the optical element 6-OE) of the third optical module 6-130. When viewed in the second direction (the Y-axis), the driving coil 6-DCL of the third driving assembly of the third optical module 6-130 partially overlaps the lens 6-1220 (the second optical element).

It should be noted that the optical element 6-OE (the first optical element) of the first optical module 6-110 and the optical element 6-OE (the third optical element) of the third optical module 6-130 are located on opposite sides of the magnetic member 6-1215 of the second driving assembly. Based on the above design, the second optical module 6-120 can be configured with a longer lens 6-1220, so that the optical system 6-100 can perform a better photographing effect.

In addition, the first optical module 6-110 to the reflective optical module 6-140 of the present disclosure are arranged in the first direction (the X-axis), and they are not stacked in a third direction (the Z-axis). The third direction is perpendicular to the first direction (the X-axis) and the second direction (the Y-axis).

An optical system is provided in the present disclosure and includes a plurality of modules, which are disposed in the housing 6-102 and can be fixed on the fixed member 6-104. These modules can include the liquid lens module, the reflective optical module, the aperture, or the photosensitive module. The configuration of these modules on the fixed member 6-104 can be adjusted according to different design requirements so as to achieve better performance of the optical system.

In addition, the first optical module 6-110 to the reflective optical module 6-140 in these modules are not stacked along the Z-axis, so that the optical system of the present disclosure can achieve the purpose of miniaturization.

The seventh embodiment group.

Figure 64:
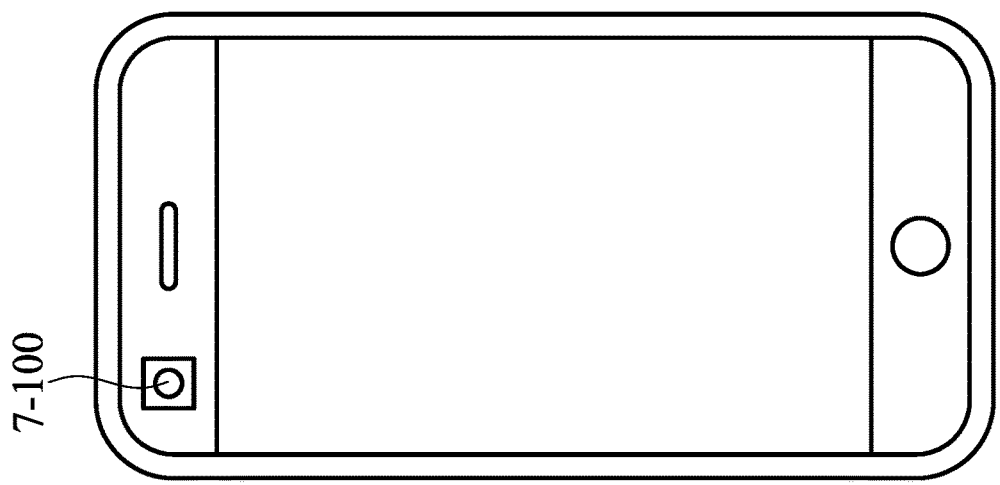
FIG. 64 shows a schematic view of an electrical device with an optical element driving mechanism according to an embodiment of the present disclosure.

Firstly, please refer to FIG. 64, an optical element driving mechanism 7-100 of an embodiment of the present disclosure may be mounted in an electrical device 7-1 for taking photos or videos, wherein the aforementioned electrical device 7-1 may, for example, be a smartphone or a digital camera, but the present disclosure is not limited to these. It should be noted that the position and the size between the optical element driving mechanism 7-100 and the electrical device 7-1 shown in FIG. 64 are only an example, which is not for limiting the position and the size between the optical element driving mechanism 7-100 and the electrical device 7-1. In fact, according to different needs, the optical element driving mechanism 7-100 may be mounted at different positions in the electrical device 7-1.

Figure 65:
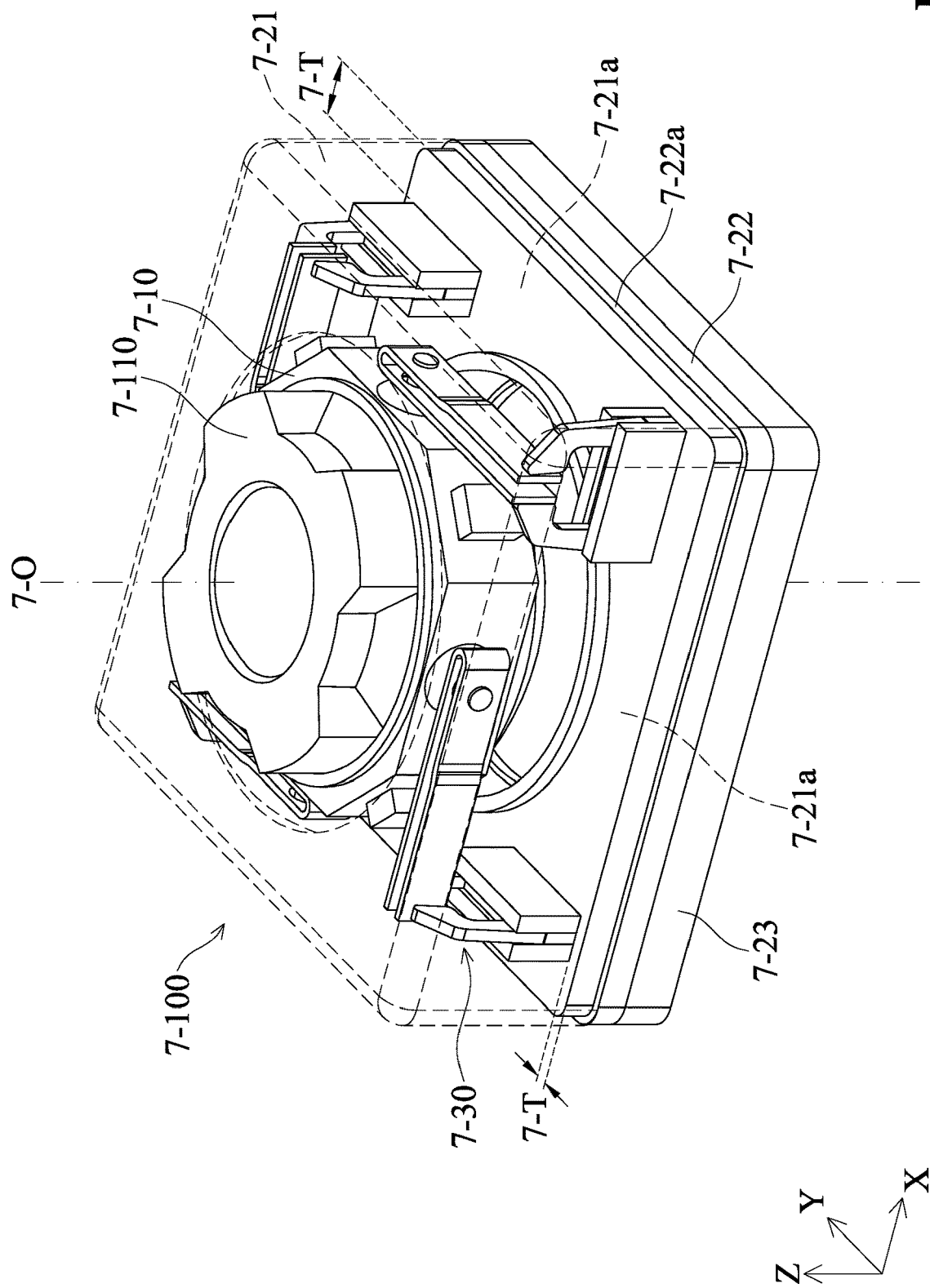
FIG. 65 shows a perspective view of the optical element driving mechanism and an optical element according to an embodiment of the present disclosure, wherein an outer frame of the optical element driving mechanism is shown as a dash-line.
Figure 66:
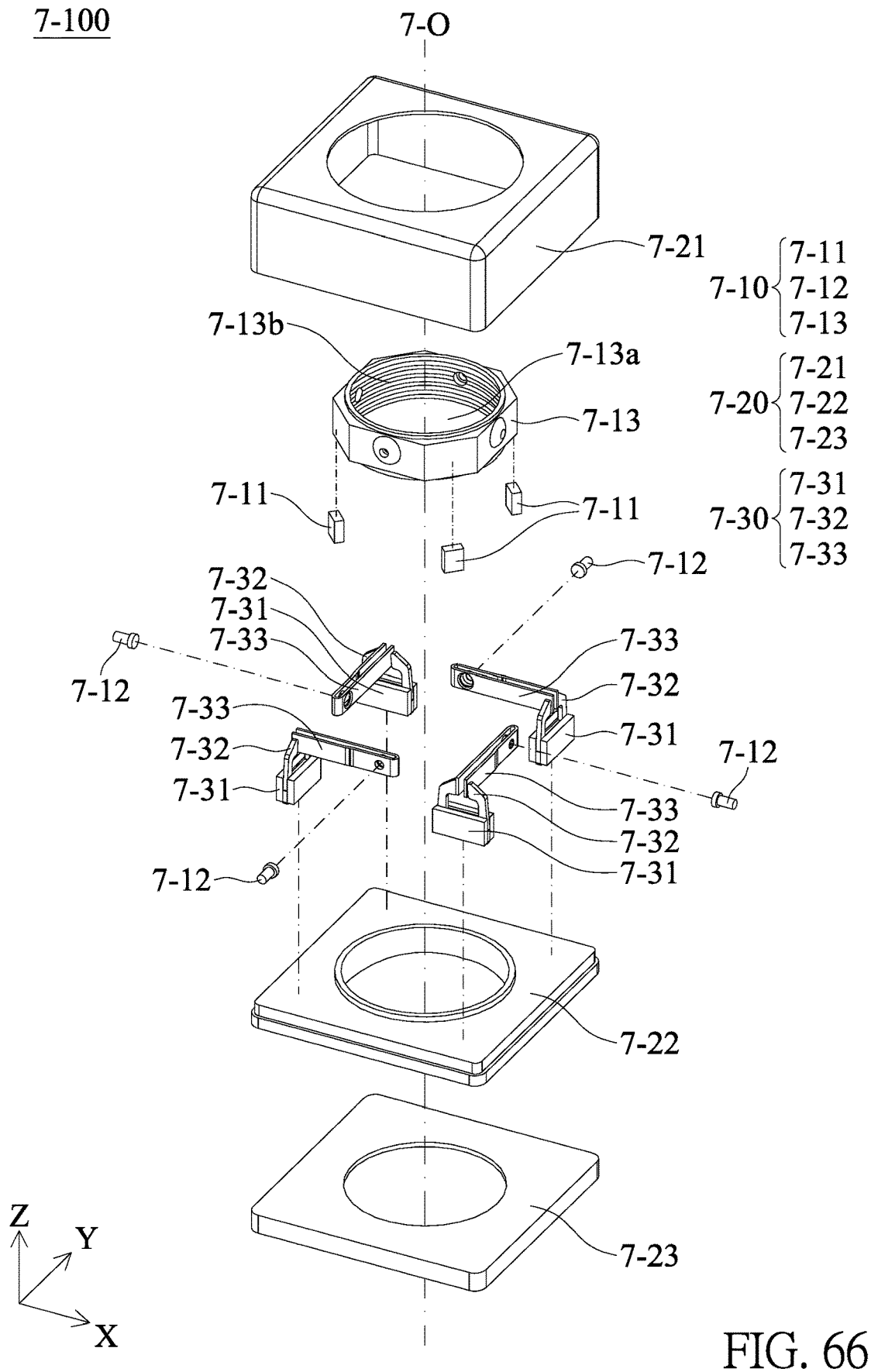
FIG. 66 shows an exploded view of the optical element driving mechanism according to an embodiment of the present disclosure.

Please refer to FIG. 65, the optical element driving mechanism 7-100 has an optical axis 7-O, the optical axis 7-O penetrates the optical element driving mechanism 7-100. Please refer to FIG. 66, the optical element driving mechanism 7-100 includes a movable part 7-10, a fixed part 7-20 and a driving assembly 7-30. The movable part 7-10 includes at least three sensing assemblies 7-11, four fixing elements 7-12 and a holder 7-13. The fixed part 7-20 includes an outer frame 7-21, a base 7-22 and an image sensor holder 7-23. The driving assembly 7-30 includes four piezoelectric elements 7-31, four deformation elements 7-32, and four connecting elements 7-33. Please refer to FIG. 65 again, the movable part 7-10 of the optical element driving mechanism 7-100 is in contact with an optical element 7-110, and the image sensor holder 7-23 is in contact with the base 7-22 and holds an image sensor (not shown). The outer frame 7-21 has four sidewalls 7-21a, the sidewalls 7-21 are parallel to the optical axis 7-O, and a gap 7-T is provided between the outer frame 7-21 and the driving assembly 7-30. By doing so, when the optical element driving mechanism 7-100 is impacted, the collision between the driving assembly 7-30 and the outer frame 7-21 may be avoided, thereby the driving assembly 7-30 are protected from damage. As shown in FIGS. 2 and 3, in the present embodiment, the optical element 7-110 may be a lens. More specifically, the holder 7-13 of the movable part 7-10 has a hollow ring structure and a through hole 7-13a and a threaded structure 7-13b formed on the through hole 7-13a, and the optical element 7-110 may be locked in the through hole 22 via the threaded structure 7-13b.

Figure 67:
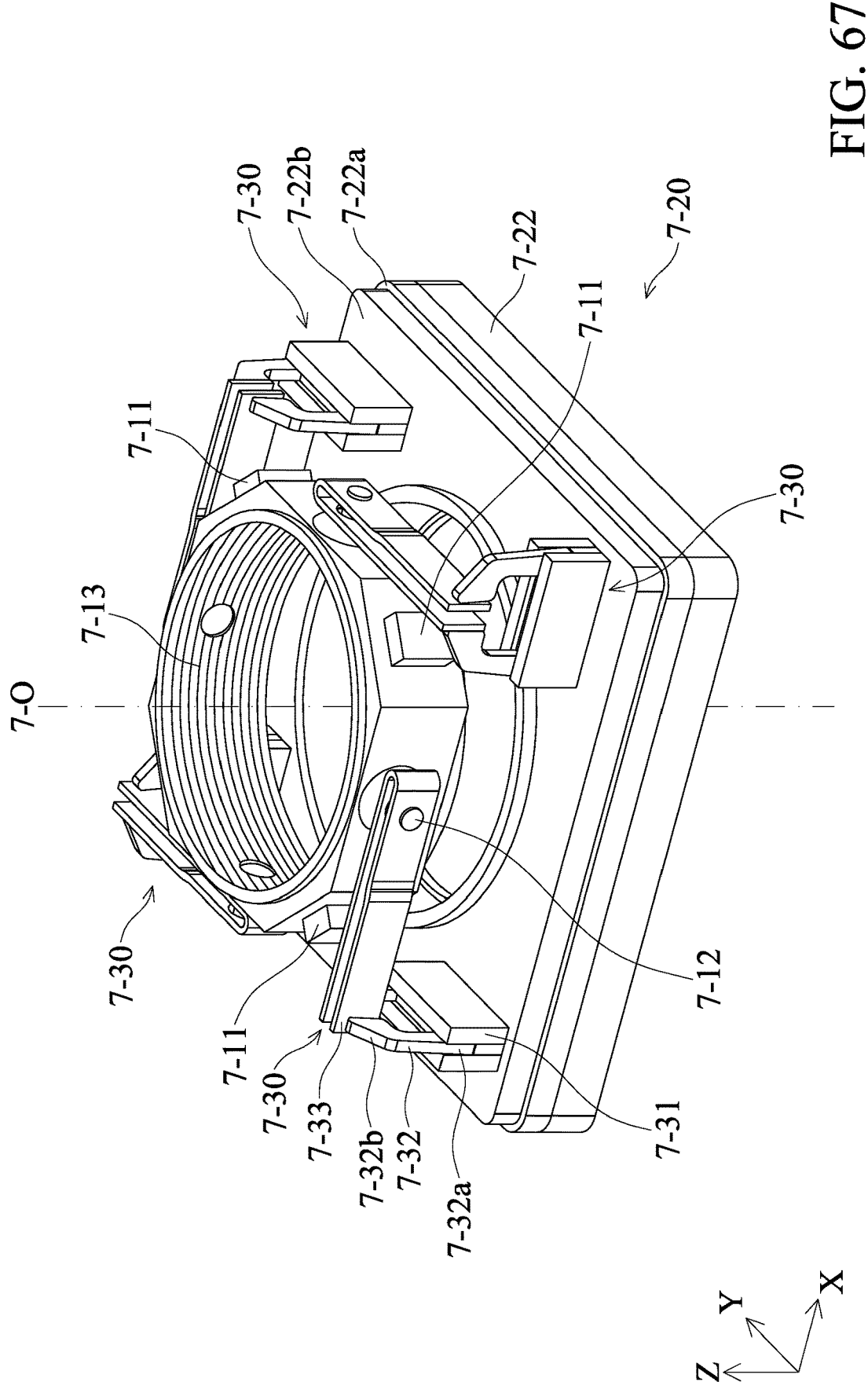
FIG. 67 shows a perspective view of the optical element driving mechanism according to an embodiment of the present disclosure, wherein the outer frame of the optical element driving mechanism is omitted.

Please refer to FIG. 67, the at least three sensing assemblies 7-11 are disposed on the holder 7-13 to detect the motion of the holder 7-13 of the movable part 7-10 relative to the fixed part 7-20. The sensing assemblies 7-11 may be a magnetic element, a magnetic field sensing unit, an optical reference, a light sensing element, or any combination thereof) It should be noted that there may be four or more sensing assemblies. The base 7-22 has a step part 7-22a and a surface part 7-22b. The outer frame 7-21 is disposed on the step part 7-22a (please refer to FIG. 65) to ensure that the outer frame 7-21 is more securely attached to the base 7-22, and this increases the attaching area to lower the level of the motion of the outer frame 7-21 relative to the base 7-22. The piezoelectric elements 7-31 are in direct contact with the surface part 7-22b of the base 7-22, and the piezoelectric elements 7-31 are fixed on the surface part 7-22b. The deformation elements 7-32 correspond to the piezoelectric elements 7-31, and the deformation elements 7-32 are in direct contact with the surface part 7-22b and fixed on the surface part 7-22b. In some embodiments, the driving assembly 7-30 includes at least two piezoelectric elements 7-31 and at least two corresponding deformation elements 7-32, and each one of the piezoelectric elements 7-31 drives the corresponding deformation element 7-32 independently. As shown in FIG. 67, in the present embodiment, the four piezoelectric elements 7-31 are corresponding to the four deformation elements 7-32, and each one of the piezoelectric elements 7-31 drives the corresponding deformation element 7-32 independently. It should be noted that the number of the piezoelectric elements 7-31, the deformation elements 7-32 and the connecting elements 7-33 of the driving assembly 7-30 are not limited to four. In other embodiments, there may be one, two three, or more piezoelectric elements 7-31, deformation elements 7-32, and connecting elements 7-33.

As shown in FIG. 67, lower half parts 7-32a of the deformation elements 7-32 overlaps the piezoelectric elements 7-31 when observing along the direction perpendicular to the optical axis 7-O, and the upper half parts 7-32b of the deformation elements 7-32 is the parts of the deformation elements 7-32 which upwardly expose from the piezoelectric elements 7-31. The piezoelectric elements 7-31 may consist of two pieces of piezoelectric materials, and the two pieces of piezoelectric materials are respectively in contact with the lower half parts 7-32a of the deformation elements 7-32, respectively, so that the piezoelectric elements 7-31 make the deformation elements 7-32 deform along an extension direction parallel to the optical axis 7-O after the piezoelectric materials receive an external current and deform. In other words, after receiving the external current, the extension direction of the piezoelectric elements 7-31 and the deformation elements 7-32 is parallel to the optical axis 7-O. The upper half parts 7-32b of the deformation elements 7-32 are in contact with the connecting elements 7-33, but the upper half parts 7-32b of the deformation elements 7-32 is not in contact with the piezoelectric elements 7-31, and the connecting elements 7-33 are in contact with the holder 7-13. In this way, when the piezoelectric materials deform and make the deformation elements 7-32 deform by receiving the external current, the connecting elements 7-33 move along with the upper half parts 7-32b of the deformation elements 7-32, thereby driving the holder 7-13 to move along the optical axis 7-O relative to the fixed part 7-20. The movable part 7-10 movably connects to the fixed part 7-20 via the connecting parts 7-33 and the fixing element 7-12.

Figure 68:
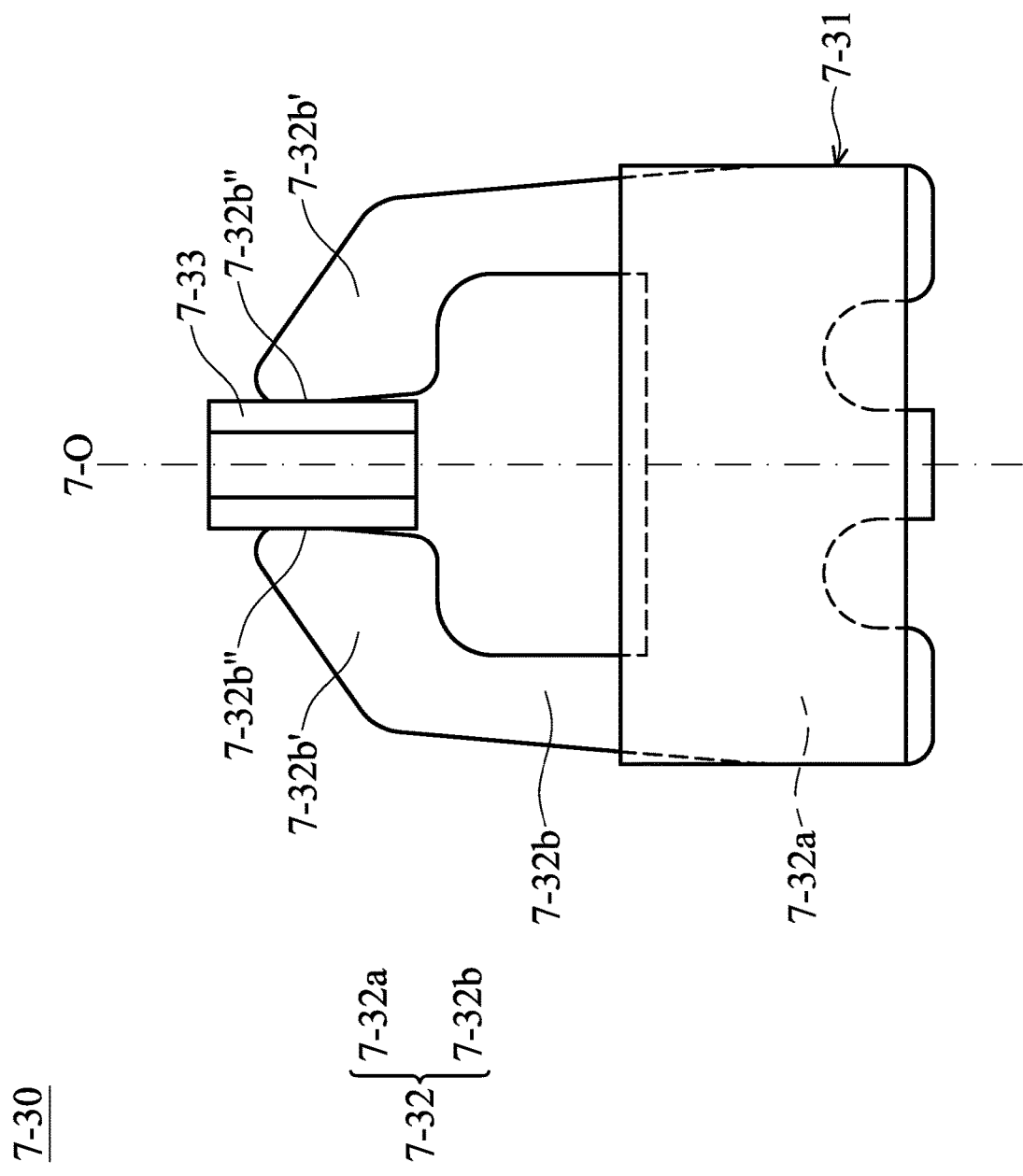
FIG. 68 shows a schematic view of a driving assembly of the optical element driving mechanism according to an embodiment of the present disclosure.

Please refer to FIG. 68, the piezoelectric elements 7-31 and the deformation elements 7-32 have plate structures. In the present embodiment, the lower half parts 7-32a of the deformation elements 7-32 downwardly expose from the piezoelectric elements 7-31 in part, in this way, the contacting area between the deformation elements 7-32 and surface part 7-22b of the base 7-22 is increased, which make the deformation elements 7-32 more securely attach to the surface part 7-22b, and a flexible adhesive material (such as flexible adhesive) may be used so that the deformation elements 7-32 may be roughly secured to the base 7-22 without affecting the motion of the piezoelectric elements 7-31 and the deformation elements 7-32. Furthermore, a supporting structure may be disposed between the deformation elements 7-32 (or the piezoelectric elements 7-31) and the fixed part to certainly limit the position of the piezoelectric elements 7-31 and the deformation elements 7-32. Moreover, the middle parts (which protrude toward the base) of the lower half parts 7-32a may be provided with harder glue, and the two sides parts (which protrude toward the base) are provided with softer glue to improve the adhesion. The upper half part 7-32b of the deformation elements 7-32 has two extension parts 7-32', the extension parts 7-32' extend a distance along a direction substantially parallel to the optical axis 7-O, then the extension parts 7-32' extend along the direction substantially perpendicular to the optical axis 7-O and the extension parts 7-32' are disposed facing to each other. The connecting elements 7-33 are in contact with a contacting surface 7-32b" of the corresponding extension part 7-32b'. Specifically, the connecting parts 7-33 abut the contacting surface 7-32b" by friction force. The deformation elements 7-32 may consist of deformable materials (such as metals), while the contacting surfaces 7-32b" have to be rigid so that the friction force between the contacting surfaces 7-32b" and the connecting parts 7-33 will not change as the deformation elements 7-32 deform. Furthermore, in other embodiments which are not shown in the figures, a flexible adhesive material may be disposed between the upper half part 7-32b and the fixed part, or between the piezoelectric elements 7-31 and the fixed part.

Figure 69:
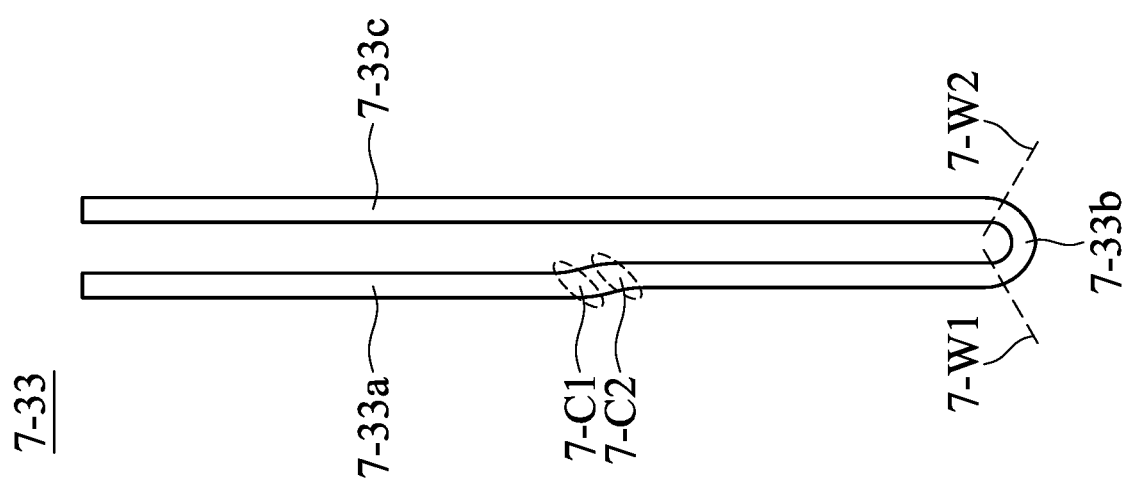
FIG. 69 shows a schematic view of a connecting element of the driving assembly of the optical element driving mechanism according to an embodiment of the present disclosure.

Please refer to FIG. 69, the connecting part 7-33 includes a first part 7-33a, a bending part 7-33b, and a second part 7-33c. The first part 7-33a is directly connected to the bending part 7-33b, and the second part 7-33c is in directly connected to the bending part 7-33b as well, but the first part 7-33a is not directly connected to the second part 7-33c. The dash line W1 is the boundary between the first part 7-33a and the bending part 7-33b, and the dash line W2 is the boundary between the bending part 7-33b and the second part 7-33c. In the embodiment shown in FIG. 69, the first part 7-33a is not linear and has a bending point 7-C1 and a bending point 7-C2, while the second part 7-33c is linear. Generally, the connecting part 7-33 is substantially a U-shpaed structure consists of a closed structure and an open structure. The connecting part 7-33 is flexible and has a pre-pressure. The structure of the non-linear first part 7-33a and the linear second part 7-33c of the connecting part 7-33 enables the connecting part 7-33 to apply the pre-pressure effectively, and the pre-pressure drives the first part 7-33a and the second part 7-33c to abut the contacting surface 7-32b" of the deformation element 7-32 in reverse to ensure that the connecting part 7-33 does not move relative to the contacting surface 7-32b".

Figure 70:
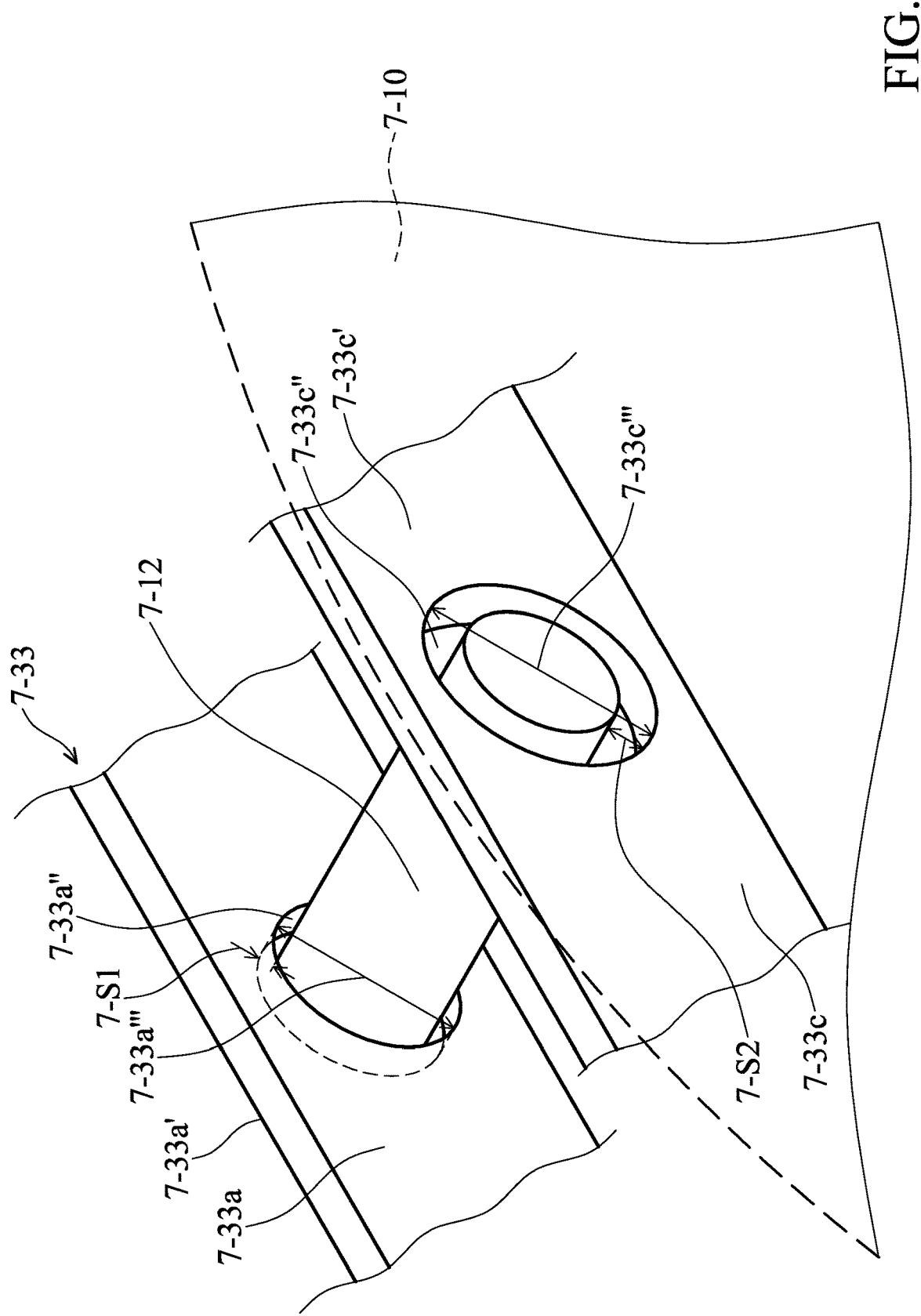
FIG. 70 shows a partial schematic view of a movable part, a first surface, a second surface and a fixing element of the optical element driving mechanism according to an embodiment of the present disclosure.
Figure 71:
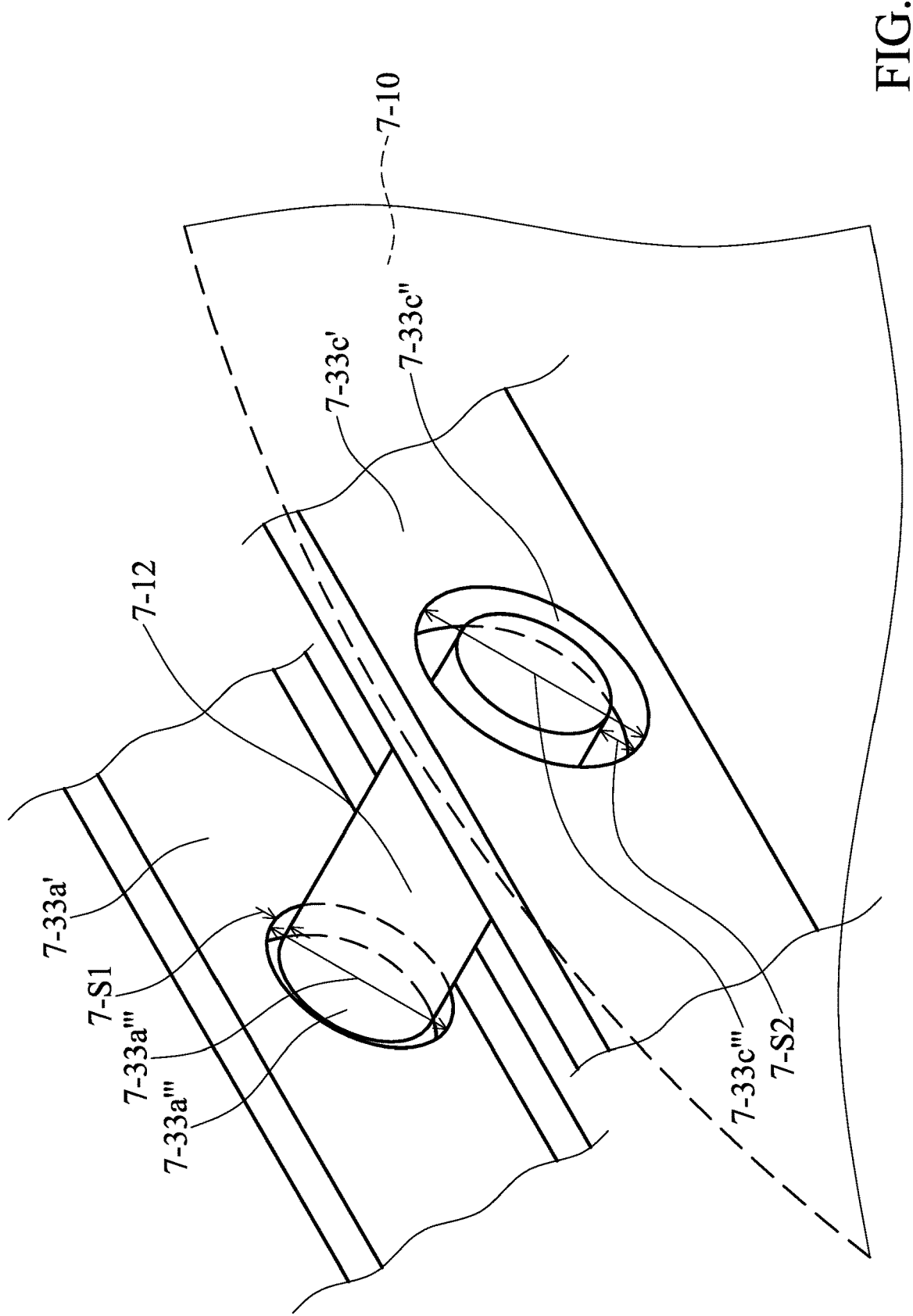
FIG. 71 shows a partial schematic view of a movable part, a first surface, a second surface and the fixing element of the optical element driving mechanism according to another embodiment of the present disclosure.
Figure 72:
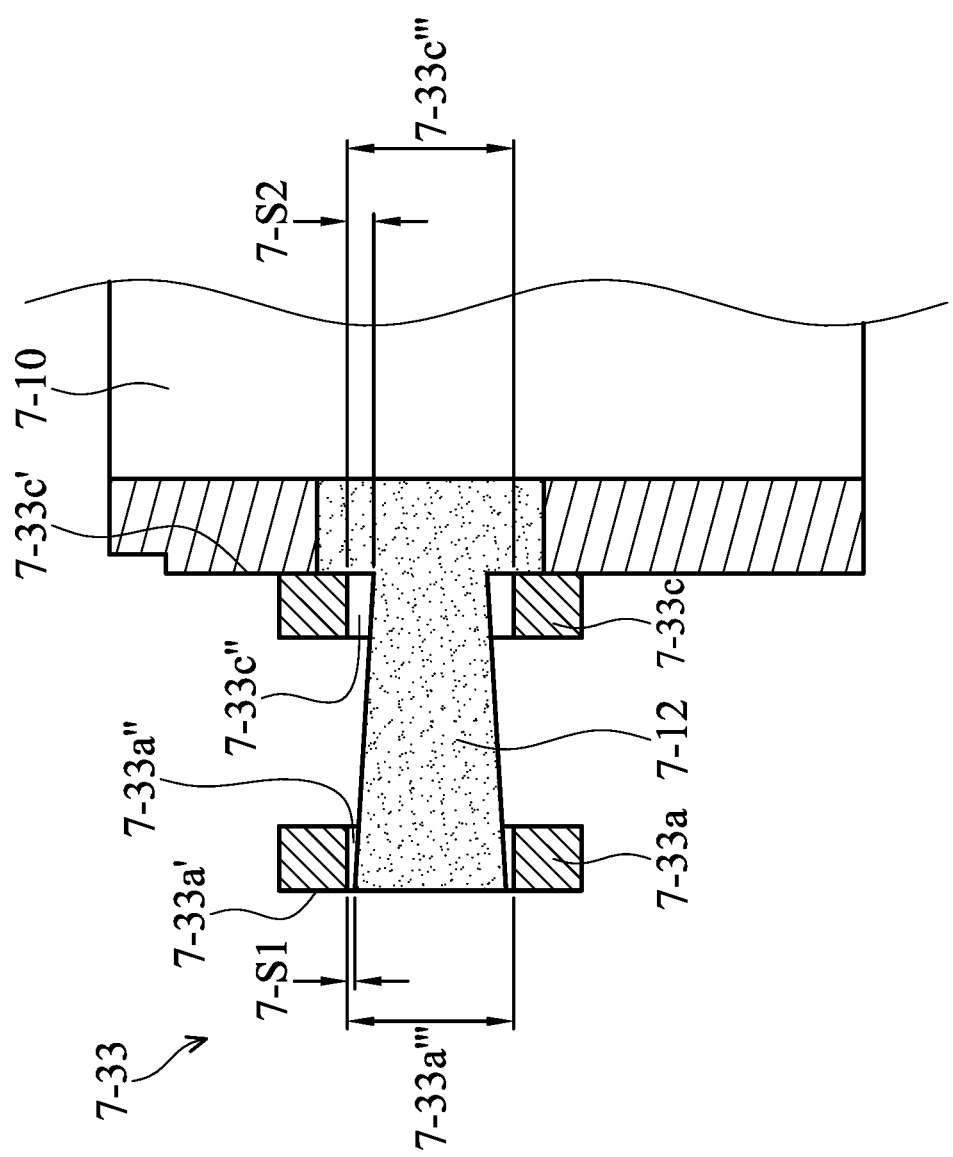
FIG. 72 shows a partial cross-sectional view of the movable part, the first surface, the second surface and the fixing element of the driving assembly of the optical element driving mechanism according to an embodiment of the present disclosure along a line A-A in FIG. 8.

Please refer to FIG. 70, the first part 7-33a of the connecting part 7-33 has a first surface 7-33a', and the second part 7-33c has a second surface 7-33c'. The first surface 7-33a' faces away from the movable part 7-10, and the second surface 7-33c' faces the movable part 7-10. The first part 7-33a also includes a first opening 7-33a", and the second part 7-33c also includes a second opening 7-33c". Generally speaking, the first opening 7-33a" and the second opening 7-33c" may be circular openings. However, the shapes of the first opening 7-33a" and the second opening 7-33c" may be other, non-circular openings according to actual need. The fixing element 7-12 of the movable part 7-10 penetrates the first opening 7-33a" and the second opening 7-33c".

In one embodiment, the size 7-33a''' of the first opening 7-33a" is smaller than the size 7-33c''' of the second opening 7-33c". Therefore, the shortest distance 7-S2 between the second surface 7-33c' and the fixing element 7-12 is longer than the shortest distance 7-S1 between the first surface 7-33a' and the fixing element 7-12. In this way, the opening 7-33c" of the second part 7-33c provides the fixing element 7-12 with more motion space than the first opening 7-33a" of the first part 7-33a does, so that the holder 7-13 will not be affected by the second opening 7-33c" when the holder 7-13 rotationally moves relative to the fixed part 7-20, thereby the angle of the rotational motion of the holder 7-13 is not limited by unnecessary limitations.

Please refer to FIGS. 8 and 9, in another embodiment, the size 7-33a" of the first opening 7-33a" is the same as the size 7-33c' of the second opening 7-33c". However, the size of the fixing element 7-12 is not constant. The fixing element 7-12 has a first size 7-12a at the first opening 7-33a", while the fixing element 7-12 has a second size 7-12b at the second opening 7-33c", and the first size 7-12a is greater than the second size 7-12b. In this configuration, the shortest distance 7-S2 between the second surface 7-33c' and the fixing element 7-12 is longer than the shortest distance 7-S1 between the first surface 7-33a' and fixing element 7-12. In this way, the second opening 7-33c" of the second part 7-33c provides the fixing element 7-12 with more motion space than the first opening 7-33a" of the first part 7-33a does, so that the holder 7-13 will not be affected by the second opening 7-33c" when the holder 7-13 rotationally moves relative to the fixed part 7-20, thereby the angle of the rotational motion of the holder 7-13 is not limited by unnecessary limitations.

Figure 73:
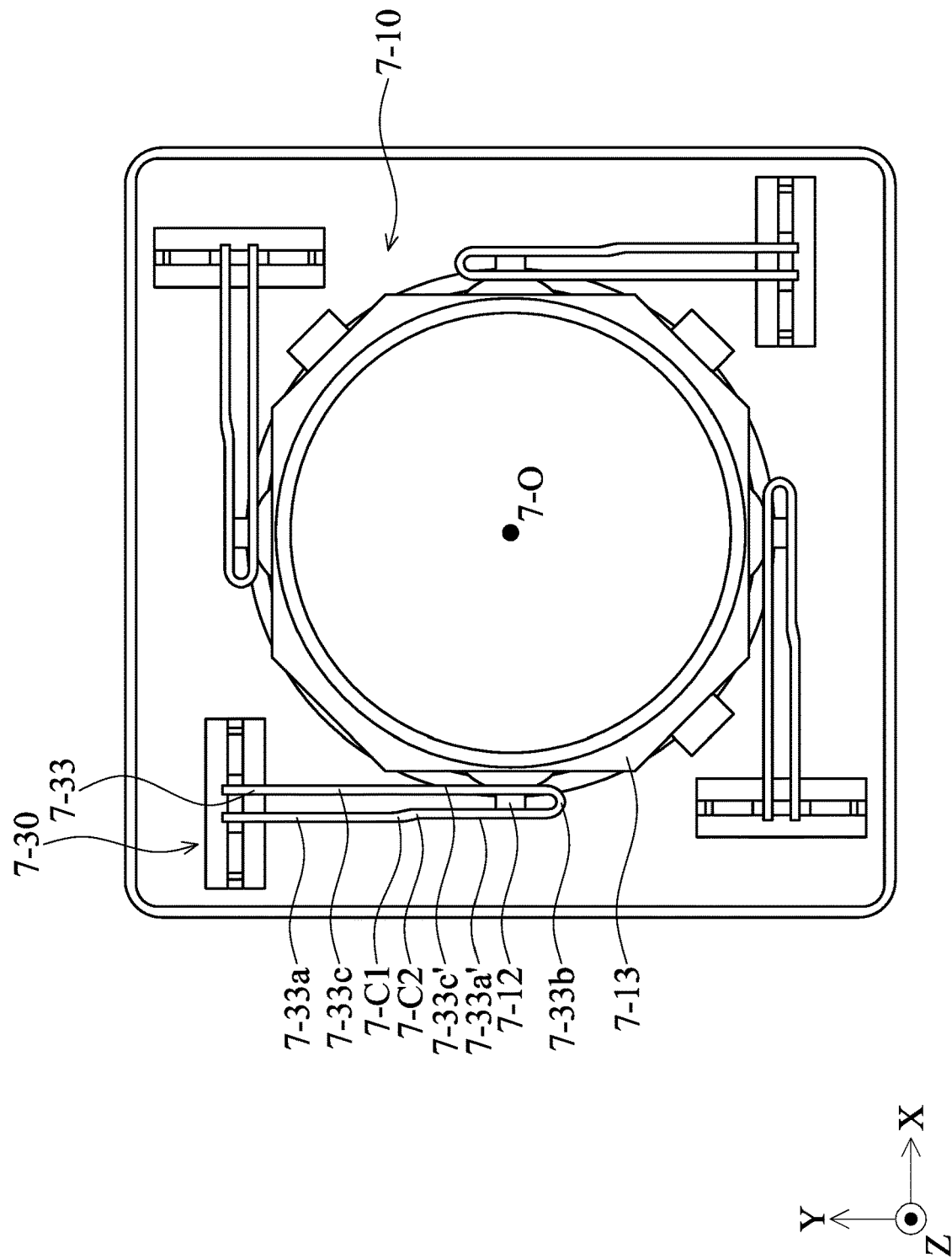
FIG. 73 shows a schematic view of the movable part and the driving assembly of the optical element driving mechanism according to an embodiment of the present disclosure.

Please refer to FIG. 73, after extending along the direction perpendicular to the optical axis 7-O, the second part 7-33c of the connecting element 7-33 of the driving assembly 7-30 is in contact with the holder 7-13 of the movable part 7-10. After extending along the direction perpendicular to the optical axis 7-O, and after bending at the bending point 7-C1 and the bending point 7-C2 of the first part 7-33a, the first part 7-33a of the connecting element 7-33 extends along the direction substantially parallel to the original extending direction and connects to the bending part 7-33b. It should be noted that the first part 7-33a between the bending point 7-C2 and the is bending part 7-33b closer to the holder 7-13 than that between the bending point 7-C1 and the connecting element 7-33, and the first part 7-33a is not in contact with the holder 7-13. Moreover, the fixing element 7-12 and the second surface 7-33c' are in direct contact with the holder 7-13 to make sure that the holder 7-13 comes into contact with the connecting element 7-33 and to movably connect the holder 7-13 to the connecting element 7-33. Since the fixing element 7-12 penetrates the first opening 7-33a" of the first part 7-33a and the second opening 7-33c" of the second part 7-33c (please refer to FIGS. 7, 8 and 9), the first part 7-33a and the second part 7-33c at least partially overlap the fixing part 7-12 when observed along the optical axis. It should be noted that, in the embodiment shown in FIG. 73, the fixing element 7-12 does not protrude from the first part 7-33a. In this way, the unnecessary contact between the fixing element 7-12 and the other elements of the optical element driving mechanism 7-100 can be avoided, and the effect of minimization can be achieved.

Figure 74:
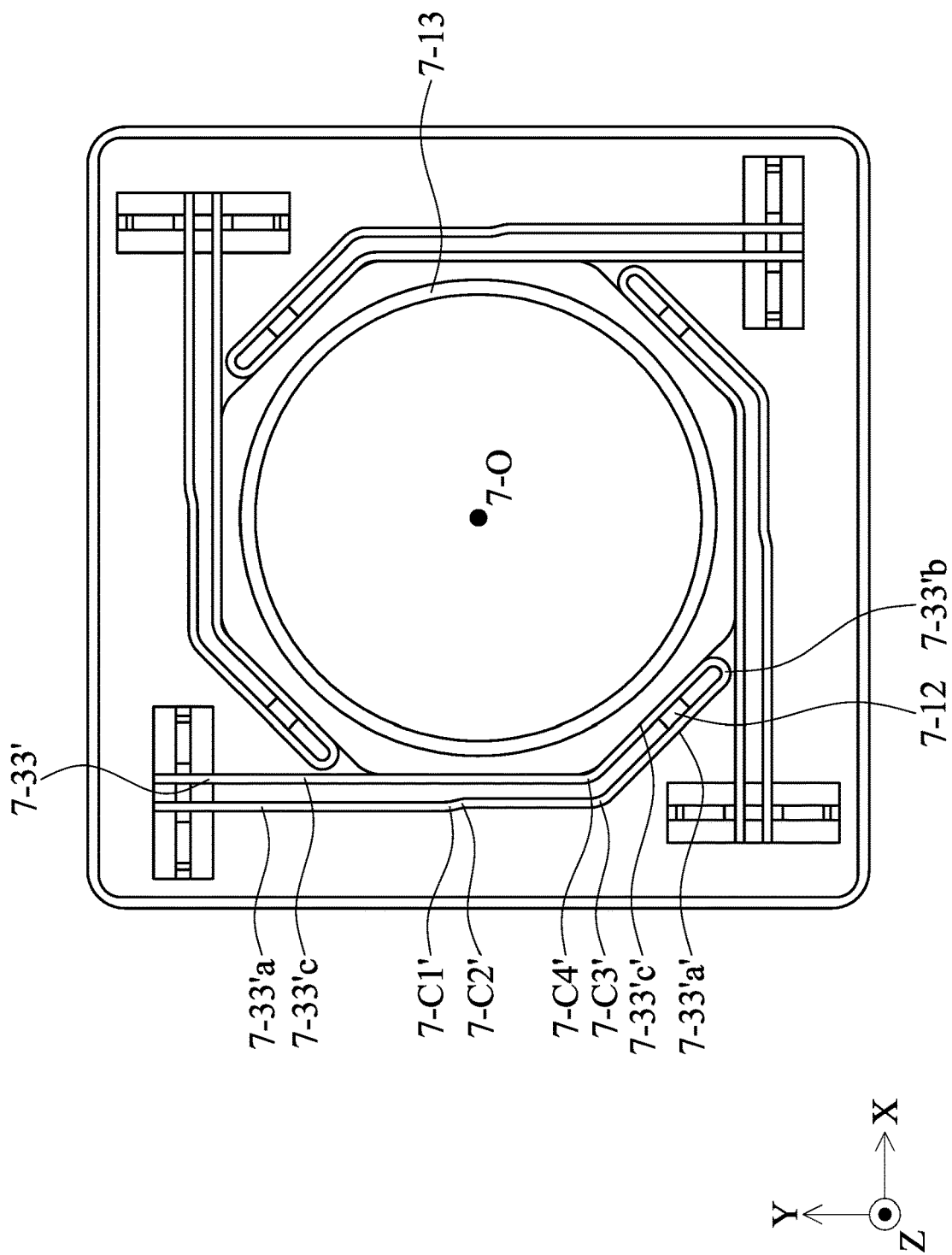
FIG. 74 shows a schematic view of the movable part and the driving assembly of the optical element driving mechanism according to another embodiment of the present disclosure.

Please refer to FIG. 74, in the embodiment shown in FIG. 74, the first part 7-33'a of the connecting element 7-33' has a bending point 7-C1', a bending point 7-C2' and a bending point 7-C3'. The second part 7-33'c is not linear, and the second part 7-33'c has a bending point 7-C4'. After extending along the direction perpendicular to the optical axis 7-O, the second part 7-33'c is in contact with the holder 7-13 of the movable part 7-10, bends an angle at the bending point 7-C4' of the second part 7-33'c, extends again along another direction perpendicular to the optical axis 7-O, keeps in contact with the holder 7-33, and connects to the bending part 7-33'b. After extending along the direction perpendicular to the optical axis 7-O, and after bending at the bending point 7-C1' and the bending point 7-C2' of the first part 7-33'a, the first part 7-33'a of the connecting element 7-33' continues to extend along the direction substantially parallel to the original extending direction of the first part 7-33'a. The first part 7-33'a then continues to extend along the direction substantially parallel to the second part 7-33'c and connects to the bending part 7-33'b after the first part 7-33'a bends at the bending point 7-C3' by the angle substantially the same as the angle at the bending point 7-C4' of the second part 7-33'c. It should be noted that the first part 7-33'a between the bending point 7-C2' and the bending part 7-33'b is closer to the holder 7-13 than that between the bending point 7-C1' and the connecting element 7-33', and the first part 7-33'a is not in contact with the holder 7-13. Compared with the connecting element 7-33 in the embodiment shown in FIG. 73, the connecting element 7-33' in the embodiment shown in FIG. 74 has a greater length, better stress distribution, and higher mechanical strength, and makes it less likely to break during impact. The fixing element 7-12 and the second surface 7-33'c' is in direct contact with the holder 7-13 to make sure that the holder 7-13 comes into contact with the connecting element 7-33 and to movably connect the holder 7-13 to the connecting element 7-33. Since the fixing element 7-12 penetrates the first opening 7-33'a" of the first part 7-33'a and the second opening 7-33'c" of the second part 7-33'c (similar to the embodiments shown in FIGS. 7, 8 and 9), the first part 7-33'a and the second part 7-33'c at least partially overlap the fixing part 7-12 when observed along the optical axis 7-O. It should be noted that, in the embodiment shown in FIG. 74, the fixing element 7-12 does not protrude from the first part 7-33'a. In this way, the unnecessary contact between the fixing element 7-12 and the other elements of the optical element driving mechanism 7-100 can be avoided, and the effect of minimization can be achieved.

Figure 75:
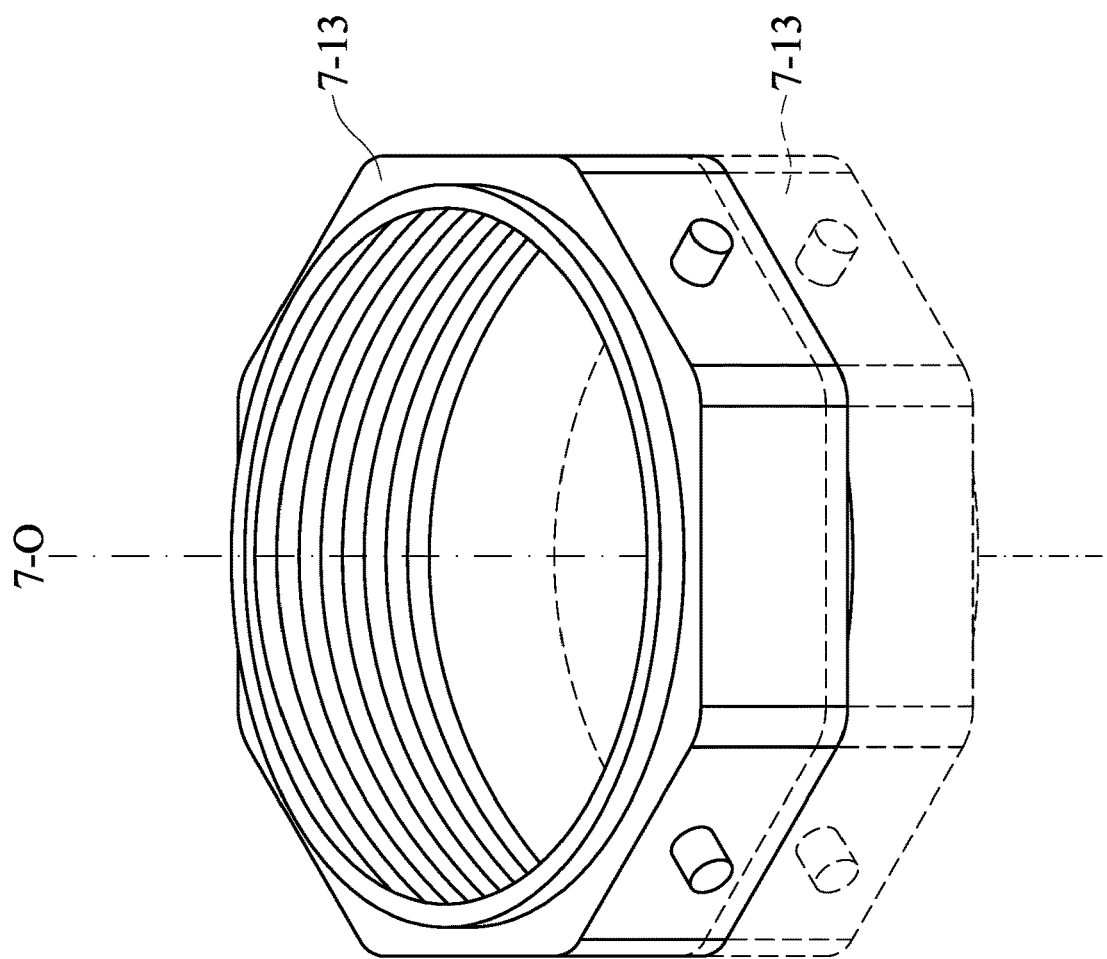
FIG. 75 shows a schematic view of the translational motion of a holder of the movable part of the optical element driving mechanism according to an embodiment of the present disclosure.
Figure 76:
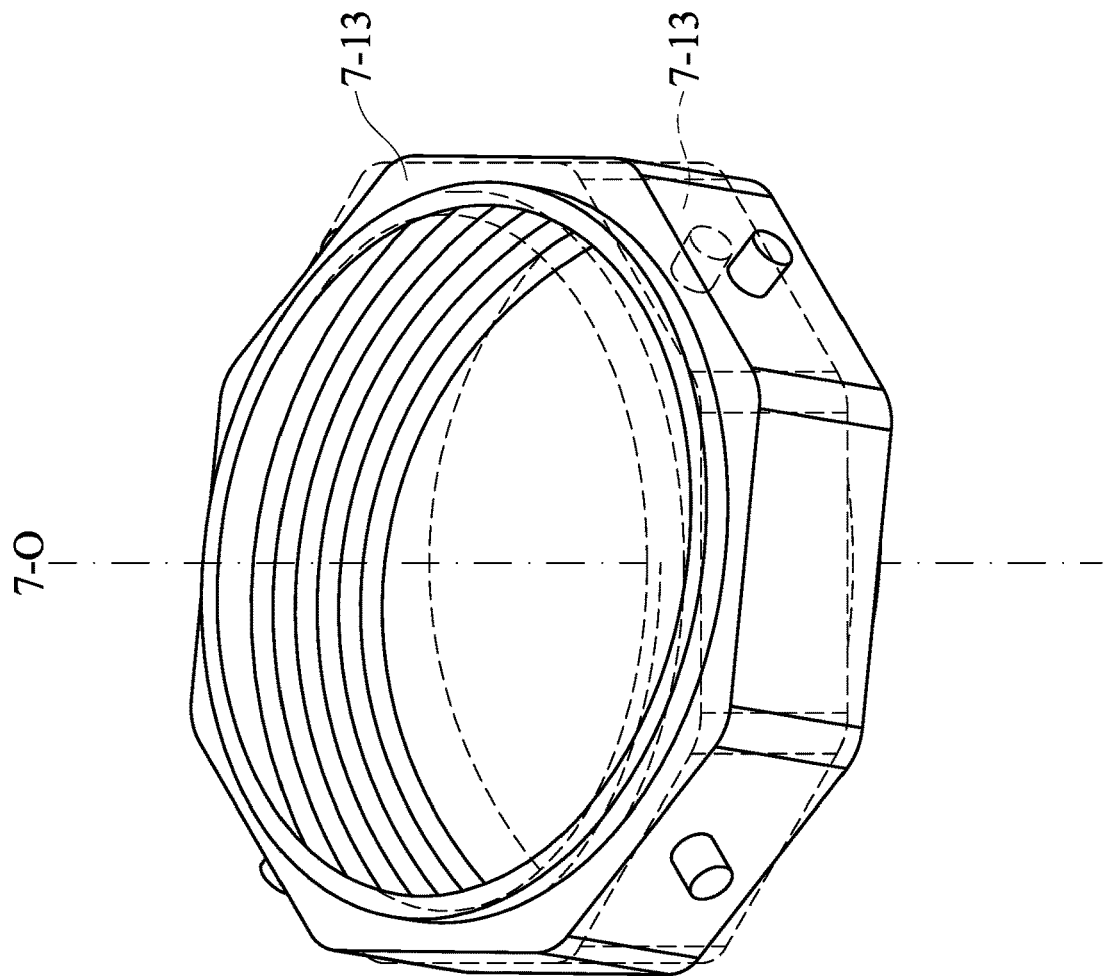
FIG. 76 shows a schematic view of the rotational motion of the holder of the movable part of the optical element driving mechanism according to an embodiment of the present disclosure.
Figure 77:
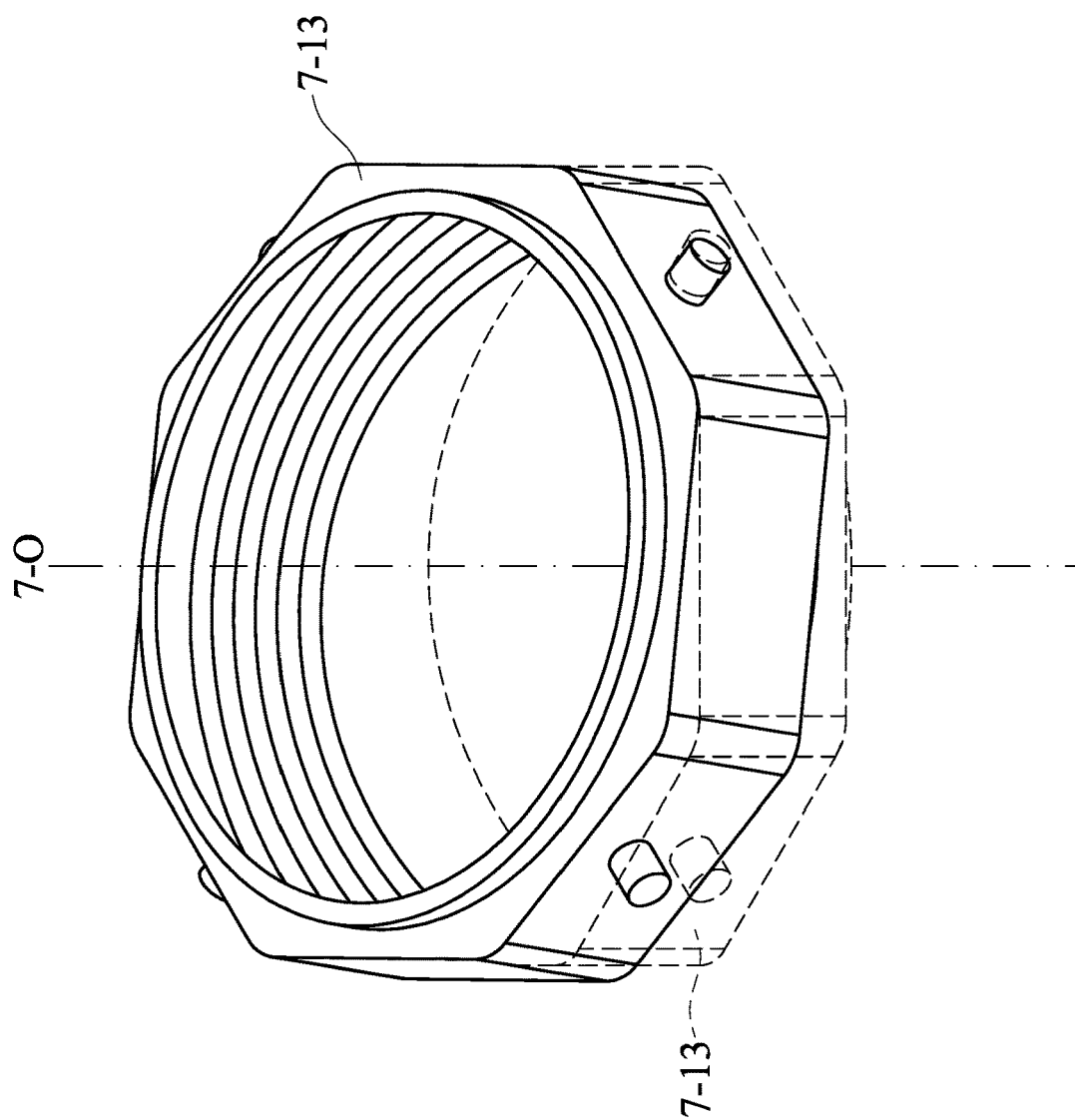
FIG. 77 shows a schematic view of the translational motion and the rotational motion of the holder of the movable part of the optical element driving mechanism according to an embodiment of the present disclosure.

Please refer to FIG. 75, the driving assembly 7-30 drives the holder 7-13 of the movable part 7-10 to move along the direction parallel to the optical axis 7-O relative to the fixed part 7-20 when the displacements of each one of the piezo-electric elements 7-31 and each one of the corresponding deformation elements 7-32 of the driving assembly 7-30 are the same, and the translational motion of the holder 7-13 of the movable part 7-10 is achieved, wherein the dash line indicates the initial position of the holder 7-13. Please refer to FIG. 76, in one case, the driving assembly 7-30 drives the holder 7-13 of the movable part 7-10 to rotate about the direction perpendicular to the optical axis 7-O relative to the fixed part 7-20 when the displacements of the piezoelectric elements 7-31 and the deformation elements 7-32 of the driving assembly 7-30 are different, and the rotational motion of the holder 7-13 of the movable part 7-10 is achieved, wherein the dash line indicates the initial position of the holder 7-13. Please refer to FIG. 77, in another case, the driving assembly 7-30 drives the holder 7-13 of the movable part 7-10 move along the direction parallel to the optical axis 7-O and to rotate about the direction perpendicular to the optical axis 7-O relative to the fixed part 7-20 when the displacements of the piezoelectric elements 7-31 and the deformation elements 7-32 of the driving assembly 7-30 are different, and the translational motion and the rotational motion of the holder 7-13 of the movable part 7-10 is achieved, wherein the dash line indicates the initial position of the holder 7-13.

Figure 78:
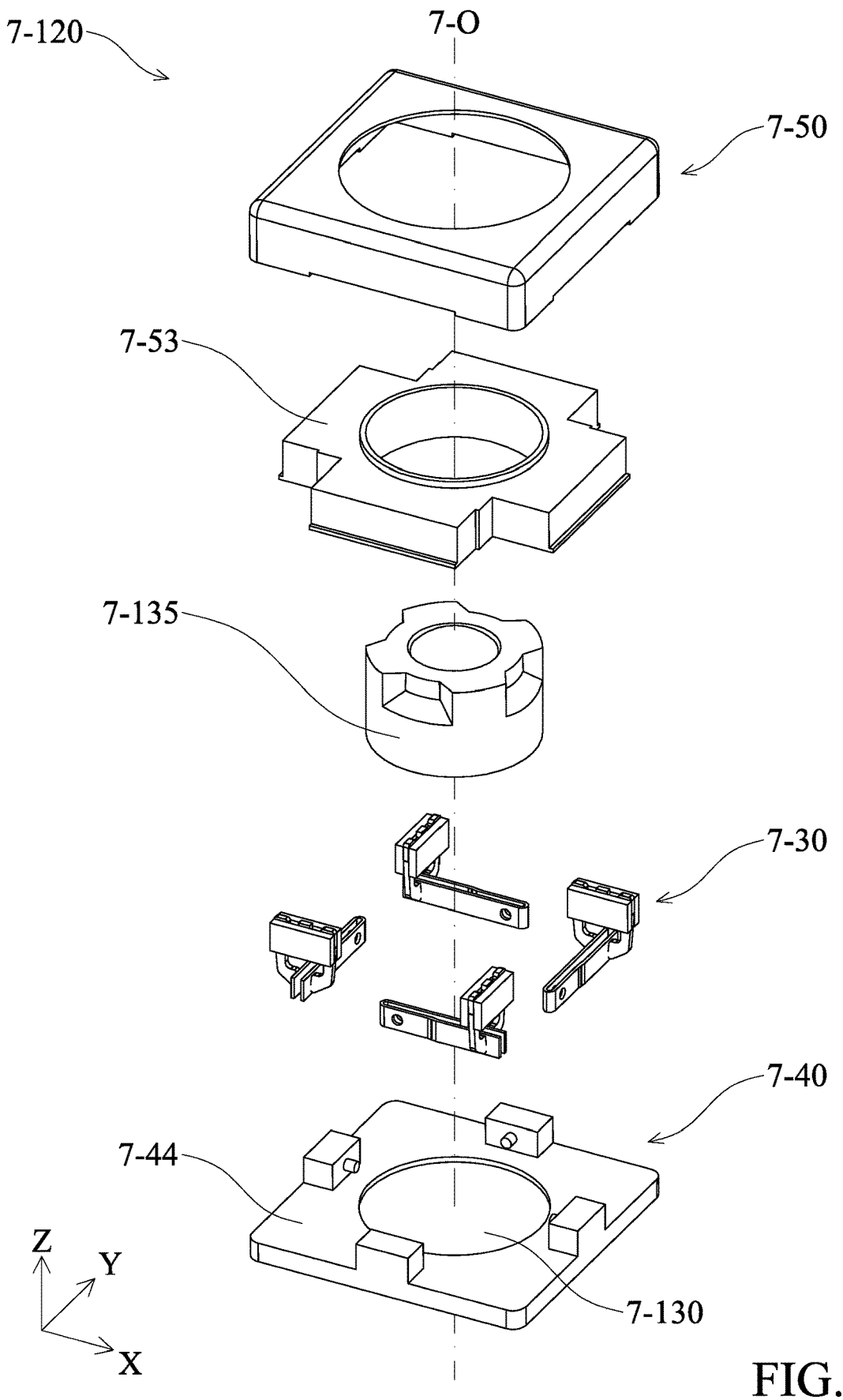
FIG. 78 shows an exploded view of the optical element driving mechanism and the optical element according to an embodiment of the present disclosure.

Please refer to FIG. 78, an optical element driving mechanism 7-120 of another embodiment of the present disclosure includes a movable part 7-40, a fixed part 7-50 and a driving assembly 7-30. Compared with the optical element driving mechanism 7-100, the movable part 7-40 of the optical element driving mechanism 7-120 has no holders, but the movable part 7-40 further includes an image sensor holder 7-44. The fixed part 7-50 of the optical element driving mechanism 7-120 has no image sensor holders, but the fixed part 7-50 further includes a holder 7-53. The features of the driving assembly 7-30 of the optical element driving mechanism 7-120 are the same as the features of the driving assembly 7-30 of the optical element driving mechanism 7-100. The main structures, functions and configuration of the optical element driving mechanism 7-120 same as the configuration of the elements of the optical element driving mechanism 7-100 are not repeated again. In the present embodiment, the optical element 7-130 is an imaging sensor disposed on the image sensor holder 7-44, while the optical element 7-135 is an ordinary lens. That is, in the present embodiment, the holder 7-53 does not move relative to the fixed part 7-50, the image sensor holder 7-44 of the movable part 7-40 moves relative to the fixed part 7-50 by means of the driving assembly 7-30, thereby driving the image sensor to move relative to the fixed part 7-50.

Figure 79:
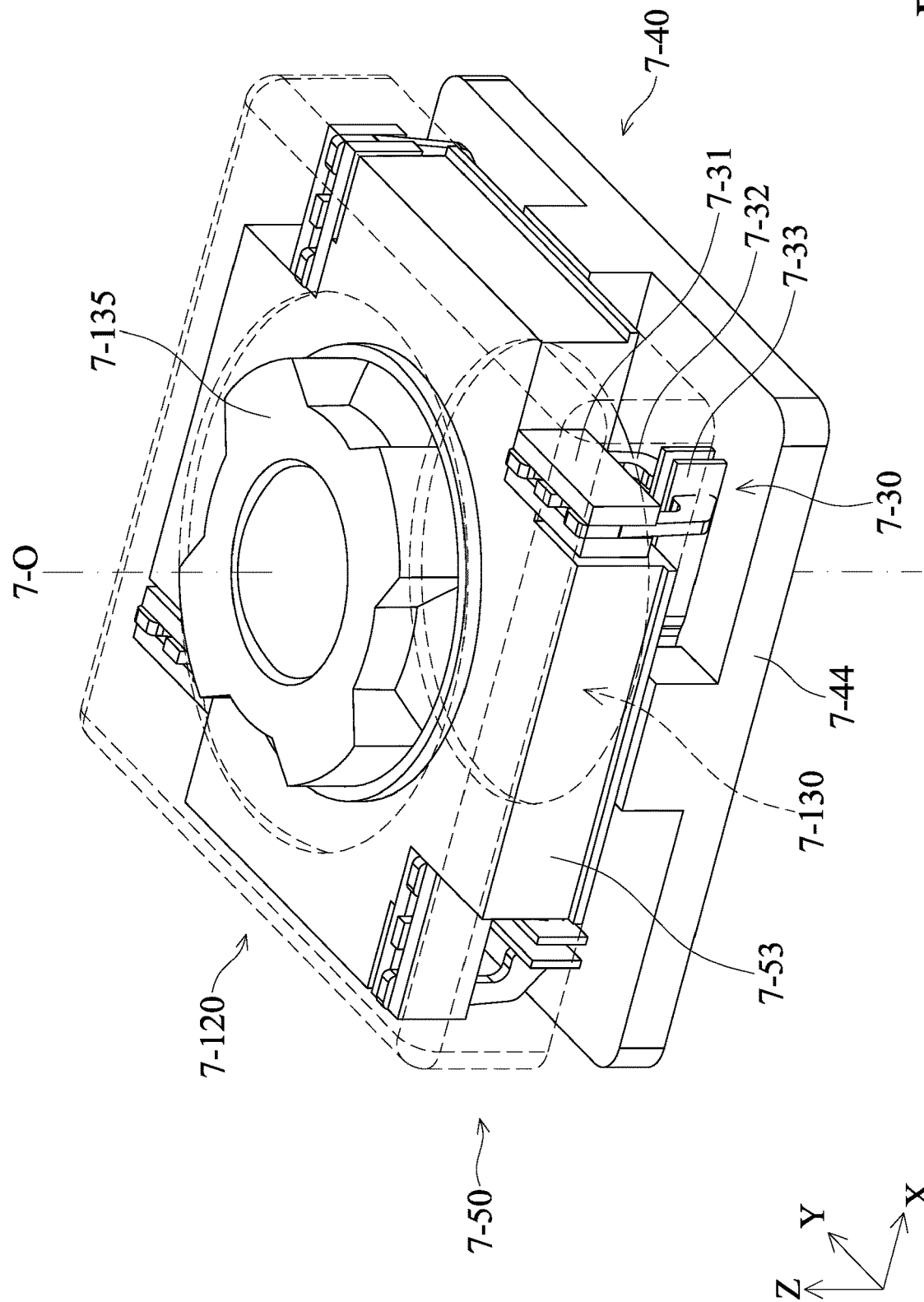
FIG. 79 shows a perspective view of the optical element driving mechanism and the optical element according to an embodiment of the present disclosure, wherein the outer frame is omitted.

Please refer to FIG. 79, the piezoelectric element 7-31 of the driving assembly 7-30 is in contact with the holder 7-53, and the connecting element 7-33 of the driving assembly 7-30 is in contact with the image sensor holder 7-44. That is, when the piezoelectric materials of the piezoelectric element 7-31 deform and make the deformation element 7-32 deforms by receiving the external current, the connecting element 7-33 moves along with the deformation element 7-32, thereby driving the image sensor holder 7-44 and the optical element 7-130 to move along the optical axis 7-O relative to the fixed part 7-50. Likewise, each one of the piezoelectric elements 7-31 and each one of the deformation elements 7-32 of the driving assembly 7-30 may move independently to enable the image sensor holder 7-44 of the movable part 7-40 to translate, rotate, or simultaneously rotate and translate. In this way, the light entering the optical element 7-135 and reaching the optical element 7-130 is subject to a zoom or focus by the translation, rotation, or simultaneous rotation and translation of the image sensor holder 7-44.

Figure 80:
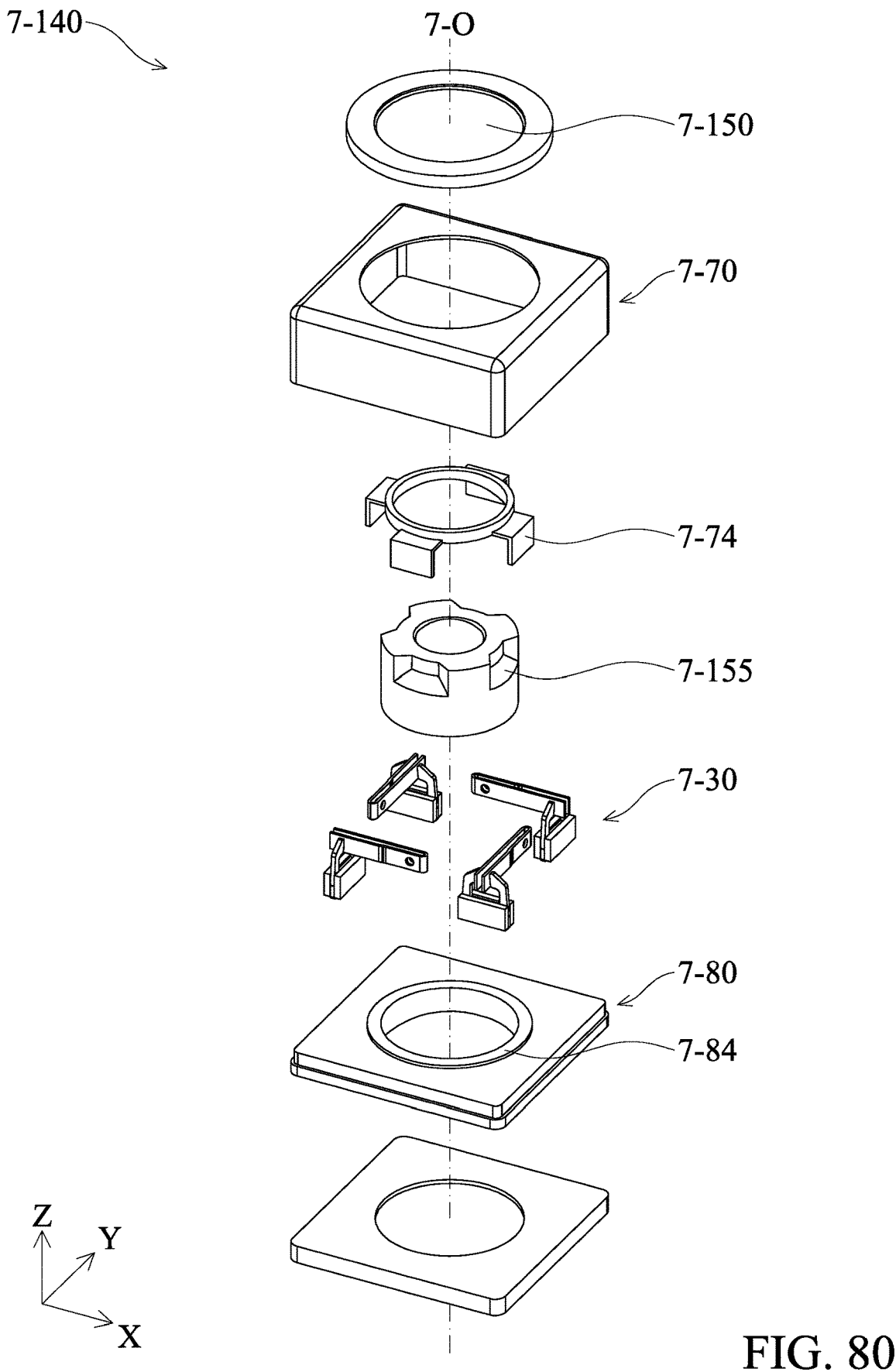
FIG. 80 shows an exploded view of the optical element driving mechanism and the optical element according to an embodiment of the present disclosure.

Please refer to FIG. 80, an optical element driving mechanism 7-140 of another embodiment of the present disclosure includes a movable part 7-70, a fixed part 7-80 and a driving assembly 7-30. Compared with the optical element driving mechanism 7-100, the movable part 7-70 of the optical element driving mechanism 7-140 has no holders, but the movable part 7-70 further includes a squeezing ring 7-74. The fixed part 7-80 further includes a holder 7-84. That is, in the present embodiment, the holder 7-84 is fixed on the fixed part 7-80. The features of the driving assembly 7-30 of the optical element driving mechanism 7-140 are the same as the features of the driving assembly 7-30 of the optical element driving mechanism 7-100. The main structures, functions and configuration of the optical element driving mechanism 7-140 same as the configuration of the elements of the optical element driving mechanism 7-100 are not repeated again. In the present embodiment, the optical element 7-150 is a liquid lens, while the optical element 7-155 is an ordinary lens.

Figure 81:
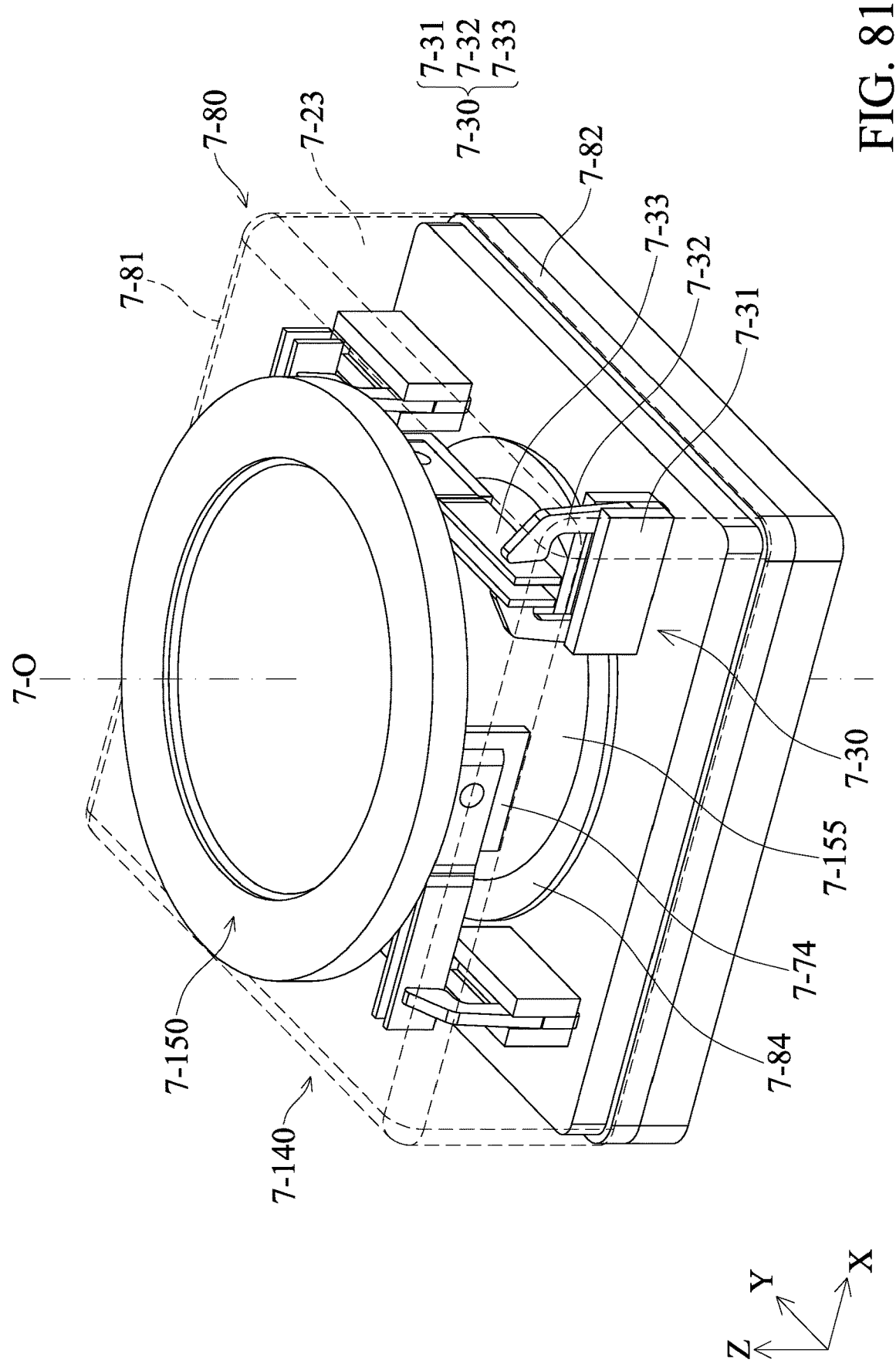
FIG. 81 shows a perspective view of the optical element driving mechanism and the optical element according to an embodiment of the present disclosure, wherein the outer frame is shown as a dash-line.

Please refer to FIG. 81, the liquid lens 7-150 is disposed on the outer frame 7-81 of the fixed part 7-80, and the squeezing ring 7-74 is disposed below the liquid lens 7-150. In the present embodiment, the driving assembly 7-30 is disposed on the fixed part 7-80, and the driving assembly 7-30 is in contact with the movable part 7-70. More specifically, the piezoelectric element 7-31 of the driving assembly 7-30 is in contact with the base 7-82 of the fixed part 7-80, and the connecting element 7-33 of the driving assembly 7-30 is in contact with the squeezing ring 7-74 of the movable part 7-70. When the piezoelectric materials of the piezoelectric element 7-31 deform and make the deformation element 7-32 deforms by receiving the external current, the connecting element 7-33 moves along with the deformation element 7-32, thereby driving the squeezing ring 7-74 to move along the optical axis 7-O relative to the fixed part 7-80, and the squeezing ring 7-74 squeezes the liquid lens 7-150. Likewise, each one of the piezoelectric elements 7-31 and each one of the deformation elements 7-32 may move independently so that the squeezing ring 7-74 may squeeze the liquid lens 7-150 in different ways.

Figure 82:
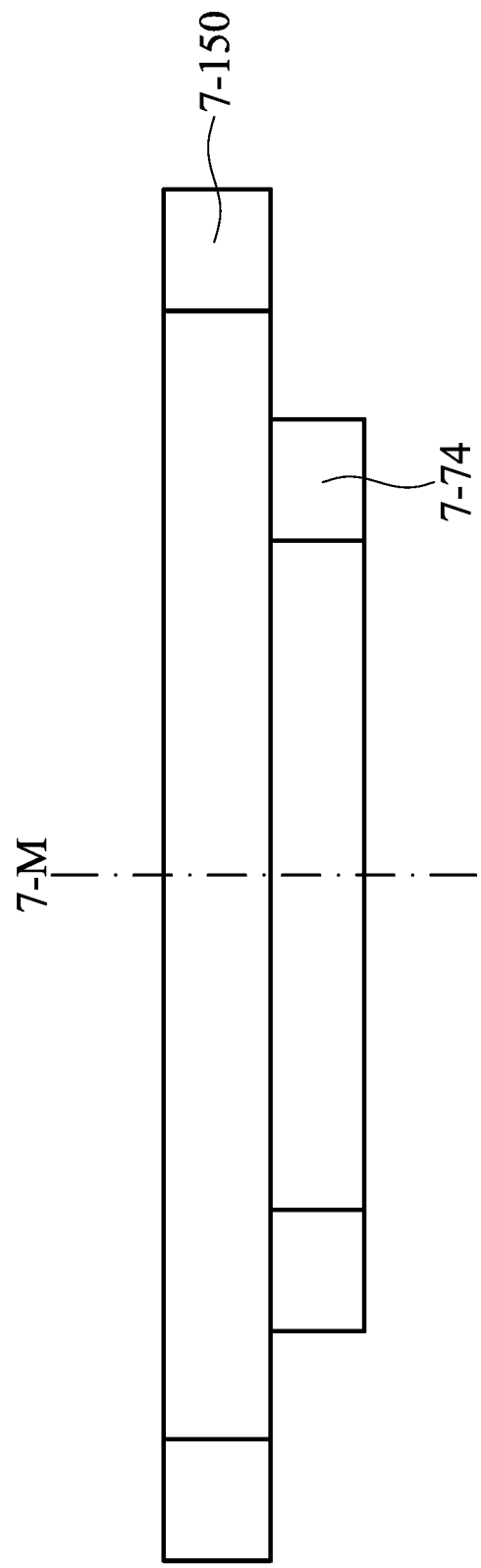
FIG. 82 shows a schematic view of the optical element and a squeezing ring of the optical element driving mechanism according to an embodiment of the present disclosure, wherein the squeezing ring is not squeezing the optical element.
Figure 83:
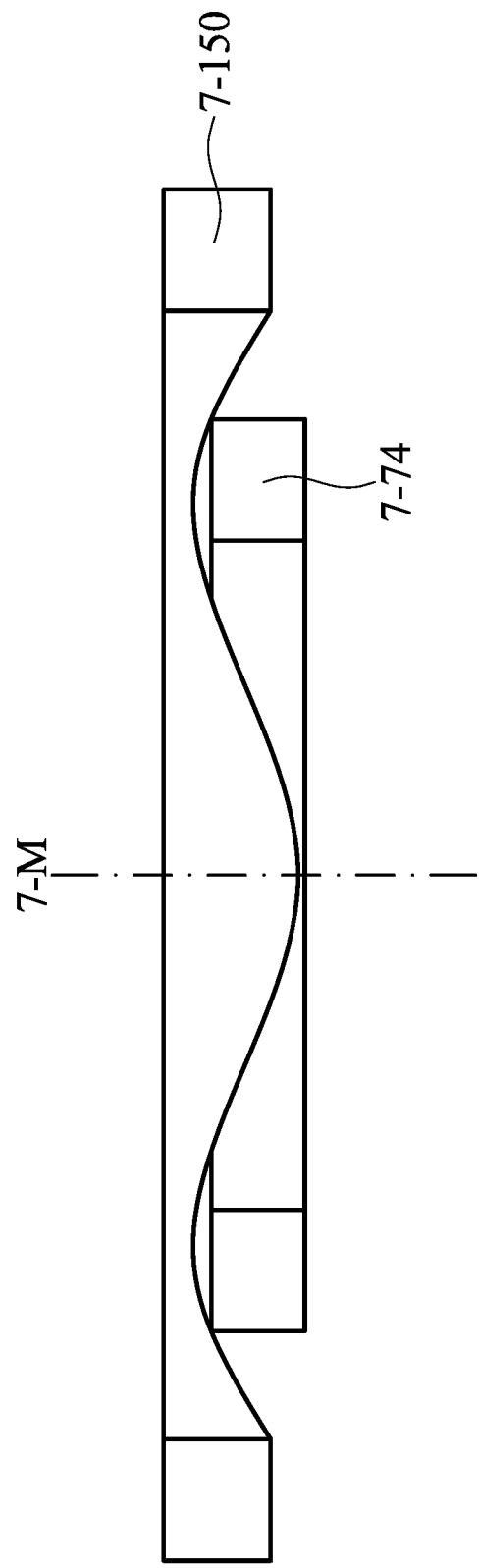
FIG. 83 shows a schematic view of the optical element and the squeezing ring of the optical element driving mechanism according to an embodiment of the present disclosure, wherein the squeezing ring is squeezing the optical element with an even force.
Figure 84:
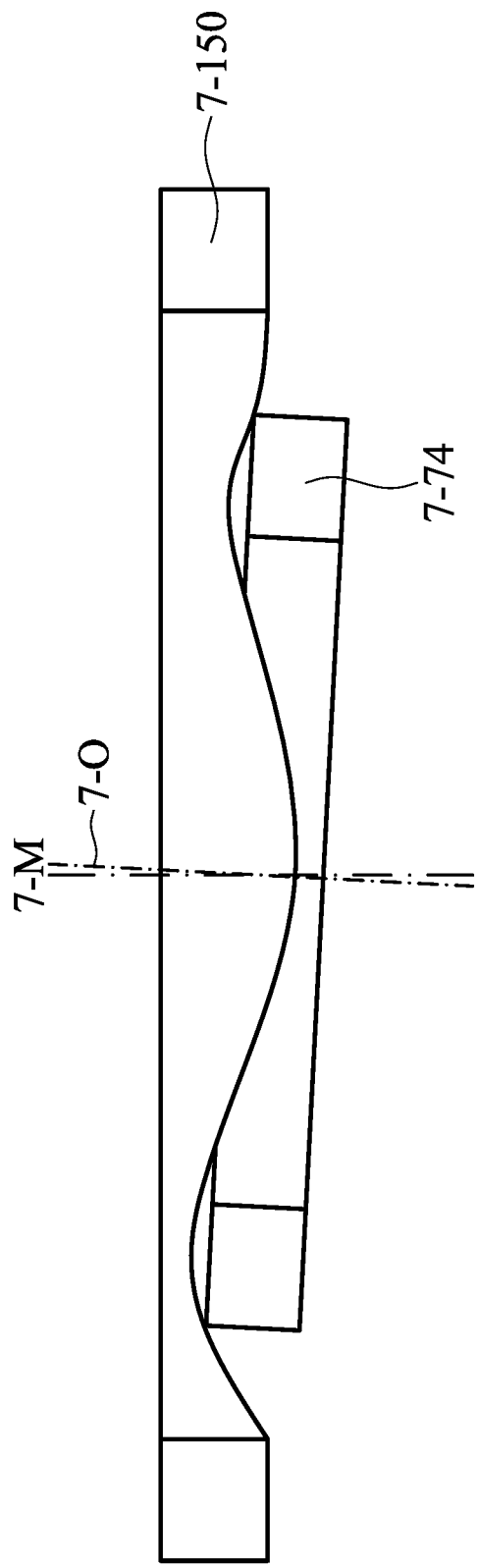
FIG. 84 shows a schematic view of the optical element and the squeezing ring of the optical element driving mechanism according to an embodiment of the present disclosure, wherein the squeezing ring is squeezing the optical element with an uneven force.

Please refer to FIG. 82, when the deformation element 7-32 does not deform (not shown in the FIG.), the squeezing ring 7-74 does not squeeze the liquid lens 7-150, the liquid lens 7-150 does not deform, the curvature of the liquid lens 7-150 is not changed, and the mirror centerline 7-M of the liquid lens 7-150 is not changed (that is, parallel to the optical axis 7-O). Please refer to FIG. 83, when the deformation element 7-32 deforms in uniform (not shown in the FIG.), and when the squeezing ring 7-74 squeezes the liquid lens 7-150 with an uniform force, the liquid lens 7-150 deforms, the curvature is changed, and the mirror centerline 7-M of the liquid lens 7-150 is not changed (that is, parallel to the optical axis 7-0). Please refer to FIG. 84, when the deformation element 7-32 deforms non-uniformly (not shown in the FIG.), and when the squeezing ring 7-74 squeezes the liquid lens 7-150 with a non-uniform force, the liquid lens 7-150 deforms, the curvature is changed, and the mirror centerline 7-M of the liquid lens 7-150 is changed (that is, not parallel to the optical axis 7-O). Therefore, the squeezing ring 7-74 enables the liquid lens to deform differently by the different deformation of the deformation element 7-32 to achieve the effect of optical focusing and optical image stabilization.

The eighth embodiment group.

Figure 85:
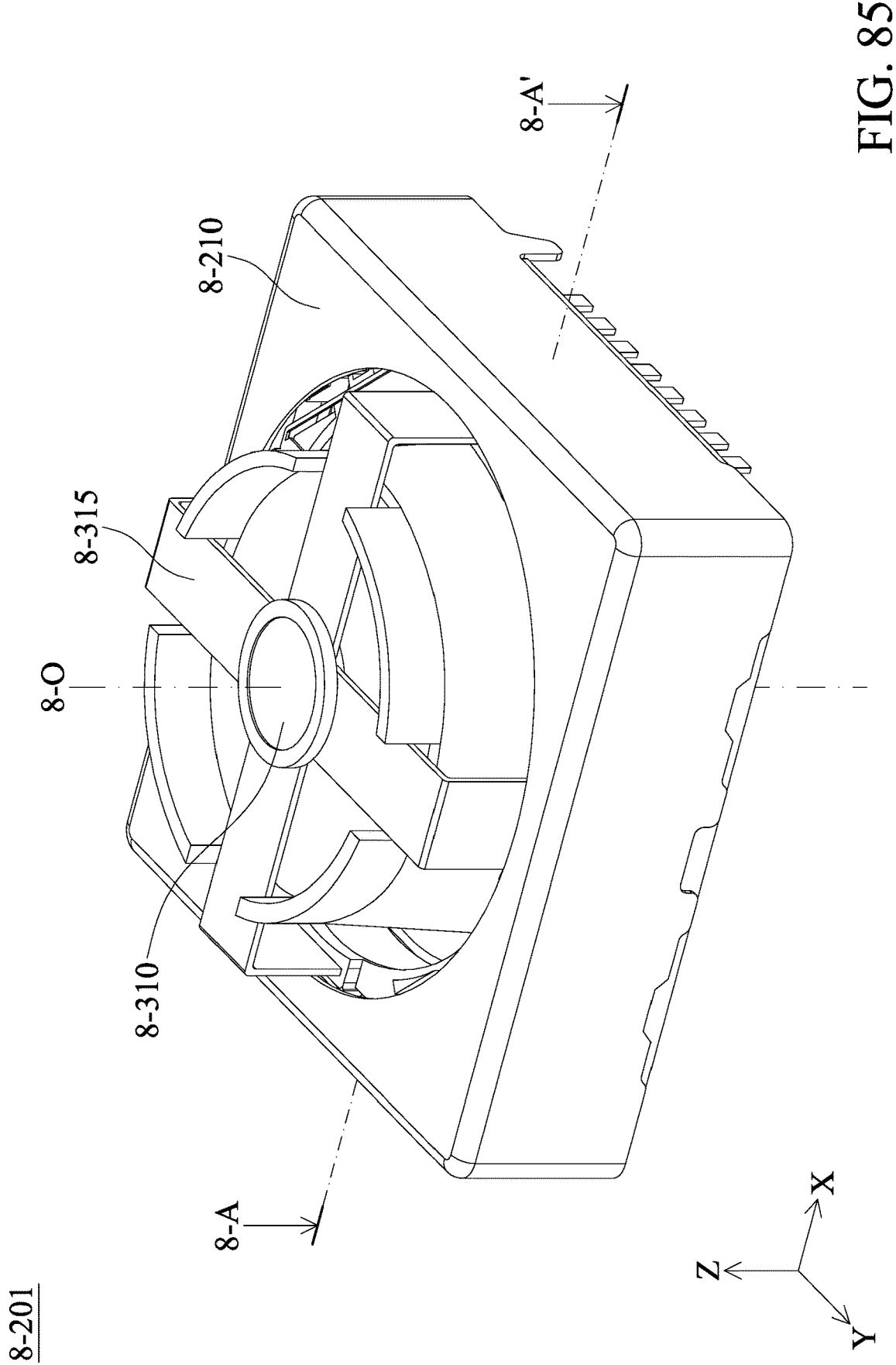
FIG. 85 shows a perspective view of a reflective element driving module in accordance with an embodiment of this disclosure.
Figure 86:
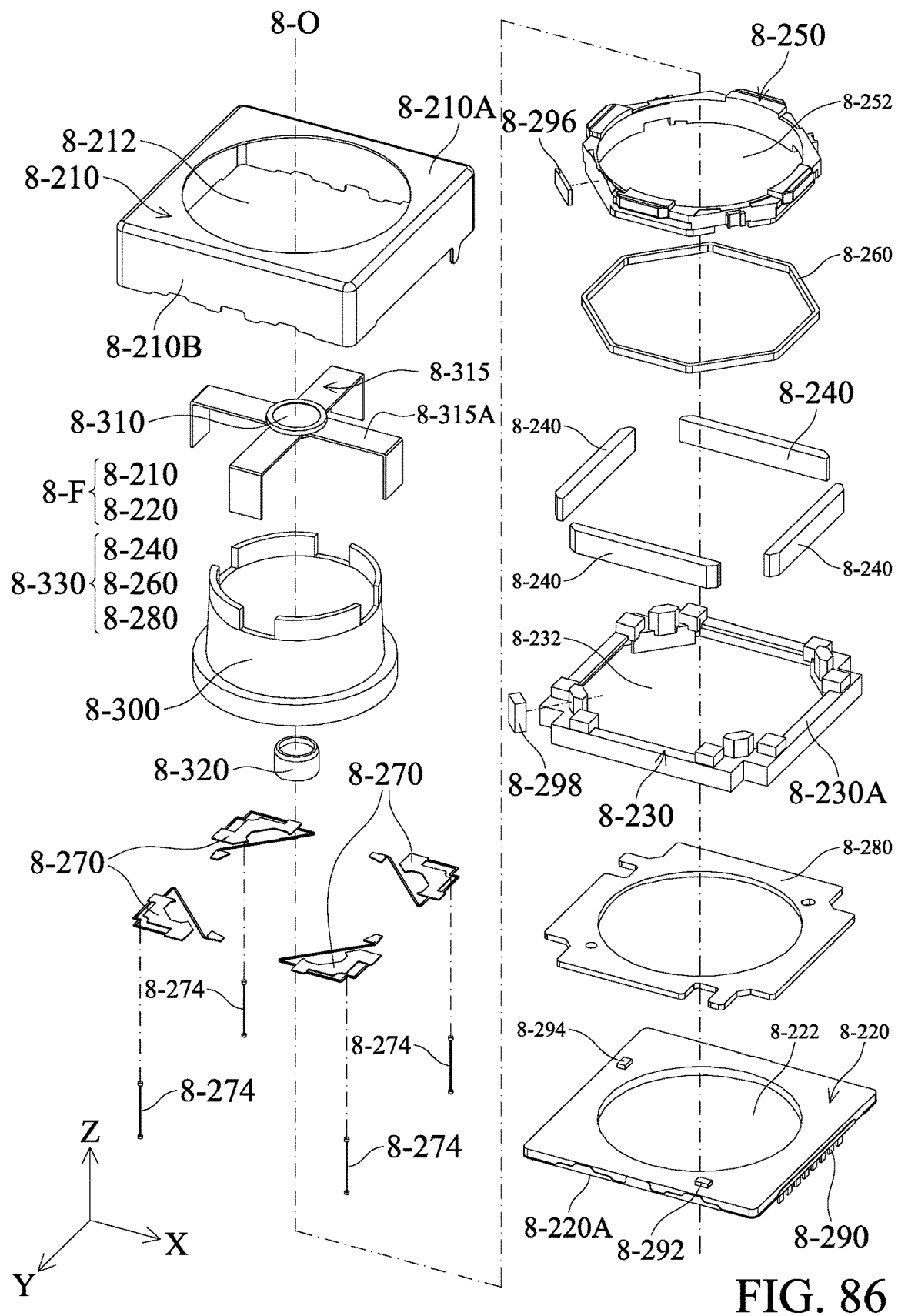
FIG. 86 shows an exploded view of a reflective element driving module in accordance with an embodiment of this disclosure.

Refer to FIG. 85 and FIG. 86. FIG. 85 shows a perspective view of a reflective element driving module 8-201 in accordance with an embodiment of this disclosure, and FIG. 86 shows an exploded view of the reflective element driving module 8-201 in accordance with an embodiment of FIG. 85 of this disclosure. As shown in FIG. 85 and FIG. 86, in the present embodiment, the reflective element driving module 8-201 has a rectangular structure with a height of less than 10 cm, and mainly includes a top case 8-210, a base 8-220, a frame 8-230, four magnets 8-240, a holder 8-250, a coil 8-260, an elastic element 8-270, four suspension wires 8-274, a driving board 8-280, a circuit board 8-290, a first magnetic field sensing element 8-292, and a second magnetic field sensing element 8-294, a third magnetic field sensing element 8-296, a first reflective element 8-300, a second reflective element 8-310, a bracket 8-315, and an optical element 8-320. The reflective element driving module 8-201 reflects an incident light having an optical axis 8-O through the first reflective element 8-300 and the second reflective element 200 inside the reflective element driving module 8-201, and the incident light is finally received at the optical element 8-320.

The top case 8-210 has a hollow structure, and can be combined with the base 8-220 to form a housing 8-F of the reflective element driving module 8-201, wherein the top case 8-210 constitutes a top wall 8-210A and four sidewalls 8-210B of the housing 8-F, and the base 8-220 constitutes a bottom wall 8-220A of the housing 8-F. It should be understood that the top case 8-210 and the base 8-220 are formed with a top case opening 8-212 and a base opening 8-222, respectively. The center of the top case opening 8-212 corresponds to the optical axis 8-O, and the base opening 8-222 corresponds to an image-sensing element (not shown in the figures) disposed outside the reflective element driving module 8-201. External light may enter the top case 8-210 through the top case opening 8-212, and is received by the image-sensing element (not shown in the figures) after passing through the optical element 8-320 and the base opening 8-222, so as to generate a digital image signal.

The frame 8-230 has an opening 8-232 and four frame edges 8-230A, wherein the frame edges 8-230A correspond to the four sidewalls 8-210B of the housing 8-F respectively. The shape of the magnets 8-240 may be a long strip, and the four magnets 8-240 may be fixed to the four frame edges 8-230A. In some embodiments, the magnets 8-240 may have other different shapes, and the four magnets 8-240 may be fixed to four corners of the frame 8-230.

The holder 8-250 has a hollow structure and has a through hole 8-252. The coil 8-260 is wound around the outer peripheral surface of the holder 8-250. In this embodiment, the holder 8-250 is movably disposed in the frame 8-230. More specifically, the holder 8-250 can be suspended in the center of the frame 8-230 by an elastic element 8-270 made of metal. When a current is applied to the coil 8-260, the coil 8-260 can act with the magnetic field of the magnets 8-240 to generate an electromagnetic force to drive the holder 8-250 to move along a Z axis with respect to the frame 8-230.

It should be understood that the outer peripheral portion of the elastic element 8-270 is connected to the frame 8-230, and the inner peripheral portion of the elastic element 8-270 is connected to the holder 8-250, so that the holder 8-250 can be suspended in the frame 8-230.

One end of the four suspension wires 8-274 is connected to the circuit board 8-290, and the other end is connected to the elastic element 8-270, so that the suspension wires 8-274 can suspend the frame 8-230 and the holder 8-250 in the housing 8-F. The suspension wires 8-274 may comprise a metal material.

The driving board 8-280, e.g., a printed circuit board, has four driving coils (not shown) therein. The positions of the four driving coils respectively correspond to the positions of the four magnets 8-240. The driving board 8-280 may be affixed to the circuit board 8-290 by adhesion.

It should be understood that the circuit board 8-290 is provided with wiring for transmitting electric signals to the coils 8-260 and the driving coils of the driving board 8-280, and the wiring on the circuit board 8-290 may be electrically connected to the coil 8-260 through the suspension wires 8-274 and the elastic elements 8-270, thereby controlling the movement of the holder 8-250 along a direction parallel to the optical axis 8-O. In this embodiment, the circuit board 8-290 is embedded in the base 8-220.

In this embodiment, a first magnetic field sensing element 8-292 and a second magnetic field sensing element 8-294, which are electrically connected to the circuit board 8-290, are respectively installed on different sides of the base 8-220. The two magnetic field sensing elements 8-292 and 8-294 may be Hall effect sensor, magnetoresistive sensor (MR sensor), or magnetic flux sensor (Fluxgate), etc., which can be used to know the position offset of the frame 8-230 and the holder 8-250 with respect to the base 8-220 in the X direction and the Y direction by detecting the magnetic field variation of the magnets 8-240 on the frame 8-230. In addition, in this embodiment, a third magnetic field sensing element 8-296 is disposed on the holder 8-250 and a sensing magnet 8-298 is disposed on the frame 8-230 to detect a position offset in the Z direction.

It should be noted in particular that the circuit board 8-290 can generate and provide electrical signals to the driving coils of the driving board 8-280, and the driving coils can act with the magnets 8-240 on the frame 8-230 to generate an electromagnetic force to move the frame 8-230 along a direction perpendicular to the optical axis 8-O (parallel to the XY plane) to compensate for the position offset described above. As a result, the optical image stabilization (OIS) function is achieved.

Figure 87:
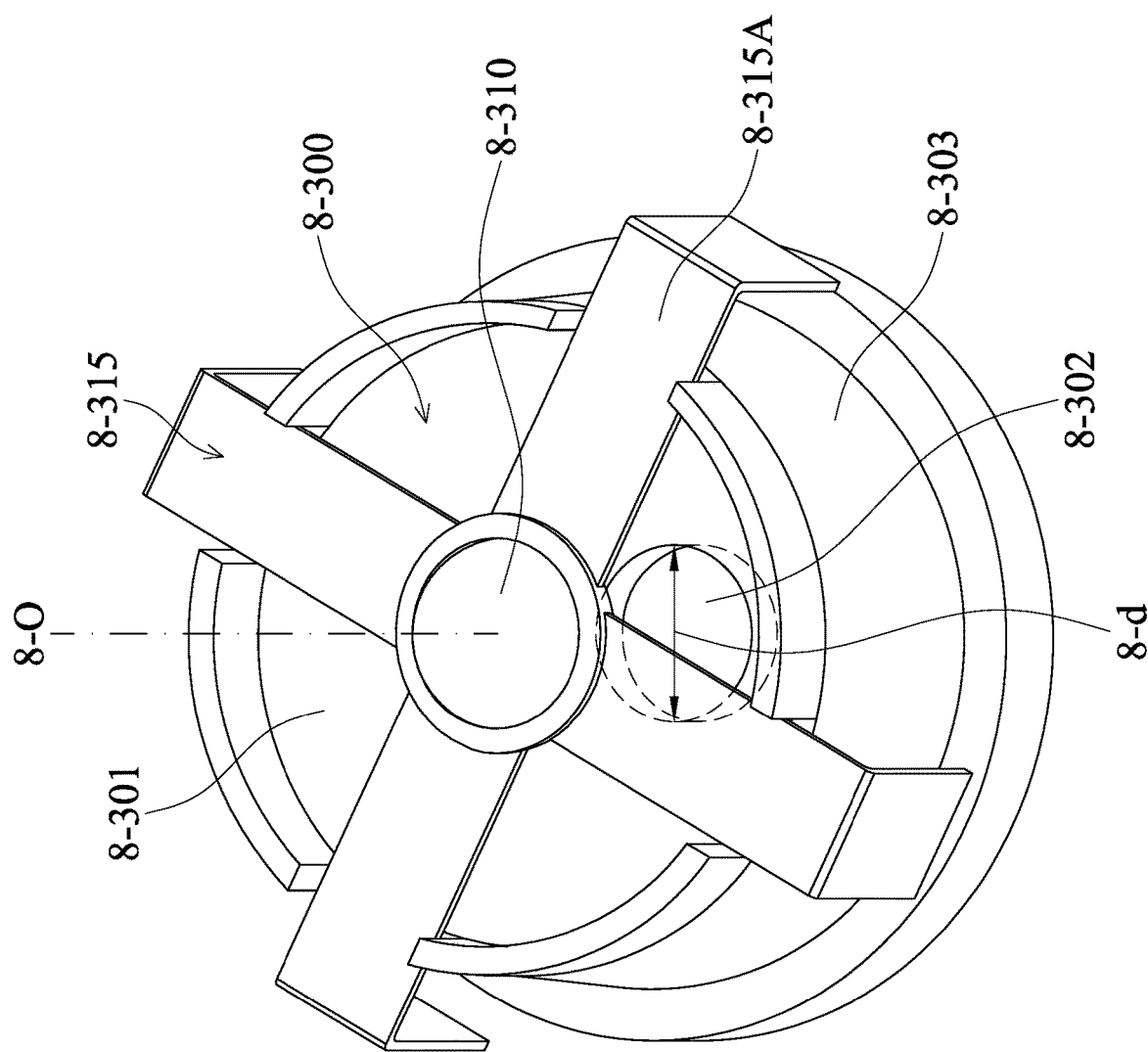
FIG. 87 shows a schematic view of a first reflective element and a second reflective element in accordance with an embodiment of this disclosure.

Refer to FIG. 87. FIG. 87 shows a schematic view of a first reflective element 8-300 and a second reflective element 8-310 in accordance with an embodiment of this disclosure. The first reflective element 8-300 is disposed to correspond to the incident light, and the light has an optical axis 8-O. The second reflective element 8-310 is disposed to correspond to the light reflected by the first reflective element 8-300, and is movable relative to the first reflective element 8-300. The first reflective element 8-300 has a first reflective surface 8-301, a perforation 8-302, and a first reflective element sidewall 8-303. The perforation has a diameter 8-$d$. When viewed along a direction parallel to the optical axis 8-O, the perforation 8-302 partially overlaps the second reflective element 8-310, and the perforation 8-302 is surrounded by the first reflective surface 8-301. The first reflective element sidewall 8-303 is disposed around the first reflective surface 8-301, and extends along a direction parallel to the optical axis 8-O to block unwanted lights. In other words, it can effectively avoid interference of lights that are non-parallel to the optical axis 8-O by setting the first reflective element sidewall 8-303. In this embodiment, the material of the first reflective surface 8-301 is glass, and the material of the first reflective element sidewall 8-303 is plastic, but the materials of the first reflective surface 8-301 and the first reflective element sidewall 8-303 are not limited to this, and may be changed as required. For example, the material of the first reflective surface 8-301 may also be stainless steel, polycarbonate, or acrylic. Furthermore, the first reflective surface 8-301 may be plated by a metal film.

Figure 88:
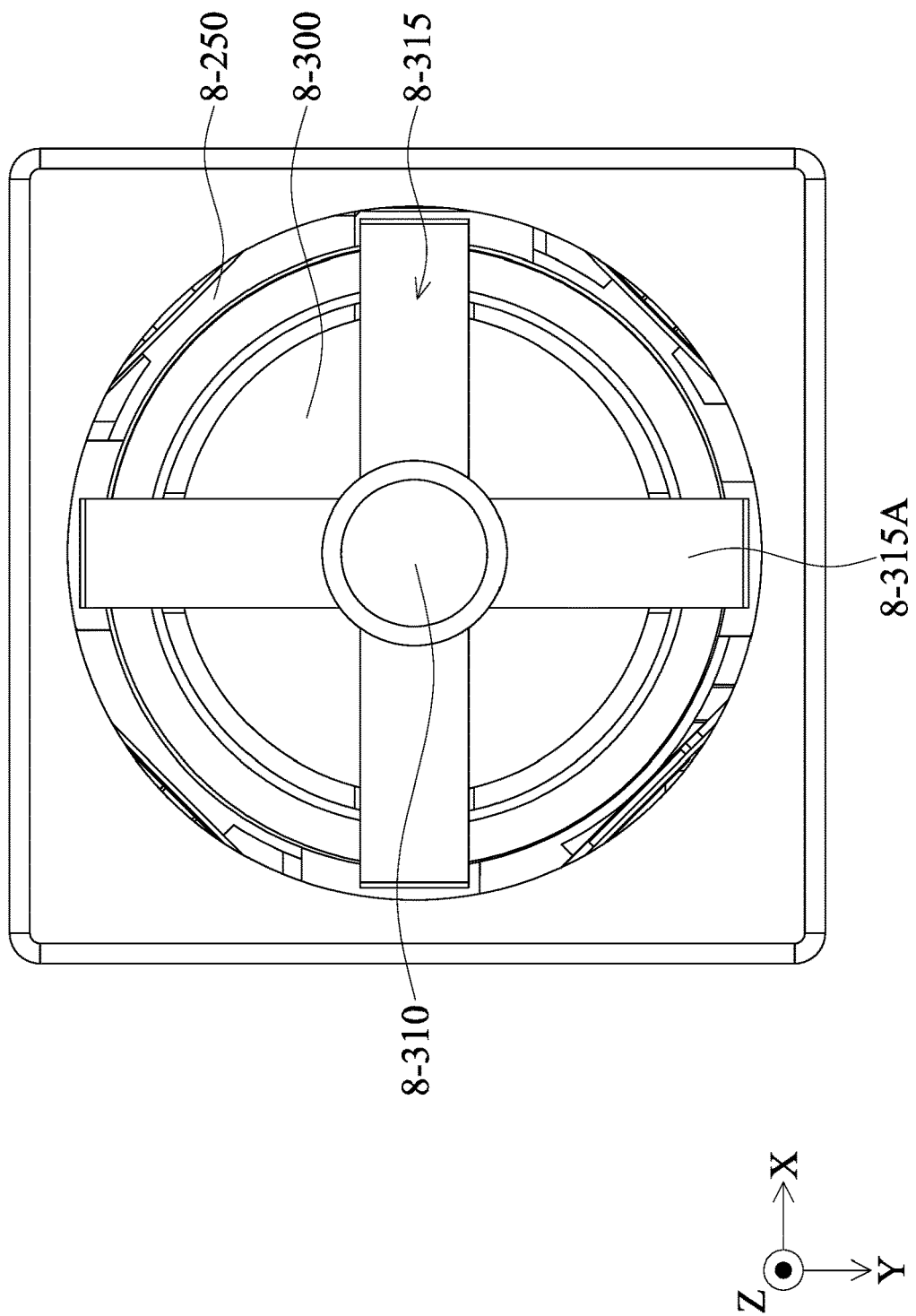
FIG. 88 shows a top view of a reflective element driving module in accordance with an embodiment of this disclosure.

Refer to FIG. 88. FIG. 88 shows a top view of a reflective element driving module 8-201 according to an embodiment of this disclosure. The first reflective element 8-300 and the second reflective element 8-310 are arranged along a direction parallel to the optical axis 8-O, and the first reflective element 8-300 is closer to the base 8-220 than the second reflective element 8-310 (refer to FIG. 89). The second reflective element 8-310 has a transparent material which can allow the light to partially pass through. The second reflective element 8-310 includes a second reflective surface 8-311 and a recess 8-312 (refer to FIG. 89). The bracket 8-315 has a light-transmissive material which can allow the light partially pass through. The bracket 8-315 is configured to connect the holder 8-250 and the second reflective element 8-310. In this embodiment, the bracket 8-315 has a plurality of cantilever 8-315A, one end of the cantilevers 8-315A is connected to the recess 8-312 of the second reflective element 8-310, and the other end of the cantilevers 8-315A is fixed to the holder 8-250 by insert molding. The material of the cantilevers 8-315A is metal to stably support the second reflective element 8-310. When viewed along a direction parallel to the optical axis 8-O, the bracket 8-315 partially overlaps the first reflective element 8-300, and the cantilevers 8-315A are point-symmetrical with the optical axis 8-O as the center. In this embodiment, the width of the cantilevers 8-315A is about 2 millimeters, but it is not limited to this, and can be adjusted as required.

Figure 89:
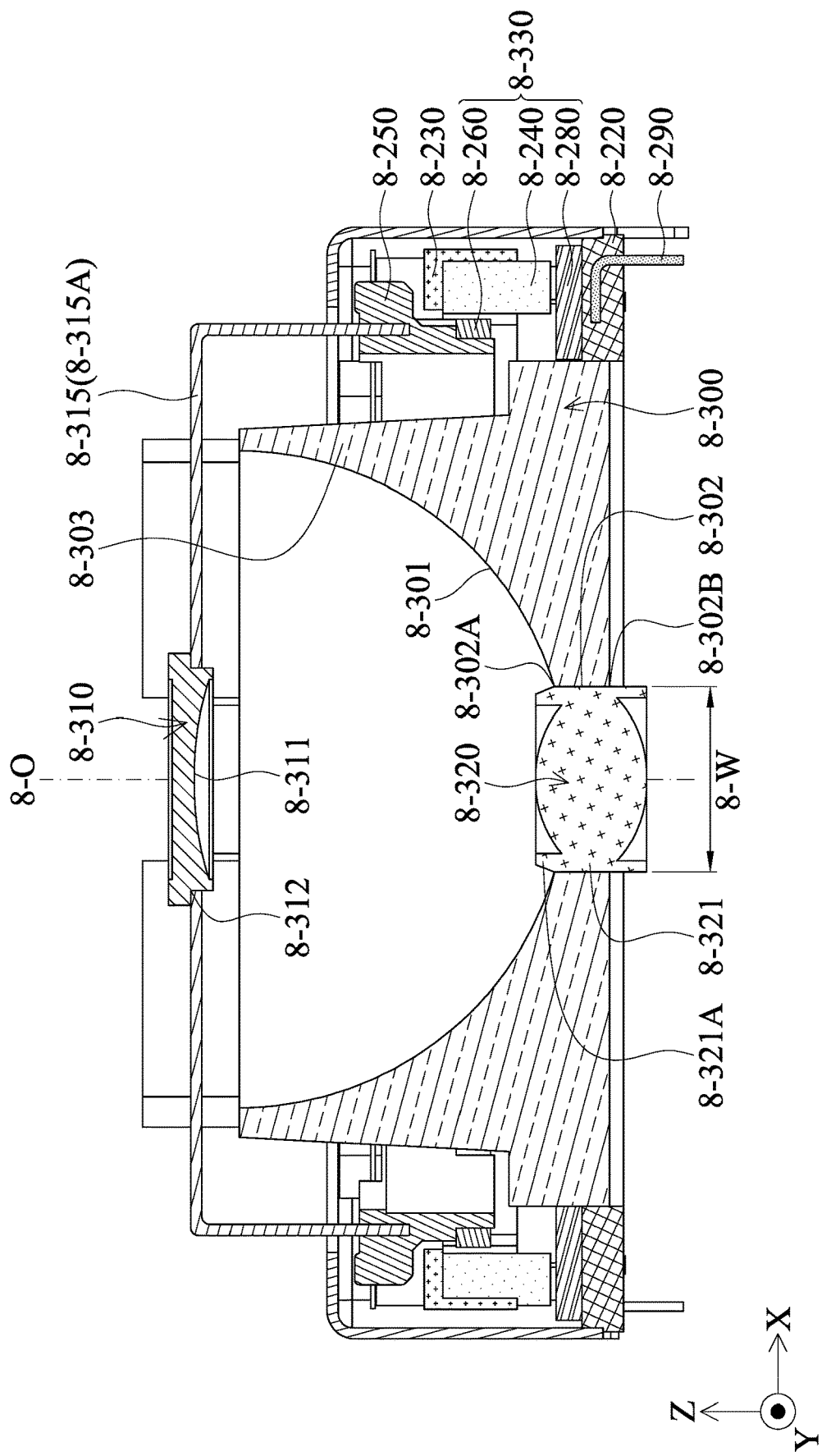
FIG. 89 shows a cross-sectional view of a reflective element driving module along a line 8-A-8-A' in FIG. 85.

Refer to FIG. 89. FIG. 89 shows a cross-sectional view of the reflective element driving module 8-201 along a line 8-A-8-A' in FIG. 85. The optical element 8-320 is disposed in the perforation 8-302 of the first reflective element 8-300 to correspond to the light reflected by the second reflective element 8-310. The diameter 8-$d$ of the perforation 8-302 (as shown in FIG. 87) is larger than a width 8-$w$ of the optical element 8-320. When viewed along a direction perpendicular to the optical axis 8-O, the optical element 8-320 partially protrudes from the upper side 8-302A and the lower side 8-302B of the perforation 8-302. In addition, when viewed along a direction perpendicular to the optical axis 8-O, the first reflective element 8-300 and the optical element 8-320 at least partially overlap. The optical element 8-320 has an optical element sidewall 8-321, and the optical element sidewall 8-321 has a reduction portion 8-321A in a direction toward the second reflective element 8-310, so that the light is blocked less during reflection. For example, if the optical element 8-320 does not have the reduction portion 8-321A, after the light is incident on the first reflective element 8-300, a portion of the light blocked by the optical element sidewall 8-321 cannot be reflected directly to the second reflective element 8-310, and thus the amount of light received by the optical element 8-320 is reduced. Therefore, in this embodiment, the probability of blocking the reflected light is reduced by reducing the optical element sidewall 8-321 to form the reduction portion 8-321A.

Figure 90:
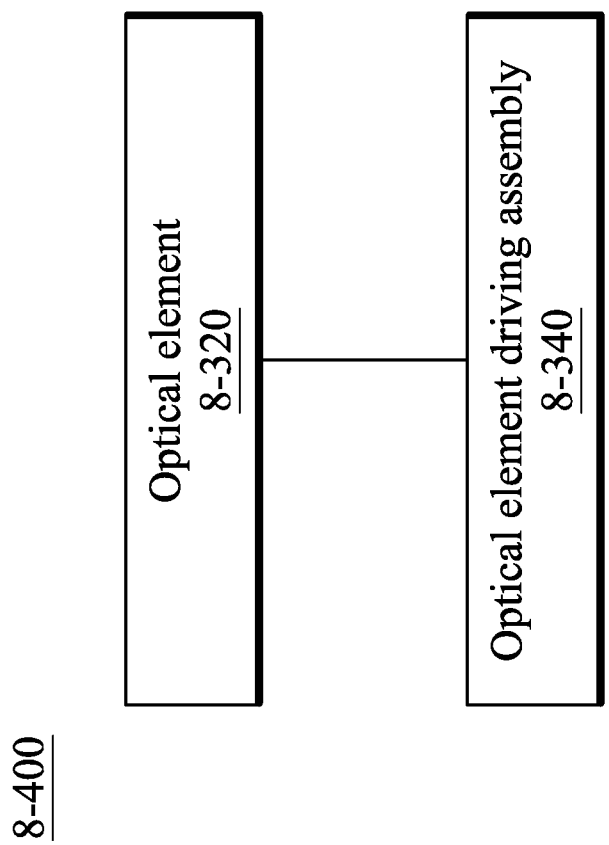
FIG. 90 shows a block diagram of a reflective element driving module in accordance with an embodiment of this disclosure.

In addition, in this embodiment, the optical element 8-320 is fixed to the first reflective element 8-300 and cannot be moved, but it is not limited to this. The optical element 8-320 may also be moved relative to the first reflective element 8-300, and further strengthen an application of a focus function of the optical element. For example, as shown in the block diagram of the optical element driving module 8-400 according to an embodiment of this disclosure in FIG. 90, an optical element driving assembly 8-340 may be added to form an optical element driving module 8-400 with the optical element 8-320. The optical element driving assembly 8-340 is used for driving the optical element 8-320 to move relative to the first reflective element 8-300.

Referring to FIG. 89, the first reflective surface 8-301 of the first reflective element 8-300 and the second reflective surface 8-311 of the second reflective element 8-310 face different directions. When viewed along a direction parallel to the optical axis 8-O, the first reflective surface 8-301 of the first reflective element 8-300 partially overlaps the second reflective surface 8-311 of the second reflective element 8-310. Therefore, when the light parallel to the optical axis 8-O enters the first reflective surface 8-301 of the first reflective element 8-300 from the outside, the first reflective element 8-300 focuses and reflects the light to the focus, that is, the position of the second reflective element 8-310. Then, the second reflective surface 8-311 of the second reflective element 8-310 reflects the light to the optical element 8-320 for further imaging. In the conventional lens module, in order to achieve a long focal length, the lens module must be lengthened. However, a longer focal length can be obtained with a shorter lens module by using the optical path design of this embodiment.

In this embodiment, the magnet 8-240, the coil 8-260, and the driving board 8-280 constitute a driving assembly 8-330, which can be used to drive the second reflective element 8-310 to move relative to the first reflective element 8-300. When viewed along a direction perpendicular to the optical axis 8-O, the optical element 8-320 and the driving assembly 8-330 at least partially overlap. The composition of the driving assembly 8-330 is not limited to this, and coils, magnets, and a driving board or other elements may be added or removed as required. As described above, since the holder 8-250 is movably disposed in the frame 8-230, and the bracket 8-315 connected to the second reflective element 8-310 is disposed on the holder 8-250. Therefore, when focusing is performed, the position in the Z axis direction can be determined by the third sensing element 8-296 and the sensing magnet 8-298 disposed on the frame, and the electric signals are transmitted through the circuit board 8-290 so that the current is applied to the coil 8-260 on the holder 8-250, and then the coil 8-260 acts with the magnetic field of the magnet 8-240 to generate an electromagnetic driving force to drive the holder 8-250 and the second reflective element 8-310 to move in the Z axis direction relative to the first reflective element 8-300. That is, the driving assembly 8-330 can drive the second reflective element 8-310 to move along a direction perpendicular to the optical axis 8-O to achieve the focusing.

If the second reflective element 8-310 is out of focus, the first magnetic field sensing element 8-292 and the second magnetic field sensing element 8-294 can be used to know the position offset of the frame 8-230 and the holder 8-250 with respect to the base 8-220 in the X direction and the Y direction by detecting the magnetic field variation of the magnets 8-240 on the frame 8-230, and the circuit board 8-290 transmits the electric signals to the driving coils (not shown) in the driving board 8-280, and the driving coils act with the magnet 8-240 on the frame 8-230 to generate the electromagnetic driving force to drive the frame 8-230 to move along a direction perpendicular to the optical axis 8-O, that is, the driving assembly 8-330 can drive the second reflective element 8-310 to move along a direction parallel to the optical axis 8-O to compensate for the position offset in the X direction and the Y direction described above.

With the embodiment disclosed by the present invention, the light amount is larger than that of the conventional lens module, and the optical path does not need to be extended as the conventional lens module to achieve the same effect, which greatly reduces the size of the lens module and can achieve miniaturization.

The ninth embodiment group.

Figure 91:
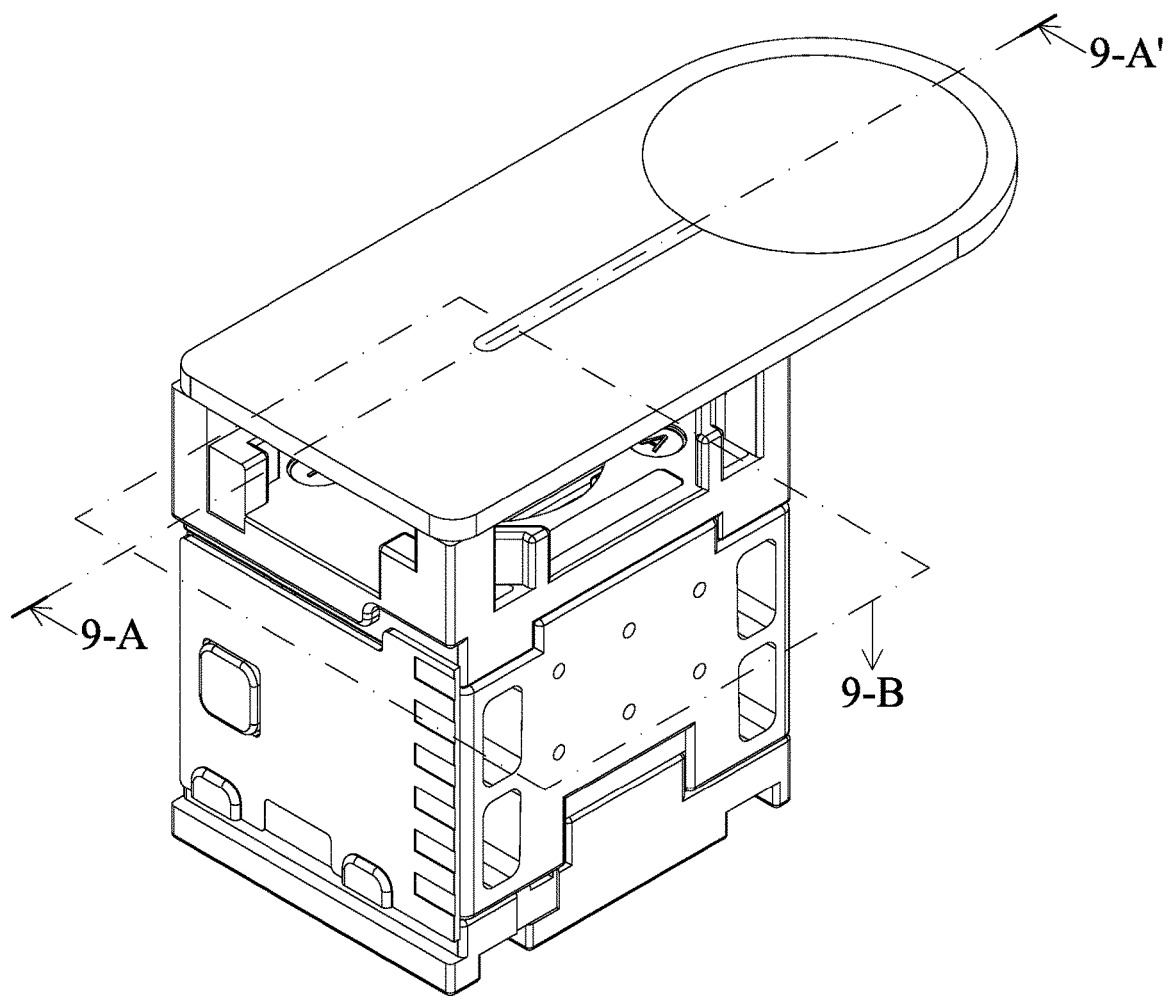
FIG. 91 is a schematic diagram of an optical element driving mechanism 9-100 according to an embodiment of the present disclosure.
Figure 93:
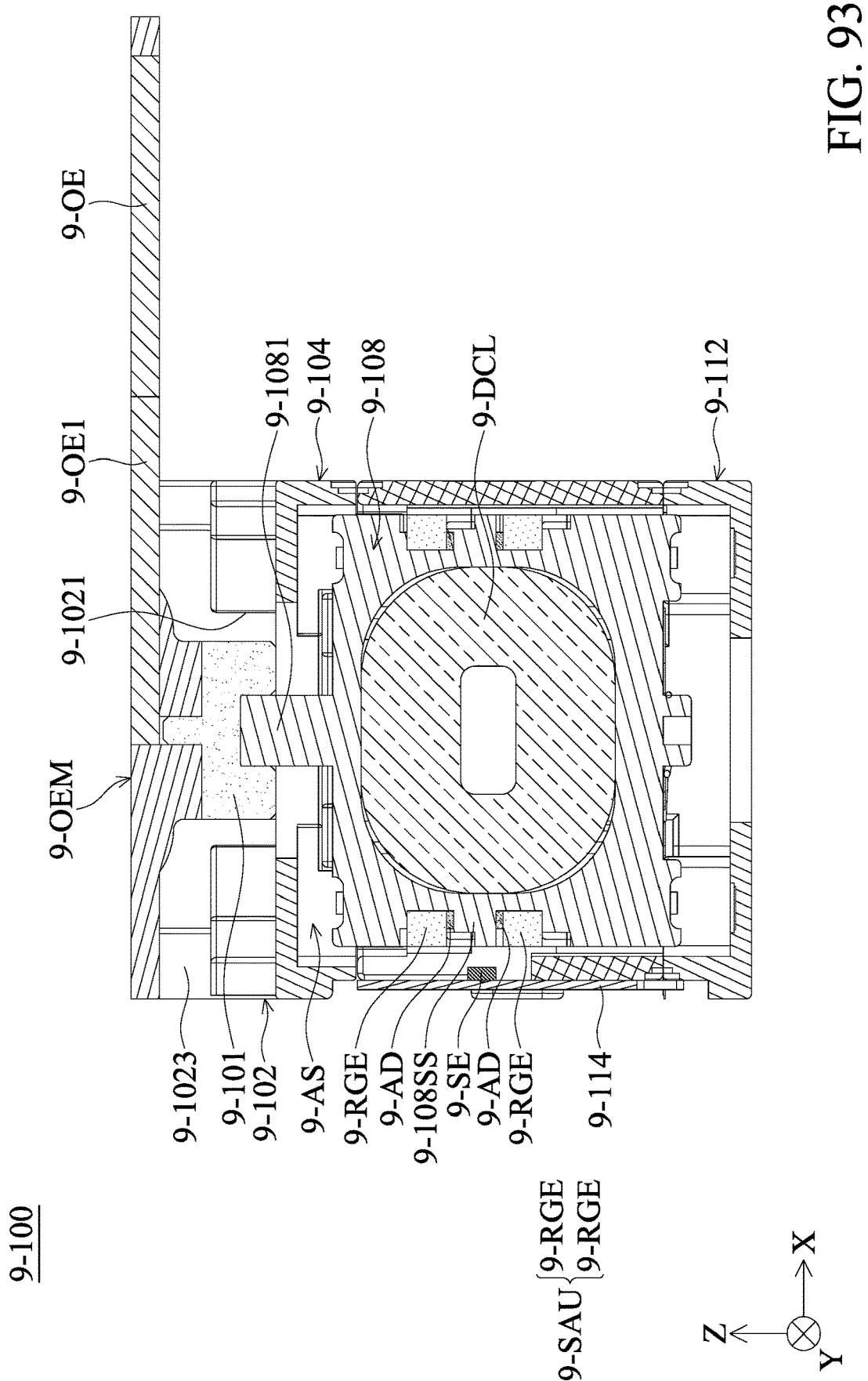
FIG. 93 is a cross-sectional diagram of the optical element driving mechanism 9-100 along line 9-A-9-A' in FIG. 91 according to an embodiment of the present disclosure.

Please refer to FIG. 91 to FIG. 93. FIG. 91 is a schematic diagram of an optical element driving mechanism 9-100 according to an embodiment of the present disclosure, FIG. 92 is an exploded diagram of the optical element driving mechanism 9-100 according to an embodiment of the present disclosure, and FIG. 93 is a cross-sectional diagram of the optical element driving mechanism 9-100 along line 9-A-9-A' in FIG. 91 according to an embodiment of the present disclosure. In this embodiment, the optical element driving mechanism 9-100 includes an optical element module 9-OEM, a fixed assembly 9-FA, a movable assembly 9-MA, a driving assembly 9-DA, and a position-sensing assembly 9-SA. The movable assembly 9-MA corresponds to an optical element 9-OE of the optical element module 9-OEM, and the movable assembly 9-MA is movable relative to the fixed assembly 9-FA. The driving assembly 9-DA is configured to drive the movable assembly 9-MA to move relative to fixed assembly 9-FA, and the position-sensing assembly 9-SA is configured to sense the position and movement of the movable assembly 9-MA relative to fixed assembly 9-FA.

As shown in FIG. 92, the fixed assembly 9-FA may include a top frame 9-102, a side frame 9-104, and a base 9-112. The top frame 9-102 is fixedly connected to the side frame 9-104, and the side frame 9-104 is fixedly connected to the base 9-112. The top frame 9-102 has an opening 9-1021 and four protruding columns 9-1023, and the optical element module 9-OEM is fixedly disposed on these protruding columns 9-1023. The side frame 9-104 and the base 9-112 may form an accommodating space 9-AS (FIG. 93), configured to accommodate the movable assembly 9-MA and the driving assembly 9-DA. In addition, the fixed assembly 9-FA may further include a circuit board 9-114, which is fixedly disposed on one side of the side frame 9-104.

The movable assembly 9-MA includes a movable member 9-108 and two elastic members 9-106. The movable member 9-108 is movably disposed in the accommodating space 9-AS, and the elastic member 9-106 is disposed the side frame 9-104 and the base 9-112. In addition, the driving assembly 9-DA may include a driving coil 9-DCL, a first driving magnetic element 9-MG1, and a second driving magnetic element 9-MG2.

As shown in FIG. 92, the driving coil 9-DCL is disposed in the movable member 9-108. The movable member 9-108 may have a plurality of grooves 9-108C located around the driving coil 9-DCL, and an adhesive member 9-AD can be accommodated in each groove 9-108C, so that the driving coil 9-DCL is fixed in the movable member 9-108. The first driving magnetic element 9-MG1 and the second driving magnetic element 9-MG2 correspond to the driving coil 9-DCL and are fixedly provided in the fixed assembly 9-FA. Specifically, the first driving magnetic element 9-MG1 and the second driving magnetic element 9-MG2 are disposed on the side frame 9-104 and are located in the accommodating space 9-AS. In addition, the driving coil 9-DCL is electrically connected to the circuit board 9-114 via two elastic members 9-106. For example, the driving coil 9-DCL is electrically connected to the circuit board 9-114 by solders 9-SD in FIG. 92.

In this embodiment, the position-sensing assembly 9-SA includes a sensed unit 9-SAU and a sensing element 9-SE. The sensing element 9-SE is disposed on the circuit board 9-114 and corresponds to the sensed unit 9-SAU. The sensed unit 9-SAU may have a plurality of reference magnetic elements 9-RGE. These reference magnetic elements 9-RGE are arranged in a first direction (such as the Z-axis), the sensed unit 9-SAU and the sensing element 9-SE are arranged in an arrangement direction (the X-axis), and the first direction is not parallel to the arrangement direction.

As shown in FIG. 92 and FIG. 93, the optical element 9-OE is a liquid lens, and the optical element module 9-OEM has a flow channel 9-OE1, which is communicated with the optical element 9-OE. A translucent liquid is disposed in the flow channel 9-OE1 and the optical element 9-OE. Furthermore, the optical element driving mechanism 9-100 may further include a deforming member 9-101, a protruding pillar 9-1081 of the movable member 9-108 is inserted into the deforming member 9-101, and the deforming member 9-101 is in contact with an end of the flow channel 9-OE1 (such as the left end in FIG. 93).

In this embodiment, one or both sides of the optical element 9-OE and the flow channel 9-OE1 along the Z-axis may be a thin film structure. When the driving coil 9-DCL is provided with electricity, the driving coil 9-DCL acts with the first driving magnetic element 9-MG1 and the second driving magnetic element 9-MG2 to generate an electromagnetic driving force. This electromagnetic driving force drives the movable member 9-108 to move along the Z-axis. Therefore, the movable member 9-108 and the deforming member 9-101 push the flow channel 9-OE1 so that a portion of the liquid in the flow channel 9-OE1 flows to the optical element 9-OE, thereby causing the optical element 9-OE to deform. Thus, the optical properties of the optical element 9-OE are changed so as to achieve the effect of optical zoom.

As shown in FIG. 93, a separating structure 9-108SS (a spacer element) can be formed on the movable member 9-108, and the separating structure 9-108SS is disposed between these reference magnetic elements 9-RGE. When viewed in the first direction (the Z-axis), the reference magnetic elements 9-RGE partially overlap the separating structure 9-108SS, and the separating structure 9-108SS has a non-magnetic permeability material, such as a plastic material. Furthermore, the optical element driving mechanism 9-100 may include a plurality of adhesive members 9-AD disposed between the separating structure 9-108SS and the corresponding reference magnetic element 9-RGE, so that the reference magnetic elements 9-RGE are fixed to the movable member 9-108.

Figure 94:
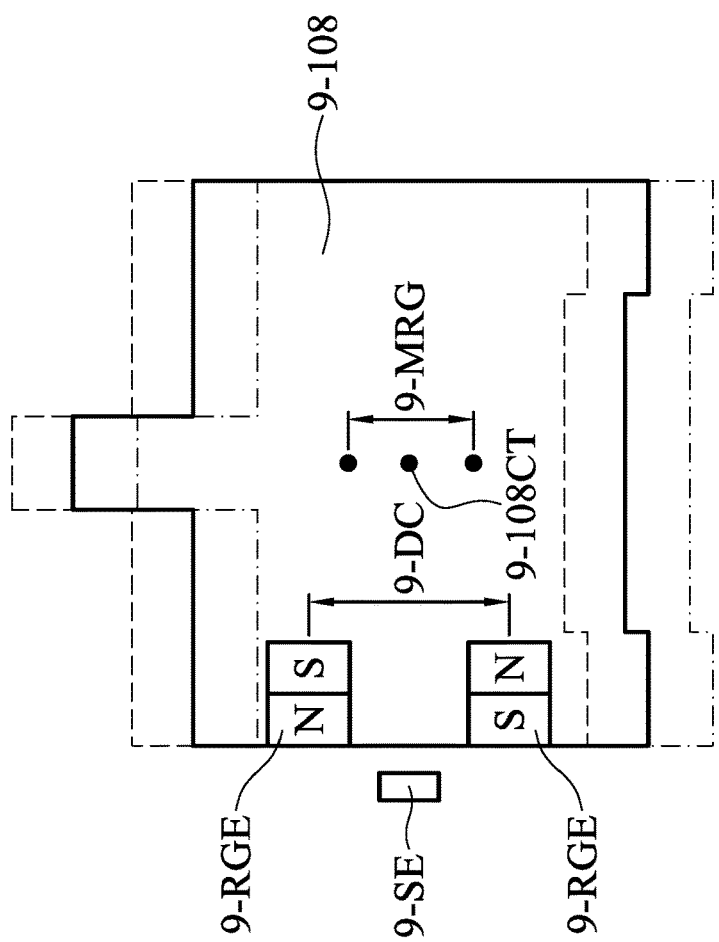
FIG. 94 is a schematic diagram of the movable member 9-108 and the position-sensing assembly 9-SA according to an embodiment of the present disclosure.

Next, please refer to FIG. 94, which is a schematic diagram of the movable member 9-108 and the position-sensing assembly 9-SA according to an embodiment of the present disclosure. As shown in FIG. 94, the arrangement direction of the magnetic poles (the N-pole, and the S-pole) of each of these reference magnetic elements 9-RGE is along the X-axis and is not parallel to the aforementioned first direction (the Z-axis). In addition, the arrange sequences of the magnetic poles of these reference magnetic elements 9-RGE are opposite. Specifically, in FIG. 94, the N-pole of the upper reference magnetic element 9-RGE faces the sensing element 9-SE, and the N-pole of the lower reference magnetic element 9-RGE faces the movable member 9-108.

Furthermore, as shown in FIG. 94, the driving assembly 9-DA of the present disclosure can drive the movable member 9-108 of the movable assembly 9-MA to move relative to the fixed assembly 9-FA in the first direction (the Z-axis) within a range of movement 9-MRG. The range of movement 9-MRG may be a range of movement of a center 9-108CT of the movable member 9-108 along the Z-axis. In the first direction, the center distance DC between these reference magnetic elements 9-RGE is greater than the range of movement 9-MRG. Based on the above configuration, the position-sensing assembly 9-SA can accurately sense the displacement of the movable member 9-108 along the Z-axis.

Figure 95:
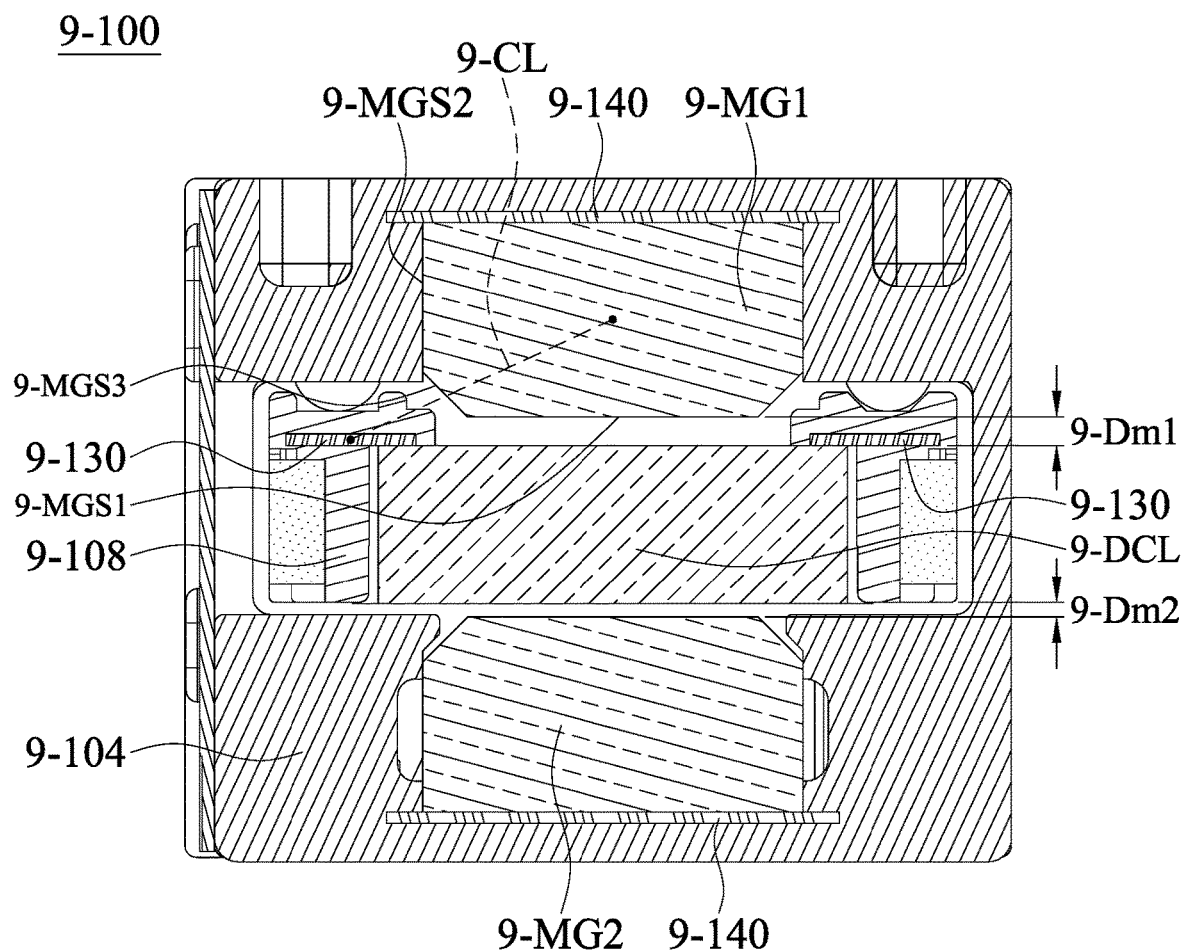
FIG. 95 is a schematic cross-sectional view of the optical element driving mechanism 9-100 along the plane 9-B in FIG. 91 according to an embodiment of the disclosure.

Please refer to FIG. 95, which is a schematic cross-sectional view of the optical element driving mechanism 9-100 along the plane 9-B in FIG. 91 according to an embodiment of the disclosure. As shown in FIG. 95, the driving coil 9-DCL, the first driving magnetic element 9-MG1, and the second driving magnetic element 9-MG2 are arranged along a second direction (the Y-axis), and the driving coil 9-DCL is disposed between the first driving magnetic element 9-MG1 and the second driving magnetic element 9-MG2. It should be noted that the shortest distance 9-Dm1 between the first driving magnetic element 9-MG1 and the driving coil 9-DCL is greater than the shortest distance 9-Dm2 between the second driving magnetic element 9-MG2 and the driving coil 9-DCL. In addition, a winding axis of the driving coil 9-DCL is parallel to the Y-axis and is different from the first direction (the Z-axis).

The driving assembly 9-DA further includes two magnetically conductive elements 9-130, which is buried in movable member 9-108, and the magnetically conductive elements 9-130 correspond to the first driving magnetic element 9-MG1. For example, They can act with the first driving magnetic element 9-MG1 to generate a magnetic attraction force. When viewed in the first direction (the Z-axis), the magnetically conductive elements 9-130 are located between the first driving magnetic element 9-MG1 and the driving coil 9-DCL.

Furthermore, the first driving magnetic element 9-MG1 includes a first surface 9-MGS1, a second surface 9-MGS2, and a third surface 9-MGS3. The first surface 9-MGS1 is perpendicular to the Y-axis (the second direction), the second surface 9-MGS2 is perpendicular to a third direction (the X-axis), and the third direction is perpendicular to the first direction and the second direction. The third surface 9-MGS3 is not parallel to the first surface 9-MGS1 and the second surface 9-MGS2 and faces the magnetically conductive element 9-130.

As shown in FIG. 95, a connecting line 9-CL of the center of the magnetically conductive element 9-130 and the center of the first driving magnetic element 9-MG1 is not parallel to the second direction (the Y-axis), which means that the two magnetically conductive elements 9-130 are disposed on two sides of the first driving magnetic element 9-MG1. In addition, because the magnetically conductive elements 9-130 are buried in the movable member 9-108, the magnetically conductive elements 9-130 can also move relative to the first driving magnetic element 9-MG1.

In this embodiment, as shown in FIG. 95, when viewed in the second direction (the Y-axis), the magnetically conductive elements 9-130 do not overlap the first driving magnetic element 9-MG1, and the driving coil 9-DCL partially overlaps the magnetically conductive elements 9-130. Furthermore, when viewed in the third direction, the magnetically conductive elements 9-130 are disposed between the first driving magnetic element 9-MG1 and the driving coil 9-DCL.

Furthermore, in this embodiment, the optical element driving mechanism 9-100 may further include two magnetically conductive fixing members 9-140, which are buried in the side frame 9-104. The first driving magnetic element 9-MG1 is disposed between the corresponding magnetically conductive fixing member 9-140 and the driving coil 9-DCL, the second driving magnetic element 9-MG2 is disposed between the corresponding magnetically conductive fixing member 9-140 and the driving coil 9-DCL, and these magnetically conductive fixing members 9-140 are configured to fix the first driving magnetic element 9-MG1 and the second driving magnetic element 9-MG2. For example, a magnetic attraction force is generated between the first driving magnetic element 9-MG1 and the corresponding magnetically conductive fixing member 9-140, so that the first driving magnetic element 9-MG1 is firmly attracted to the corresponding magnetically conductive fixing member 9-140.

Figure 97:
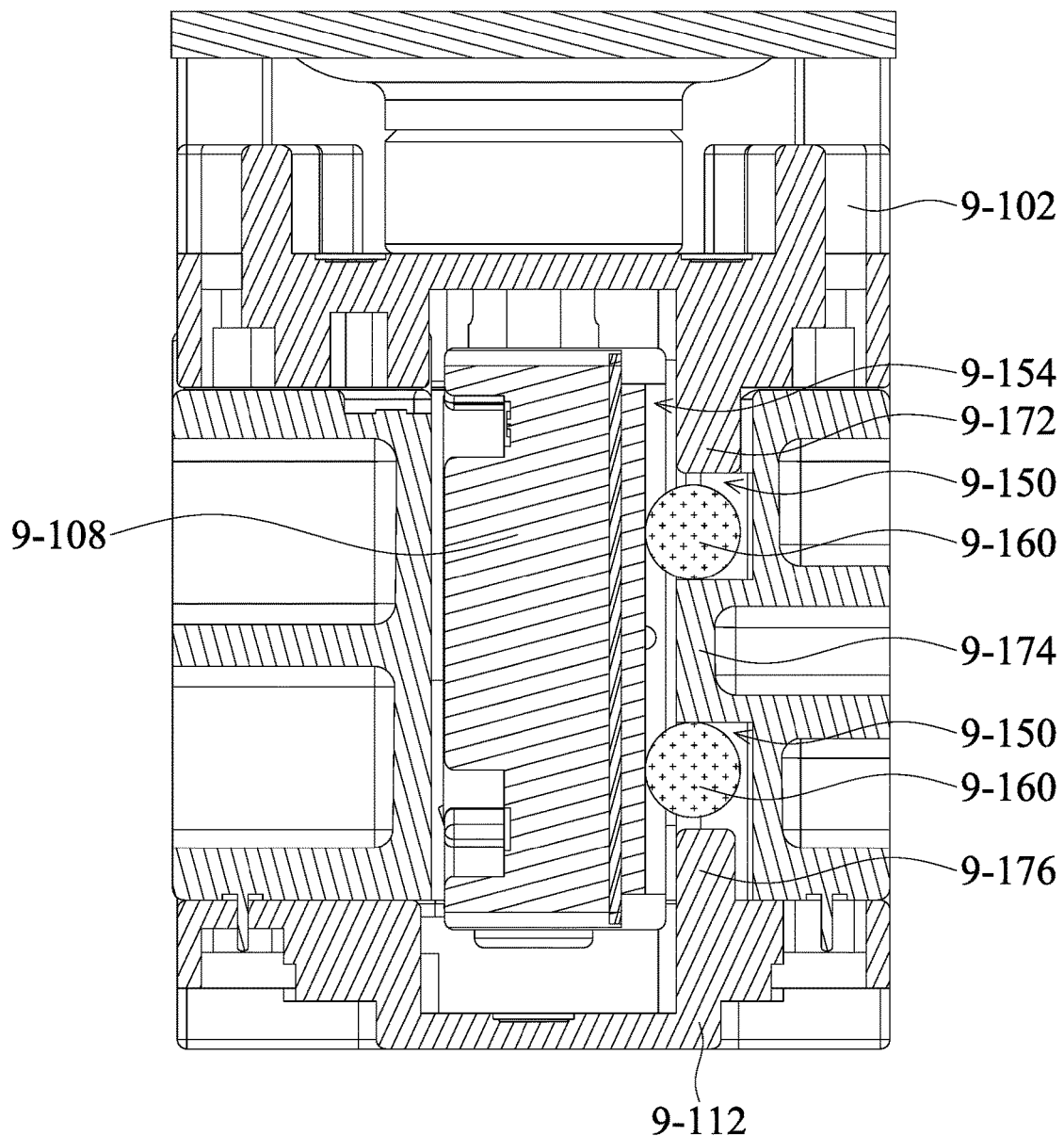
FIG. 97 is a cross-sectional view of the optical element driving mechanism 9-100 along the YZ plane according to an embodiment of the present disclosure.
Figure 98:
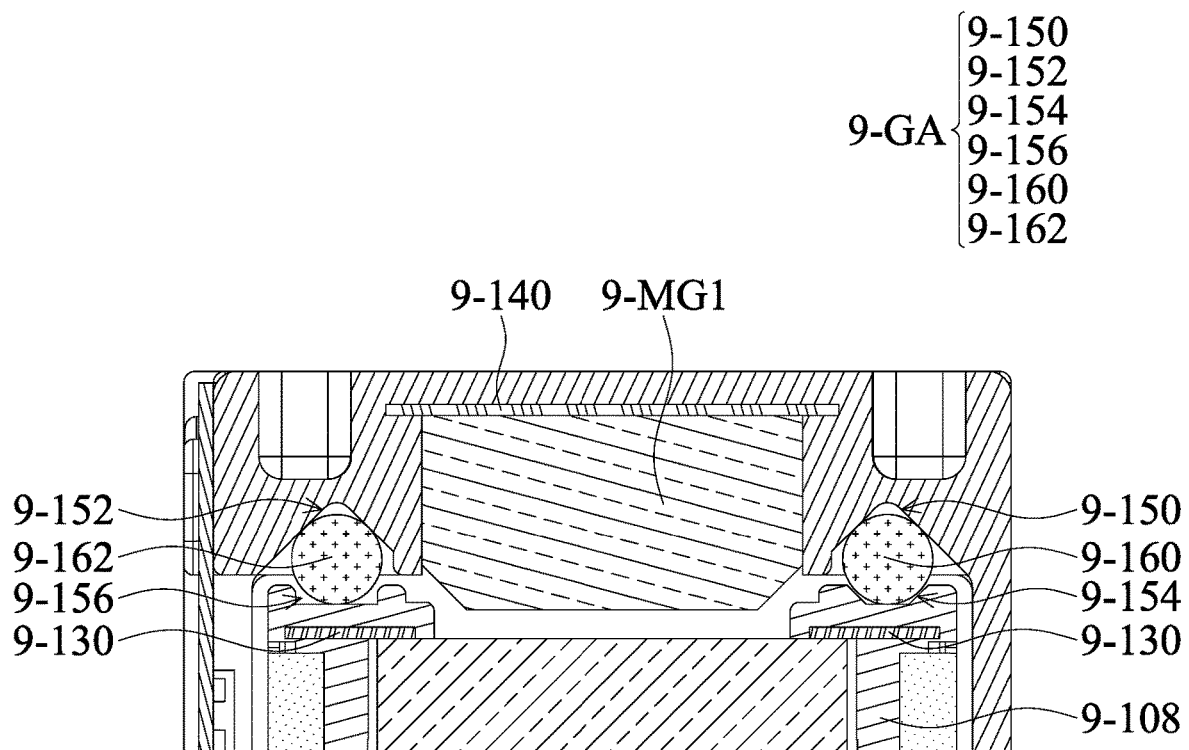
FIG. 98 is a cross-sectional view of the optical element driving mechanism 9-100 along the XY plane according to an embodiment of the present disclosure.

Please refer to FIG. 96 to FIG. 98. FIG. 96 is a perspective sectional view of the optical element driving mechanism 9-100 according to an embodiment of the present disclosure, FIG. 97 is a cross-sectional view of the optical element driving mechanism 9-100 along the YZ plane according to an embodiment of the present disclosure, and FIG. 98 is a cross-sectional view of the optical element driving mechanism 9-100 along the XY plane according to an embodiment of the present disclosure. In this embodiment, the optical element driving mechanism 9-100 may further include a guiding assembly 9-GA configured to guide the movable assembly 9-MA to move relative to the fixed assembly 9-FA in the first direction, and the guiding assembly 9-GA is disposed between the magnetically conductive element 9-130 and the first driving magnetic element 9-MG1.

In this embodiment, the guiding assembly 9-GA may include two first guiding grooves 9-150, two second guiding grooves 9-152, a first guiding trench 9-154, and a second guiding trench 9-156, two first intermediate elements 9-160, and two second intermediate elements 9-162. As shown in FIG. 96 to FIG. 98, the two first guiding grooves 9-150 are arranged in the first direction (the Z-axis), and the two second guiding grooves 9-152 are arranged in the first direction (the Z-axis), and the first guiding grooves 9-150 and the second guiding grooves 9-152 respectively correspond to the first guiding trench 9-154 and the second guiding trench 9-156.

As shown in FIG. 98, the first intermediate element 9-160 and the second intermediate element 9-162 may be balls, the first intermediate element 9-160 is disposed between the first guiding groove 9-150 and the first guiding trench 9-154, and the second intermediate element 9-162 is disposed between the second guiding groove 9-152 and the second guiding trench 9-156. In addition, as shown in FIG. 96 and FIG. 97, the optical element driving mechanism 9-100 may further include a plurality of blocking portions 9-172, 9-174, and 9-176. The blocking portions 9-172, 9-174 are disposed on two sides of the first guiding groove 9-150 adjacent to the top frame 9-102, the blocking portions 9-174 and 9-176 are disposed on two sides of the first guiding groove 9-150 adjacent to the base 9-112, and the blocking portions are configured to limit the range of movement of the first intermediate elements 9-160 in the first direction (the Z-axis).

Furthermore, as shown in FIG. 98, when viewed in the first direction (the Z-axis), the first guiding groove 9-150 and the second guiding groove 9-152 each have a V-shaped structure, respectively corresponding to the first intermediate element 9-160 and the second intermediate element 9-162, and the first guiding trench 9-154 and/or the second guiding trench 9-156 have a non-V-shaped structure.

It should be noted that, as shown in FIG. 96, the first guiding trench 9-154 corresponding to the first guiding groove 9-150 may have a boundary 9-1541, and an extending direction (the X-axis) of the boundary 9-1541 is perpendicular to the first direction (the Z-axis). When viewed in the second direction (the Y-axis), and when the movable member 9-108 of the movable assembly 9-MA is at any position within the range of movement 9-MRG, the first guiding groove 9-150 does not overlap the boundary 9-1541. That is, the first intermediate elements 9-160 and the second intermediate elements 9-162 do not separate from the corresponding first guiding groove 9-150 and the second guiding groove 9-152.

In addition, as shown in FIG. 98, because a magnetic attraction force is formed between the magnetically conductive element 9-130 and the first driving magnetic element 9-MG1, the movable member 9-108 is in contact with the first intermediate elements 9-160 and the second intermediate elements 9-162, so that the first intermediate elements 9-160 and the second intermediate elements 9-162 are stably disposed in the first guiding groove 9-150 and the second guiding groove 9-152, respectively.

Figure 99:
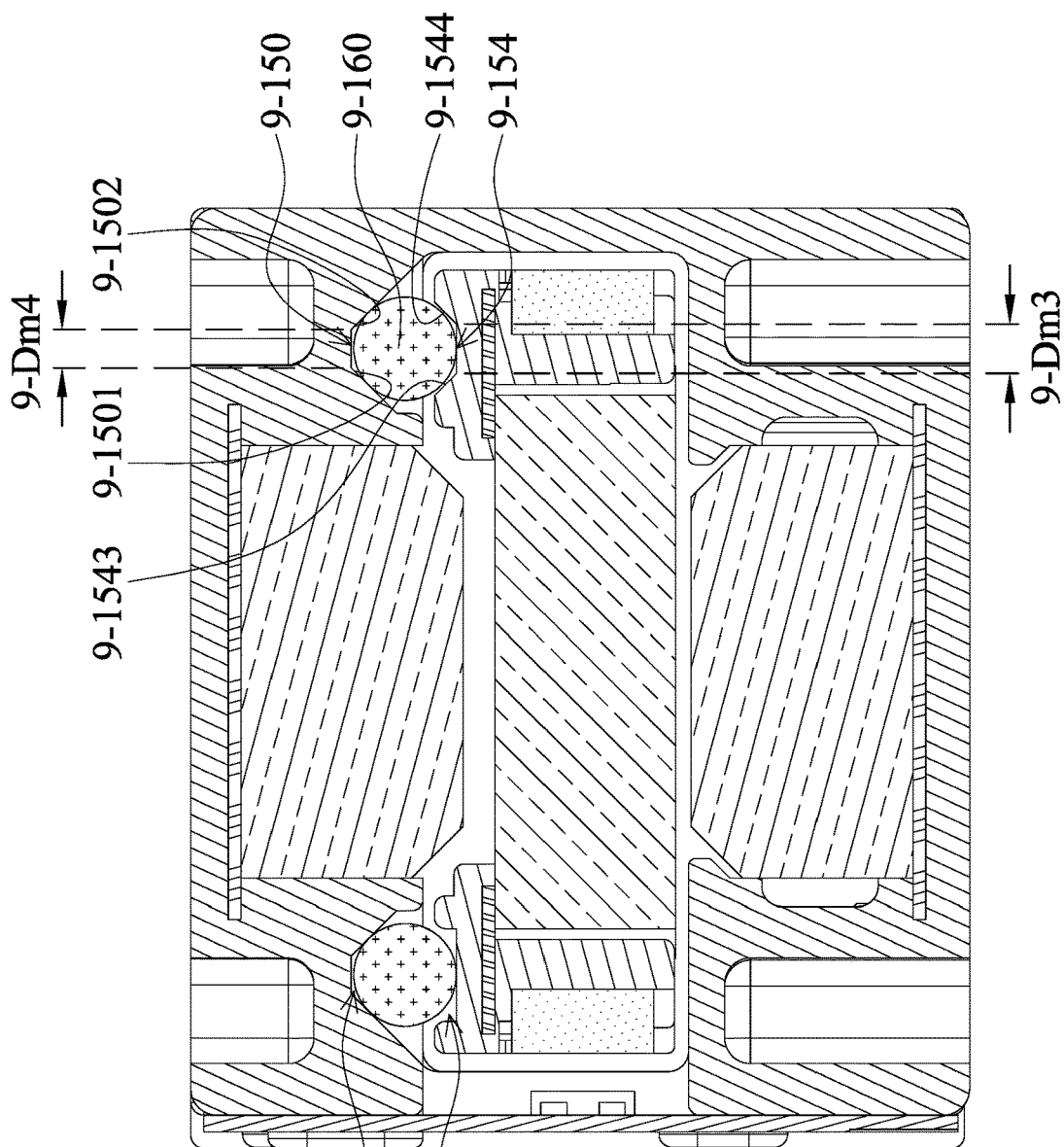
FIG. 99 is a schematic cross-sectional view of the optical element driving mechanism 9-100 along the XY plane according to another embodiment of the present disclosure.

Next, please refer to FIG. 99, which is a schematic cross-sectional view of the optical element driving mechanism 9-100 along the XY plane according to another embodiment of the present disclosure. In this embodiment, the first guiding grooves 9-150 and the second guiding grooves 9-152 have a non-V-shaped structure. Specifically, the first guiding trench 9-154 has two first surfaces 9-1543, 9-1544, and the first surfaces 9-1543, 9-1544 are not parallel to the third direction (the X-axis). The first guiding groove 9-150 has two second surfaces 9-1501, 9-1502, and the second surfaces 9-1501, 9-1502 are not parallel to the third direction, either. As shown in FIG. 99, a shortest distance 9-Dm3 between the first surfaces 9-1543, 9-1544 is different from a shortest distance 9-Dm4 between the second surfaces 9-1501, 9-1502.

Figure 100:
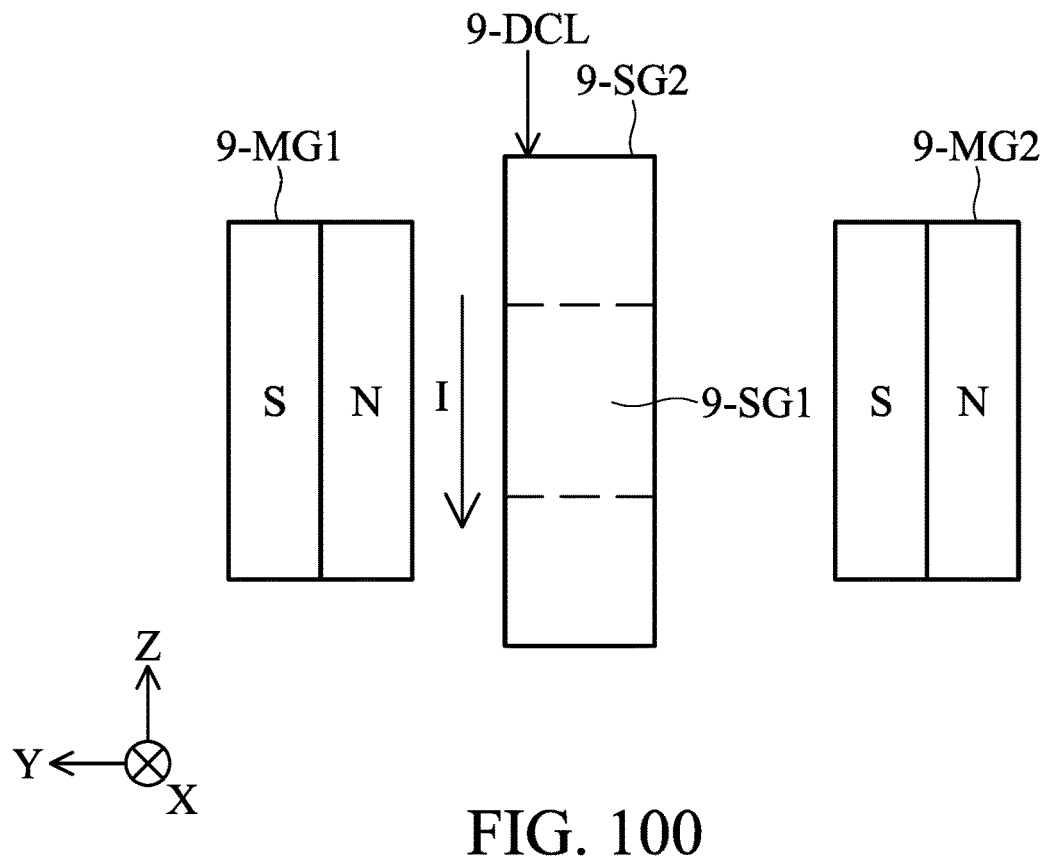
FIG. 100 is a front view of a partial structure of the optical element driving mechanism 9-100 according to an embodiment of the present disclosure.
Figure 101:
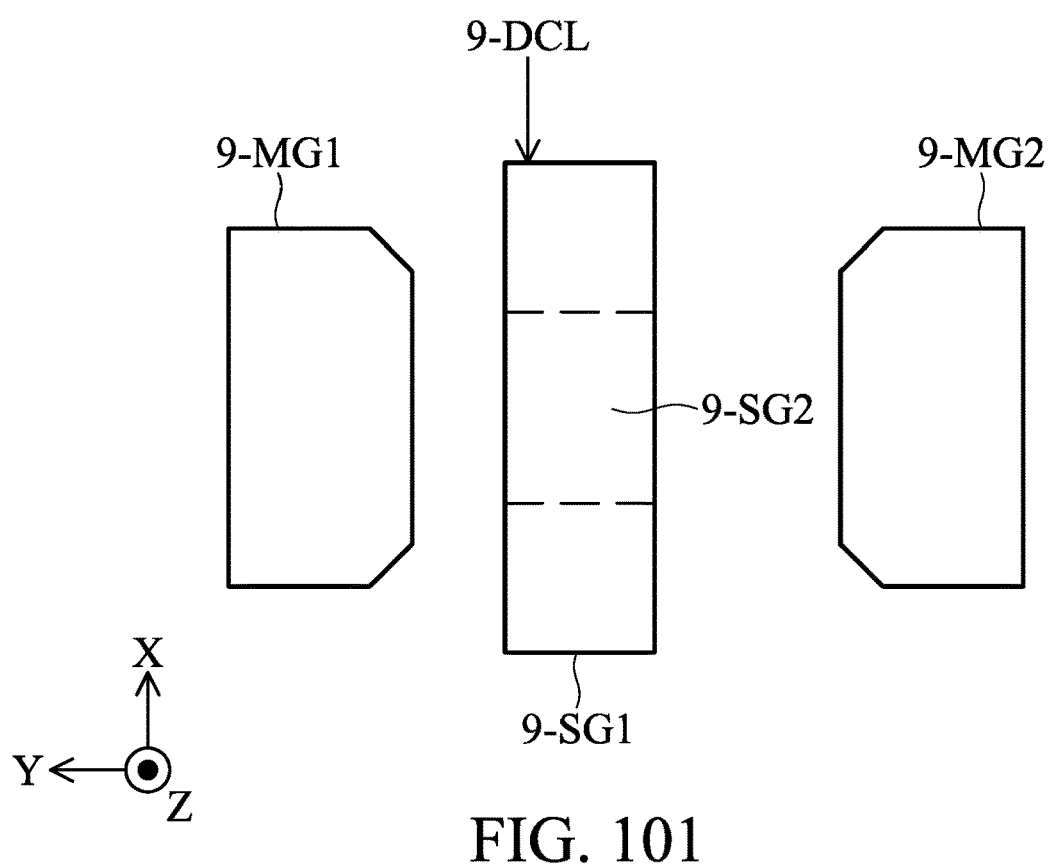
FIG. 101 is a top view of a partial structure of the optical element driving mechanism 9-100 according to an embodiment of the present disclosure.

Please refer to FIG. 100 and FIG. 101. FIG. 100 is a front view of a partial structure of the optical element driving mechanism 9-100 according to an embodiment of the present disclosure, and FIG. 101 is a top view of a partial structure of the optical element driving mechanism 9-100 according to an embodiment of the present disclosure. In this embodiment, the driving coil 9-DCL has a first segment portion 9-SG1 and a second segment portion 9-SG2, and the second segment portion 9-SG2 is perpendicular to the first direction (the Z-axis). As shown in FIG. 100, the magnetic poles of the first driving magnetic element 9-MG1 and the second driving magnetic element 9-MG2 are arranged along the same direction, for example, along the Y-axis.

In addition, as shown in FIG. 101, the first segment portion 9-SG1 is disposed between the first driving magnetic element 9-MG1 and the second driving magnetic element 9-MG2, and when viewed in the second direction (the Y-axis), the first driving magnetic element 9-MG1 and the second driving magnetic element 9-MG2 partially overlap the first segment portion 9-SG1.

Next, please refer to FIG. 102, which is a schematic perspective view of a partial structure of the optical element driving mechanism 9-100 according to another embodiment of the present disclosure. In this embodiment, the driving assembly 9-DA includes a single driving magnetic element 9-MG and two driving coils 9-DCL. The driving magnetic element 9-MG can be disposed in the movable member 9-108, and the two driving coils 9-DCL are installed in the side frame 9-104 and correspond to the driving magnetic element 9-MG. The driving magnetic element 9-MG and the two driving coils 9-DCL are arranged in the second direction (the Y-axis).

Each driving coil 9-DCL has a first segment portion 9-SG1 and a second segment portion 9-SG2. The second segment portion 9-SG2 is perpendicular to the first direction (the Z-axis), and the driving magnetic element 9-MG is disposed between these first segment portions 9-SG1. When viewed in the second direction, the driving magnetic element 9-MG partially overlaps these first segment portions 9-SG1. In addition, when a current 9-I flows to the driving assembly 9-DA, as shown in FIG. 102, the directions of the current 9-I in these first segment portions 9-SG1 are opposite to each other. For example, a direction of the current 9-I in the left first segment portion 9-SG1 is opposite to a direction of the current 9-I in the right first segment portion 9-SG1.

The present disclosure provides an optical element driving mechanism including an optical element module 9-OEM, a driving assembly 9-DA, a movable member 9-108, and a fixed assembly 9-FA. The driving assembly 9-DA can generate an electromagnetic driving force to drive the movable member 9-108 to move relative to the fixed assembly 9-FA. The movable member 9-108 can push the flow channel 9-OE1 by the deforming member 9-101, so that a portion of the liquid in the flow channel 9-OE1 flows to the optical element 9-OE, thereby causing the optical element 9-OE to deform. Thus, the optical properties of the optical element 9-OE are changed so as to achieve the effect of optical zoom.

In addition, the magnetically conductive element 9-130 may be disposed in the movable member 9-108. Because a magnetic attraction force is formed between the magnetically conductive element 9-130 and the first driving magnetic element 9-MG1 of the driving assembly 9-DA, the movable member 9-108 is in contact with the first intermediate elements 9-160 and the second intermediate elements 9-162, so that the first intermediate elements 9-160 and the second intermediate elements 9-162 are stably disposed in the first guiding groove 9-150 and the second guiding groove 9-152, respectively.

The tenth embodiment group.

Figure 103:
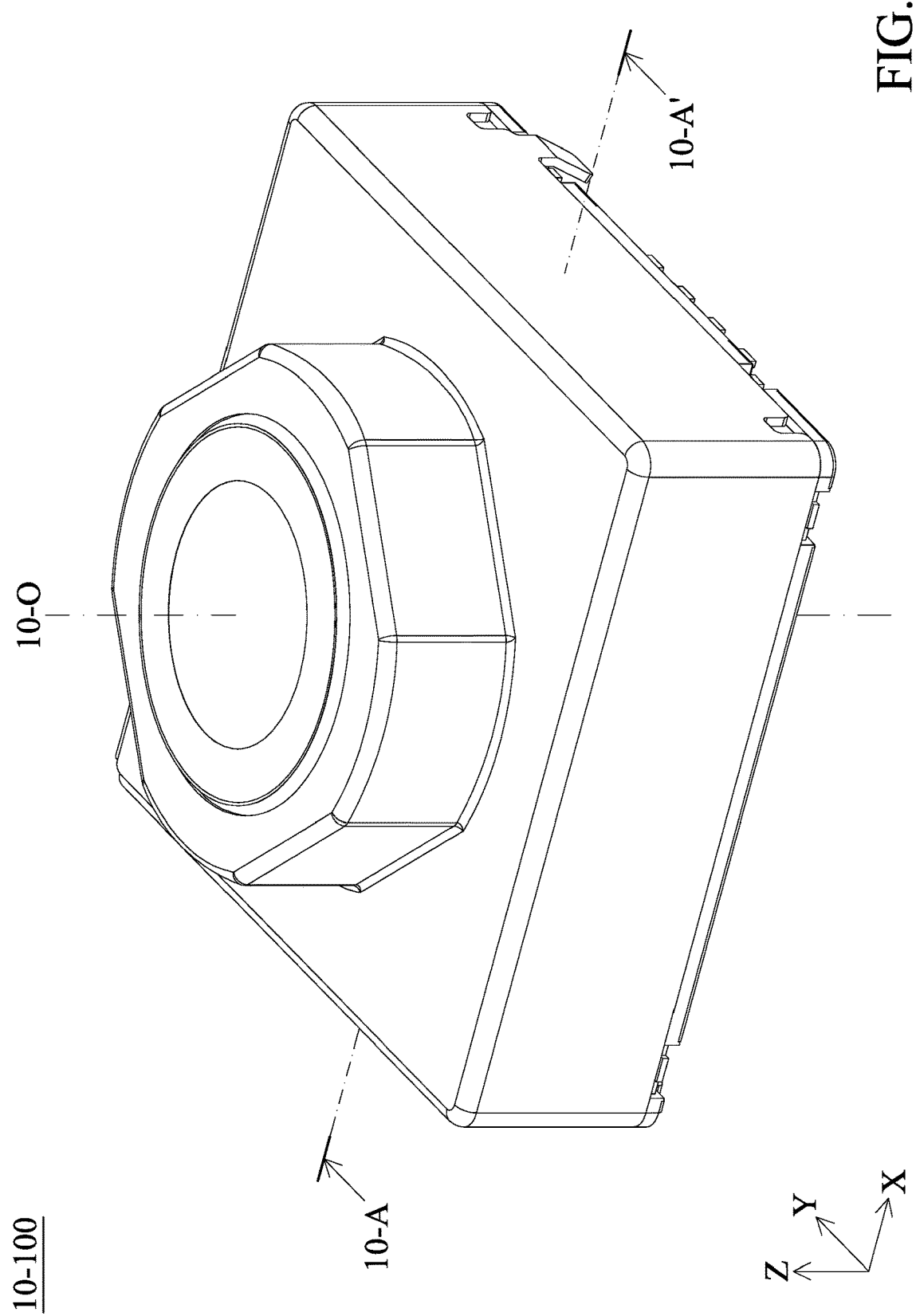
FIG. 103 is a schematic diagram of an optical system 10-100 according to an embodiment of the present disclosure.
Figure 104:
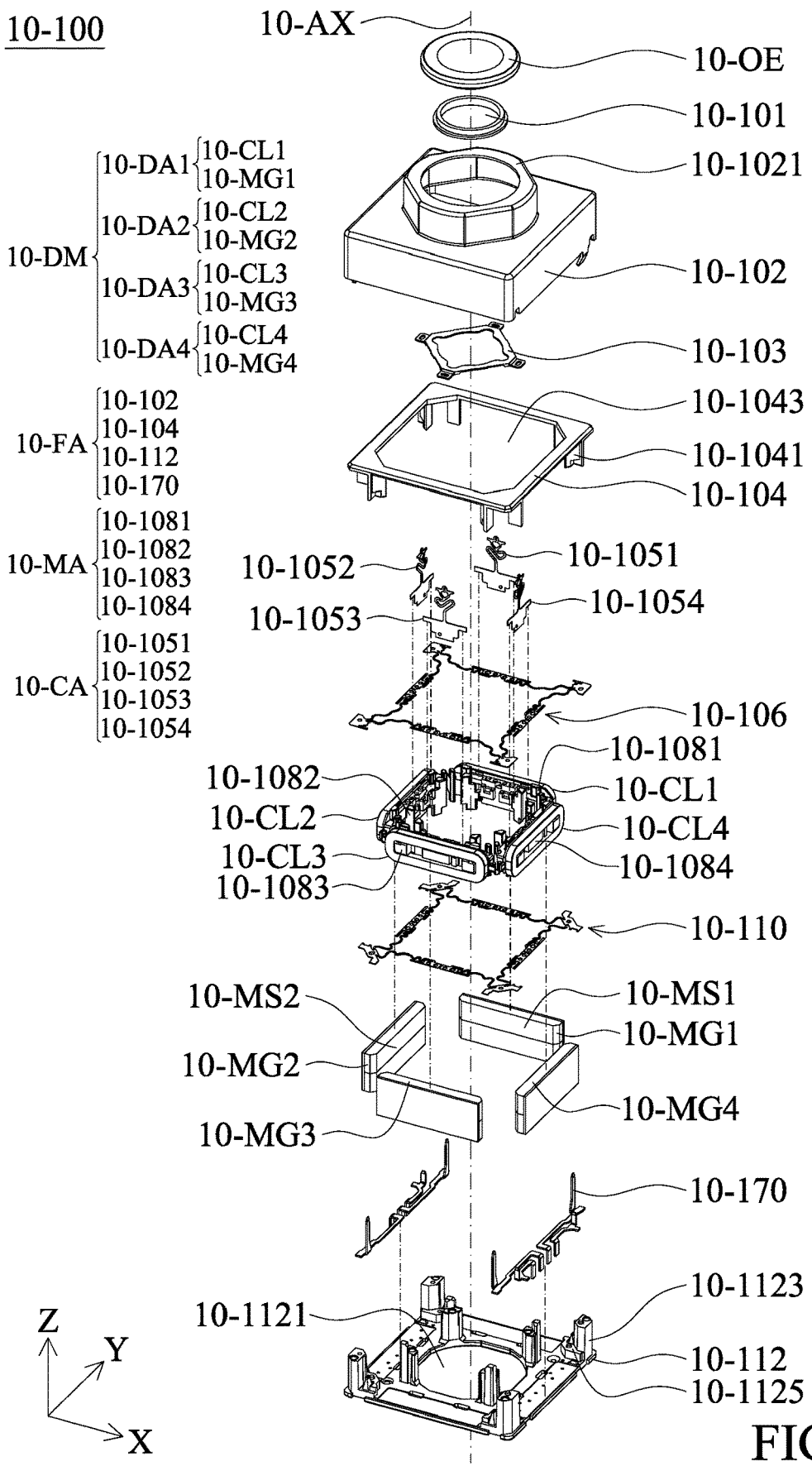
FIG. 104 is an exploded diagram of an optical system 10-100 according to an embodiment of the present disclosure.
Figure 105:
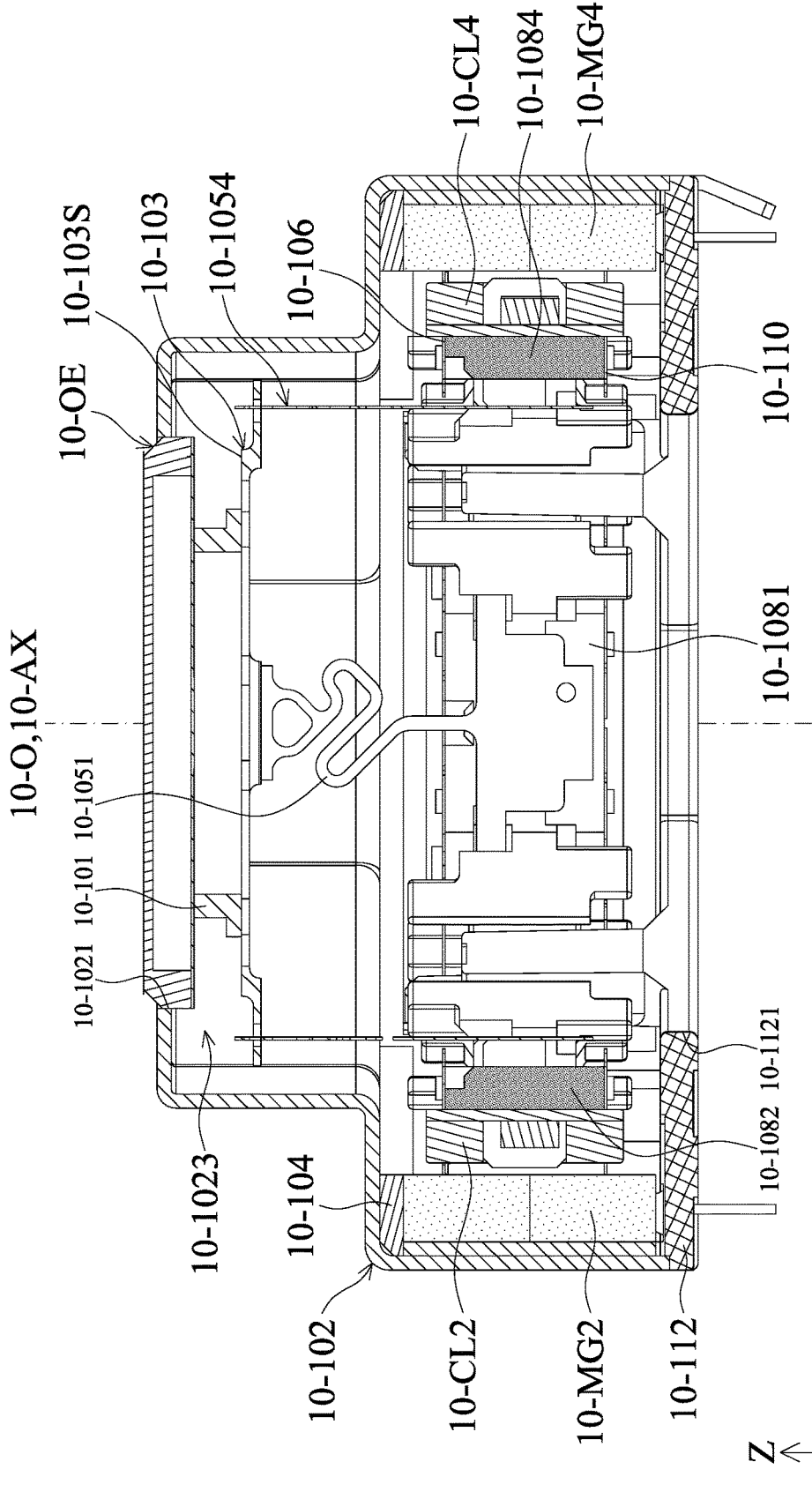
FIG. 105 is a cross-sectional view of the optical system 10-100 along line (10-A)-(10-A') in FIG. 103 according to an embodiment of the present disclosure.

Please refer to FIG. 103 to FIG. 105. FIG. 103 is a schematic diagram of an optical system 10-100 according to an embodiment of the present disclosure, FIG. 104 is an exploded diagram of an optical system 10-100 according to an embodiment of the present disclosure, and FIG. 105 is a cross-sectional view of the optical system 10-100 along line (10-A)-(10-A') in FIG. 103 according to an embodiment of the present disclosure. The optical system 10-100 can be an optical camera system and can be configured to hold and drive a first optical element 10-OE, and the first optical element 10-OE may define an optical axis 10-0. The optical system 10-100 can be installed in different electronic devices or portable electronic devices, such as a smartphone, for allowing a user to perform the image capturing function. In this embodiment, the optical system 10-100 can be a voice coil motor (VCM) with an auto-focusing (AF) function, but it is not limited thereto. In other embodiments, the optical system 10-100 can also perform the functions of auto-focusing and optical image stabilization (OIS).

As shown in FIG. 104, in this embodiment, the optical system 10-100 may include a fixed assembly 10-FA, a deforming member 10-101, a movable element 10-103, and a connecting assembly 10-CA, a movable assembly 10-MA and a driving module 10-DM. The deforming member 10-101 is connected between the movable element 10-103 and the first optical element 10-OE, the movable element 10-103 is movable relative to the fixed assembly 10-FA, and the driving module 10-DM is configured to drive the movable element 10-103 to move relative to the fixed assembly 10-FA. Specifically, the movable assembly 10-MA is movably connected to the movable element 10-103 via the connecting assembly 10-CA, and the driving module 10-DM drives the movable assembly 10-MA to move relative to the fixed assembly 10-FA, thereby driving the movable element 10-103.

In this embodiment, as shown in FIG. 104 and FIG. 105, the fixed assembly 10-FA includes a casing 10-102, a frame 10-104, and a base 10-112. The casing 10-102 is fixedly connected to the base 10-112, and the frame 10-104 can also be fixedly connected to the inner wall surface of the casing 10-102. A main axis 10-AX can be defined by the fixed assembly 10-FA. When the optical system 10-100 is not activated, the main axis 10-AX is parallel to or overlaps an optical axis 10-O of the first optical element 10-OE. In addition, the movable element 10-103 has a movable element surface 10-103S which faces the first optical element 10-OE.

As shown in FIG. 104 and FIG. 105, the aforementioned casing 10-102 has a hollow structure, and a casing opening 10-1021 is formed thereon. A base opening 10-1121 is formed on the base 10-112, The center of the casing opening 10-1021 corresponds to the optical axis 10-O of the first optical element 10-OE, and the base opening 10-1121 corresponds to a photosensitive element (not shown in the figure) disposed below the base 10-112. In this embodiment, the first optical element 10-OE is fixedly disposed in the casing opening 10-1021. The external light can enter the casing 10-102 through the first optical element 10-OE and then is received by the aforementioned photosensitive element after passing through the base opening 10-1121 so as to generate a digital image signal.

Furthermore, the casing 10-102 is disposed on the base 10-112 and may have an accommodating space 10-1023 configured to accommodate the movable element 10-103, the frame 10-104, and the movable assembly 10-MA, the connecting assembly 10-CA, and the driving module 10-DM.

As shown in FIG. 104 and FIG. 105, in this embodiment, the movable assembly 10-MA may include four movable members (a first movable member 10-1081, a second movable member 10-1082, and a third movable member 10-1083 and a fourth movable member 10-1084), and the connecting assembly 10-CA may include four connecting members (a first connecting member 10-1051, a second connecting member 10-1052, a third connecting member 10-1053, and a fourth connecting member 10-1054). The first movable member 10-1081 to the fourth movable member 10-1084 are connected to the movable element 10-103 by the first connecting member 10-1051 to the fourth connecting member 10-1054, respectively.

In addition, the optical system 10-100 may further include a first elastic element 10-106 and a second elastic element 10-110, and the base 10-112 may include four protruding columns 10-1123. The outer portion (the outer ring portion) of the first elastic element 10-106 is fixedly disposed on the top surfaces of the protruding columns 10-1123, the outer portion (the outer ring portion) of the second elastic element 10-110 is fixedly disposed on a plane 10-1125 of each of the protruding columns 10-1123, and the inner portions (the inner ring portions) of the first elastic element 10-106 and the second elastic element 10-110 are respectively connected to the upper and lower sides of the movable assembly 10-MA so that the first movable member 10-1081 to the fourth movable member 10-1084 are suspended in the accommodating space 10-1023.

In this embodiment, the driving module 10-DM may include four driving assemblies (a first driving assembly 10-DA1, a second driving assembly 10-DA2, a third driving assembly 10-DA3, and a fourth driving assembly 10-DA4). The first driving assembly 10-DA1 includes a first driving coil 10-CL1 and a first magnetic element 10-MG1, and the second driving assembly 10-DA2 includes a second driving coil 10-CL2 and a second magnetic element 10-MG2, the third driving assembly 10-DA3 includes a third driving coil 10-CL3 and a third magnetic element 10-MG3, and the fourth driving assembly 10-DA4 includes a fourth driving coil 10-CL4 and a fourth magnetic element 10-MG4.

In this embodiment, each magnetic element has a magnetic surface. For example, as shown in FIG. 104, the first magnetic element 10-MG1 and the second magnetic element 10-MG2 respectively have a first magnetic surface 10-MS1 and a second magnetic surface 10-MS2, the first magnetic surface 10-MS1 faces the first driving coil 10-CL1, the second magnetic surface 10-MS2 faces the second driving coil 10-CL2, and the first magnetic surface 10-MS1 and the second magnetic surface 10-MS2 face different directions.

In this embodiment, as shown in FIG. 104, the frame 10-104 has a plurality of grooves 10-1041 and a central opening 10-1043. In this embodiment, the frame 10-104 has four grooves 10-1041 configured to receive the four magnetic elements, but the number of the grooves 10-1041 and the magnetic elements is not limited to this embodiment. The central opening 10-1043 is configured to accommodate the first driving coil 10-CL1 to the fourth driving coil 10-CL4 and the first movable member 10-1081 to the fourth movable member 10-1084.

In this embodiment, the first driving coil 10-CL1 to the fourth driving coil 10-CL4 may be winding coils, which are respectively disposed on the first movable member 10-1081 to the fourth movable member 10-1084, and when the first driving coil 10-CL1 to the fourth driving coil 10-CL4 are provided with electricity, they can respectively act with the first magnetic element 10-MG1 to the fourth magnetic element 10-MG4 to generate an electromagnetic driving force to drive at least one of the first movable member 10-1081 to the fourth movable member 10-1084 to move relative to the base 10-112 and the frame 10-104 along the optical axis 10-0 (the Z-axis) so as to perform the functions of auto focusing or optical image stabilization.

The driving assembly of the driving module 10-DM can actuate individually or cooperatively. For example, the first driving assembly 10-DA1 is configured to drive the first movable member 10-1081 to move relative to the fixed assembly 10-FA, and the second driving assembly 10-DA2 is configured to drive the second movable member 10-1082 to move relative to the fixed assembly 10-FA and the first movable member 10-1081, and so on.

Furthermore, as shown in FIG. 104, in this embodiment, the fixed assembly 10-FA may further include at least one circuit member 10-170 configured to be electrically connected to the driving module 10-DM through the first elastic element 10-106 or the second elastic element 10-110. The circuit member 10-170 may be implemented by insert molding technology, but it is not limited thereto.

Figure 106:
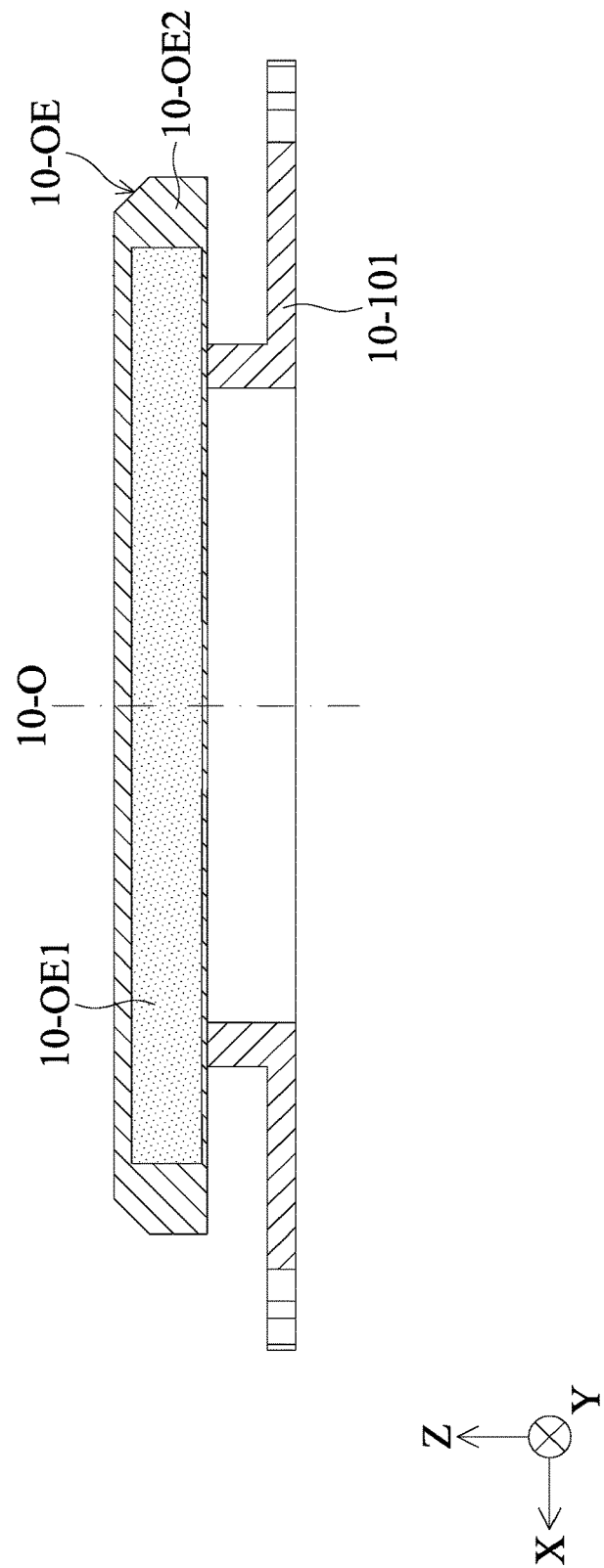
FIG. 106 is a schematic diagram illustrating that the first optical element 10-OE is not pushed by the deforming member 10-101 according to an embodiment of the present disclosure.
Figure 107:
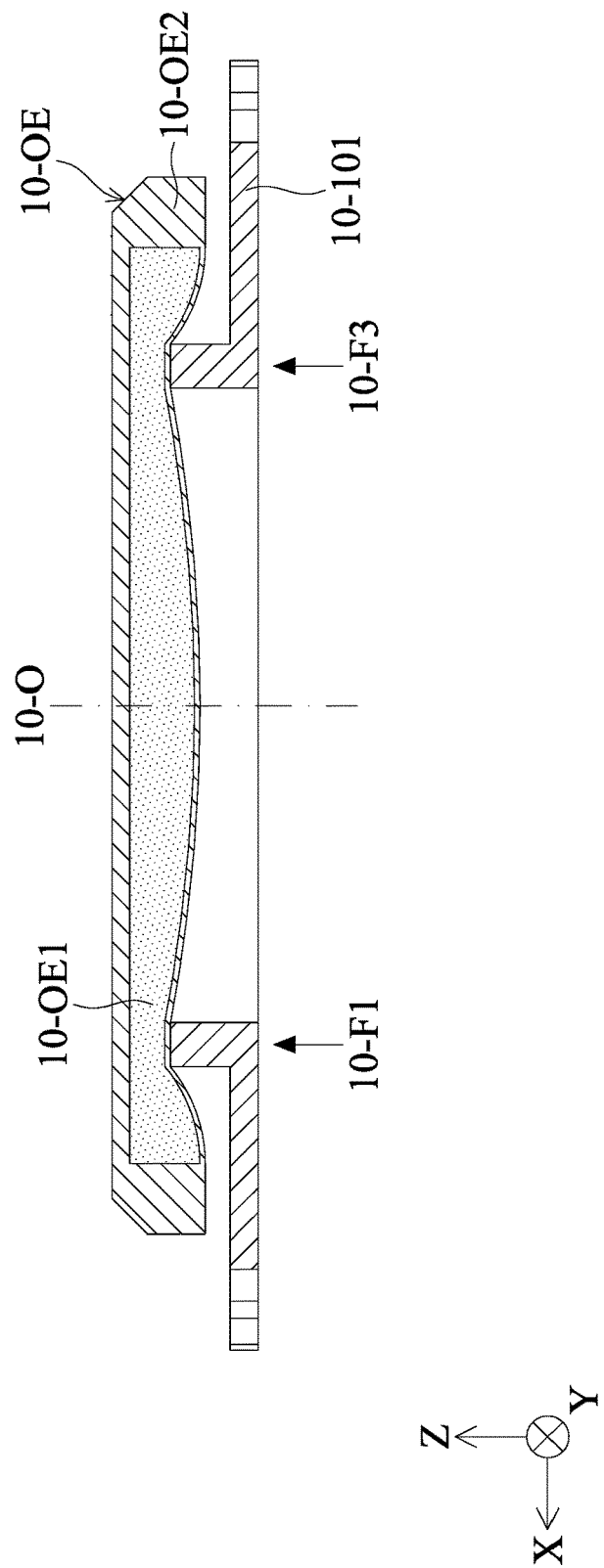
FIG. 107 and FIG. 108 are schematic diagrams of the first optical element 10-OE after being pushed by the deforming member 10-101 according to an embodiment of the present disclosure.
Figure 108:
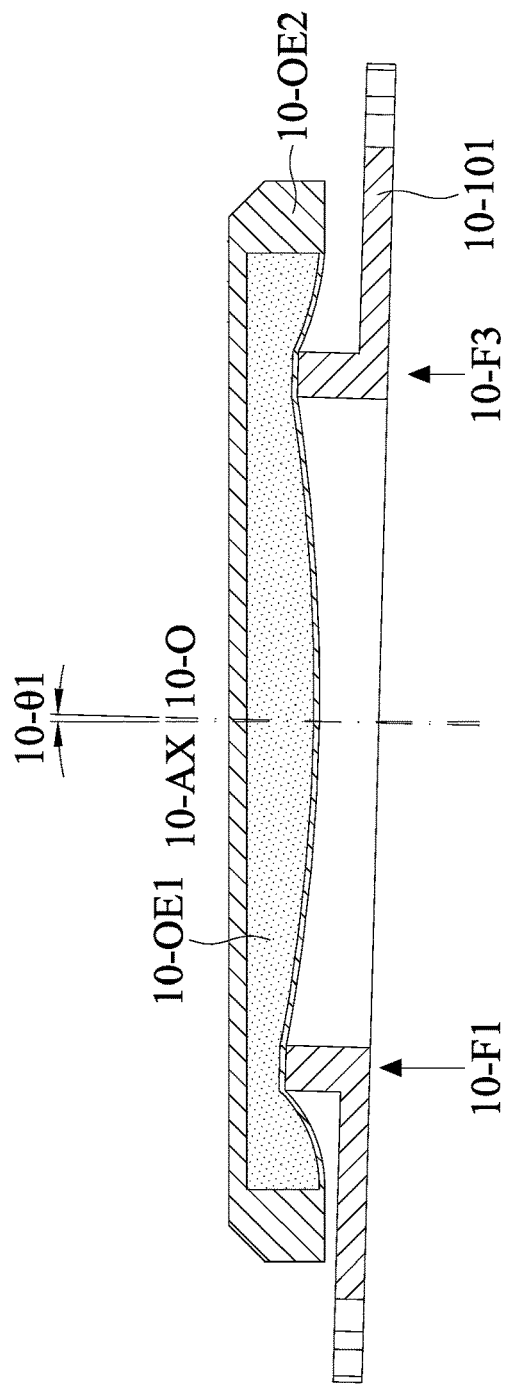

Next, please refer to FIG. 106 to FIG. 108. FIG. 106 is a schematic diagram illustrating that the first optical element 10-OE is not pushed by the deforming member 10-101 according to an embodiment of the present disclosure, and FIG. 107 and FIG. 108 are schematic diagrams of the first optical element 10-OE after being pushed by the deforming member 10-101 according to an embodiment of the present disclosure. As shown in FIG. 106, the first optical element 10-OE may be a liquid lens, including a liquid lens element 10-OE1 and a fixed member 10-OE2. The liquid lens element 10-OE1 is disposed within of the fixed member 10-OE2 having a hollow structure that protects and supports the liquid lens element 10-OE1. The deforming member 10-101 is disposed under the liquid lens element 10-OE1 and the fixed member 10-OE2. The bottom of the fixed member 10-OE2 may be a thin film, so that the deforming member 10-101 may be used for changing the shape of the liquid lens element 10-OE1.

FIG. 106 shows that the liquid lens element 10-OE1 is not deformed and the deforming member 10-101 is in an initial position, and the liquid lens element 10-OE1 has an optical axis 10-0. When the driving module 10-DM drives the movable assembly 10-MA to move, for example, applying a driving current to the driving coils of the driving module 10-DM, a magnetic force is generated between the driving coils and the corresponding magnetic elements, so that the movable assembly 10-MA is driven to move through the magnetic force and to force the deforming member 10-101 though the connecting assembly 10-CA to press the lower side of the liquid lens element 10-OE1. Therefore the liquid lens element 10-OE1 is deformed.

As shown in FIG. 104 and FIG. 107, when the first driving assembly 10-DA1 and the third driving assembly 10-DA3 of the driving module 10-DM provide pushing forces 10-F1, 10-F3 of the same magnitude, the deforming member 10-101 translates along the optical axis 10-0. At this time, the lens curvature of the liquid lens element 10-OE1 is changed from the curvature of the liquid lens element 10-OE1 in FIG. 106. That is, the shape of the liquid lens element 10-OE1 is changed. Therefore, the optical properties of the liquid lens element 10-OE1 can be changed, thereby achieving an optical zoom, focus or shock-proofing effect.

Similarly, referring to FIG. 108, when the driving module 10-DM drives the deforming member 10-101 with a tilted movement, as illustrated in FIG. 108, the deforming member 10-101 obliquely moves and provides an unequal amount of pushing forces 10-F1 and 10-F3 to two different sides of the liquid lens element 10-OE1, so that the optical axis 10-0 of the liquid lens element 10-OE1 is rotated and is deviated from the main axis 10-AX. That is, there is an angle 10-θ1 formed between them. Therefore, the optical properties of the liquid lens element 10-OE1 are changed, and the optical zoom, focusing or shock-proofing effect can be accomplished.

Figure 109:
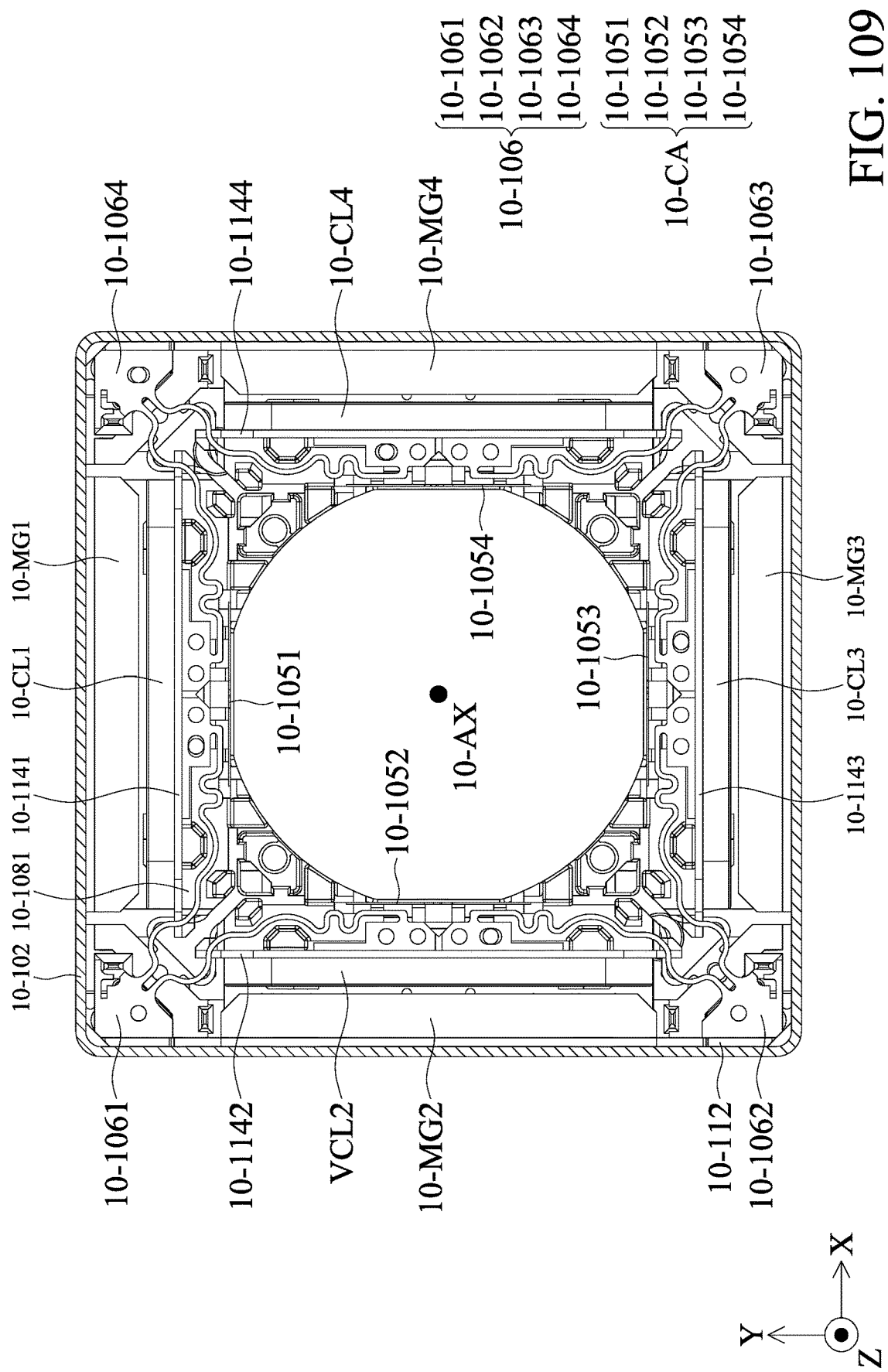
FIG. 109 is a top view of a partial structure of the optical system 10-100 according to an embodiment of the present disclosure.

Please refer to FIG. 109, which is a top view of a partial structure of the optical system 10-100 according to an embodiment of the present disclosure. When viewed along the main axis 10-AX, the first elastic element 10-106 is located in a plurality of corners of the polygonal casing 10-102, and the plurality of connecting members of the connecting assembly 10-CA are evenly distributed between these corners, respectively. For example, as shown in FIG. 109, the first elastic element 10-106 may include four conductive elements 10-1061 to 10-1064, which are respectively connected to portions of the base 10-112 located at the four corners of the casing 10-102, and the second connecting member 10-1052 is located between the conductive element 10-1061 and the conductive element 10-1062.

The arrangement of the first elastic element 10-106 and the connecting assembly 10-CA may not be limited to this embodiment. For example, in other embodiments, when viewed along the main axis 10-AX, the four conductive elements 10-1061 to 10-1064 of the first elastic element 10-106 may be located at four sides of the casing 10-102, and the four connecting members (the first connecting member 10-1051 to the fourth connecting member 10-1054) of the connecting assembly 10-CA can be respectively distributed at the four corners of the casing 10-102.

As shown in FIG. 109, the optical system 10-100 may further include a plurality of circuit boards 10-1141 to 10-1144, which are respectively disposed between the corresponding driving coils and movable members. For example, the circuit board 10-1141 is disposed between the first movable member 10-1081 and the first driving coil 10-CL1.

Figure 110:
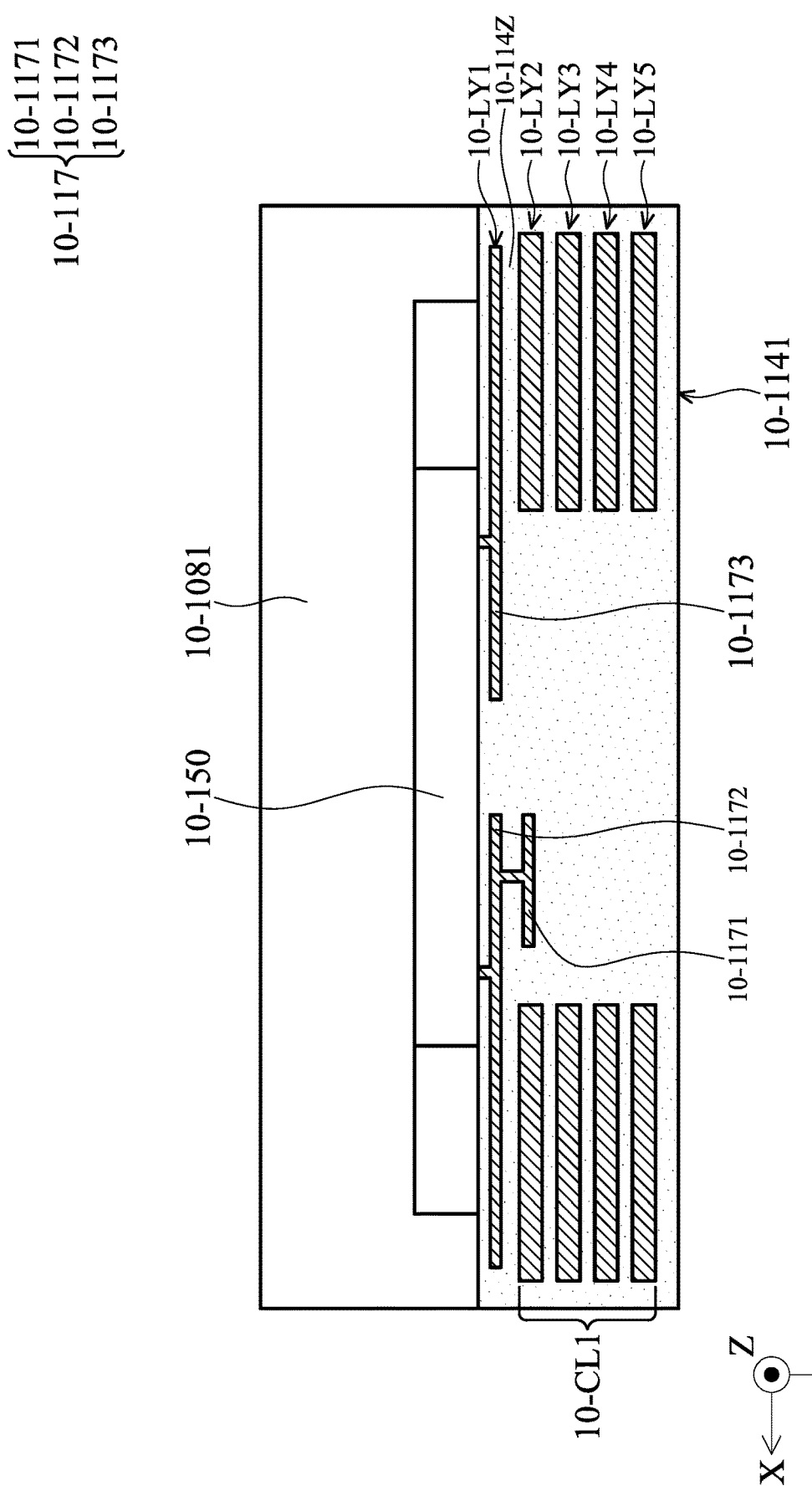
FIG. 110 is a schematic cross-sectional view of the circuit board 10-1141 and the first movable member 10-1081 according to an embodiment of the present disclosure.

Please refer to FIG. 110, which is a schematic cross-sectional view of the circuit board 10-1141 and the first movable member 10-1081 according to an embodiment of the present disclosure. In this embodiment, the circuit board 10-1141 has a plate-shaped structure and is disposed on the first movable member 10-1081. The first driving coil 10-CL1 can be integrated into the circuit board 10-1141, and an electronic component 10-150 may be disposed between the circuit board 10-1141 and the first movable member 10-1081. As shown in FIG. 110, the circuit board 10-1141 includes a coil (the first driving coil 10-CL1) and a circuit line 10-117. The first driving coil 10-CL1 is electrically connected to the electronic components 10-150 by the circuit line 10-117. When viewed in a direction of the circuit board 10-1141 (for example, in the X-axis), the first driving coil 10-CL1 partially overlaps the circuit line 10-117.

In this embodiment, the circuit board 10-1141 has a multilayer structure, for example, it includes a first layer 10-LY1 to a fifth layer 10-LY5, and the first driving coil 10-CL1 is disposed on the second layer 10-LY2 to the fifth layer 10-LY5. As shown in FIG. 110, when viewed in a direction perpendicular to the circuit board 10-1141 (for example, in the Y-axis), the first driving coil 10-CL1 partially overlaps the circuit line 10-117, and the first driving coil 10-CL1 surrounds a first portion 10-1171 of the circuit line 10-117.

As shown in FIG. 110, a portion of the first driving coil 10-CL1 is disposed on the second layer 10-LY2, and the first portion 10-1171 of the circuit line 10-117 is disposed on the second layer 10-LY2. In addition, a second portion 10-1172 of the circuit line 10-117 is disposed on the first layer 10-LY1, and when viewed in a direction of the first layer 10-LY1 (for example, in the X-axis), the circuit line 10-117 on the first layer 10-LY1 does not overlap the first driving coil 10-CL1.

Furthermore, another portion of the first driving coil 10-CL1 is disposed on the third layer 10-LY3, and when viewed in a direction of the third layer 10-LY3 (in the X-axis), the first driving coil 10-CL1 on the third layer 10-LY3 does not overlap the circuit line 10-117.

In addition, the circuit board 10-1141 further includes an insulating layer 10-114Z formed between the first layer 10-LY1 and the second layer 10-LY2, and the insulating layer 10-114Z is in direct contact with the first layer 10-LY1 and the second layer 10-LY2. Specifically, the circuit board 10-1141 may include a plurality of insulating layers 10-114Z, and these insulating layers 10-114Z are integrally formed and cover the circuit line 10-117 and the first driving coil 10-CL1.

Figure 111:
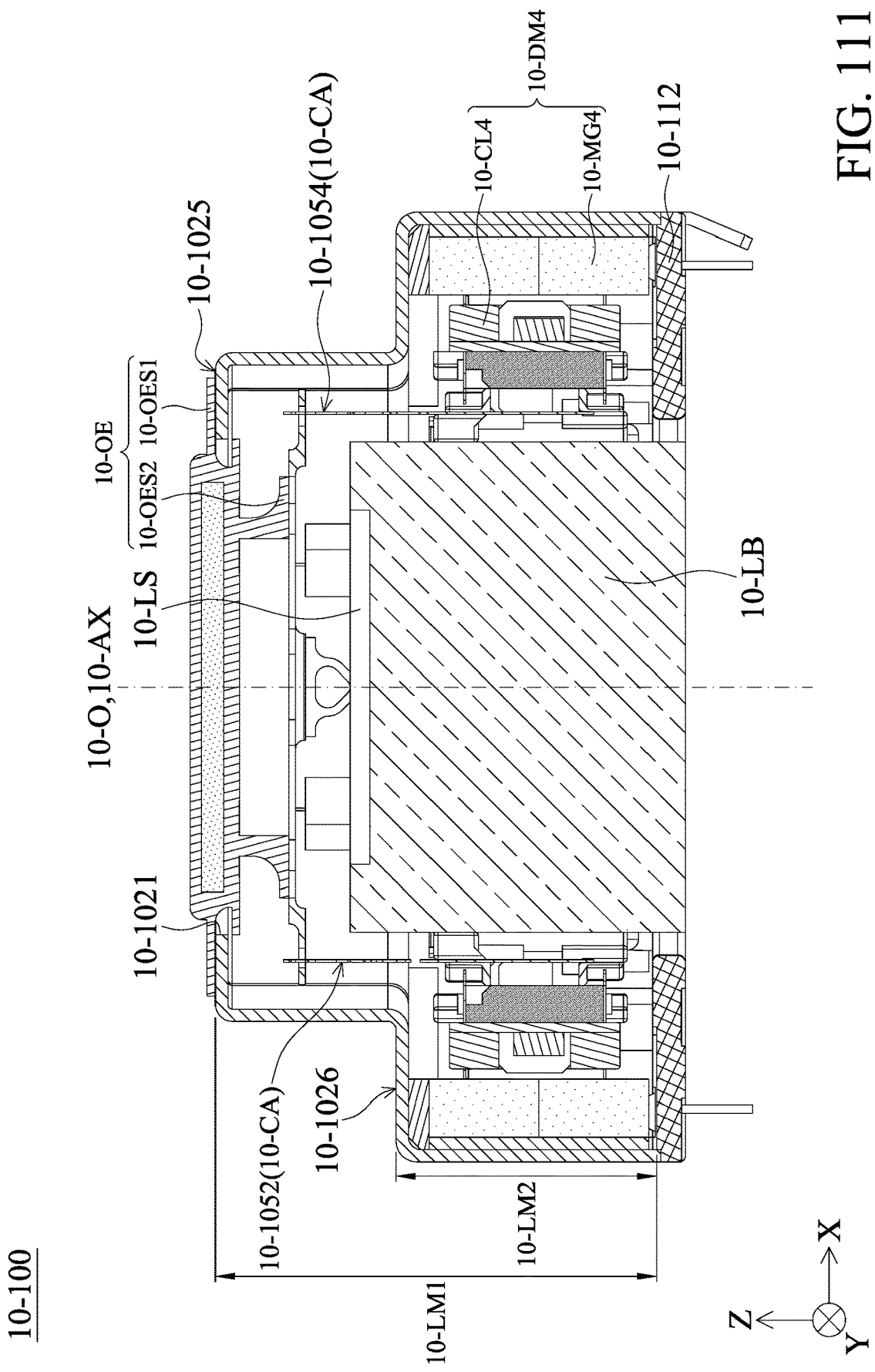
FIG. 111 is a schematic cross-sectional view of the optical system 10-100 according to another embodiment of the present disclosure.

Please continue to refer to FIG. 111, which is a schematic cross-sectional view of the optical system 10-100 according to another embodiment of the present disclosure. In this embodiment, the deforming member 10-101 of the foregoing embodiment and the first optical element 10-OE may be integrally formed in one piece, and the first optical element 10-OE may have a first section 10-OES1 and a second section 10-OES2. When viewed along the main axis 10-AX, the size of the first section 10-OES1 is larger than that of the casing opening 10-102, and the size of the second section 10-OES2 is smaller than that of the casing opening 10-1021.

In addition, in this embodiment, the optical system 10-100 may further include a lens barrel 10-LB, a second optical element 10-LS is disposed in the lens barrel 10-LB, and when viewed along the main axis 10-AX, the effective optical area of the first optical element 10-OE is larger than the effective optical area of the second optical element 10-LS. In other words, the light passage portion of the first optical element 10-OE (the liquid lens) is larger than the light passage portion of the second optical element 10-LS (the general lens).

Furthermore, the casing 10-102 has a first top surface 10-1025 which contacts the first optical element 10-OE, and as shown in FIG. 111, when viewed along the main axis 10-AX, the first top surface 10-1025 does not overlap the driving module 10-DM.

As shown in FIG. 111, the casing opening 10-1021 is located on the first top surface 10-1025 of the casing 10-102 and corresponds to the main axis 10-AX, and the first top surface 10-1025 is not parallel to the main axis 10-AX. For example, the main axis 10-AX is perpendicular to the first top surface 10-1025. When viewed along the main axis 10-AX, the first top surface 10-1025 at least partially overlaps the connecting assembly 10-CA. As shown in FIG. 111, when viewed along the main axis 10-AX, the first top surface 10-1025 at least overlaps the second connecting member 10-1052 and the fourth connecting member 10-1054.

As shown in FIG. 111, the casing 10-102 further includes a second top surface 10-1026, the first top surface 10-1025 and the second top surface 10-1026 are not parallel to the main axis 10-AX, and the first top surface 10-1025 and the second top surface 10-1026 both are back to the base 10-112 (i.e., both face a direction opposite to the base 10-112). Specifically, the shortest distance 10-LM2 between the second top surface 10-1026 and the base 10-112 is smaller than the shortest distance 10-LM1 between the first top surface 10-1025 and the base 10-112.

Figure 112:
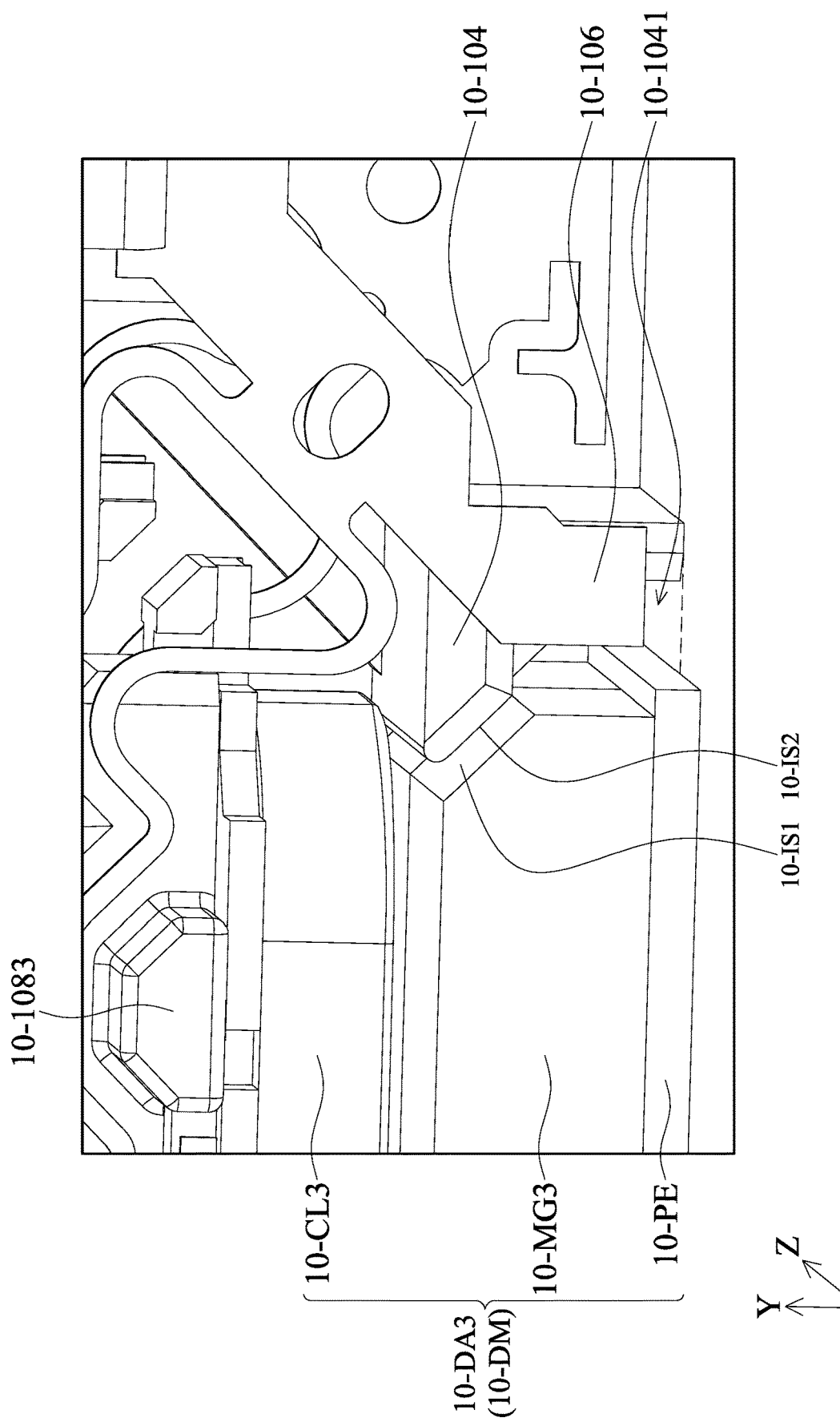
FIG. 112 is a schematic partial structural diagram of the optical system 10-100 according to an embodiment of the present disclosure.

Next, please refer to FIG. 112, which is a schematic partial structural diagram of the optical system 10-100 according to an embodiment of the present disclosure. In this embodiment, each driving assembly of the driving module 10-DM may further include a magnetically permeable element. As shown in FIG. 112, in addition to the third magnetic element 10-MG3 (the driving magnet) and the third driving coil 10-CL3, the third driving assembly 10-DA3 of the driving module 10-DM may further include a magnetically permeable element 10-PE, and the area of the magnetically permeable element 10-PE is larger than that of the third magnetic element 10-MG3.

In addition, as shown in FIG. 112, the third magnetic element 10-MG3 may have an inclined surface 10-IS1, and a stopping slope 10-IS2 is formed on the frame 10-104. The stopping slope 10-IS2 is configured to block the third magnetic element 10-MG3 for preventing the third magnetic element 10-MG3 from colliding with the third driving coil 10-CL3.

Figure 113:
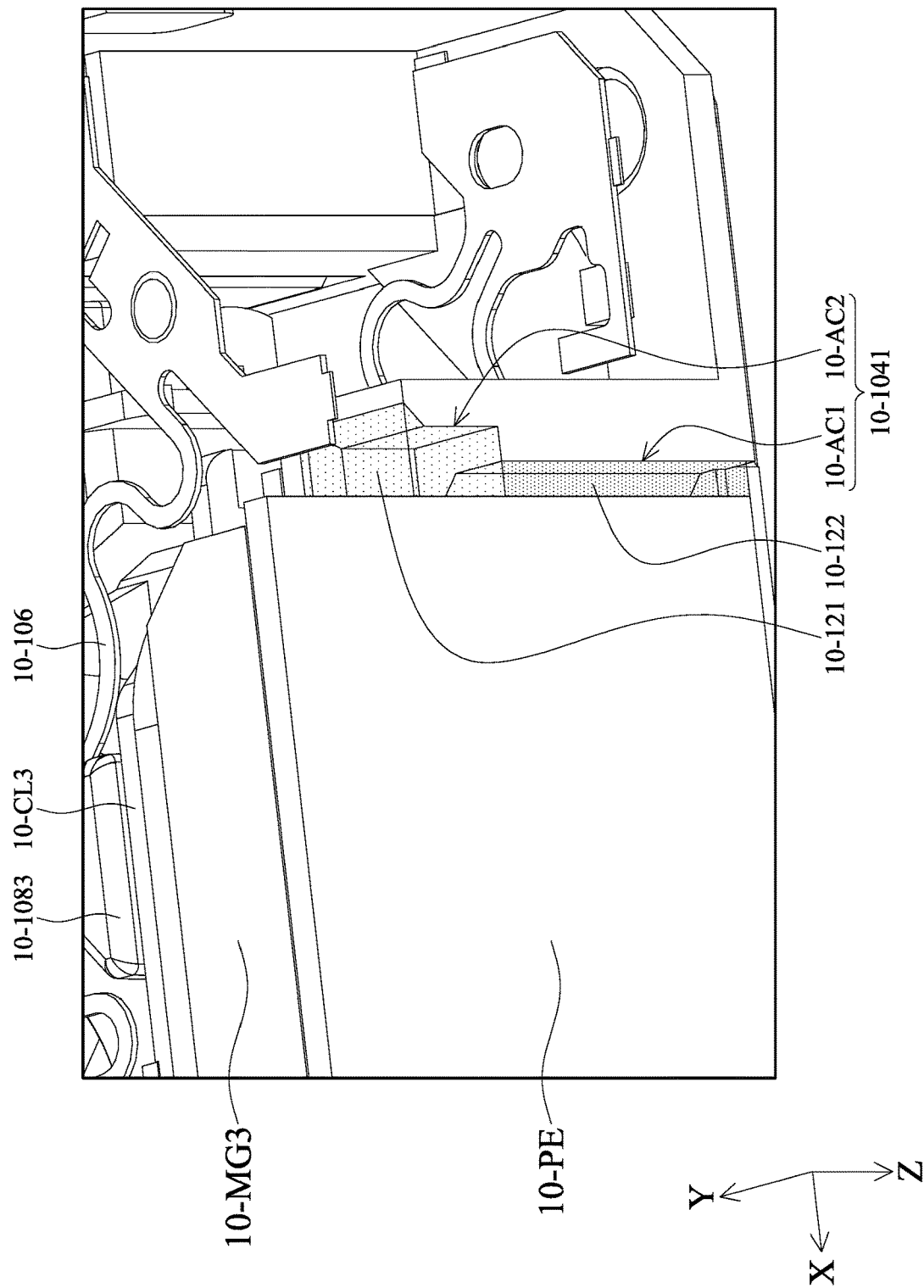
FIG. 113 is a partial structural diagram of the optical system 10-100 from another angle according to an embodiment of the present disclosure.

Next, please refer to FIG. 112 and FIG. 113. FIG. 113 is a partial structural diagram of the optical system 10-100 from another angle according to an embodiment of the present disclosure. As shown in FIG. 112 and FIG. 113, the groove 10-1041 on the frame 10-104 corresponds to the magnetically permeable element 10-PE. Furthermore, in this embodiment, when viewed along the main axis 10-AX (the Z-axis), the groove 10-1041 partially overlaps the magnetically permeable element 10-PE. That is, in the Y-axis, a portion of the magnetically permeable element 10-PE is located outside the groove 10-1041.

As shown in FIG. 113, the groove 10-1041 has a first accommodating portion 10-AC1 and a second accommodating portion 10-AC2, and there is a step between the first accommodating portion 10-AC1 and the second accommodation portion 10-AC2. In this embodiment, a first adhesive element 10-121 can be disposed in the first accommodating portion 10-AC1, and a second adhesive element 10-122 can be disposed in the second accommodating portion 10-AC2. The first adhesive element 10-121 and the second adhesive element 10-122 are configured to adhere the third magnetic element 10-MG3 and the magnetically permeable element 10-PE to the frame 10-104, and the aforementioned first adhesive element 10-121 and the second adhesive element 10-122 include different materials. For example, one of them may be UV glue, and the other one may be thermosetting glue.

Figure 114:
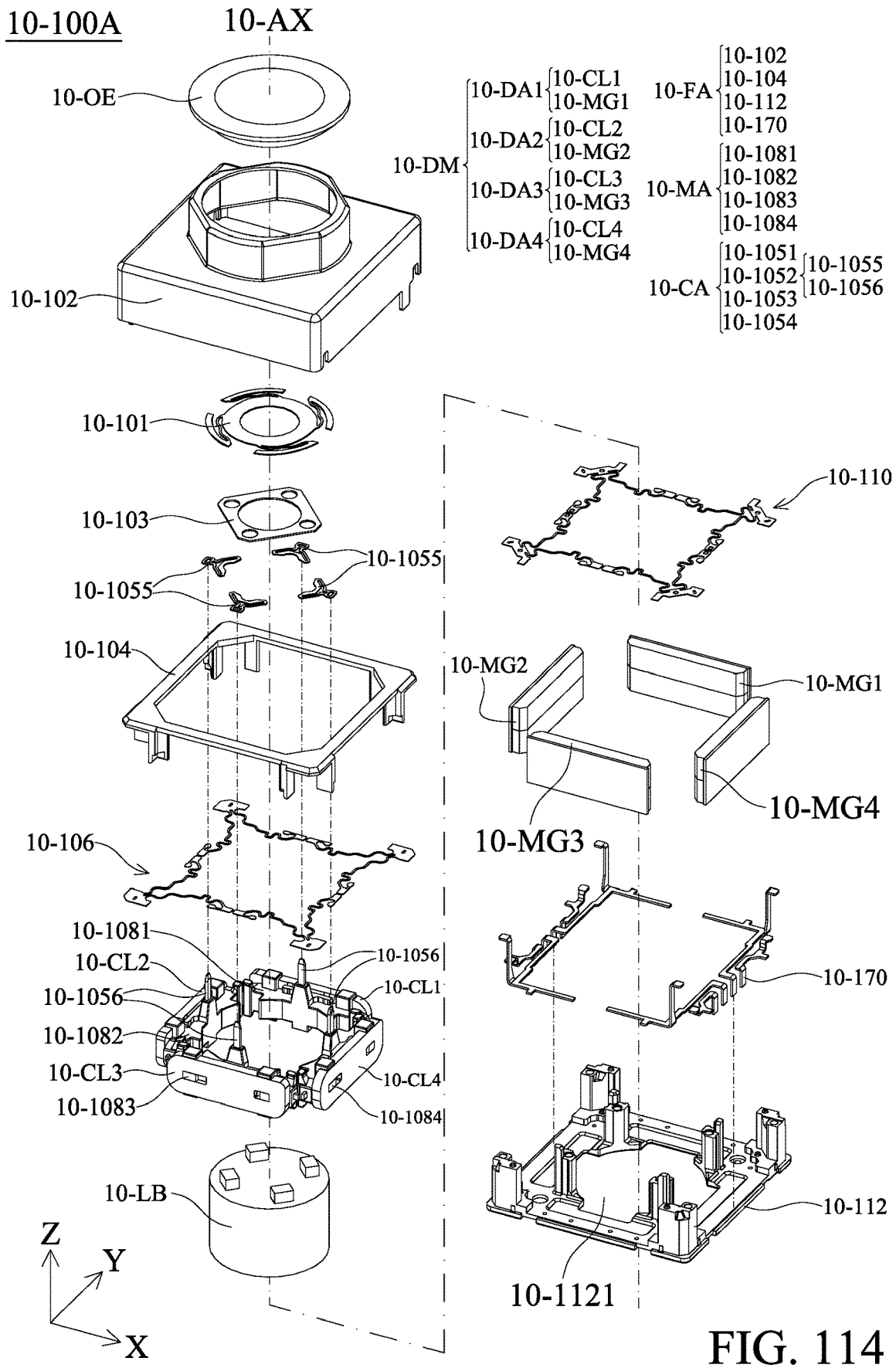
FIG. 114 is an exploded diagram of an optical system 10-100A according to another embodiment of the present disclosure.
Figure 115:
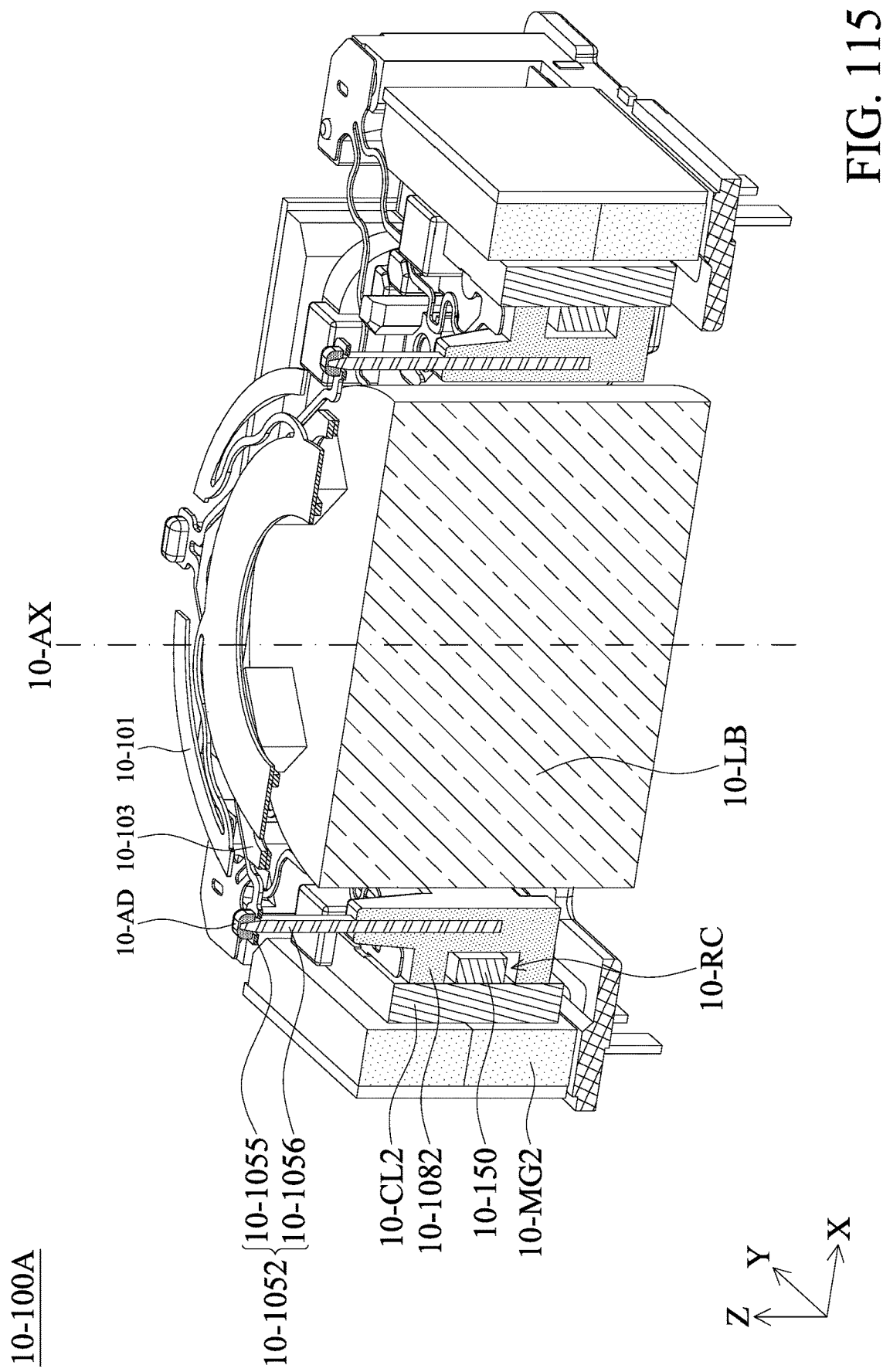
FIG. 115 is a partial structural diagram of the optical system 10-100A according to another embodiment of the present disclosure.

Please refer to FIG. 114 and FIG. 115. FIG. 114 is an exploded diagram of an optical system 10-100A according to another embodiment of the present disclosure, and FIG. 115 is a partial structural diagram of the optical system 10-100A according to another embodiment of the present disclosure. The optical system 10-100A is similar to the optical system 10-100. In this embodiment, the connecting assembly 10-CA of the optical system 10-100A also includes four connecting members, and each connecting member may have an elastic portion and a rigid portion.

As shown in FIG. 114 and FIG. 115, the second connecting member 10-1052 has an elastic portion 10-1055 and a rigid portion 10-1056. The elastic portion 10-1055 may have a plate-shaped structure and is not parallel to the main axis 10-AX, for example, perpendicular to the main axis 10-AX, and the rigid portion 10-1056 is connected to the elastic portion 10-1055 by an adhesive member 10-AD. The rigid portion 10-1056 is connected between the elastic portion 10-1055 and the second movable member 10-1082.

Furthermore, the second driving coil 10-CL2 is disposed on the second movable member 10-1082 of the movable assembly 10-MA, an accommodating recess 10-RC is formed between the second driving coil 10-CL2 and the second movable member 10-1082, and the optical system 10-100A further includes an electronic component 10-150 (such as a control unit or a sensor) which is disposed in the accommodating recess 10-RC. Based on the above design, the electronic component 10-150 can be protected from collision and damage.

Figure 116:
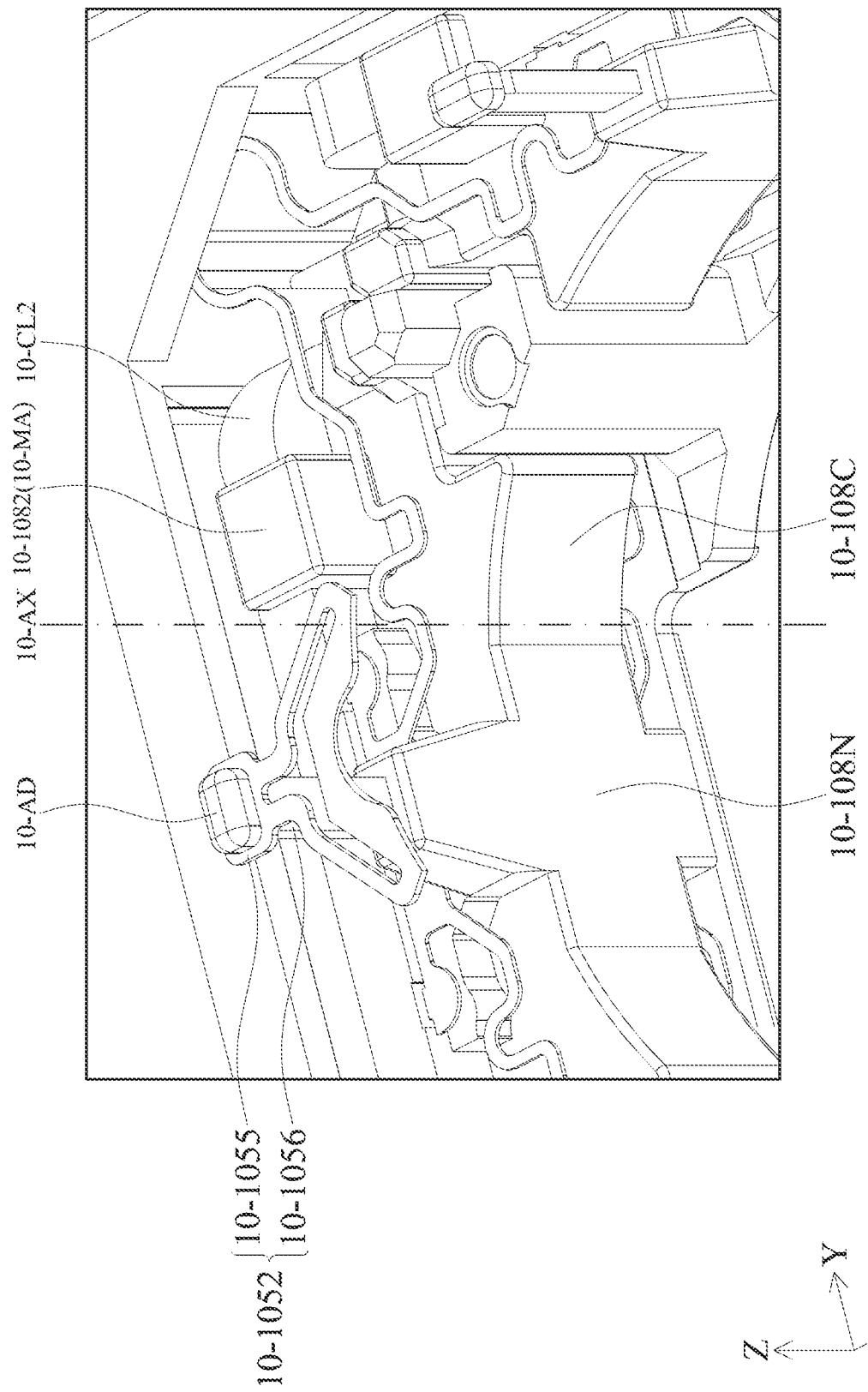
FIG. 116 is a partial structural diagram of the optical system 10-100A according to another embodiment of the present disclosure.

Please refer to FIG. 116, which is a partial structural diagram of the optical system 10-100A according to another embodiment of the present disclosure. As shown in FIG. 116, the second movable member 10-1082 of the movable assembly 10-MA has a plane 10-108N and a curved surface 10-108C, facing the main axis 10-AX. Based on this structural design, the mechanical strength of the movable assembly 10-MA can be increased, and a larger size lens barrel 10-LB can be accommodated.

Figure 117:
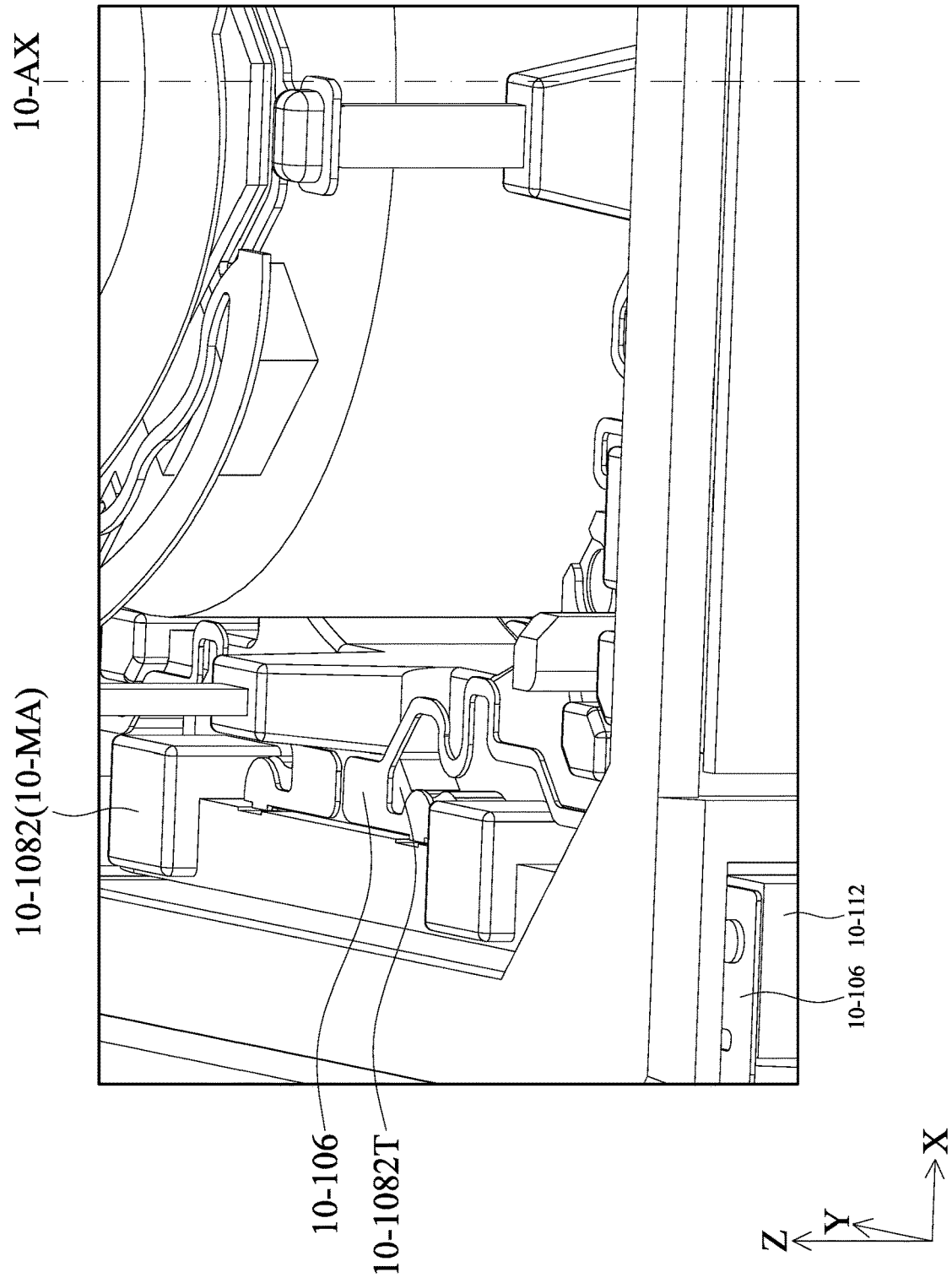
FIG. 117 is a partial structural diagram of an optical system 10-100A according to another embodiment of the present disclosure.
Figure 118:
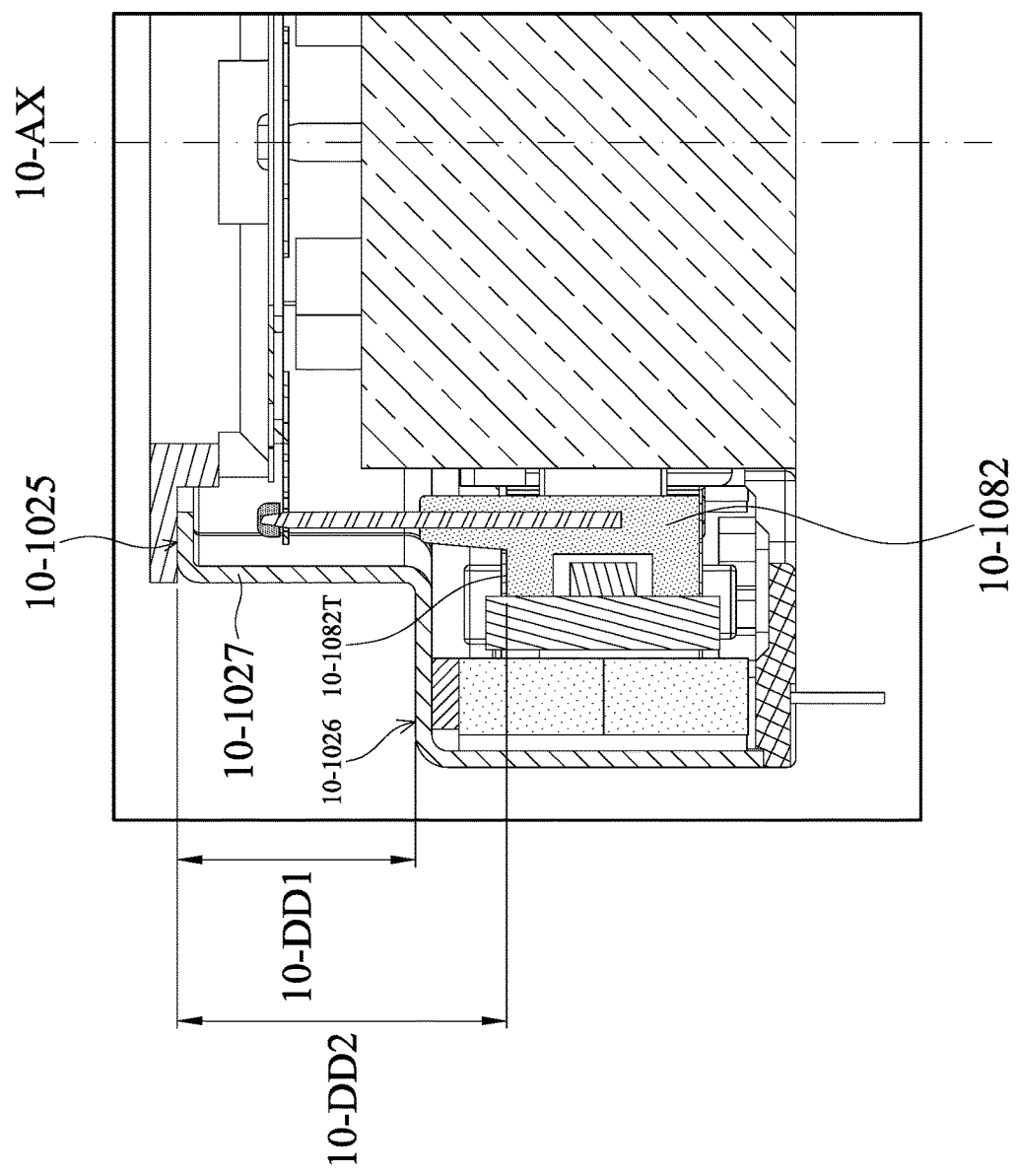
FIG. 118 is a cross-sectional view of a partial structure of the optical system 10-100A according to another embodiment of the present disclosure.

Please refer to FIG. 117 and FIG. 118. FIG. 117 is a partial structural diagram of an optical system 10-100A according to another embodiment of the present disclosure, and FIG. 118 is a cross-sectional view of a partial structure of the optical system 10-100A according to another embodiment of the present disclosure. As shown in FIG. 117 and FIG. 118, the second movable member 10-1082 of the movable assembly 10-MA has a movable assembly surface 10-1082T, and the movable assembly surface 10-1082T is movably connected to the base 10-112 through the first elastic element 10-106. In addition, along the main axis 10-AX, a distance 10-DD1 between the first top surface 10-1025 and the second top surface 10-1026 of the casing 10-102 is shorter than a distance 10-DD2 between the movable assembly surface 10-1082T and the first top surface 10-1025. That is, the movable assembly surface 10-1082T is not in contact with the casing 10-102.

Furthermore, the casing 10-102 further has a side wall 10-1027 connected between the first top surface 10-1025 and the second top surface 10-1026. When viewed along the main axis 10-AX, the side wall 10-1027 partially overlaps the second movable member 10-1082. Based on the design of the casing 10-102 of the present disclosure, the purposes of protecting the movable assembly 10-MA, accommodating a longer lens barrel 10-LB, and miniaturization can be achieved.

The present disclosure provides an optical system having a first optical element 10-OE, a deforming member 10-101, a movable element 10-103, a fixed assembly 10-FA, a connecting assembly 10-CA, a movable assembly 10-MA, and a driving module 10-DM. The movable element 10-103 is configured to be connected to the first optical element 10-OE through the deforming member 10-101, and the movable assembly 10-MA is connected to the movable element 10-103 through the connecting assembly 10-CA. When driving module 10-DM is configured to drive movable assembly 10-MA to move relative to fixed assembly 10-FA, the movable element 10-103 can be moved to drive the deforming member 10-101 to push the bottom of first optical element 10-OE, thereby changing the optical properties of the liquid lens element 10-OE1.

In addition, in some embodiments, the magnetic element is disposed in the groove 10-1041 of the frame 10-104. A stopping slope 10-IS2 is formed on the frame 10-104. The stopping slope 10-IS2 is configured to block the inclined surface 10-IS1 of the magnetic element for preventing the magnetic element from colliding with the corresponding driving coil and causing the driving coil to be damaged. The groove 10-1041 can have a first accommodating portion 10-AC1 and a second accommodating portion 10-AC2, and a first adhesive element 10-121 and a second adhesive element 10-122 can be respectively disposed in the first accommodating portion 10-AC1 and the second accommodating portion 10-AC2 so as to adhere the third magnetic element 10-MG3 and the magnetically permeable element 10-PE to the frame 10-104. In addition, the aforementioned first adhesive element 10-121 and the second adhesive element 10-122 include different materials.

The eleventh embodiment group.

Figure 119:
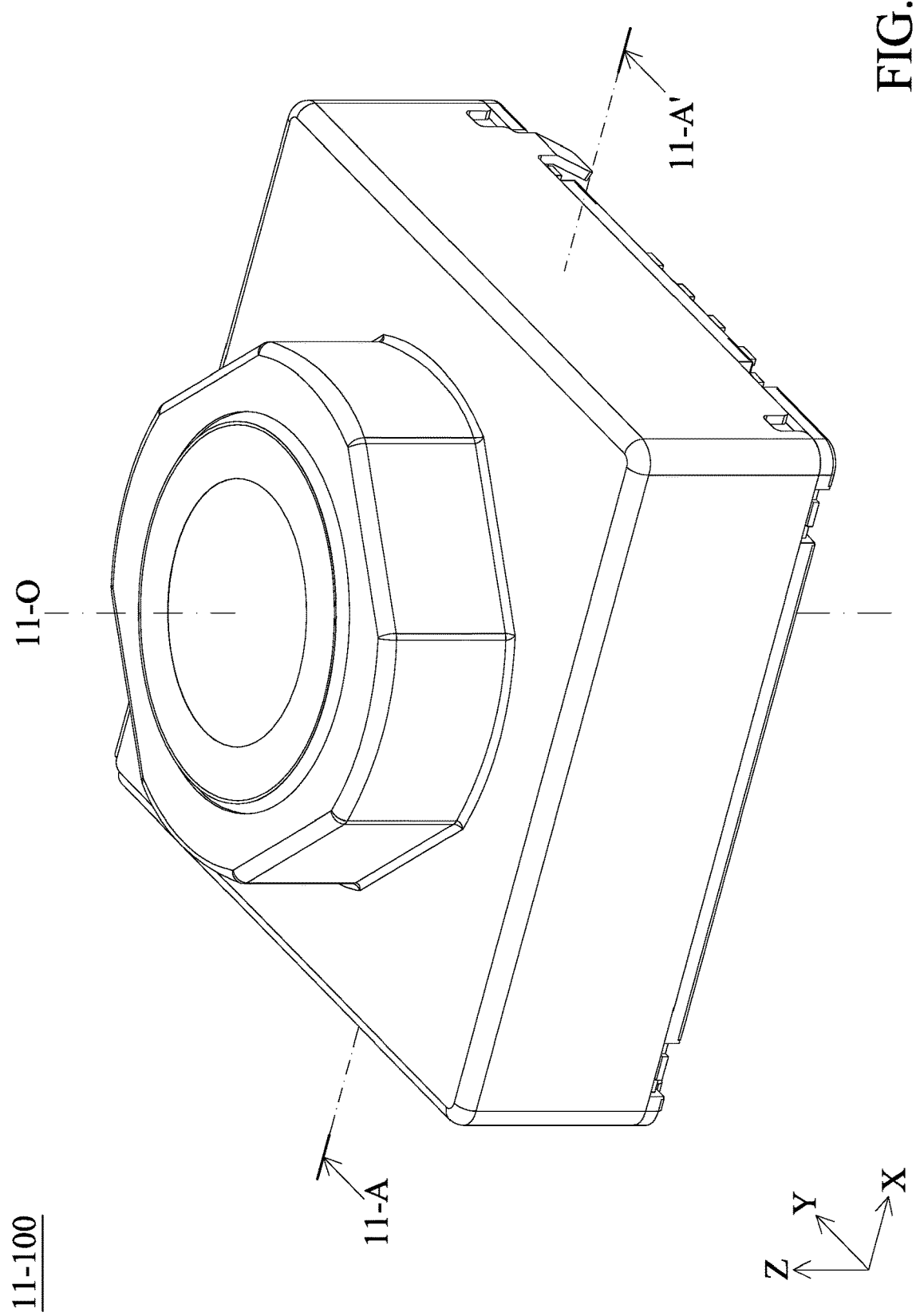
FIG. 119 is a schematic diagram of an optical system 11-100 according to an embodiment of the present disclosure.
Figure 120:
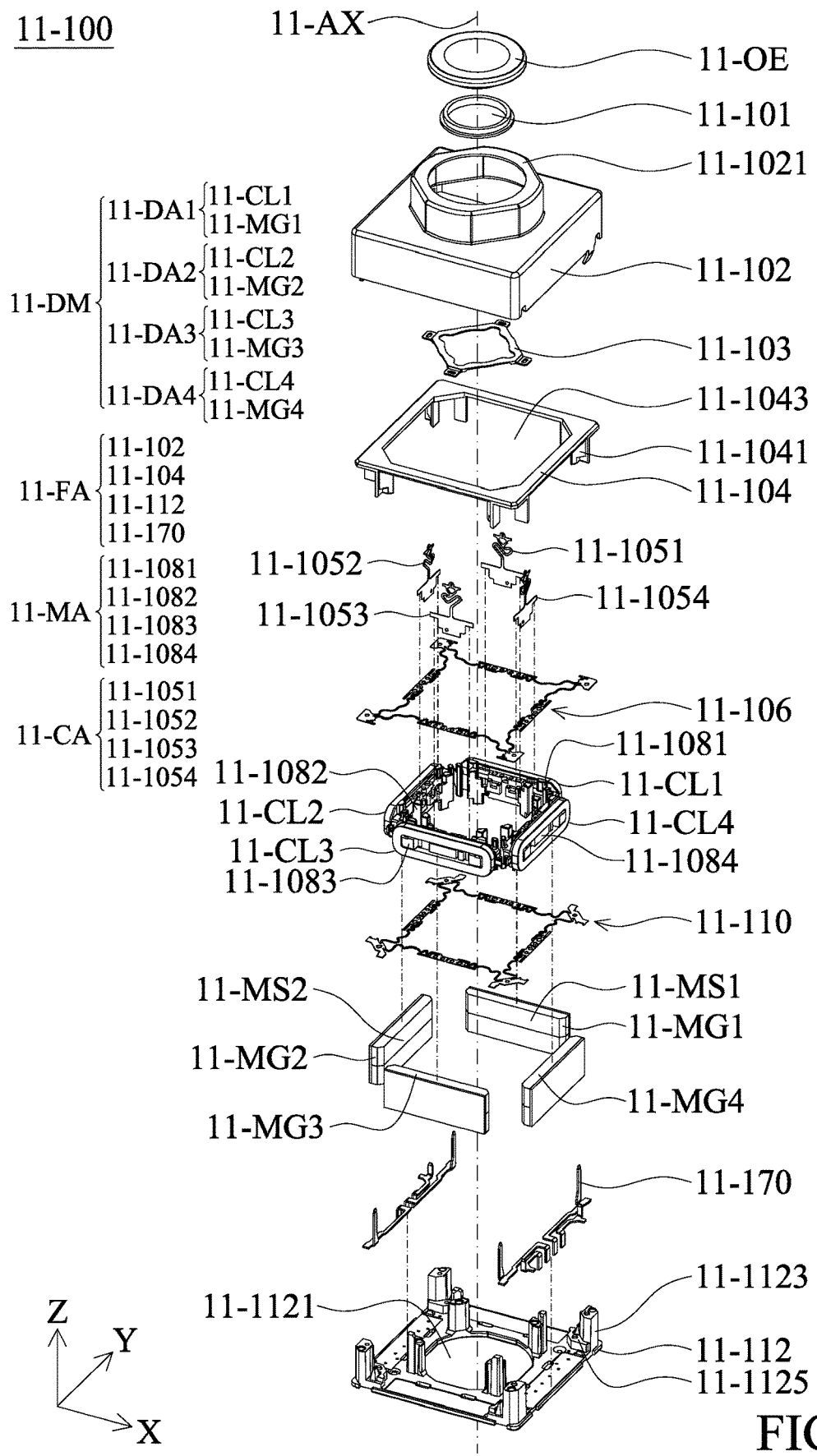
FIG. 120 is an exploded diagram of an optical system 11-100 according to an embodiment of the present disclosure.
Figure 121:
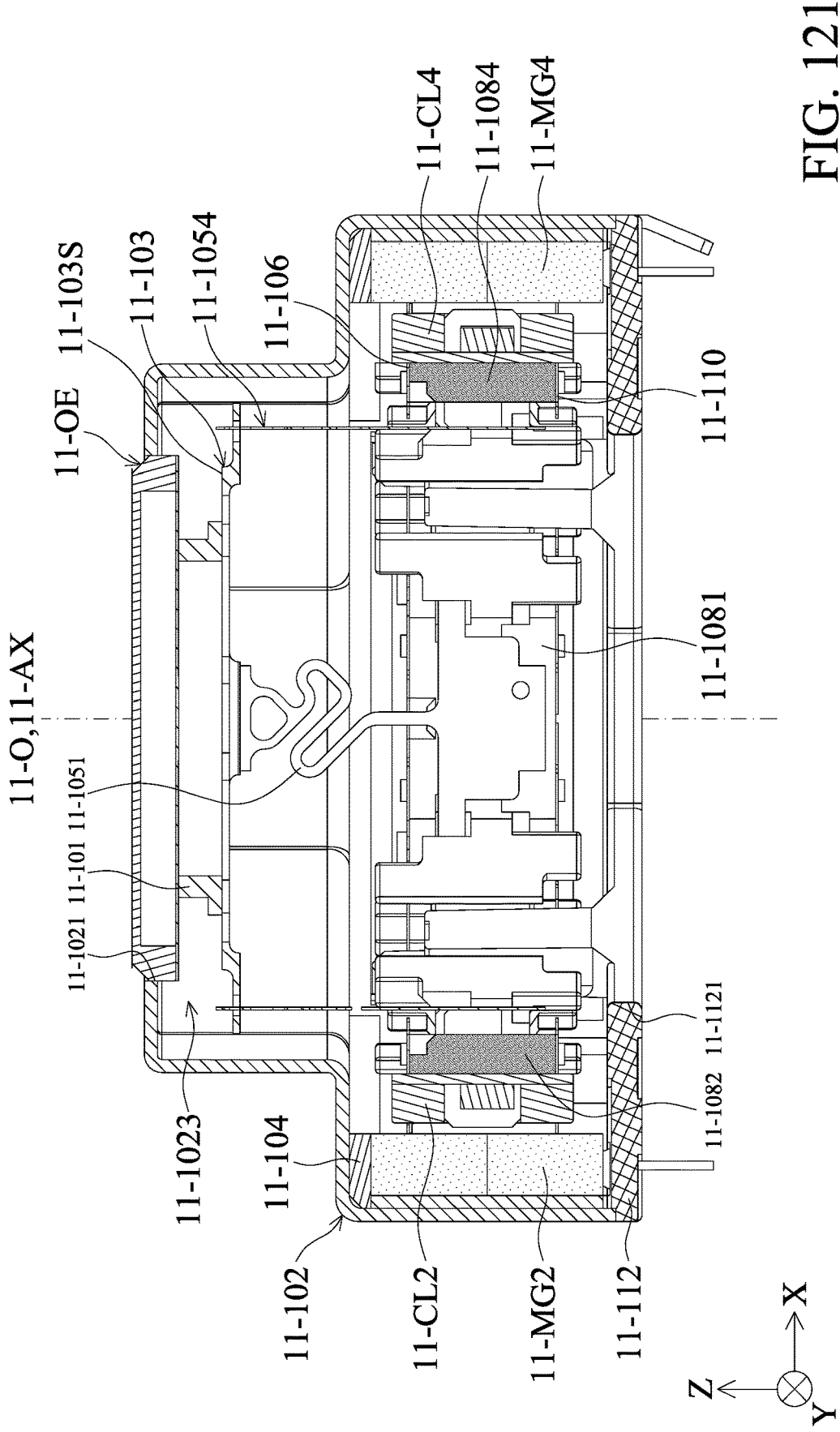
FIG. 121 is a cross-sectional view of the optical system 11-100 along line (11-A)-(11-A') in FIG. 119 according to an embodiment of the present disclosure.

Please refer to FIG. 119 to FIG. 121. FIG. 119 is a schematic diagram of an optical system 11-100 according to an embodiment of the present disclosure, FIG. 120 is an exploded diagram of an optical system 11-100 according to an embodiment of the present disclosure, and FIG. 121 is a cross-sectional view of the optical system 11-100 along line (11-A)-(11-A') in FIG. 119 according to an embodiment of the present disclosure. The optical system 11-100 can be an optical camera system and can be configured to hold and drive a first optical element 11-OE, and the first optical element 11-OE may define an optical axis 11-O. The optical system 11-100 can be installed in different electronic devices or portable electronic devices, such as a smartphone, for allowing a user to perform the image capturing function. In this embodiment, the optical system 11-100 can be a voice coil motor (VCM) with an auto-focusing (AF) function, but it is not limited thereto. In other embodiments, the optical system 11-100 can also perform the functions of auto-focusing and optical image stabilization (OIS).

As shown in FIG. 120, in this embodiment, the optical system 11-100 may include a fixed assembly 11-FA, a deforming member 11-101, a movable element 11-103, and a connecting assembly 11-CA, a movable assembly 11-MA and a driving module 11-DM. The deforming member 11-101 is connected between the movable element 11-103 and the first optical element 11-OE, the movable element 11-103 is movable relative to the fixed assembly 11-FA, and the driving module 11-DM is configured to drive the movable element 11-103 to move relative to the fixed assembly 11-FA. Specifically, the movable assembly 11-MA is movably connected to the movable element 11-103 via the connecting assembly 11-CA, and the driving module 11-DM drives the movable assembly 11-MA to move relative to the fixed assembly 11-FA, thereby driving the movable element 11-103.

In this embodiment, as shown in FIG. 120 and FIG. 121, the fixed assembly 11-FA includes a casing 11-102, a frame 11-104, and a base 11-112. The casing 11-102 is fixedly connected to the base 11-112, and the frame 11-104 can also be fixedly connected to the inner wall surface of the casing 11-102. A main axis 11-AX can be defined by the fixed assembly 11-FA. When the optical system 11-100 is not activated, the main axis 11-AX is parallel to or overlaps an optical axis 11-O of the first optical element 11-OE. In addition, the movable element 11-103 has a movable element surface 11-103S which faces the first optical element 11-OE.

As shown in FIG. 120 and FIG. 121, the aforementioned casing 11-102 has a hollow structure, and a casing opening 11-1021 is formed thereon. A base opening 11-1121 is formed on the base 11-112, The center of the casing opening 11-1021 corresponds to the optical axis 11-O of the first optical element 11-OE, and the base opening 11-1121 corresponds to a photosensitive element (not shown in the figure) disposed below the base 11-112. In this embodiment, the first optical element 11-OE is fixedly disposed in the casing opening 11-1021. The external light can enter the casing 11-102 through the first optical element 11-OE and then is received by the aforementioned photosensitive element after passing through the base opening 11-1121 so as to generate a digital image signal.

Furthermore, the casing 11-102 is disposed on the base 11-112 and may have an accommodating space 11-1023 configured to accommodate the movable element 11-103, the frame 11-104, and the movable assembly 11-MA, the connecting assembly 11-CA, and the driving module 11-DM.

As shown in FIG. 120 and FIG. 121, in this embodiment, the movable assembly 11-MA may include four movable members (a first movable member 11-1081, a second movable member 11-1082, and a third movable member 11-1083 and a fourth movable member 11-1084), and the connecting assembly 11-CA may include four connecting members (a first connecting member 11-1051, a second connecting member 11-1052, a third connecting member 11-1053, and a fourth connecting member 11-1054). The first movable member 11-1081 to the fourth movable member 11-1084 are connected to the movable element 11-103 by the first connecting member 11-1051 to the fourth connecting member 11-1054, respectively.

In addition, the optical system 11-100 may further include a first elastic element 11-106 and a second elastic element 11-110, and the base 11-112 may include four protruding columns 11-1123. The outer portion (the outer ring portion) of the first elastic element 11-106 is fixedly disposed on the top surfaces of the protruding columns 11-1123, the outer portion (the outer ring portion) of the second elastic element 11-110 is fixedly disposed on a plane 11-1125 of each of the protruding columns 11-1123, and the inner portions (the inner ring portions) of the first elastic element 11-106 and the second elastic element 11-110 are respectively connected to the upper and lower sides of the movable assembly 11-MA so that the first movable member 11-1081 to the fourth movable member 11-1084 are suspended in the accommodating space 11-1023.

In this embodiment, the driving module 11-DM may include four driving assemblies (a first driving assembly 11-DA1, a second driving assembly 11-DA2, a third driving assembly 11-DA3, and a fourth driving assembly 11-DA4). The first driving assembly 11-DA1 includes a first driving coil 11-CL1 and a first magnetic element 11-MG1, and the second driving assembly 11-DA2 includes a second driving coil 11-CL2 and a second magnetic element 11-MG2, the third driving assembly 11-DA3 includes a third driving coil 11-CL3 and a third magnetic element 11-MG3, and the fourth driving assembly 11-DA4 includes a fourth driving coil 11-CL4 and a fourth magnetic element 11-MG4.

In this embodiment, each magnetic element has a magnetic surface. For example, as shown in FIG. 120, the first magnetic element 11-MG1 and the second magnetic element 11-MG2 respectively have a first magnetic surface 11-MS1 and a second magnetic surface 11-MS2, the first magnetic surface 11-MS1 faces the first driving coil 11-CL1, the second magnetic surface 11-MS2 faces the second driving coil 11-CL2, and the first magnetic surface 11-MS1 and the second magnetic surface 11-MS2 face different directions.

In this embodiment, as shown in FIG. 120, the frame 11-104 has a plurality of grooves 11-1041 and a central opening 11-1043. In this embodiment, the frame 11-104 has four grooves 11-1041 configured to receive the four magnetic elements, but the number of the grooves 11-1041 and the magnetic elements is not limited to this embodiment. The central opening 11-1043 is configured to accommodate the first driving coil 11-CL1 to the fourth driving coil 11-CL4 and the first movable member 11-1081 to the fourth movable member 11-1084.

In this embodiment, the first driving coil 11-CL1 to the fourth driving coil 11-CL4 may be winding coils, which are respectively disposed on the first movable member 11-1081 to the fourth movable member 11-1084, and when the first driving coil 11-CL1 to the fourth driving coil 11-CL4 are provided with electricity, they can respectively act with the first magnetic element 11-MG1 to the fourth magnetic element 11-MG4 to generate an electromagnetic driving force to drive at least one of the first movable member 11-1081 to the fourth movable member 11-1084 to move relative to the base 11-112 and the frame 11-104 along the optical axis 11-O (the Z-axis) so as to perform functions of auto focusing or optical image stabilization.

The driving assembly of the driving module 11-DM can actuate individually or cooperatively. For example, the first driving assembly 11-DA1 is configured to drive the first movable member 11-1081 to move relative to the fixed assembly 11-FA, and the second driving assembly 11-DA2 is configured to drive the second movable member 11-1082 to move relative to the fixed assembly 11-FA and the first movable member 11-1081, and so on.

Furthermore, as shown in FIG. 120, in this embodiment, the fixed assembly 11-FA may further include at least one circuit member 11-170 configured to be electrically connected to the driving module 11-DM through the first elastic element 11-106 or the second elastic element 11-110. The circuit member 11-170 may be implemented by insert molding technology, but it is not limited thereto.

Figure 122:
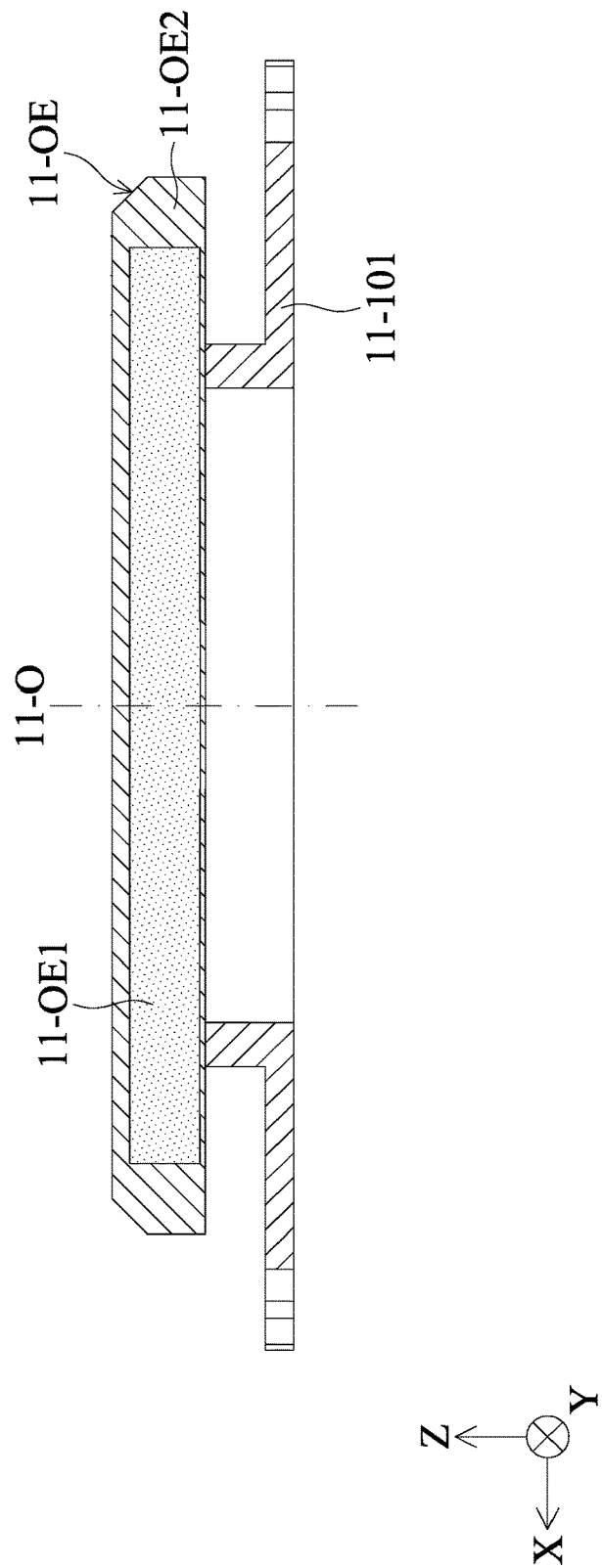
Figure 123:
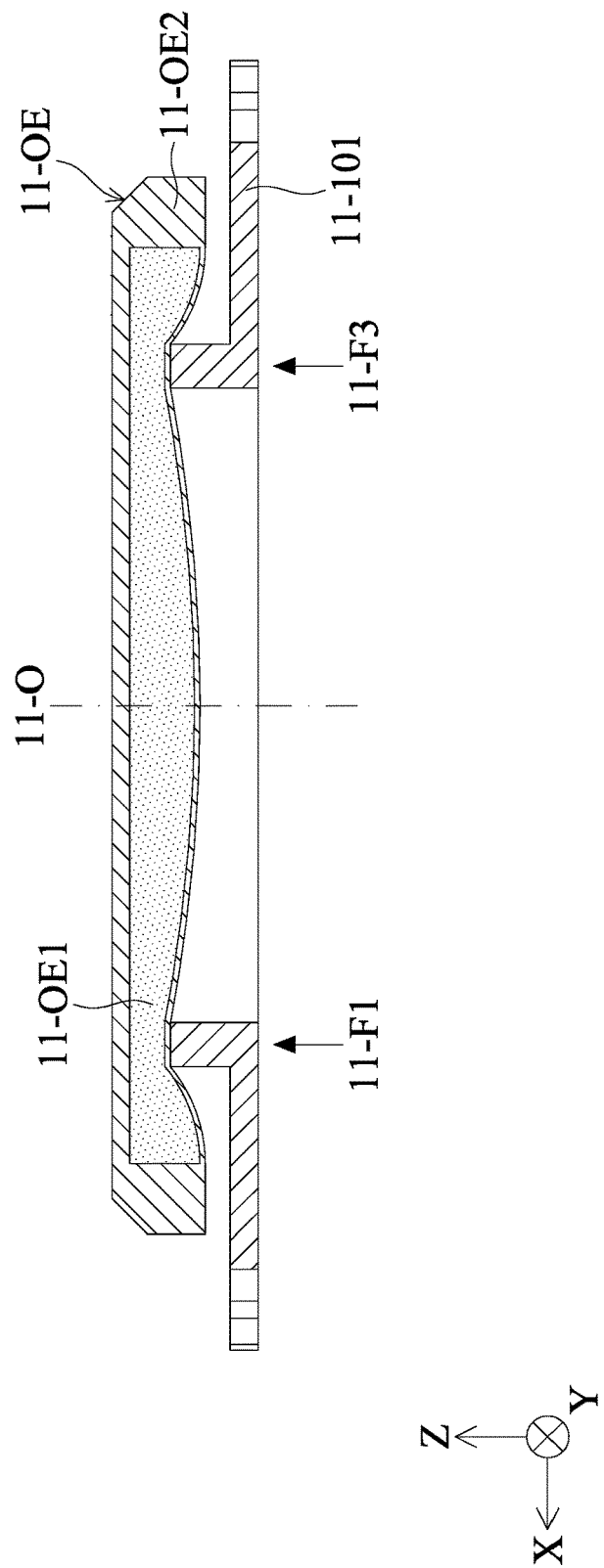
Figure 124:
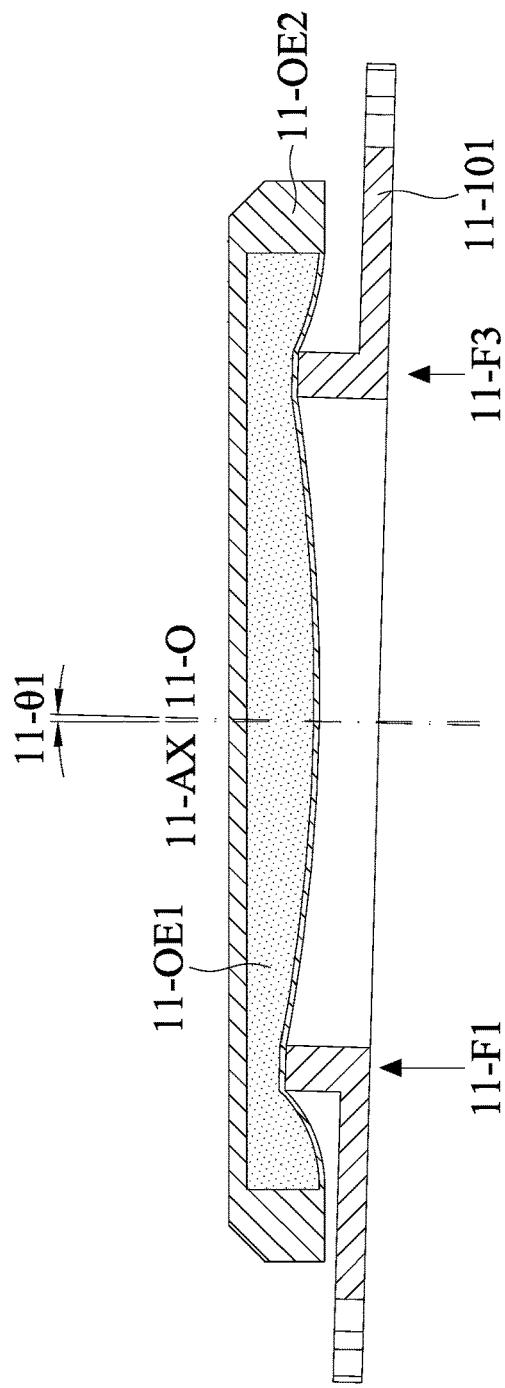

Next, please refer to FIG. 122 to FIG. 124. FIG. 122 is a schematic diagram illustrating that the first optical element 11-OE is not pushed by the deforming member 11-101 according to an embodiment of the present disclosure, and FIG. 123 and FIG. 124 are schematic diagrams of the first optical element 11-OE after being pushed by the deforming member 11-101 according to an embodiment of the present disclosure. As shown in FIG. 122, the first optical element 11-OE may be a liquid lens, including a liquid lens element 11-OE1 and a fixed member 11-OE2. The liquid lens element 11-OE1 is disposed within of the fixed member 11-OE2 having a hollow structure that protects and supports the liquid lens element 11-OE1. The deforming member 11-101 is disposed under the liquid lens element 11-OE1 and the fixed member 11-OE2. The bottom of the fixed member 11-OE2 may be a thin film, so that the deforming member 11-101 may be used for changing the shape of the liquid lens element 11-OE1.

FIG. 122 shows that the liquid lens element 11-OE1 is not deformed and the deforming member 11-101 is in an initial position, and the liquid lens element 11-OE1 has an optical axis 11-O. When the driving module 11-DM drives the movable assembly 11-MA to move, for example, applying a driving current to the driving coils of the driving module 11-DM, a magnetic force is generated between the driving coils and the corresponding magnetic elements, so that the movable assembly 11-MA is driven to move through the magnetic force and to force the deforming member 11-101 though the connecting assembly 11-CA to press the lower side of the liquid lens element 11-OE1. Therefore the liquid lens element 11-OE1 is deformed.

As shown in FIG. 120 and FIG. 123, when the first driving assembly 11-DA1 and the third driving assembly 11-DA3 of the driving module 11-DM provide pushing forces 11-F1, 11-F3 of the same magnitude, the deforming member 11-101 translates along the optical axis 11-O. At this time, the lens curvature of the liquid lens element 11-OE1 is changed from the curvature of the liquid lens element 11-OE1 in FIG. 122. That is, the shape of the liquid lens element 11-OE1 is changed. Therefore, the optical properties of the liquid lens element 11-OE1 can be changed, thereby achieving an optical zoom, focus or shock-proofing effect.

Similarly, referring to FIG. 124, when the driving module 11-DM drives the deforming member 11-101 with a tilted movement, as illustrated in FIG. 124, the deforming member 11-101 obliquely moves and provides an unequal amount of pushing forces 11-F1 and 11-F3 to two different sides of the liquid lens element 11-OE1, so that the optical axis 11-O of the liquid lens element 11-OE1 is rotated and is deviated from the main axis 11-AX. That is, there is an angle 11-θ1 formed between them. Therefore, the optical properties of the liquid lens element 11-OE1 are changed, and the optical zoom, focusing or shock-proofing effect can be accomplished.

Figure 125:
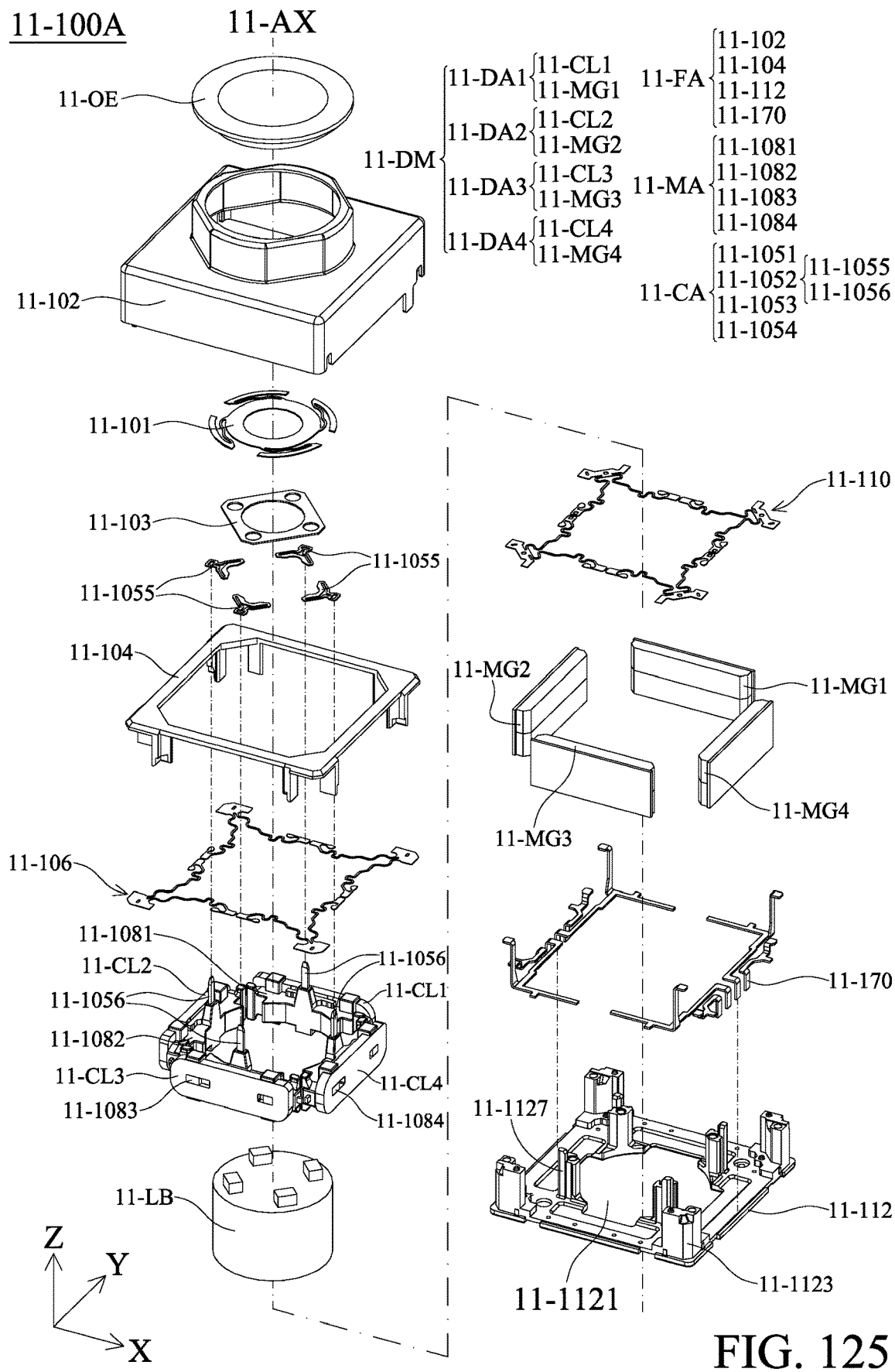
Figure 126:
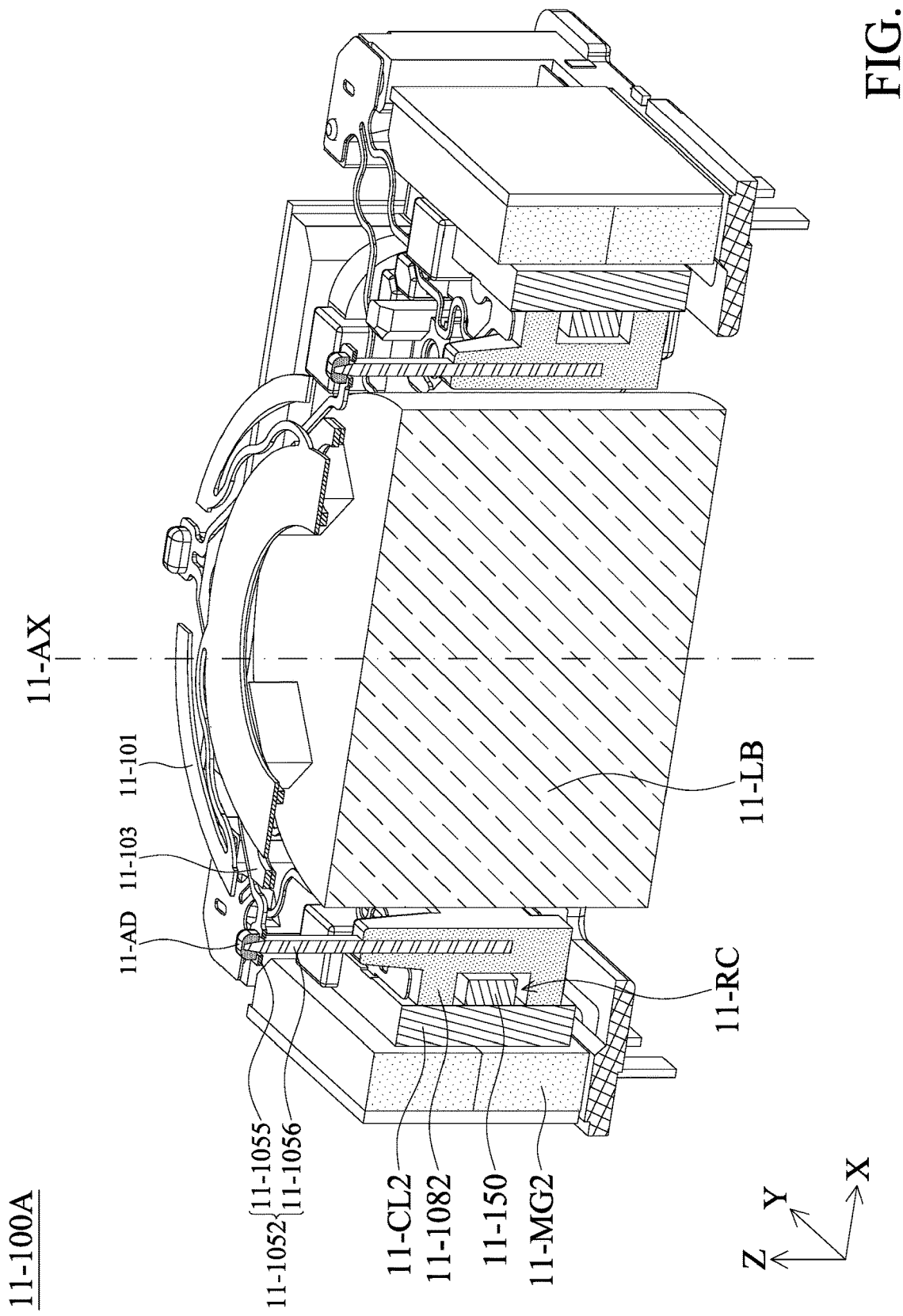

Please refer to FIG. 125 and FIG. 126. FIG. 125 is an exploded diagram of an optical system 11-100A according to another embodiment of the present disclosure, and FIG. 126 is a cross-sectional view of the optical system 11-100A according to another embodiment of the present disclosure. The optical system 11-100A is similar to the optical system 11-100 and may include a lens barrel 11-LB. In this embodiment, the connecting assembly 11-CA of the optical system 11-100A also includes four connecting members, and each connecting member may have an elastic portion and a rigid portion.

For example, as shown in FIG. 125 and FIG. 126, the second connecting member 11-1052 has an elastic portion 11-1055 and a rigid portion 11-1056. The elastic portion 11-1055 may have a plate-shaped structure, which is not parallel to the main axis 11-AX. For example, it may be perpendicular to the main axis 11-AX, and the rigid portion 11-1056 is connected to the elastic portion 11-1055 by the adhesive member 11-AD. The rigid portion 11-1056 is connected between the elastic portion 11-1055 and the second movable member 11-1082.

Figure 127:
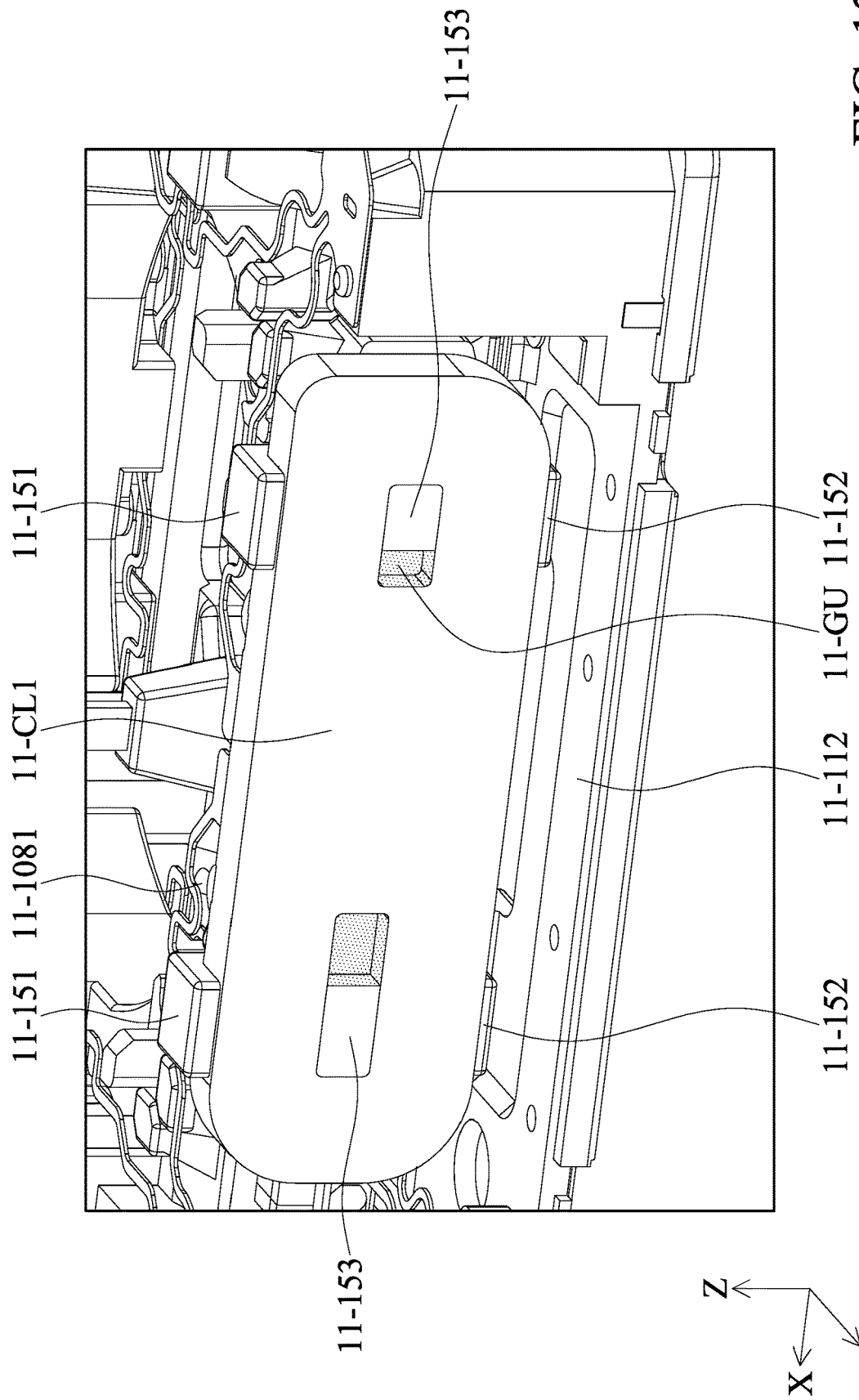

Please refer to FIG. 127, which is a partial structural diagram of the optical system 11-100A according to another embodiment of the present disclosure. In this embodiment, the optical system 11-100A further includes a stopping assembly, and the stopping assembly may include a plurality of stopping members, which are respectively disposed on the first movable member 11-1081 to the fourth movable member 11-1084. The aforementioned stopping assembly is used for limiting the range of motion of the movable assembly 11-MA and the movable element 11-103.

Specifically, as shown in FIG. 127, two first stopping members 11-151, two second stopping members 11-152, and two third stopping members 11-153 are disposed on the first movable member 11-1081. All of these first stopping members 11-151 are disposed on one side of the first movable member 11-1081 and face the first optical element 11-OE, and all of these second stopping members 11-152 are disposed on the other side of the first movable member 11-1081 and face the base 11-112.

In addition, as shown in FIG. 127, the first driving coil 11-CL1 surrounds the third stopping members 11-153, and the optical system 11-100A may further include at least one glue 11-GU disposed on the third stopping members 11-153, and the glue 11-GU is configured to be adhered to the first driving coil 11-CL1 and the first movable member 11-1081.

It should be noted that the second movable member 11-1082, the third movable member 11-1083, and the fourth movable member 11-1084 also have the same configuration. There are fewer than three first stopping members 11-151, fewer than three second stopping members 11-152, and fewer than three third stopping members 11-153 on each movable member of this disclosure.

Figure 128:
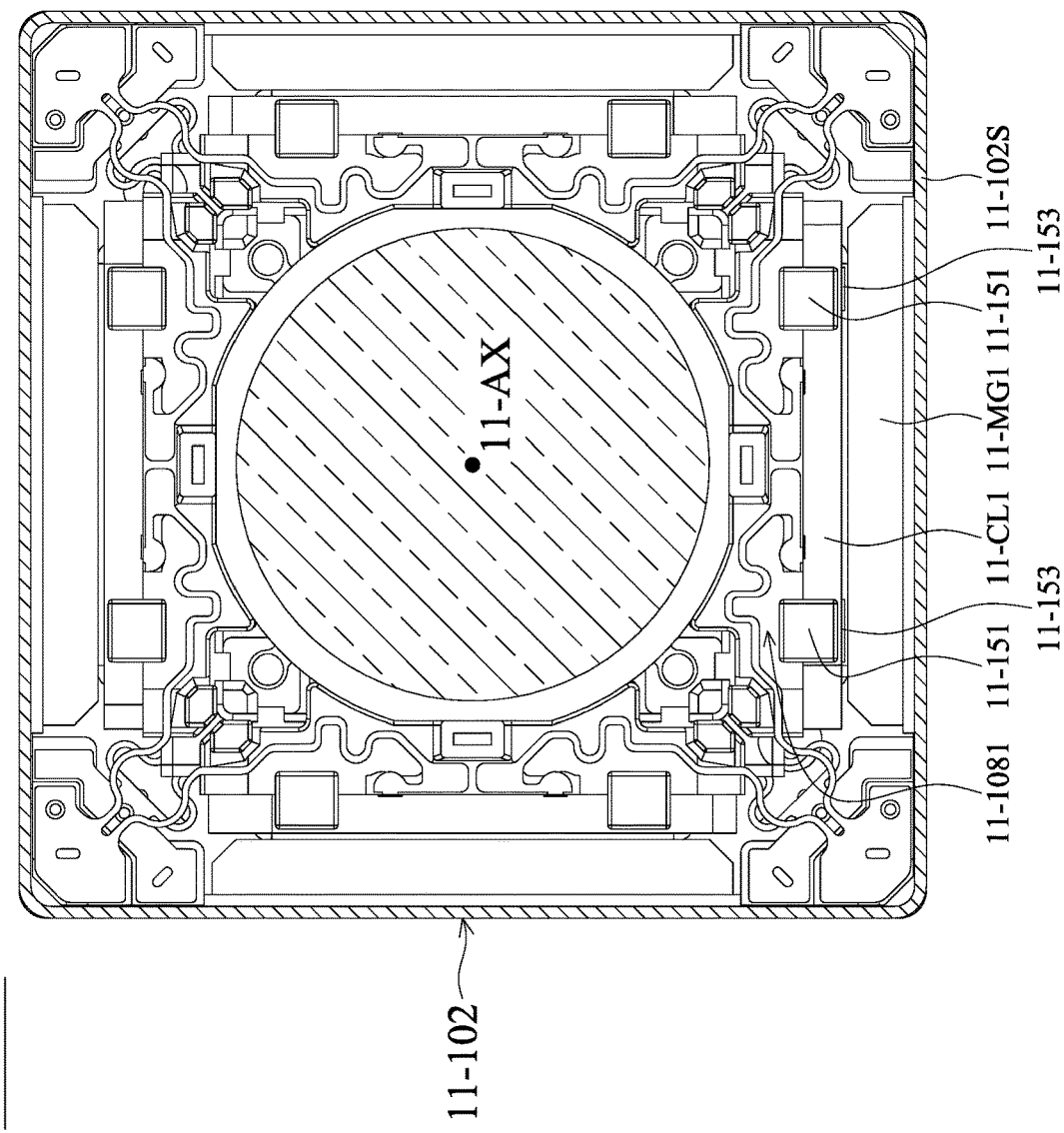

Please continue to refer to FIG. 127 and FIG. 128. FIG. 128 is a top view of a partial structure of the optical system 11-100A according to another embodiment of the present disclosure. In this embodiment, the first stopping members 11-151, the two second stopping members 11-152, and the two third stopping members 11-153 on the first movable member 11-1081 only correspond to a sidewall 11-102S of the casing 11-102. That is, when viewed along the main axis 11-AX, the connecting line of the first stopping members 11-151 does not pass through the main axis 11-AX.

Furthermore, as shown in FIG. 127 and FIG. 128, when viewed along the main axis 11-AX, these first stopping members 11-151 partially overlap the first driving coil 11-CL1 of the first driving assembly 11-DA1. Similarly, the second stopping members 11-152 also partially overlap the first driving coil 11-CL1 of the first driving assembly 11-DA1.

In addition, as shown in FIG. 128, in the Y-axis (the first direction), the distance between the third stopping member 11-153 and the first magnetic element 11-MG1 (the driving magnet) is smaller than the distance between the first driving coil 11-CL1 and the first magnetic element 11-MG1. That is, the third stopping members 11-153 can be used for preventing the first driving coil 11-CL1 from colliding with the first magnetic element 11-MG1.

Figure 129:
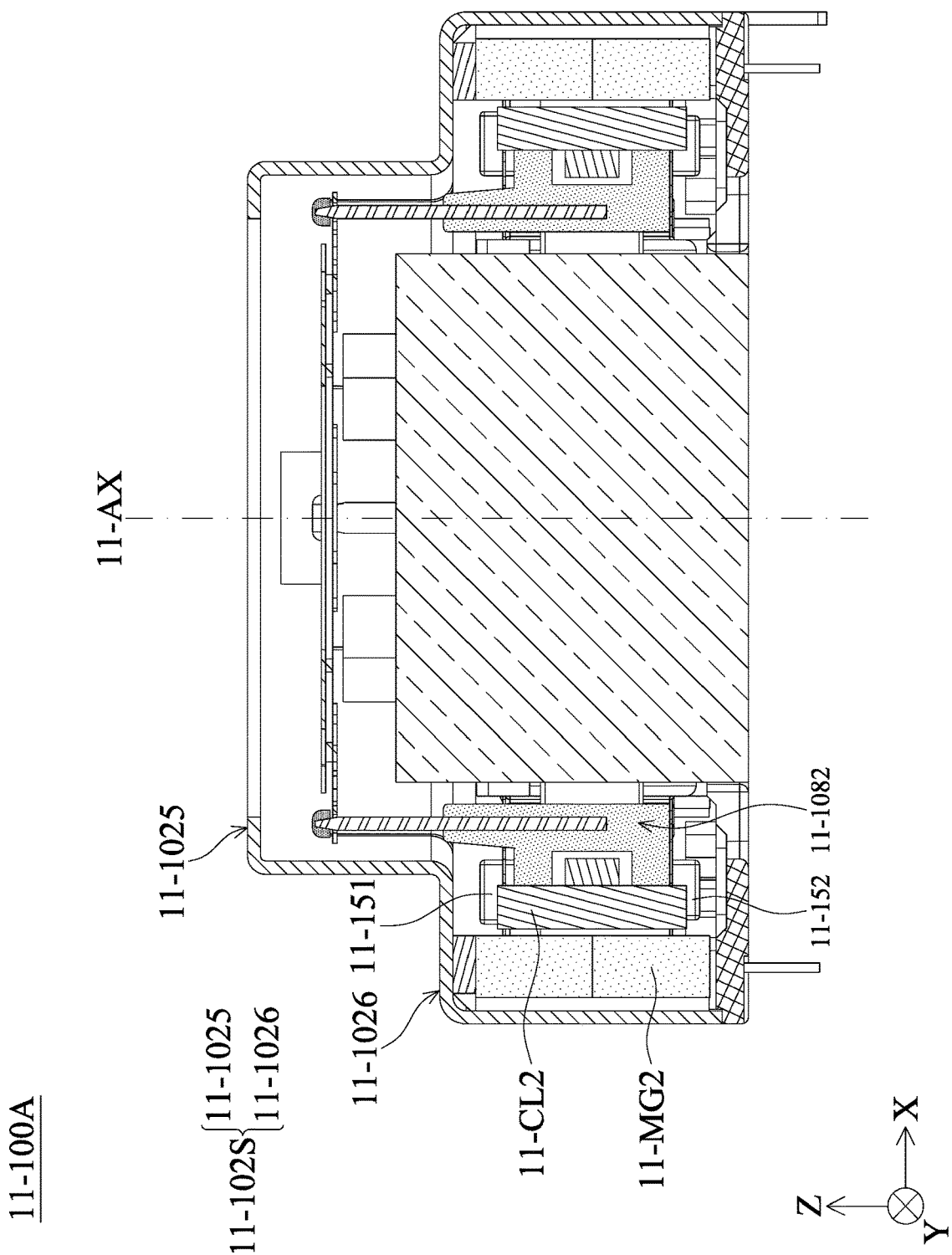

Next, please refer to FIG. 129, which is a cross-sectional view of the optical system 11-100A according to another embodiment of the present disclosure. As shown in FIG. 129, the sidewall 11-102S includes a first top surface 11-1025 and a second top surface 11-1026, and when viewed along the main axis 11-AX, the second top surface 11-1026 partially overlaps these first stopping members 11-151. In other embodiments, the second top surface 11-1026 may not overlap the first stopping members 11-151.

Furthermore, when viewed along the main axis 11-AX, the first top surface 11-1025 does not overlap the second magnetic element 11-MG2 and the second driving coil 11-CL2 of the second driving assembly 11-DA2.

Figure 130:
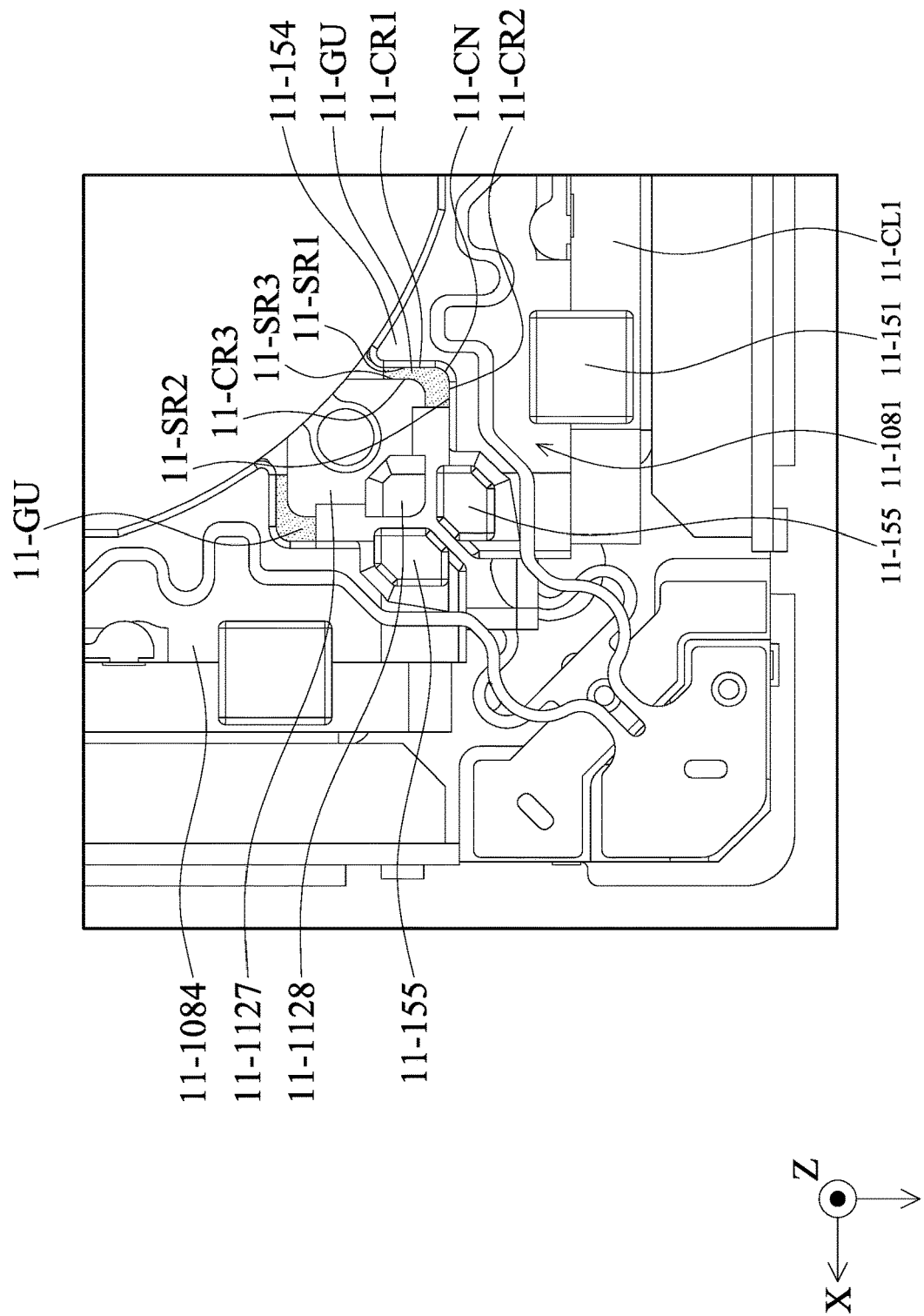

Please continue to refer to FIG. 130, which is a schematic diagram of a partial structure of the optical system 11-100A according to another embodiment of the present disclosure. In this embodiment, four protruding pillars 11-1127 (FIG. 125) may be further formed on the base 11-112, and the aforementioned stopping assembly may further include a fourth stopping member 11-154 extending along the Y-axis (the first axis) and disposed on the first movable member 11-1081. The protruding pillar 11-1127 is configured to block the fourth stopping member 11-154, thereby preventing the first movable member 11-1081 of the movable assembly 11-MA from rotating around the main axis 11-AX or moving along the Y-axis (the first axis) or the X-axis (the second axis).

When viewed along the main axis 11-AX (the Z-axis), the protruding pillar 11-1127 is located between the first driving coil 11-CL1 of the first driving assembly 11-DA1 and the main axis 11-AX. In addition, the optical system 11-100A may further include glue 11-GU, which is disposed between the protruding pillar 11-1127 and the movable assembly 11-MA. As shown in FIG. 130, a piece of glue 11-GU is disposed between the protruding pillar 11-1127 and the first movable member 11-1081, and another piece of glue 11-GU is disposed between the protruding pillar 11-1127 and the fourth movable member 11-1084.

As shown in FIG. 130, the aforementioned stopping assembly may further include a fifth stopping member 11-155, which is disposed on the first movable member 11-1081 and faces the casing 11-102, and a protruding portion 11-1128 may be formed on the protruding pillar 11-1127 and is configured to block the fifth stopping member 11-155, thereby preventing the first movable member 11-1081 of the movable assembly 11-MA from rotating around the X-axis (the second axis).

Figure 131:
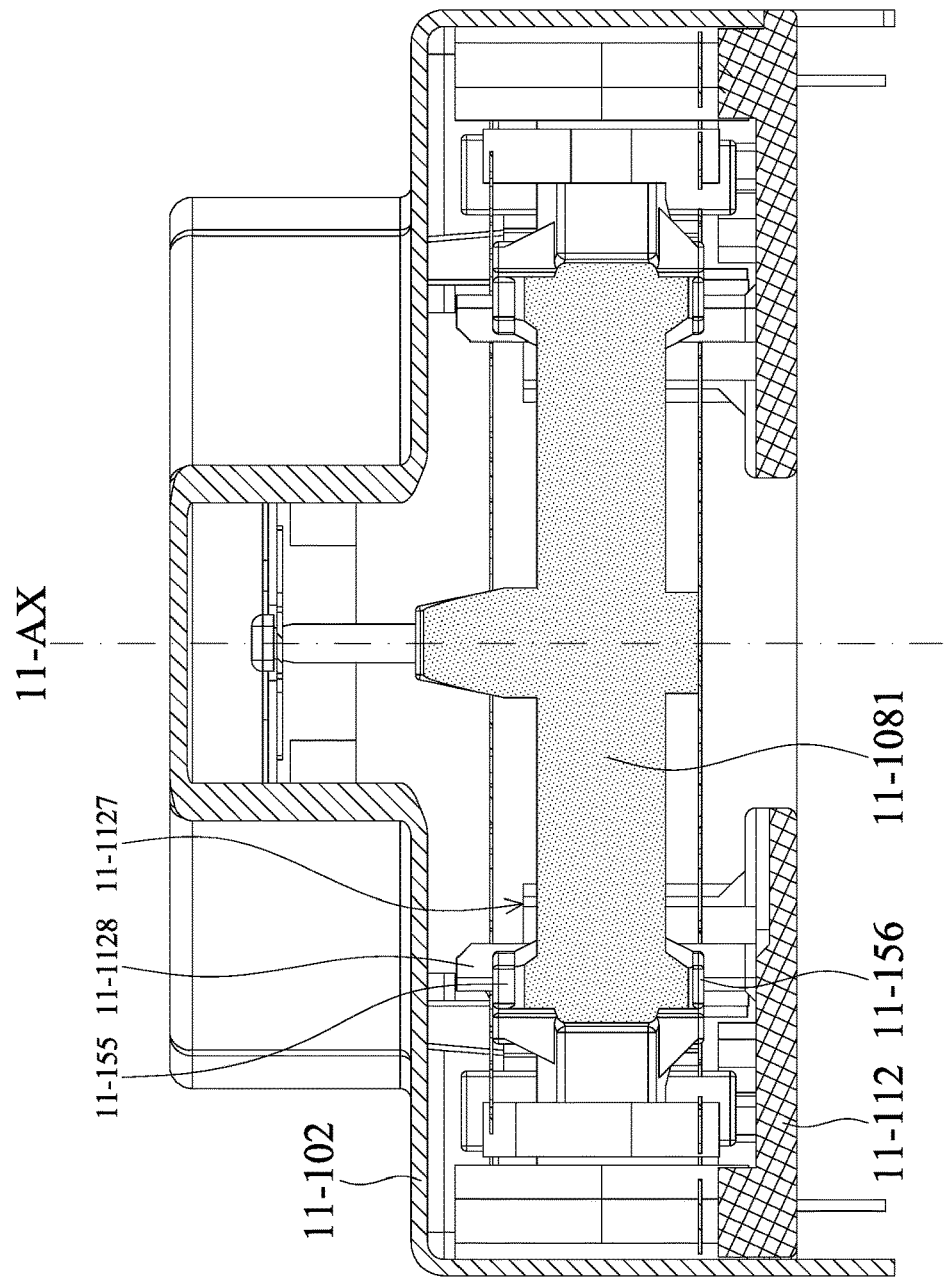

Please refer to FIG. 130 and FIG. 131. FIG. 131 is a cross-sectional view of the optical system 11-100A along the XZ plane according to an embodiment of the present disclosure. As shown in FIG. 131, along the main axis 11-AX, the distance between the protruding portion 11-1128 and the casing 11-102 is smaller than the distance between the fifth stopping member 11-155 and the casing 11-102.

In addition, as shown in FIG. 131, the foregoing stopping assembly may further include a sixth stopping member 11-156, which is disposed on the first movable member 11-1081 and faces the base 11-112. The protruding pillar 11-1127 is configured to block the sixth stopping member 11-156, thereby preventing the first movable member 11-1081 of the movable assembly 11-MA from rotating around the X-axis (the second axis).

In this embodiment, the sixth stopping member 11-156 and the fifth stopping member 11-155 are disposed on opposite sides of the first movable member 11-1081, and when viewed along the main axis 11-AX, the fifth stopping member 11-155 partially overlaps the sixth stopping member 11-156. That is, the shapes of the fifth stopping member 11-155 and the sixth stopping member 11-156 may be different or asymmetrical.

As shown in FIG. 130, the first movable member 11-1081 has a first surface 11-SR1 and a second surface 11-SR2, the first surface 11-SR1 and the second surface 11-SR2 are connected to a corner 11-CN, a first contact surface 11-CR1 of the glue 11-GU contacts the first surface 11-SR1, and a second contact surface 11-CR2 of the glue 11-GU contacts the second surface 11-SR2. The protruding pillar 11-1127 has a third surface 11-SR3, and a third contact surface 11-CR3 of the glue 11-GU is configured to contact the third surface 11-SR3.

Figure 134:
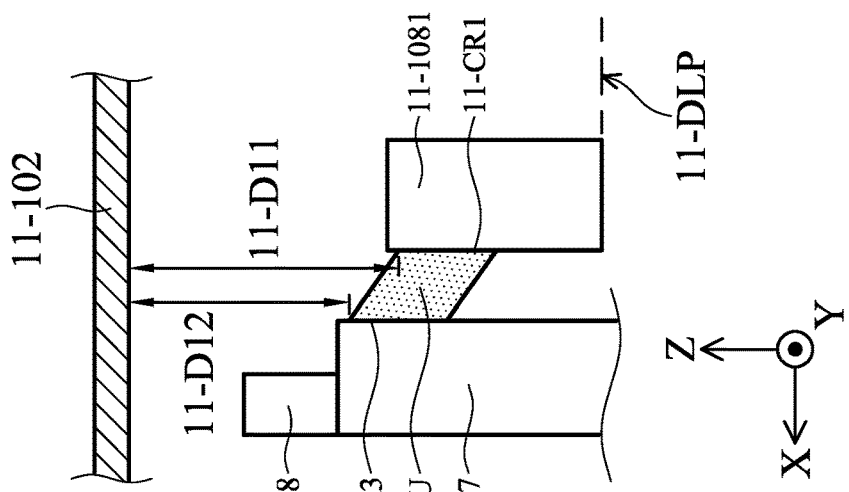
Figure 133:
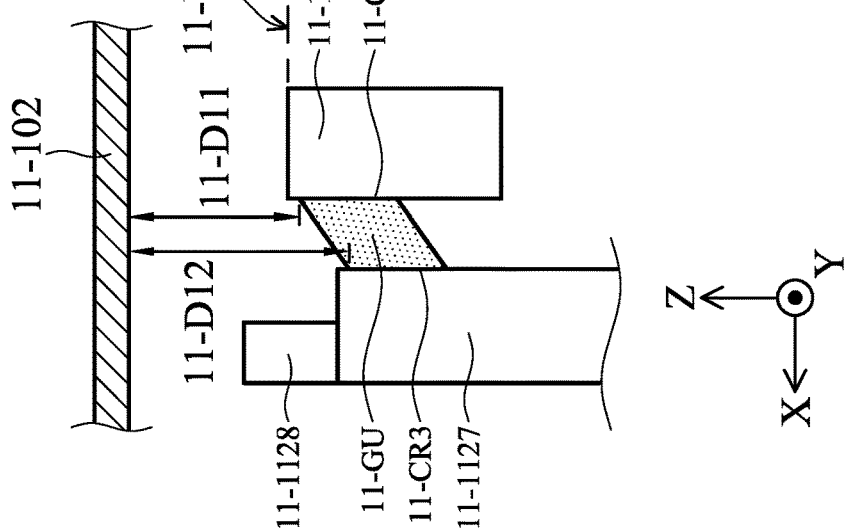
Figure 132:
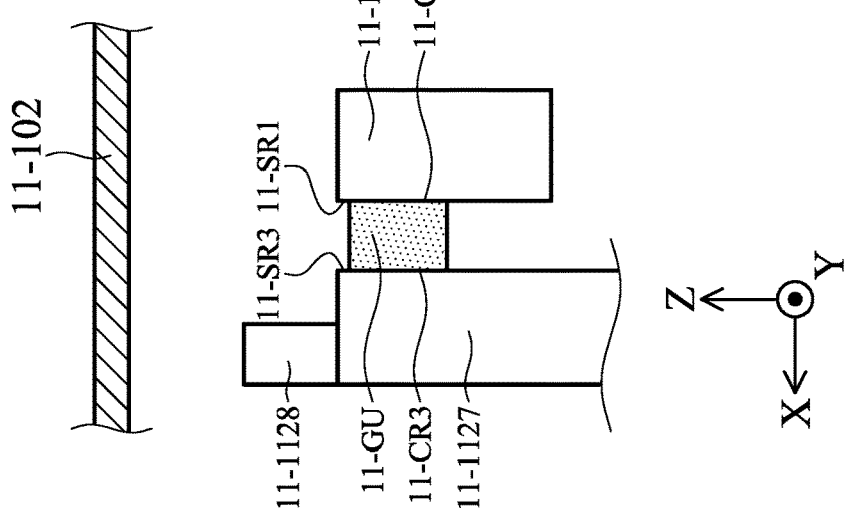

Please refer to FIG. 132 to FIG. 134, which are schematic diagrams of the movement of the first movable member 11-1081 relative to the protruding pillar 11-1127 according to an embodiment of the present disclosure. As shown in FIG. 132, when the first movable member 11-1081 does not move relative to the protruding pillar 11-1127, the glue 11-GU does not deform. Next, as shown in FIG. 133 and FIG. 134, the first movable member 11-1081 of the movable assembly 11-MA is configured to move between an upper limit position 11-ULP and a lower limit position 11-DLP along the main axis 11-AX (the Z-axis), and the glue 11-GU is disposed between the upper limit position 11-ULP and the lower limit position 11-DLP. For example, the glue 11-GU can be disposed at the center of the upper limit position 11-ULP and the lower limit position 11-DLP, but it is not limited thereto.

Furthermore, as shown in FIG. 133, when the first movable member 11-1081 of the movable assembly 11-MA is located at the upper limit position 11-ULP, the glue 11-GU is deformed, and the distance D11 along the main axis 11-AX between the first contact surface 11-CR1 and the casing 11-102 is less than the distance D12 between the third contact surface 11-CR3 and the casing 11-102.

Furthermore, as shown in FIG. 134, when the first movable member 11-1081 of the movable assembly 11-MA is located at the lower limit position 11-DLP, the glue 11-GU is deformed, and the distance D11 along the main axis 11-AX between the first contact surface 11-CR1 and the casing 11-102 is greater than the distance D12 between the third contact surface 11-CR3 and the casing 11-102.

Figure 135:
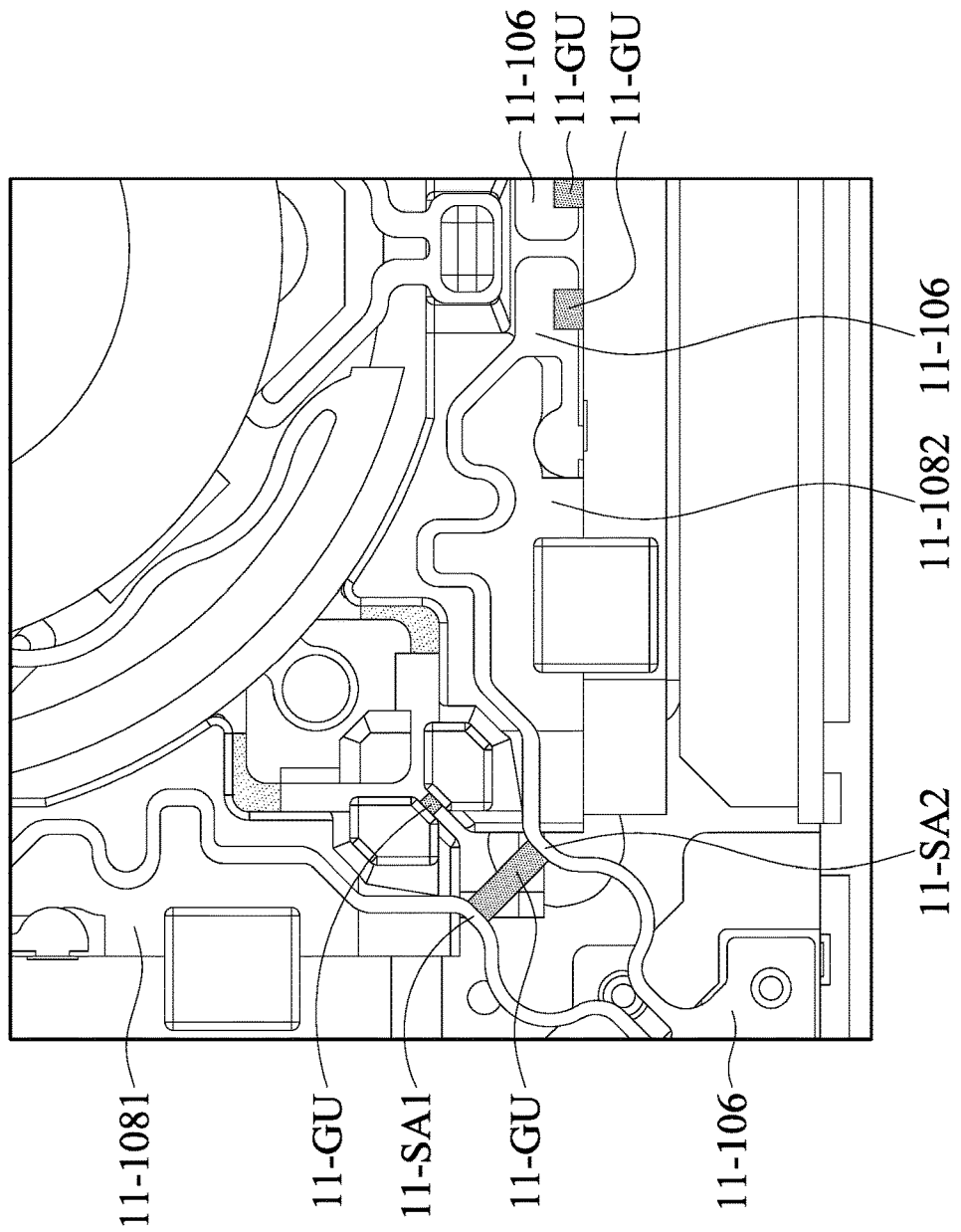

Please continue to refer to FIG. 135, which is a top view of a part of the structure of the optical system 11-100A according to another embodiment of the present disclosure. As shown in FIG. 135, the first movable member 11-1081 is disposed along the X-axis (the second axis), and the second movable member 11-1082 is disposed along the Y-axis (the first axis). The second movable member 11-1082 is adjacent to the first movable member 11-1081, and the second movable member 11-1082 is configured to block the first movable member 11-1081 from moving along the X-axis or the Y-axis.

Furthermore, the optical system 11-100A further includes one or more pieces of glue 11-GU, which are disposed between the first movable member 11-1081 and the second movable member 11-1082. As shown in FIG. 135, by disposing the glue 11-GU, the first movable member 11-1081 can be prevented from directly colliding with the second movable member 11-1082 to cause damage.

As shown in FIG. 135, the first elastic element 11-106 includes a first string arm 11-SA1 and a second string arm 11-SA2, which are respectively connected to the first movable member 11-1081 and the second movable member 11-1082, and the glue 11-GU can also be disposed between the first string arm 11-SA1 and the second string arm 11-SA2 for preventing the first string arm 11-SA1 from colliding with the second string arm 11-SA2 to cause damage.

In addition, in this embodiment, the glue 11-GU may also be disposed between the elastic element and the movable assembly 11-MA. As shown in FIG. 135, the glue 11-GU is disposed between the first elastic element 11-106 and the second movable member 11-1082.

Figure 136:
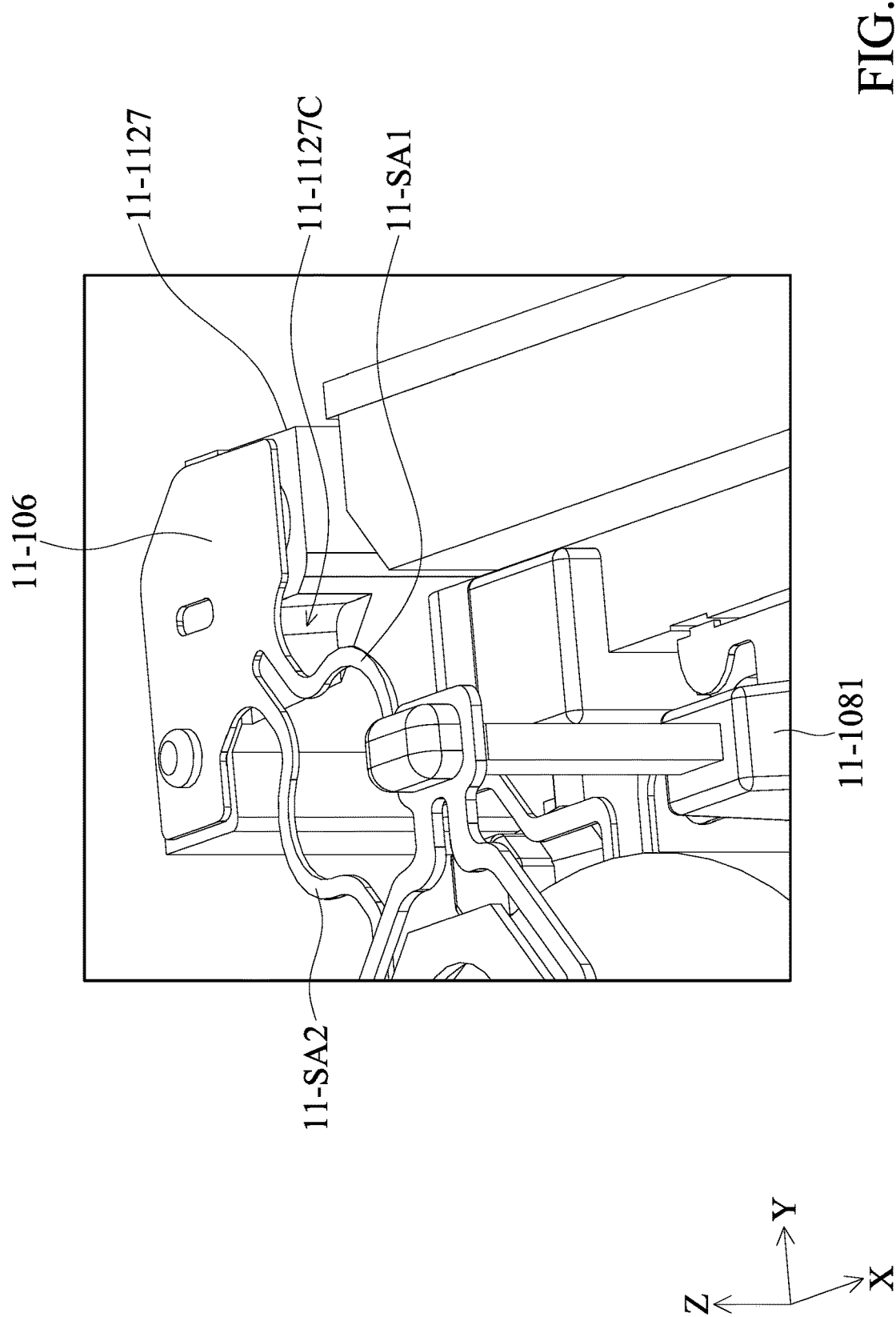

Please refer to FIG. 136, which is a partial structural diagram of the optical system 11-100A according to another embodiment of the present disclosure. In this embodiment, an avoiding groove 11-1127C corresponding to the first string arm 11-SA1 and the second string arm 11-SA2 is formed on the protruding pillar 11-1127. By disposing the avoiding groove 11-1127C, the first string arm 11-SA1 and the second string arm 11-SA2 can be prevented from directly colliding with the protruding pillar 11-1127 to cause damage.

Please refer to FIG. 137, which is a schematic structural diagram of a part of the optical system 11-100A according to another embodiment of the present disclosure. The protruding pillars 11-1127 of the present disclosure may have different designs. In this embodiment, a receiving groove 11-1127R may be formed on the protruding pillar 11-1127 in further, and the optical system 11-100A may further include an adhesive element 11-AE which is disposed in the receiving groove 11-1127R and is configured to be adhered to the protruding pillar 11-1127, the first elastic element 11-106, and the casing 11-102.

In addition, in this embodiment, the optical system 11-100A may further include another piece of glue 11-GU, which is disposed between the elastic element and the fixed assembly 11-FA. Specifically, as shown in FIG. 137, the first elastic element 11-106 may have a perforation 11-106H, and the glue 11-GU may be disposed between the first elastic element 11-106 and the protruding pillar 11-1127 through the perforation 11-106H.

The present disclosure provides an optical system having a first optical element 11-OE, a deforming member 11-101, a movable element 11-103, a fixed assembly 11-FA, a connecting assembly 11-CA, a movable assembly 11-MA, and a driving module 11-DM. The movable element 11-103 is configured to be connected to the first optical element 11-OE through the deforming member 11-101, and the movable assembly 11-MA is connected to the movable element 11-103 through the connecting assembly 11-CA. When driving module 11-DM is configured to drive movable assembly 11-MA to move relative to fixed assembly 11-FA, the movable element 11-103 can be moved to drive the deforming member 11-101 to push the bottom of first optical element 11-OE, thereby changing the optical properties of the liquid lens element 11-OE1.

In addition, the optical system of the present disclosure may include a plurality of pieces of glue 11-GU, and the glue 11-GU may serve as a buffering element, disposed between a stopping member and a driving coil, between two adjacent movable members, between a movable member and the protruding column 11-1127, between the elastic element and the movable assembly 11-MA, or between the elastic element and the fixed assembly 11-FA, so as to prevent the elements in the optical system from the damage caused by collision.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a fixed assembly, having a main axis;
   a movable element, movable relative to the fixed assembly and having a movable element surface facing a first optical element; and
   a driving module, configured to drive the movable element to move relative to the fixed assembly;
   wherein the driving module includes:
   a first driving assembly, having:
      a first driving coil; and
      a first magnetic element, having a first magnetic surface which faces the first driving coil; and
   a second driving assembly, having:
      a second driving coil; and
      a second magnetic element, having a second magnetic surface which faces the second driving coil;
   wherein the first magnetic surface and the second magnetic surface face different directions;
   wherein the optical system further comprises a movable assembly and a connecting assembly, the movable assembly is movably connected to the movable element via the connecting assembly, and the driving module drives the movable assembly to move relative to the fixed assembly, thereby driving the movable element;
   wherein the driving module further includes a third driving assembly, the movable assembly includes a first movable member surface and a third movable member surface, the first movable member surface faces the first driving assembly, and the third movable member surface faces the third driving assembly, wherein an imaginary plane is defined by the optical system, the imaginary plane is perpendicular to the main axis, and when the driving module drives the movable assembly and when viewed in a direction perpendicular to the main axis, an angle between the movable element surface and the imaginary plane is less than or equal to an angle formed between a line connecting a center of the first movable member surface with a center of the third movable member surface and the imaginary plane.

2. The optical system as claimed in claim 1, wherein the movable assembly includes a first movable member and a second movable member, the first driving assembly is configured to drive the first movable member to move relative to the fixed assembly, and the second driving assembly is configured to drive the second movable member to move relative to the fixed assembly and the first movable member.

3. The optical system as claimed in claim 1, wherein the connecting assembly includes a connecting member, and the movable assembly is connected to the movable element via an elastic portion of the connecting member.

4. The optical system as claimed in claim 3, wherein the elastic portion has a plate-shaped structure which is substantially parallel to the main axis.

5. The optical system as claimed in claim 3, wherein the connecting member has a platform surface facing the movable element.

6. The optical system as claimed in claim 3, wherein the movable assembly includes a first accommodating slot, and the first accommodating slot is configured to accommodate the connecting member.

7. The optical system as claimed in claim 6, wherein the movable assembly further includes a second accommodating slot, and an adhesive element is disposed in the second accommodating slot and is configured to adhere to the connecting member.

8. The optical system as claimed in claim 3, wherein the elastic portion has a plate-shaped structure which is not parallel to the main axis.

9. The optical system as claimed in claim 8, wherein the connecting member further includes a rigid portion connected between the elastic portion and the movable assembly, and in the main axis, an elastic coefficient of the rigid portion is greater than an elastic coefficient of the elastic portion.

10. The optical system as claimed in claim 9, wherein a portion of the rigid portion is embedded in the movable assembly, the rigid portion includes a first section and a second section connected to the first section, and the second section is not parallel to the first section.

11. The optical system as claimed in claim 8, wherein the elastic portion includes a first cantilever, and when viewed in a direction of the main axis, the movable element does not overlap at least one portion of the first cantilever.

12. The optical system as claimed in claim 11, wherein the optical system further comprises a lens barrel configured to accommodate at least one second optical element, and the lens barrel has at least one projection, which extends toward the movable element.

13. The optical system as claimed in claim 12, wherein the connecting assembly further includes a plurality of connecting members, and the elastic portions of the connecting members are disposed around the main axis.

14. The optical system as claimed in claim 13, wherein when viewed in the direction of the main axis, the projection is located between adjacent two of the elastic portions.

15. The optical system as claimed in claim 1, wherein an opening and a perforation are formed on the movable element, the main axis passes through the opening, and the perforation is adjacent to the opening.

16. The optical system as claimed in claim 15, wherein the movable element has a plurality of perforations configured to surround the opening in a symmetrical manner.

17. The optical system as claimed in claim 1, wherein when viewed in a direction of the main axis, the movable assembly overlaps the first optical element.

18. An optical system, comprising:
a fixed assembly, having a main axis;
a movable element, movable relative to the fixed assembly and having a movable element surface facing a first optical element; and
a driving module, configured to drive the movable element to move relative to the fixed assembly;
wherein the driving module includes:
a first driving assembly, having:
a first driving coil; and
a first magnetic element, having a first magnetic surface which faces the first driving coil; and
a second driving assembly, having:
a second driving coil; and
a second magnetic element, having a second magnetic surface which faces the second driving coil;
wherein the first magnetic surface and the second magnetic surface face different directions;
wherein the optical system further comprises a movable assembly and a connecting assembly, the movable assembly is movably connected to the movable element via the connecting assembly, and the driving module drives the movable assembly to move relative to the fixed assembly, thereby driving the movable element;
wherein the movable assembly includes a first movable member and a second movable member, the first driving assembly is configured to drive the first movable member to move relative to the fixed assembly, and the second driving assembly is configured to drive the second movable member to move relative to the fixed assembly and the first movable member.

19. An optical system, comprising:
a fixed assembly, having a main axis;
a movable element, movable relative to the fixed assembly and having a movable element surface facing a first optical element; and
a driving module, configured to drive the movable element to move relative to the fixed assembly;
wherein the driving module includes:
a first driving assembly, having:
a first driving coil; and
a first magnetic element, having a first magnetic surface which faces the first driving coil; and
a second driving assembly, having:
a second driving coil; and
a second magnetic element, having a second magnetic surface which faces the second driving coil;
wherein the first magnetic surface and the second magnetic surface face different directions;
wherein the optical system further comprises a movable assembly and a connecting assembly, the movable assembly is movably connected to the movable element via the connecting assembly, and the driving module drives the movable assembly to move relative to the fixed assembly, thereby driving the movable element;
wherein the connecting assembly includes a connecting member, and the movable assembly is connected to the movable element via an elastic portion of the connecting member;
wherein the elastic portion has a plate-shaped structure which is not parallel to the main axis;
wherein the connecting member further includes a rigid portion connected between the elastic portion and the movable assembly, and in the main axis, an elastic coefficient of the rigid portion is greater than an elastic coefficient of the elastic portion.

20. An optical system, comprising:
a fixed assembly, having a main axis;
a movable element, movable relative to the fixed assembly and having a movable element surface facing a first optical element; and a driving module, configured to drive the movable element to move relative to the fixed assembly;
wherein the driving module includes:
a first driving assembly, having:
  a first driving coil; and
  a first magnetic element, having a first magnetic surface which faces the first driving coil; and
a second driving assembly, having:
  a second driving coil; and
  a second magnetic element, having a second magnetic surface which faces the second driving coil;
wherein the first magnetic surface and the second magnetic surface face different directions;
wherein the optical system further comprises a movable assembly and a connecting assembly, the movable assembly is movably connected to the movable element via the connecting assembly, and the driving module drives the movable assembly to move relative to the fixed assembly, thereby driving the movable element;
wherein the connecting assembly includes a connecting member, and the movable assembly is connected to the movable element via an elastic portion of the connecting member;
wherein the elastic portion has a plate-shaped structure which is not parallel to the main axis;
wherein the elastic portion includes a first cantilever, and when viewed in a direction of the main axis, the movable element does not overlap at least one portion of the first cantilever.

* * * * *